United States Patent Office 3,850,911
Patented Nov. 26, 1974

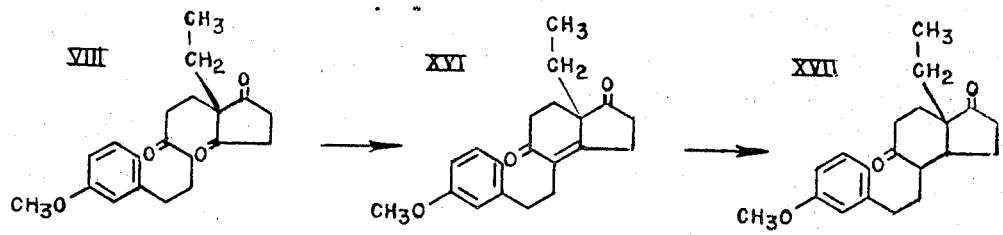

3,850,911
STEROID SYNTHESIS
Gordon Alan Hughes, Conshohocken, Pa., and Herchel Smith, 500 Chestnut Lane, Wayne, Pa. 19087; said Hughes assignor to Herchel Smith
Continuation-in-part of abandoned applications Ser. No. 57,904, Sept. 23, 1960, Ser. No. 91,341, Feb. 24, 1961, Ser. No. 137,535, Sept. 12, 1961, Ser. No. 195,000, May 15, 1962, and Ser. No. 196,557, May 16, 1962, This application Oct. 4, 1962, Ser. No. 228,384
Claims priority application Great Britain, Sept. 22, 1960, 32,670/60, 32,671/60
Int. Cl. C07c 169/08, 169/22, 173/00
U.S. Cl. 260—239.5                7 Claims

ABSTRACT OF THE DISCLOSURE

Chemical compounds having a cyclopentanophenanthrene carbon-carbon skeleton containing at least 19 and up to a maximum of 40 carbon atoms and in which at least the B and C ring are at least partially hydrogenated, including a nucleus selected from the group consisting of saturated and unsaturated gonane and 8-isogonane nuclei having up to a maximum of five (5) double bonds and having as a part thereof in the 13-position a monovalent polycarbon alkyl radical having 2 to about 16 carbon atoms, said rings and the 13 other positions of the nucleus being identified according to steroid nomenclature; such compounds wherein said nucleus is unsaturated and has a double bond or bonds present in a position or positions selected from the following: (a) 4 position, (b) 5 position, (c) 5(10) position, (d) 2,5(10) positions, (e) 3,5 positions, (f) 1,3,5(10) positions, (g) 1,3,5(10), 9(11) positions, (h) 1,3,5(10),8 positions, or (i) 1,3,5(10),8,14 positions; such compounds containing three (3) or more double bonds in the nucleus and wherein the A ring of said nucleus is aromatic; preferably such compounds wherein the monovalent polycarbon alkyl radical in the 13-position is ethyl; such compounds having a substituent in the 17-position linked to said 17-position through a carbon-carbon bond, thus being a part of said carbon-carbon skeleton, said 17 substituent containing a maximum of 4 carbon atoms; particularly such compounds wherein an alpha-ethynyl group is present in the 17-position; and especially such latter compounds wherein an acetoxy or hydroxy group is also present at said 17-position.

This application is a continuation-in-part of our priorfiled copending applications Ser. Nos. 57,904, filed Sept. 23, 1960; 91,341, filed Feb. 24, 1961; 137,535, filed Sept. 12, 1961; 195,000, filed May 15, 1962; and 196,557, filed May 16, 1962, all now abandoned.

This invention relates to compositions of matter classified in the art of chemistry as substituted unsaturated-gonane derivatives, to intermediates therefor, and to processes for making and using such compositions.

In describing the invention, reference will be made in the following specification to the annexed drawings, wherein.

Figure 14:
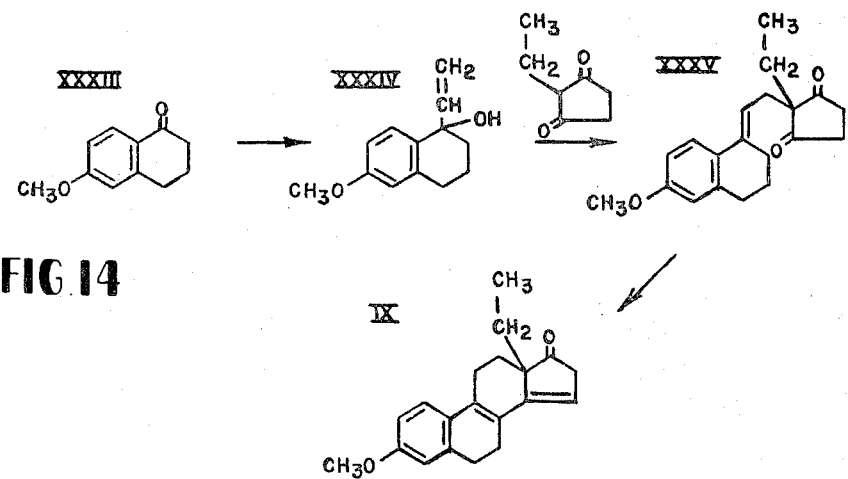

FIG. 14 illustrates schematically the sequence of reactions for preparing a 13-alkyl-1,3,5(10),8,14-gonapentaene from a tetralone and a 1,3-cycloalkanedione having at least one hydrogen at the 2-position, specifically 13β-ethylgona - 1,3,5(10),8,14-pentaen-17-one from 6-methoxy-1-tetralone and 2-ethyl-1,3-cyclopentanedione.

The invention sought to be patented, in a principal composition aspect, is described as residing in the concept of a chemical compound having a cyclo-aliphatic phenanthrene nucleus in which the B and the C rings are at least partially hydrogenated and having attached thereto in the 13-position a monovalent polycarbon-alkyl radical.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The tangible embodiments of the invention possess the inherent applied use characteristics of exerting qualitatively varying hormonal effects in animals as evidenced by pharmacological evaluation according to standard test procedures. Such tangible embodiments show estrogenic, androgenic, anti-estrogenic, progestational, blood lipid effects, and anabolic actions, salt retention, salt excretion and central nervous system effects. This finding indicates their usefulness in the treatment of female hypogonadism, amenorrhea, dysmenorrhea, ovulation block and contraception, functional uterine bleeding, acne, arteriosclerosis, osteoporosis, hormone dependent tumors, infertility, pregnancy maintenance, habitual abortion, weight gain and nitrogen retention, growth stimulation, post operative recovery, healing of wounds, and healing of burns. In particular it has been established that alterations of the natural steroid structure made possible by our discovery result not merely in a change of degree of hormonal activity but, as a result of the separation of types of hormonal activity, alter in an unexpected way its basic nature so that a desirable hormone effect is maximized and an undesirable hormone effect is minimized.

In addition to their inherent applied use characteristics, the intermediate compositions of this invention are useful in practicing the process aspect of the present invention in the making of the principal gonane compositions of the invention according to the sequence of reactions described herein.

The invention sought to be patented, in a principal process of making the compositions aspect, is described as residing in the concept of the sequence of reactions including: converting a compound having a 5-phenyl-pent-1-yne nucleus, ring-unsubstituted in at least one position ortho to the point of chain attachment, by means of a Mannich type reaction, to its acetylenic amine derivative; hydrating the acetylenic linkage to form a 3-keto compound; reacting such 3-keto substrate compound with a nucleophilic 2-monovalent alkyl-1,3-dioxocyclopentano compound under Michael condensation conditions to attach the cyclopentano compound through its 2-position carbon atom to the 1-position carbon atom of the 3-keto compound; treating the bicyclic triketone formed in the preceding step with an acidic dehydrating agent thereby to effect a double cyclodehydration to form a 1,3,5(10),8,14-pentadehydro-13-alkylgonane; selectively saturating the 14(15) double bond of said gonane with hydrogen in the presence of a catalyst; thereafter saturating the 8(9) double bond of the compound resulting from the preceding step; partially reducing the A-ring double bonds and the 17-carbonyl group to 17-hydroxymethylene; and, thereafter converting the so-reduced compound to a 4-dehydro-13-alkyl-17-hydroxy-gonane.

Figure 1:
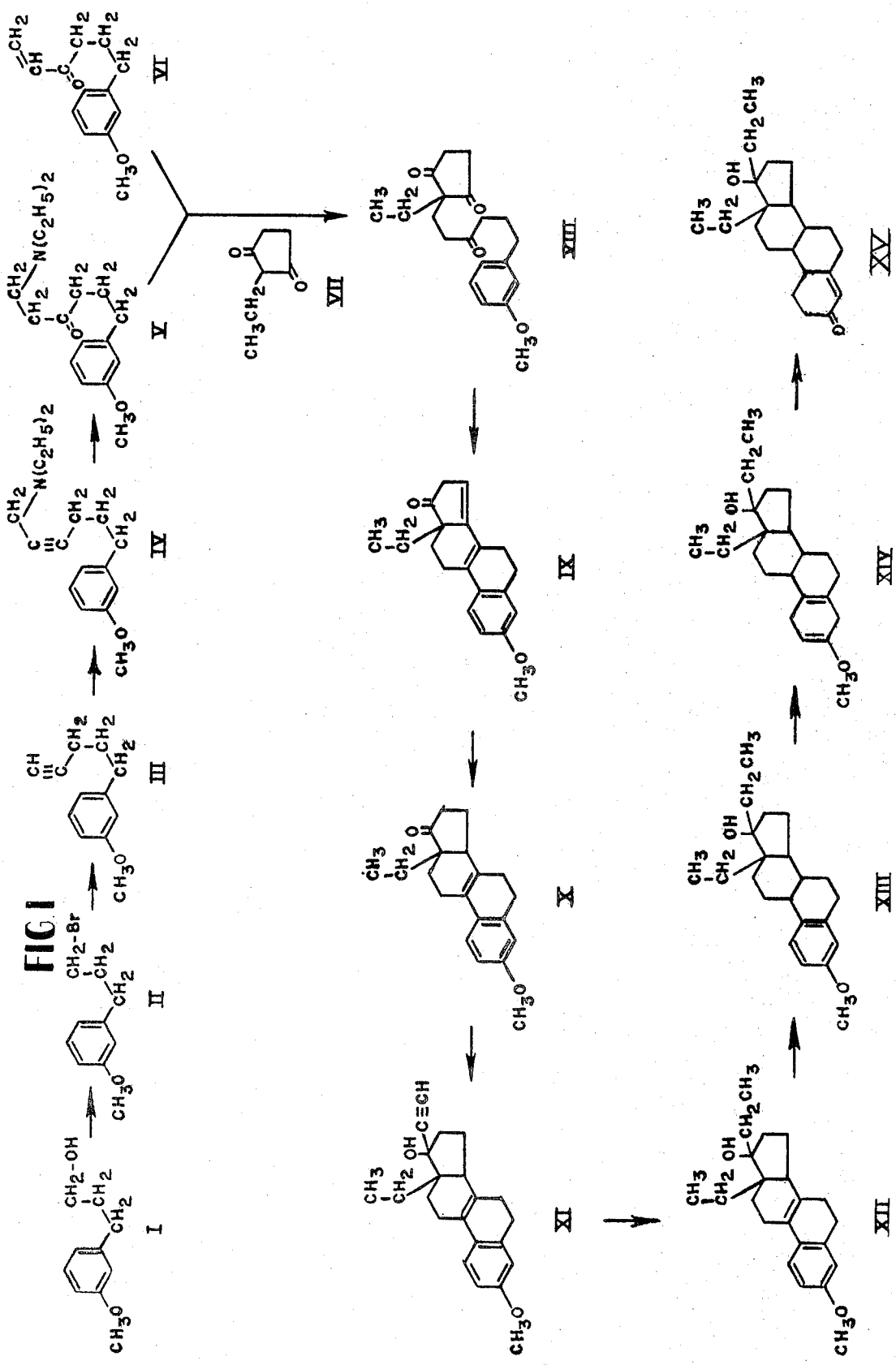
FIG. 1 illustrates schematically the reaction sequence for preparing a 13-alkylgon-4-ene, specifically 13β,17α-diethyl-17β-hydroxygon-4-en-3-one.

The invention sought to be patented in a second composition aspect is described as residing in the concept of a 2-(6-phenyl-3-oxohexyl)-1,3-cyclopentanedione nucleus having attached thereto in the 2-position a monovalent polycarbon-alkyl radical (FIG. 1, VIII).

The tangible embodiments of said second composition aspect possess the applied use characteristic of being intermediates for the preparation of compositions exerting hormonal effects as evidenced by standard test procedures.

The invention sought to be patented in a third composition aspect is described as residing in the concept of a gona-1,3,5(10),8,14-pentaene nucleus having attached thereto in the 13-position a monovalent polycarbon-alkyl radical (FIG. 1, IX).

The tangible embodiments of said third composition aspect possess the use characteristic of exerting varying hormone effects in animals as evidenced by pharmacological evaluation according to standard test procedures including estrogenic and lipid shifting effects. Furthermore, said tangible embodiments of said other secondary composition aspect possess the use characteristic of being intermediates for the preparation of compositions exerting hormonal effects as evidenced by standard test procedures.

The invention sought to be patented in a fourth composition aspect is described as residing in the concept of a gona-1,3,5(10),8-tetraene nucleus having attached thereto in the 13-position a monovalent polycarbon-alkyl radical (FIG. 1, X, XI, and XII).

The tangible embodiments of said fourth composition aspect possess the use characteristic of exerting varying hormone effects in animals as evidenced by pharmacological evaluation including estrogenic and lipid shifting effects. Furthermore said tangible embodiments of said fourth composition aspect possess the use characteristic of being important intermediates for the preparation of compositions exerting hormonal effects as evidenced by standard test procedures.

Figure 2:
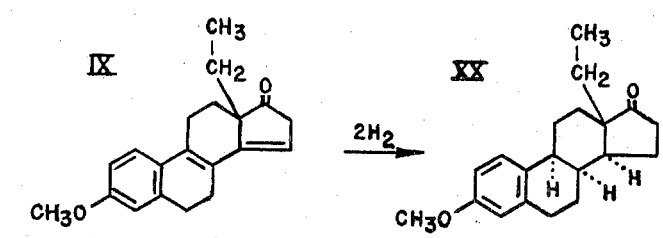
FIG. 2 illustrates schematically the reaction sequence for preparing a 13-alkylgona-1,3,5(10)-triene from a 2-alkyl-2-(6-phenyl-3-oxohexyl)-1,3-cyclopentanedione, specifically 13β-ethyl-3-methoxygona-1,3,5(10)-trien-17-one.

The invention sought to be patented in a fifth composition aspect is described in the concept of a gona-1,3,5(10)-triene nucleus having attached thereto in the 13-position a monovalent polycarbon-alkyl radical (FIG. 2, XIX).

The tangible embodiments of said fifth composition aspect possess the inherent applied use characteristic of exerting hormonal effects as evidenced by standard test procedures. Moreover, they are intermediates for the preparation of other compositions of the invention herein described.

Figure 3:
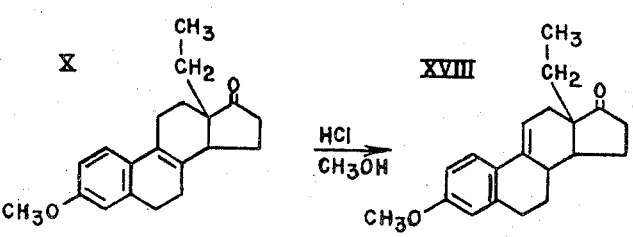
FIG. 3 illustrates schematically the hydrogenation of a 13-alkylgona-1,3,5(10),8,14-pentaene to prepare a 13-alkyl-8-isogona-1,3,5(10)-triene, specifically the conversion of 13β-ethyl-3-methoxygona-1,3,5(10),8,14-pentaen-17-one to 13β-ethyl-3-methoxy-8-isogona-1,3,5(10)-trien-17-one.

The invention sought to be patented in a sixth composition aspect is described as residing in the concept of an 8-isogona-1,3,5(10)-triene nucleus having attached thereto in the 13-position a monovalent polycarbon-alkyl radical (FIG. 3, XX).

The tangible embodiments of said sixth composition aspect possess the use characteristic of exerting hormonal effects as evidenced by standard test procedures. Furthermore said tangible embodiments of said sixth composition aspect possess the use characteristic of being intermediates for the preparation of compositions exerting hormonal effects as evidenced by standard test procedures.

The invention sought to be patented in a seventh composition aspect is described in the concept of a gona-1,3,5-(10),9(11)-tetraene nucleus having attached thereto in the 13-position a monovalent polycarbon-alkyl radical (FIG. 2, XVIII).

The tangible embodiments of said seventh composition aspect possess the inherent applied use characteristic of exerting hormonal effects as evidenced by standard test procedures. Moreover, they are intermediates which furnish a route to 11-hydroxy and 11-oxo corticoidal compounds.

Figure 5:
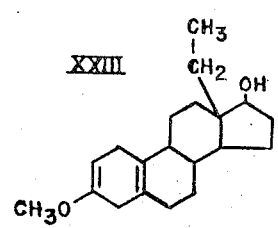
FIG. 5 illustrates schematically the reaction sequence for preparing a 13-alkygona-2,5(10)-diene from a 13-alkylgona-1,3,5(10),8-tetraene, specifically 13β-ethyl-3-methoxygona-2,5(10)-dien-17β-ol from 13β-ethyl-3-methoxygona-1,3,5(10),8-tetraen-17-one.
Figure 6:
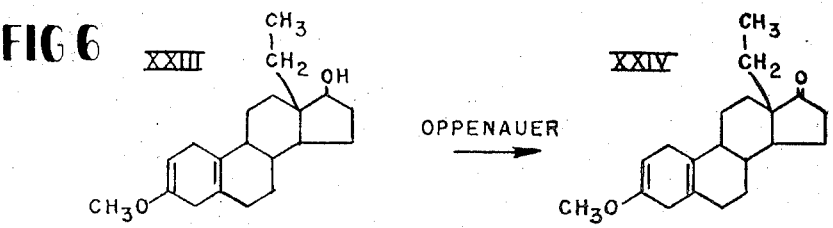
FIG. 6 illustrates schematically the oxidation of a 13-alkylgona-2,5(10)-dien-17-ol to a 13-alkylgona-2,5(10)-dien-17-one, specifically 13β-ethyl - 3 - methoxygona - 2, 5(10)-dien-17β-ol to 13β-ethyl-3-methoxygona-2,5(10)-dien-17-one.

The invention sought to be patented in an eighth composition aspect is described as residing in the concept of a gona-2,5(10)-diene nucleus having attached thereto in the 13-position a monovalent polycarbon-alkyl radical (FIG. 5, XXIII; FIG. 6, XXXIV).

The tangible embodiments of said eighth composition aspect possess the use characteristic of varying hormone effects in animals as evidenced by pharmacological evaluation by standard test procedures. Furthermore said tangible embodiments possess the use characteristic of being intermediates for the preparation of compositions exerting hormonal effects as evidenced by standard test procedures.

Figure 7:
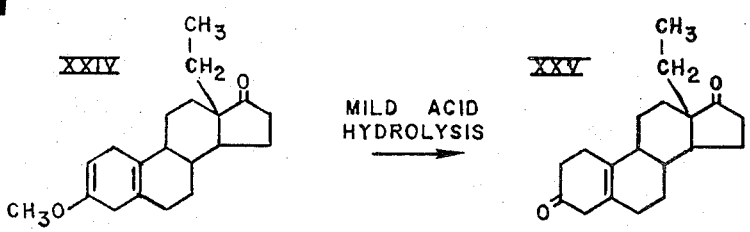
FIG. 7 illustrates schematicaly the mild hydrolysis of a 13-alkylgona-2,5(10)-diene to a 13-alkylgon-5(10)-ene, specifically 13β - ethyl - 3-methoxygona-2,5(10)-dien-17-one to 13β-ethylgon-5(10)-en-3,17-dione.

The invention sought to be patented in a ninth composition aspect is described as residing in the concept of a gon-5(10)-ene nucleus having attached thereto in the 13-position a monovalent polycarbon-alkyl radical (FIG. 7, XXV).

The tangible embodiments of said ninth composition aspect possess the use characteristic of varying hormone effects in animals as evidenced by pharmacological evaluation by standard test procedures. Furthermore said tangible embodiments possess the use characteristic of being important intermediates for the preparation of compositions with the use characteristic of exerting hormonal effects as evidenced by standard test procedures.

Figure 8:
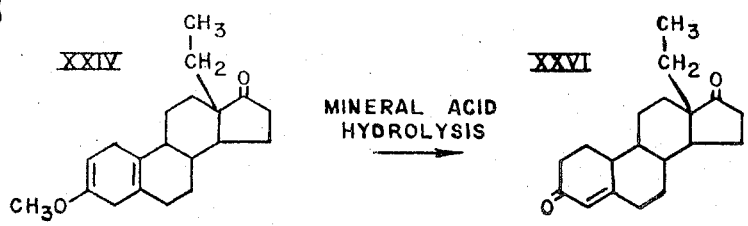
FIG. 8 illustrates schematically the mineral acid hydrolysis of a 13-alkylgona-2,5(10)-diene to a 13-alkylgon-4-ene, specifically 13β-ethyl - 3 - methoxygona - 2,5(10)-dien-17-one to 13β-ethylgon-4-en-3,17-dione.

The invention sought to be patented in a tenth composition aspect is described as residing in the concept of a gon-4-ene nucleus having attached thereto in the 13-position a monovalent polycarbon-alkyl radical (FIG. 8, XXVI).

The tangible embodiments of said tenth composition aspect possess the use characteristic of varying hormone effects in animals as evidenced by pharmacological evaluation by standard test procedures. Furthermore said tangible embodiments possess the use characteristic of being intermediates for the preparation of compositions exerting hormonal effects as evidenced by standard test procedures.

Figure 12:
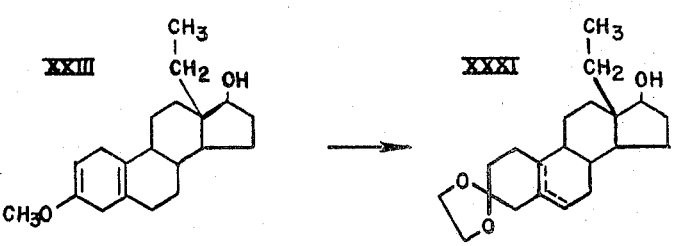
FIG. 12 illustrates schematically the reaction for preparing a mixture of a 13-alkyl - 3,3 - alkylenedioxygon-5(10)-ene and a 13-alkyl-3,3-alkylenedioxygon-5(6)-ene from a 13-alkyl-3-alkoxygona-2,5(10)-diene, specifically, a mixture of 13β-ethyl-3,3-ethylenedioxygon-5(10)-en-17-ol and a 13β-ethyl-3,3-ethylenedioxygon-5(6)-en-17-ol from 13β-ethyl-3-methoxygona-2,5-(10)-dien-17-ol.

The invention sought to be patented in an eleventh composition aspect is described as residing in the concept of a mixture of a compound having a gon-5(10)-ene nucleus and the correspondingly substituted compound having a gon-5(6)-ene nucleus, both of said gonenes having attached thereto in their 13-position a monovalent polycarbon-alkyl radical (FIG. 12, XXXI).

The tangible embodiments of the said eleventh composition aspect possess the use characteristic of varying hormonal effects in animals as evidenced by pharmacological evaluation by standard test procedures. Furthermore, said tangible embodiments of said eleventh composition aspect possess the use characteristic of being intermediates for the preparation of compositions exerting hormonal effects with unexpected separation of activity as evidenced by standard test procedures.

Figure 13:
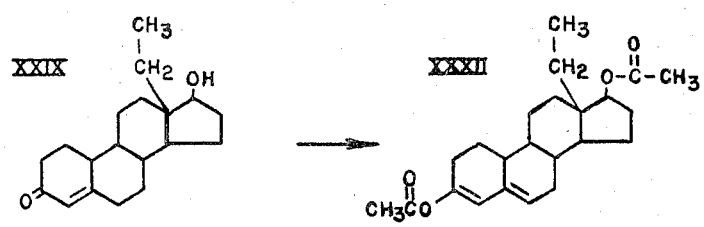
FIG. 13 illustrates schematically the reaction for preparing a 13-alkylgona-3,5-dien-3,17-diol diester from a 13-alkyl-17-hydroxygon-4-en-3-one, specifically 13β-ethylgona-3,5-dien-3,17β-diol diacetate from 13β-ethyl-17-hydroxygon-4-en-3-one.

The invention sought to be patented in a twelfth composition aspect is described as residing in the concept of a gona-3,5-diene having attached thereto in the 13-position a monovalent polycarbon-alkyl radical (FIG. 13, XXXII).

The tangible embodiments of said twelfth composition aspect possess the use characteristic of varying hormonal effects in animals as evidenced by pharmacological evaluation by standard test procedures. Furthermore, said tangible embodiments of said twelfth composition aspect possess the use characteristic of being intermediates for the preparation of compositions exerting hormonal effects with unexpected separation of activity as evidenced by standard test procedures.

The invention sought to be patented in a thirteenth composition aspect is described as residing in the concept of an 8,14-secogona-1,3,5(10),9-tetraen-14-one having attached thereto in the 13-position a monovalent polycarbonalkyl radical (FIG. 14, XXXV).

The tangible embodiments of said thirteenth composition aspect possess the use characteristic of being intermediates for the preparation of compositions which possess the use characteristic of exerting hormonal effects with unexpected separation of activity as evidenced by standard test procedures.

The invention sought to be patented in a fourteenth composition aspect is described as residing in the concept of a compound having a dialkylamino-6-phenyl-2-hexyne nucleus (FIG. 1, IV).

The tangible embodiments of said fourteenth composition aspect possess the use characteristic of being intermediates for the preparation of compositions which possess the use characteristic of exerting hormonal effects with unexpected separation of activity as evidenced by standard test procedures.

The invention sought to be patented in a fifteenth composition aspect is described as residing in the concept of a compound having a dialkylamino-6-phenyl-3-hexanone nucleus (FIG. 1, V).

The tangible embodiments of said fifteenth composition aspect possess the use characteristic of being intermediates for the preparation of compositions which possess the use characteristic of exerting hormonal effects with unexpected separation of activity as evidenced by standard test procedures.

The invention sought to be patented in a sixteenth composition aspect is described as residing in the concept of a compound having a 6-phenyl-1-hexen-3-one nucleus (FIG. 1, VI).

The tangible embodiments of said sixteenth composition aspect possess the use characteristic of being intermediates for the preparation of compositions which possess the use characteristic of exerting hormonal effects with unexpected separation of activity as evidenced by standard test procedures.

The invention sought to be patented in a seventeenth composition aspect is described as residing in the concept of a compound having a 2-polycarbonalkyl-1,3-cyclopentanedione nucleus (FIG. 1, VII).

The tangible embodiments of said seventeenth composition aspect possess the use characteristic of being intermediates for the preparation of compositions which possess the use characteristic of exerting hormonal effects with unexpected separation of activity as evidenced by standard test procedures.

The invention sought to be patented in an eighteenth composition aspect is described as residing in the concept of a compound having a 5,6,7,8-tetrahydro-4-phenethylindane-1,5-dione nucleus (FIG. 2, XVI).

The tangible embodiments of said eighteenth composition aspect possess the use characteristic of being intermediates for the preparation of compositions which possess the use characteristic of exerting hormonal effects with unexpected separation of activity, as evidenced by standard test procedures.

The invention sought to be patented in a nineteenth composition aspect is described as residing in the concept of a hexahydro-4-phenethylindane-1,5-dione nucleus having attached thereto in the 8-position a monovalent polycarbonalkyl radical.

The tangible embodiments of said nineteenth composition aspect possess the use characteristic of being intermediates for the preparation of compositions which possess the use characteristic of exerting hormonal effects with unexpected separation of activity as evidenced by standard test procedures.

The invention sought to be patented in a sub-generic composition aspect is described as residing in the concept of a 13,17-dialkyl-17-hydroxygon-4-en-3-one (FIG. 1, XV), of which a specific embodiment, 13β,17α-diethyl-17β-hydroxygon-4-en-3-one, is hereinafter described.

The tangible embodiments of said sub-generic composition aspect possess the use characteristic of varying hormone effects in animals as evidenced by pharmacological evaluation by standard test procedures. In clinical tests, said specific embodiment has demonstrated high anabolic potency and unexpected separation of anabolic and estrogenic activities.

The invention sought to be patented in a second sub-generic composition aspect is described as residing in the concept of a 13-alkyl-17-alkynyl-17-hydroxygon-4-en-3-one (FIG. 10, XXVIII), of which a specific embodiment wherein the alkyl group is 13β-ethyl and the alkynyl group is 17α-ethynyl is hereinafter discussed.

The tangible embodiments of said second sub-generic composition aspect possess the use characteristic of varying hormone effects in animals, as evidenced by pharmacological evaluation by standard test procedures, and in particular have demonstrated a high progestational activity, coupled with an unexpected separation of activities.

The invention sought to be patented in a third sub-generic composition aspect is described as residing in the concept of a 17 ester of a 13-alkyl-17-hydroxygon-4-en-3-one (FIG. 11, XXX), of which a specific embodiments in which the alkyl group is 13β-ethyl and the ester is the decanoate ester is hereinafter discussed.

The tangible embodiments of said third sub-generic composition aspect possess the use characteristic of varying hormone effects in animals, as evidenced by pharmacological evaluation by standard test procedures, and in particular in certain instances long-acting anabolic effects accomplished by unexpected separation of activities.

The invention sought to be patented in a second process aspect is described as residing in the concept of reacting a compound having a 6-phenyl-1-hexen-3-one nucleus unsubstituted in the 1-position (FIG. 1, VI), or, alternatively, reacting a compound having a 6-phenyl-3-hexanone nucleus to which is attached at the 1-position a group which will eliminate with hydrogen under Michael conditions (FIG. 1, V), with a nucleophilic compound having a 1,3-dioxocyclopentano nucleus which has at least one hydrogen in the 2-position, under Michael condensation, to attach the cyclopentano-compound nucleus through its 2-position carbon to the 1-position carbon atom of the 3-keto compound nucleus, thereby to form a 2-(6-phenyl-3-oxohexyl)-1,3-cyclopentanedione (FIG. 1, VIII).

The invention sought to be patented in a third process aspect is described as residing in the concept of treating a compound having a 2-(6-phenyl-3-oxohexyl)-1,3-cyclopentanedione nucleus which has an ortho-para directing substituent (FIG. 1, VIII), with catalytic amounts of a suitable dehydrating acid, such as polyphosphoric or p-toluene sulfonic acid, under conditions which result in the removal of water to form a tetracyclic compound (FIG. 1, IX).

The invention sought to be patented in a fourth process aspect is described as residing in the concept of selectively hydrogenating in the presence of a catalyst a compound having a gona-1,3,5(10),8,14-pentaene nucleus (FIG. 1, IX) and obtaining unexpectedly the corresponding compound having a 1,3,5(10),8-gonatetraene nucleus exclusively, with the 14-hydrogen exocyclic substituent trans to the 13-exocyclic substituent (FIG. 1, X).

The invention sought to be patented in a fifth process aspect, as illustrated in annexed FIG. 2, is described as residing in the concept of a sequence of reactions to form the gonane structure with the natural configuration of hydrogen atoms at the 8,9 and 14-positions including: treating the bicyclic ketone formed in the Michael reaction of 3-keto substrate compound with a nucleophilic 1,3-dioxocyclopentano compound having at least one hydrogen at the 2-position (VIII) under aldol condensation conditions, i.e., in the presence of a basic catalyst, and if a suitable activating substituent is not present on the aromatic ring, in the presence of an acid catalyst, to form the tricyclic diketone (XVI): reducing the C-ring unsaturation to form Compound XVII (by whatever mechanism the hydrogen at the 8-position is introduced, it can on treatment with an acid or base take up the most stable configuration, i.e., the position trans to the other newly introduced hydrogen, by equilibrating through keto-enol tautomerism with the adjacent keto; thus when the first is α, having been introduced trans to the 13-substituent by stereospecific means, the 8-carbon will be β so that the natural configuration results): closing the B-ring under acidic conditions at low temperature to form XVIII: and stereospecifically reducing the 9,11-unsaturation by the action of an alkali metal in liquid ammonia to also form the natural α-hydrogen configuration at the 9-position in Compound XIX.

The invention sought to be patented in a sixth process aspect, as illustrated in annexed FIG. 3, is described as residing in the concept of catalytically hydrogenating a compound having a gona-1,3,5(10),8,14-pentaen-17-one nucleus (IX) in the presence of a solvent to obtain the corresponding compound having an 8-isogona-1,3,5(10)-trien-17-one nucleus, i.e., a gona-1,3,5(10)-trien-17-one in which the 8-position hydrogen is in an α-configuration instead of the β-configuration of the natural gonane structure (XX). Thus, the 9,8-8,14-14,13 exocyclic substituents are in a cis-syn-trans relationship.

Figure 4:
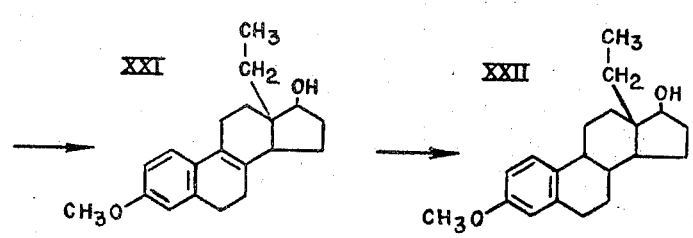
FIG. 4 illustrates schematically the rearrangement of a 13-alkylgona-1,3,5(10),8-tetraene to a 13-alkylgona-1,3,5(10),9(11)-tetraene, specifically 13β-ethyl-3-methoxygona-1,3,5(10),8-tetraen-17-one to 13β-ethyl-3-methoxygona-1,3,5(10),9(11)-tetraen-17-one.

The invention sought to be patented in a seventh process aspect, as illustrated in annexed FIG. 4, is described as residing in the concept of a reaction comprising the rearrangement of a gona-1,3,5(10),8-tetraene nucleus, having attached thereto in the 13-position a monovalent polycarbon-alkyl radical, to the corresponding gona-1,3,5(10),9(11)-tetraene nucleus in the presence of an acid catalyst.

The invention sought to be patented in an eighth process aspect, as illustrated in annexed FIG. 5, is described as residing in the concept of sequence of reactions including: reducing a gona-1,3,5(10),8-tetraen-17 - one nucleus, having attached thereto in the 13-position a monovalent polycarbon-alkyl radical, with an alkali metal hydride to a similarly 13-substituted gona-1,3,5(10),8-tetraen-17-ol nucleus (XXI): reducing the 8,9 double bond of XXI by alkali metal reduction in liquid ammonia to obtain a gona-1,3,5(10)-trien-17-ol nucleus (XXII) having attached thereto in the 13-position a monovalent polycarbon-alkyl radical, said nucleus having the normal gonane configuration of 9,8-8,14-14,13 exocyclic substituents, namely, trans-anti-trans: and reducing the A-ring of Compound XXII by alkali metal reduction in liquid ammonia in the presence of a proton donor such as ethanol (Birch reduction) to obtain a compound with a gona-2,5(10)-dien-17-ol nucleus having attached thereto in the 13-position a monovalent polycarbon-alkyl radical.

The invention sought to be patented in a ninth process aspect is described as residing in the concept of a reduction of a compound with a gona-1,3,5(10),8-tetraen-17-one nucleus, having attached thereto in the 13-position a monovalent polycarbon-alkyl radical (FIG. 5, X) under Birch reduction conditions, i.e., alkali metal in liquid ammonia in the presence of a proton donor such as methanol, to saturate the 8(9) double bond, reduce the 17-carbonyl to 17-hydroxy-methylene, and partially reduce the aromatic A-ring, obtaining a compound with a gona-2,5(10)-diene-17-ol having attached thereto in the 13-position a monovalent polycarbon-alkyl radical (FIG. 5, XXIII) in a one-step reaction.

The invention sought to be patented in a tenth process aspect, as illustrated in annexed FIG. 6, is described as residing in the concept of an oxidation (Oppenauer) of a compound with a gona-2(5(10)-diene-17-ol neculeus, having attached thereto in the 13-position a monovalent polycarbon-alkyl radical (XXIII), to obtain a compound with a gona-2,5(10)-diene-17-one nucleus having attached thereto in the 13-position a monovalent polycarbon-alkyl radical (XXIV).

The invention sought to be patented in an eleventh process aspect, as illustrated in annexed FIG. 7, is described as residing in the concept of a reaction comprising hydrolyzing a compound with a gona-2,5(10)-diene nucleus having attached thereto in the 13-position a monovalent polycarbon-alkyl radical (XXIV), under mild conditions, i.e., low temperature, limited time, mild acid such as oxalic, to obtain the corresponding compound with a gona-5(10)-en-3-one nucleus (XXV).

The invention sought to be patented in a twelfth process aspect, as illustrated in annexed FIG. 8, is described as residing in the concept of a reaction comprising hydrolyzing a compound with a gona-2,5(10)-diene nucleus, having attached thereto in the 13-position a monovalent polycarbon-alkyl radical (XXIV), under strong conditions, i.e., heat, mineral acid, to obtain a compound with a gon-4-en-3-one nucleus having attached thereto in the 13-position a monovalent polycarbon-alkyl radical (XXVI).

Figure 9:
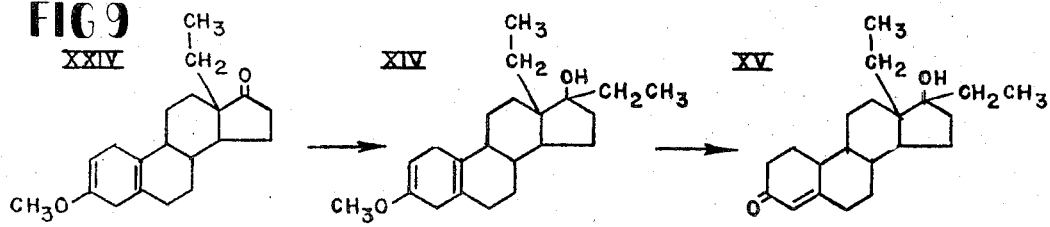
FIG. 9 illustrates schematically the reaction sequence for preparing a 13,17-dialkylgon-4-en-17-ol from a 13-alkylgona-2,5(10)-dien-17-one, specifically 13β,17α-diethyl-17β-hydroxygon-4-en-3-one from 3-methoxy-13β-ethylgona-2,5(10)-dien-17-one.

The invention sought to be patented in a thirteenth process aspect, as illustrated in annexed FIG. 9, is described as residing in the concept of a sequence of reactions including: treating a compound with a gona-2,5(10)-dien-17-one nucleus having attached thereto in the 13-position a monovalent polycarbon-alkyl radical (XXIV) with an alkyl Grignard reagent or metal alkyl to obtain a compound with a 17α-alkyl-gona-2,5(10)-dien-17-ol nucleus having attached thereto in the 13-position a monovalent polycarbon-alkyl radical (XIV), and hydrolyzing said product with mineral acid to obtain a compound with a 17α-alkyl-17β-hydroxygon-4-en-3-one nucleus having attached thereto in the 13-position a monovalent polycarbonalikyl radical (XV).

Figure 10:
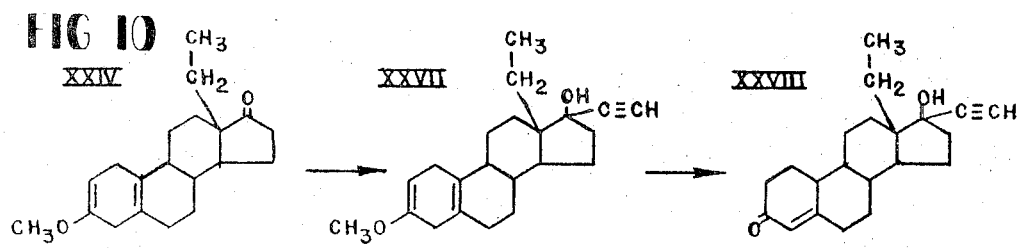
FIG. 10 illustrates schematically the reaction sequence for preparing a 13-alkyl-17-alkynylgon-4-en-17-ol from a 13-alkylgona-2,5(10)-dien-17-one, specifically 13β-ethyl-17α-ethynyl-17β-hydroxygon-4-en-3-one from 13β-ethyl-3-methoxygon-2,5(10)-dien-17-one.

The invention sought to be patented in a fourteenth process aspect, as illustrated in annexed FIG. 10, is described as residing in the concept of a sequence of reactions including: treating a compound with a gona-2,5-(10)-diene-17-one nucleus having attached thereto in the 13-position a monovalent polycarbon-alkyl radical (XXIV) with an organo-metallic derivative of a 1-alkyne to obtain the corresponding 17α-alkynylgona-2,5(10)-dien-17-ol having attached thereto in the 13-position a monovalent polycarbon radical (XXVII), and hydrolyzing said product with mineral acid to obtain a 17α-alkynyl-17β-hydroxygon-4-en-3 - one having attached thereto in the 13-position a monovalent polycarbon-alkyl radical (XXVII).

Figure 11:
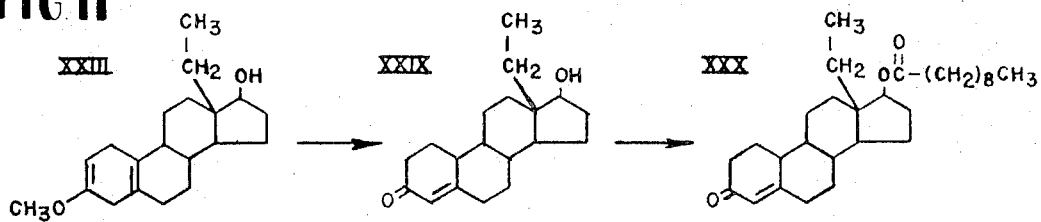
FIG. 11 illustrates schematically the reaction sequence for preparing an ester of a 13-alkyl-17-hydroxygon-4-ene from a 13-alkylgona-2,5(10)-dien-17-ol, specifically the decanoate ester of 13β-ethyl-17β-hydroxygon-4-en-3-one from 13β-ethyl-3-methoxygona-2,5(10)-dien-17-one.

The invention sought to be patented in a fifteenth process aspect, as illustrated in annexed FIG. 11, is described as residing in the concept of a sequence of reactions including: treating a compound with a gona-2,5(10)-dien-17-ol nucleus having attached thereto in the 13-position a monovalent polycarbon-alkyl radical (XXIV) with mineral acid to obtain a compound with a 17-hydroxygon-4-en-3-one nucleus having attached thereto in the 13-position a monovalent polycarbon-alkyl radical (XXIX), and esterifying the hydroxy group to obtain the corresponding 17-ester (XXX).

The invention sought to be patented in a sixteenth process aspect, as illustrated in annexed FIG. 14, is described as residing in the concept of a sequence of reactions including: reacting a compound having a 1-tetralone nucleus (XXXIII) with a vinyl Grignard to obtain a compound with a 1-vinyltetral-1-ol nucleus (XXXIV); condensing said tetralol with a compound with a 1,3-cyclopentanedione nucleus having attached thereto in the 2-position a monovalent polycarbon-alkyl radical, to obtain a compound with a 2 - [2-(1,2,3,4-tetrahydro-1-naphthylidene)ethyl]-1,3-cyclopentanedione nucleus having attached to the 2-position of the cyclopentane a monovalent polycarbon-alkyl radical (XXXV); cyclizing under said acid reaction conditions to obtain a compound with a gona-1,3,5(10),8,14-pentaen-17-one nucleus having attached thereto in the 13-position a monovalent polycarbon-alkyl radical (IX).

The manner and process of making and using the invention will now be generally described so as to enable a person skilled in the art of chemistry to make and use the same, as follows:

Referring now to FIG. 1, wherein the compounds are assigned Roman numerals for identification schematically, the sequence of reactions involved in the synthesis of a specific embodiment, namely, 13β,17α-diethyl-17β-hydroxygon-4-en-3-one, is illustrated. 3-(m-methoxyphenyl)propanol (I) is heated with phosphorus tribromide in benzene after dropwise addition in the cold to form 3-(m-methoxyphenyl)propyl bromide (II). This halogen Compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% formalin, acetic acid, diethylamine, dioxan, and cuprous chloride at 70° C. for about 12 hours, whereby there is obtained 1-diethylamino-6-(m-methoxyphenyl)-2-hexyne (IV), which is in turn hydrated in the presence of a mercury salt and sulfuric acid to form 1-diethylamino-6-(m-methoxyphenyl)-3-hexanone (V). The ketamine (V) may eliminate diethylamine on distillation to give the vinyl ketone 6-(m-methoxyphenyl)-1-hexen-3-one (VI). Either the ketamine (V) or the ketone (VI), or mixtures thereof, is then reacted with 2-ethyl - 1,3 - cyclopentanedione (VII) under Michael condensation conditions, e.g., refluxing in methanolic potassium hydroxide to form 2-ethyl-2-[6-(m-methoxyphenyl)-3-oxohexyl]-1,3-cyclopentanedione (VIII).

Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13β-ethyl - 3 - methoxygona - 1,3,5(10),8,14-pentaen-17-one (IX). The 14-unsaturation of Compound IX is then selectively hydrogenated in the presence of a metal catalyst, such as 2% palladized calcium carbonate, to form 13β-ethyl - 3 - methoxygona - 1,3,5(10),8-tetraen-17-one (X). Ethynylation at the 17-position of Compound X with lithium acetylide in dimethylacetamide gives 13β,17α - ethynyl - 3 - methoxygona - 1,3,5(10),8-tetraen-17β-ol (XI). The ethynyl group of Compound XI is then selectively hydrogenated to ethyl, as in the presence of a supported palladium catalyst, to produce 13β,17α-diethyl-3-methoxygona-1,3,5(10),8-tetraen - 17β - ol (XII), which is then converted to 13β,17α-diethyl-3-methoxygona-1,3,5(10)-trien-17β-ol (XIII) by alkali metal reduction in liquid ammonia, to provide the normal gonane configuration of 9,8-8,14-14,13 exocyclic substituents, namely, trans-anti-trans.

By alkali metal reduction in liquid ammonia in the presence of a proton donor, such as ethanol (Birch reduction), Compound XIII is converted to 13β,17α-diethylgona-2,5(10)-dien-17β-ol (XIV). By hydrolysis in the presence of mineral acid, Compound XIV is then converted to 13β,17α-diethyl - 17β - hydroxygon - 4 - en-3-one (XV).

Referring now to FIG. 2, wherein the compounds are assigned Roman numerals for identification schematically, the sequence of reactions involved in an alternate process for cyclizing the 2-alkyl-2-(6-phenyl-3-oxohexyl)-1,3-cyclopentanedione to obtain the tetracyclic 13-alkylgona-1,3,5(10)-triene is illustrated. Internal aldol condensation and dehydration of 2 - ethyl-2-[6-(m-methoxyphenyl)-3-oxohexyl]-1,3-cyclopentanedione (VIII) forms 8-ethyl-5,6,7,8-tetrahydro - 4 - m-methoxyphenethylindane - 1,5-dione. The newly formed unsaturation of Compound VIII is hydrogenated to form 8-ethylhexahydro-4-m-methoxyphenethylindane - 1,5 - dione (XVII). B-ring closure of Compound XVII proceeds at room temperature under acid conditions to form 13β-ethyl-3-methoxygona-1,3,5-(10),9-tetraen-17-one (XVIII). The unsaturated bond at the 9-position is reduced with alkali metal and liquid ammonia and the product is oxidized to give 13β-ethylgona-1,3,5(10)-trien-17-one (XIX).

Treatment of Compound XIX with alkali metal in liquid ammonia in the presence of a proton donor reduces the A-ring to form 13β-ethylgona-2,5(10) - dien - 17β-ol (FIG. 5, XXIII). Oppenauer oxidation of XXIII gives 13β-ethylgona-2,5(10)-dien-17-one (FIG. 6, XXIV). Reaction of XXIV with an ethyl Grignard reagent forms 13β,17α-diethyl - 3 - methoxygona-2,5(10) - dien - 17β-ol (XIV) which is then hydrolyzed in the presence of mineral acid and is thus converted to 13β,17α-diethyl-17β-hydroxygon-4-en-3-one (XV).

The compound 13β,17α-diethyl - 17β - hydroxygon-4-en-3-one, when administered to humans, is strongly anabolic as measured by weight gain, and shows virtually no androgenicity at therapeutic dose levels. Consistent effects on appetite stimulation are present and beneficial effects upon dermatitis and ichthyosis of mongols have been noted.

To form another specific embodiment of this invention, referring to FIG. 10, Compound XXIV, 13β-ethyl-3-methoxygona-2,5(10)-dien-17-one is treated with an alkali metal acetylide in liquid ammonia to convert it to 13β-ethyl-17α-ethynyl-3-methoxygona-2,5(10) - dien - 17β-ol (XXVII). Compound XXVII is then converted to 13β-ethyl-17α-ethynyl-17β-hydroxygon-4-en-3-one (XXVIII)

When administered orally, this compound, 13β - ethyl-17α-ethynyl-17β-hydroxygon-4-en - 3 - one, demonstrates unexpectedly high progestational activity accompanied by a separation of undesirable hormone effects found in the natural steroids.

Referring to FIG. 11, a third specific embodiment of the invention, 13β - ethyl - 17β-hydroxygon-4-en-3-one decanoate ester (XXX), is formed by esterification of 13β - ethyl - 17β - hydroxygon-4-en-3-one (XXIX), obtained by mineral acid hydrolysis of 13β - ethyl-3-methoxygona - 2,5(10) - dien - 17α - ol (XXIII). Compound XXIII is obtained from Compound XXIV, 13β - ethyl-3-methoxygona - 2,5(10) - di - en-17α-one, by reduction with a complex metal hydride, or alternatively from Compound X, FIG. 1, 13β - ethyl - 3 - methoxygona-1,3,5-(10),8 - tetraen - 17 - one, by the sequence of reactions schematically illustrated in FIG. 5, namely, complex metal hydride reduction to form 13β - ethyl - 3 - methoxygona-1,3,5(10),8 - tetraen - 17 - ol (XXI), and then alkali metal in liquid ammonia reduction of Compound XXI to obtain 13β - ethyl - 3 - methoxygona - 1,3,5(10)-trien-17-ol (XXII), followed by alkali metal in liquid ammonia reduction in the presence of a proton donor to form the before-mentioned Compound XXIII.

The compound 13β-ethyl - 17β - hydroxygon-4-en-3-one decanoate ester (XXX) is a long acting anabolic agent with unexpected enhancement of anabolic activity accompanied by a decrease in androgenic activity.

While the hereinbefore described processes produce novel and steroidal-like compounds which have an unnatural substituent at the 13-position, it is apparent that the novel and valuable processes of the invention offer a unique feasible route to the corresponding natural steroids if the nucleophilic compound used in the Michael condensation step is 2-methyl-1,3-cyclopentanedione.

The aromatic ring of the phenylpropanol (FIG. 1, I) used as the starting material for the preparation of the compositions and initial preparations of the invention may have one or more substituents, provided, however, at least one position ortho to the position of propanol-chain attachment is unsubstituted so that cyclodehydration to form a cyclic structure can eventually be effectuated. To activate such ortho position for said subsequent ring closure, a para-directing group (referring to electrophilic aromatic substitution) such as hydroxy, acyloxy, alkoxy, amino, alkylamino, or acylamino is a necessary substituent on the aromatic ring. The group may be present initially or may be introduced later but before ring closure, either directly, or by conversion from a meta-directing group such as nitro. After the tetracyclic structure has been formed, substituents can be introduced into the aromatic A-ring which are not limited as above; however, if such substituted compound is to undergo a reduction, the group is preferably one not sensitive to reduction. After the A-ring has been reduced, the substituents on said A-ring may be the same as those originally present, or substituents to which they may be converted, such as ketonic oxygen, dialkoxy, alkylenedioxy, alkylenethioxy, and alkylenedithio; or groups introducible by known processes, such as halogen or alkyl. For the processes of the invention and except for the limitations expressed in this specification, variations of the substituents on the A-ring of the fully formed tetracyclic structures, or on the intermediates leading thereto, are full equivalents of each other.

The carbon atom to which the phenyl group of the starting propanol (I) is attached can be substituted, as, for example, with an alkyl group, such as methyl or ethyl. Moreover, this atom, to which the phenyl group is attached in Compound I, need not necessarily be carbon. It can be a hetero atom which would not interfere with subsequent catalytic reductions, as, for example, oxygen or nitrogen. This atom will appear in the tetracyclic structures of the invention in the 6-position, and it will be apparent, may be, as in the case of the nitrogen, substituted with hydrogen or an alkyl group.

The 2-carbon atom of the starting phenyl-propanol (I) can also be substituted, as, for example, with an alkyl group, such as methyl and ethyl, and as such, be unchanged throughout the subsequent synthesis. In the tetracyclic structures of the invention this carbon atom will appear in the 7-position.

For the processes of the invention and except for the limitations expressed in this specification, variations of the B-ring on the fully formed tetracyclic structures, or on the intermediates leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent, or a 1-hydroxy substituent will react with the nucleophilic compound to form the Michael product. The nucleophilic compound can be a carbocyclic-1,3-dione of varying ring size, as for example a five-membered ring, a six-membered ring, etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure. Acylic nucleophilic compounds can be used in conducting the Michael reaction step and the open-chain of the resulting product thereafter ring-closed to form a cyclic D-ring For the processes of the invention, and except for the limitations expressed in this specification, variations of the D-ring on the fully formed tetracyclic structure, or on the intermediates leading thereto, are full equivalents of each other.

When the nucleophilic compound is 2-methyl-1,3-cyclopentanedione, the invention provides a unique total syntheseis for natural steroids: the hydrogens at the 8-position, 9-position, and 14-position being β, α, and α respectively, as in the natural steroids. Thus such valuable therapeutic substances as estrone, estradiol, and 19-nor-testosterone are made available from easily obtainable and relatively simple and inexpensive starting materials.

Moreover, by varying the group at the 2-position of the nucleophilic Michael condensation reactant, the invention provides a way to produce compounds resembling the natural steroids save at the 13-position. Thus, by varying the substituent at the 2-position of the 1,3-cyclopenanedione, alkyl groups of varying chain length such as, for example, ethyl, isopropyl, cetyl, etc., may be introduced to form the gonane correspondingly substituted at the 13-position. Further, gonanes may be prepared wherein the 13-position is substituted with any organic radical. Thus, but without limiting the generally of the foregoing, an aralkyl, cycloalkylalkyl, or a polycarbon-alkylene bridge bearing a hydroxy-, amino-, or alkylamino-substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position polycarbon-alkyl substituents, having physiological activity of the same type.

In any of the intermediate structures or in the tetracyclic structures of the invention having either an aromatic, partially reduced, or totally reduced A-ring wherein the 17-position, or position corresponding thereto in the gonane nucleus, is carbonyl, the carbonyl group can be converted to a group such as hydroxymethylene by lithium aluminum hydride reduction; to acyloxymethylene by esterification of the hydroxymethylene group so formed; to alkoxymethylene by etherification of the hydroxymethylene group; to alkylhydroxymethylene by addition of the appropriate organo-metallic reagent to the carbonyl; or to alkynylhydroxymethylene by addition of the appropriate alkali metal acetylide in a suitable inert solvent; all in the known manners. The carbonyl group may also be ketalized or thioketalized by treating with the appropriate alcohol or glycol in a suitable solvent under acidic conditions, as in the presence of an acid such as sulfuric acid, p-toluene sulfonic acid, or boron trifluoride etherate, with heating where necessary, according to the known art.

The specific reactions involved in the processes of the invention will now be considered, as follows, reference being made to the drawings for typifying compounds:

The vinyl ketones (VI) of the invention are prepared by elimination of dialkylamine from the corresponding dialkylaminoethyl aminoketones (V), obtained by hydration of the acetylenic linkage in an acetylenic amine (IV). The acetylenic amines (IV) can be themselves prepared by a Mannich reaction from the corresponding acetylene (III) with formaldehyde and a dialkylamine. The hydration can be carried out, for example, in aqueous sulfuric acid with mercuric sulfate as a catalyst. The corresponding quaternary salts, which may also be used in the subsequent Michael condensation, can be obtained by quaternization of the corresponding acetylenic dialkylaminoethyl amine, followed by hydration, or by quaternization of the ketoamine. The vinyl ketones can be prepared from these derivatives by the above elimination reaction. Thus the ketoamine or its quaternary salt can be treated with a base for this purpose, for example, with sodium hydroxide or a sodium alkoxide.

The vinyl ketones (VI) and dialkylamino ketones (V) are condensed with a nucleophilic compound under Michael reaction conditions. Thus the condensation can be carried out by bringing the two reagents together in solution in the presence of a base, for example, pyridine, triethylamine, diethylamine, sodium hydroxide, or sodium methoxide, and heating as required. The nature and amount of base employed in the condensation reaction will depend upon the particular reagents used. Where the vinyl ketone derivative employed is a keto-amine and dialkylamine is eliminated in the reaction, no added base may be required. Where the compound is a 2-alkylcyclopentane-1,3-dione (VII), the compound to be condensed with it is preferably a vinyl ketone, and the dione is used in excess of the molecular equivalent quantity. Suitable solvents are hydrocarbons, such as benzene, and anhydrous alcohols, such as methanol. If the reaction is carried out in benzene under refluxing conditions, water formed in the condensation may be azeotroped out of the reaction mixture with a Dean-Stark type trap.

As hereinbefore noted, monocyclodehydration of the C-ring is accomplished by an internal aldol condensation. The cyclodehydration can therefore be carried out using conditions generally applicable for an aldol condensation, i.e., in the presence of an acid or basic catalyst such as NaOH, p-toluene sulfonic acid, triethylamine benzoate, aluminum tertiary butoxide, and the like, either at room temperature or accompanied by heating if necessary. In most instances, we prefer to carry out the cyclic dehydration at the boiling point of the solvent to permit azeotropic removal of the water formed during the course of the reaction, inasmuch as the aldol reaction is an equilibrium one. Preferred as solvents are the low boiling anhydrous aromatic hydrocarbons, such as benzene and xylene. C-ring closure occurs regardless of the nature of the substitution on the aromatic ring.

The reduction of the 8(14) unsaturation in the tricyclic compounds is carried out by catalytic hydrogenation either at room temperature or above. It is found that when hydrogen and a palladium-on-charcoal catalyst are used, the hydrogen introduced at the carbon 14-position is principally in the configuration trans to the group attached at the 13-position. By whatever mechanism the hydrogen at the 8-position is introduced, it can on treatment with an acid or base take up the most stable configuration, i.e., the position trans to the other newly introduced hydrogen, by equilibrating through keto-enol tautomerism with the adjacent keto group. Thus the second hydrogen atom can be made to take up the β-configuration when the first is α.

The configuration of the hydrogen atom introduced by palladium hydrogenation at the 14-carbon has been independently proved by reducing the keto group of Compound XXXVI

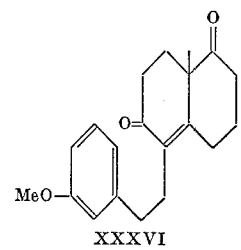

XXXVI at the 17a-position (steroid enumeration) using sodium borohydride, a method selective for that position while leaving the other keto group untouched, and then reducing the resulting keto-alcohol (XXXVII)

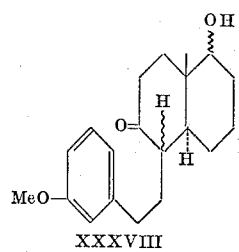

XXXVII with lithium in liquid ammonia, a method stereospecific for the introduction of a hydrogen at $C_{14}$ trans to the angular substituent at $C_{13}$ in XXXVIII,

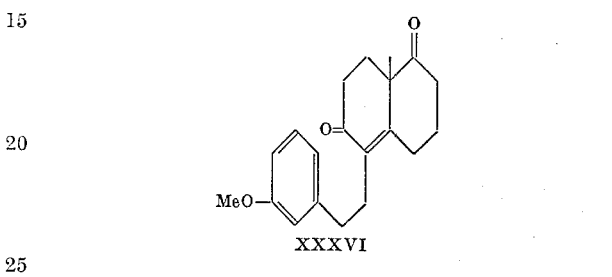

XXXVIII followed by oxidation of the reduced keto-alcohol using chromium trioxide in an organic medium to give a crystalline diketone (XXXIX)

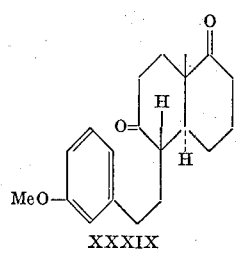

XXXIX which is converted by methanolic hydrochloric acid to the tetracyclic ketone (XL)

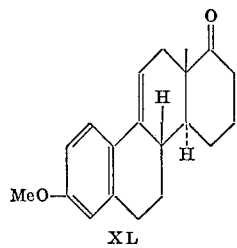

XL whose structure was determined by reduction of the 9(11) double bond and conversion to the known benzylidene derivative.

The B-ring closure is brought about under acidic conditions. Suitable are strong acids such as sulfuric, hydrochloric, p-toluene sulfonic, etc. in solvents such as benzene, toluene, anhydrous alcohol, etc. The reaction is generally carried out at room temperature or below since heat may promote the formation of an aromatic B-ring. The preferred treatment is with methanolic hydrochloric acid at room temperature, As hereinbefore noted, it has been found that the ease of B-ring closure of the compounds of the invention to form tetracyclic compounds is affected by the nature of the substituent present on the preformed aromatic A-ring, and that subsequent cyclization is easier to carry out when the preformed aromatic A-ring contains a substituent which activates the position at which cyclization is to occur. Where a compound is to be used directly for B-ring closure, it will in practice be one containing such a substituent. Those substituents which cause subsequent B-ring closure to occur readily are substituents para to the position of ring closure which are groups that in electrophilic aromatic substitution activate an aromatic ring and are predominantly o- and p-directing; for example, the hydroxy or alkoxy group.

The double cyclodehydration is brought about by dissolving a compound typified by Compound VIII in benzene containing a catalytic amount of p-toluene sulfonic acid and boiling the mixture under a Dean-Stark trap until two equivalents of water have been collected, or alternatively, by treating the same triketone with polyphosphoric acid at room temperature or slightly above until ring closure is complete.

The selective hydrogenation of the gona-8,14-dienes typified by Compound IX is carried out by means of 2% palladized calcium carbonate. As hereinbefore noted, surprisingly, the catalytic hydrogenation results in addition of hydrogen to the 14-double bond in such a way as to give the "natural" stereochemical configuration; that is, the hydrogen adds at 14-trans to the alkyl at 13. Selective reduction of the 14-ethylenic linkage is achieved by use of catalyst, solvent combination which shows adequate selectivity, and stopping the hydrogenation when the theoretical amount of hydrogen has reacted. Solvents showing selectivity in this regard are the nonprotonic solvents, that is, hydrocarbons and ethers; benzene, toluene, naphtha, dioxan, dibutyl ether, and diethyl ether are examples of suitable nonprotonic solvents. On the other hand, protonic solvents such as acetic acid and ethanol appear to be largely non-selective.

It has been found that a moderately active Raney nickel catalyst provides good selectivity in a suitable solvent. If a Raney nickel catalyst of low activity is employed, the hydrogenation may be too slow to be useful; on the other hand, a vigorous catalyst shows poor selectivity, and some saturation of the 8,9-ethylenic bond may occur simultaneously with the hydrogenation at the 14,15-position.

If desired, other moderately active hydrogenation catalysts may be used instead of Raney nickel; for example, palladium on barium sulfate or on an alkaline earth metal carbonate or on charcoal have all been found suitable in this selective hydrogenation.

Saturation at the 8- or at the 9(11)-position of the tetracyclic structures must be stereospecific to obtain the natural type of exocyclic substituent configuration as noted supra. Such a sufficiently stereospecific reduction can be in general effected by the action of an alkali metal (sodium, potassium, or lithium) in liquid ammonia to give the normal steroid configuration hydrogen at the respective carbons. Preferably this type of reduction is carried out in the presence of a primary or secondary aromatic amine, for instance aniline, p-toluidine, or diphenylamine, as this can improve the yield of the desired product. The reduction can also be carried out in the presence of a more reactive proton donor: in this instance, the reduction of the ethylenic linkage occurs with a simultaneous reduction of the aromatic ring to give a 1,4-dihydrophenyl group.

The reduction of 9-dehydrocompounds can also be effected by catalytic hydrogenation, as this has been discovered to be sufficiently stereospecific for production of the desired trans-anti-trans compounds of normal configuration.

Catalytic hydrogenation of the gona-1,3,5(10),8,14-pentaenes, as noted above, gives a class of novel and useful 8-isomeric steroids. Solvents such as benzene, anhydrous ethanol, and methanol are suitable, and the hydrogenation is preferably carried out at room temperature and pressure.

While the tetracyclic compounds in this specification and the appended examples are named to describe the configuration correspondng to that of the natural steroids, it is to be understood that unless otherwise indicated, the product of each of the given manipulative procedures is a racemic mixture which contains said named compound and its enantiomorph.

Representative formulations embodying specific compositions of this invention follow:

A pharmaceutical tablet for use as an oral anabolic agent consists of the following ingredients:

|  | Mg. |
|---|---|
| 13$\beta$,17$\alpha$-diethyl-17$\beta$-hydroxygon-4-en-3-one | 5 |
| Carboxymethylcellulose (viscosity 400 cps.) | 15 |
| Lactose powder | 25 |
| Redried corn starch | 25 |
| Magnesium stearate powder | 4 |
| Calcium silicate powder | Q.s. |
|  | 200 |

A capsule for use as an oral anabolic agent contains, in encapsulating gelatin, the following ingredients:

|  | Mg. |
|---|---|
| 13$\beta$,17$\alpha$-diethyl-17$\beta$-hydroxygon-4-en-3-one | 5 |
| Finely divided silica lubricant | 5 |
| Magnesium stearate powder | 5 |
| Powdered corn starch | 113 |
| Lactose powder | Q.s. |
|  | 245 |

An anabolic agent suspension for oral use consists of the following ingredients per 5 cc.:

|  | Mg. |
|---|---|
| 13$\beta$,17$\alpha$-diethyl-17$\beta$-hydroxygon-4-en-3-one | 5.0 |
| Magnesium aluminum silicate (thickening agent) | 37.5 |
| Carboxymethylcellulose of low viscosity | 37.5 |
| Polyoxyethylene sorbitan monolaurate | 50.0 |
| Glycerin | 250.0 |
| Sucrose | 2000.0 |
| Methyl p-hydroxybenzoate | 5.0 |
| Propyl p-hydroxybenzoate | 1.0 |
| Flavor and distilled water | Q.s. |

An anabolic agent suspension for parenteral use consists of the following ingredients per cc.:

| | Mg. |
|---|---|
| 13β,17α-diethyl-17β-hydroxygon-4-en-3-one | 0.5 |
| Benzyl alcohol | 10 |
| Sodium chloride | 90 |
| Polyoxyethylene sorbitan monooleate | 4 |
| Sodium carboxymethylcellulose | 5 |
| Water for injection | Q.s. |

Pediatric drops for use as an anabolic agent consist of the following ingredients per drop (0.05 cc.):

| | Mg. |
|---|---|
| 13β,17α-diethyl-17β-hydroxygon-4-en-3-one | 0.500 |
| Magnesium aluminum silicate (thickening agent) | 0.375 |
| Polyoxyethylene sorbitan monolaurate | 0.500 |
| Disodium phosphate heptahydrate | 0.375 |
| Citric acid monohydrate | 0.060 |
| Glycerin | 1.250 |
| Methyl p-hydroxybenzoate | 0.025 |
| Propyl p-hydroxybenzoate | 0.005 |
| Butyl p-hydroxybenzoate | 0.020 |
| Distilled water | 0.015 |
| Sodium saccharin | 0.013 |
| Sorbitol and flavor | Q.s. |

A long-acting anabolic agent tablet consists of the following ingredients:

| | Mg. |
|---|---|
| 13β,17α-diethyl-17β-hydroxygon-4-en-3-one | 5 |
| Water-insoluble acid carboxyvinyl polymer of acrylic acid copolymerized with 0.75–2% of polyallyl sucrose (the Carbopol 934 of U.S. Pat. 2,909,462) | 150 |
| Magnesium stearate powder | 2 |
| Lactose | Q.s. |

A long-acting anabolic agent suspension for parenteral use consists of the following ingredients per cc.:

| | Mg. |
|---|---|
| 13β-ethyl-17β-hydroxygon-4-en-3-one 17-decanoate | 0.5 |
| Benzyl alcohol | 10 |
| Sodium chloride | 90 |
| Polyoxyethylene sorbitan monooleate | 4 |
| Sodium carboxymethylcellulose | 5 |
| Water for injection | Q.s. |

A progestational agent tablet consists of the following ingredients:

| | Mg. |
|---|---|
| 13β-ethyl-17α-ethynyl-17β-hydroxygon-4-en-3-one | 5 |
| Spray dried lactose | 75 |
| Methocel (400 cps.) | 12 |
| Powdered stearic acid | 6 |
| Talc | 2 |

Pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet-disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter. The term "preparation" is intended to include the formulation of the compound with encapsulating material as carrier providing a capsule in which the compound (with or without other carrier) is surrounded by carrier, which is thus in association with it. Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspension suitable for oral use can be made by dispensing the finely divided compound in water with viscous material, natural or synthetic gums, resins, etc., for example, gum arabic, ion-exchange resins, methylcellulose, sodium carboxymethylcellulose and other well known suspending agents.

Preferably the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules. The unit dosage form can be a capsule, cachet, or tablet itself, or it can be the appropriate number of any of these in packaged form. The quantity of compound in a unit dose of preparation may be varied or adjusted from 1 mg. to 100 mg. (generally within the range of 2.5 to 25 mg.) according to the particular application and the potency of the active ingredient.

The claimed compositions having physiological activity can be incorporated into pharmaceutical formulation including sustained-release agents.

The following preparations illustrate the manner of making the chemical compounds which are the starting materials for use in the processes of the invention.

PREPARATION 1

4,4-ethylenedioxy-4-m-nitrophenylbutyric acid glycol monoester

Add a solution of 3-(m-nitrobenzoyl) propionic acid (140 g.) (Martin, J. Amer. Chem. Soc., 1936, 58, 1441) in benzene to toluene-p-sulphonic acid (50 g.) and an excess of ethylene glycol. Reflux for 20 hours with removal of water in a Dean-Stark apparatus. Wash the cooled mixture with water and evaporate the solvent under reduced pressure, to obtain as a gum the crude ethylene glycol monoester of 4,4 - ethylenedioxy-4-m-nitrophenylbutric acid.

PREPARATION 2

4,4-ethylenedioxy-4-m-nitrophenylbutyric acid

Mix the ketal ester of Preparation 1 with an equal volume of ethanol to make it mobile, and add the solution rapidly to a refluxing solution of sodium hydroxide (50 g.) in water (200 cc.). After 3 minutes cool and pour the mixture into excess dilute acetic acid with shaking. Allow the ketal acid, 4,4-ethylenedioxy-4-m-nitrophenylbutyric acid, to precipitate as a yellow granular powder and filter off (150 g.).

PREPARATION 3

4-m-aminophenyl-4,4-ethylenedioxybutyric acid

Shake the nitro ketal acid of Preparation 2 (50 g.) in methanol (500 cc.) with platinum oxide catalyst (1.5 g.) in hydrogen at atmospheric pressure until hydrogenation ceases (1 hour). Remove the catalyst and evaporate the solvent under reduced pressure to obtain 4-m-aminophenyl - 4,4 - ethylenedioxybutyric acid as pale yellow fine needles (43 g.).

PREPARATION 4

4-m-nitrophenylbutyric acid

Dissolve amino ketal acid of Preparation 3 (43 g.) in liquid ammonia (1 liter), add sodium (12 g.) in pieces, and stir the mixture until all the sodium dissolves and the blue color is discharged. Add ammonium chloride (19 g.) to dissolve the precipitate, and more sodium (8 g.). Complete removal of the ketal group is marked by a permanent blue color. Add more ammonium chloride (19 g.), evaporate and extract the solid residue with ethanol. Filter and evaporate, and then extract, filter and evaporate again to obtain crude sodium 4-m-aminophenylbutyrate. Heat on a steam bath for 6 hours at 0.05 mm. pressure to remove most of the ethylene glycol present. Shake the product for several hours in chloroform with toluene-p-sulphonic acid (31 g.), filter the solution, wash the residue with hot chloroform and add the hot chloroform washings to the filtrate. Evaporate the filtrate solvent to obtain crude 4-m-aminophenylbutyric acid as a gum.

Add the crude aminoacid in chloroform (75 cc.) dropwise to a hot solution of peracetic acid in apparatus fitted with a reflux condenser. When the ensuing highly exothermic reaction is complete, pour the chloroform solution into water and then remove the chloroform by steam distillation. On cooling the dark oil obtained partly solidifies. Crystallize from aqueous methanol, treating with charcoal to remove color, to obtain 4-m-nitrophenylbutyric acid, m.p. 125° C.

$C_{10}H_{11}O_4N$ calculated: C, 57.4%; H, 5.3%. Found: C, 57.9%; H, 5.4%.

PREPARATION 5

3-m-nitrophenylpropyl bromide

Neutralize the nitroacid of Preparation 4 to (9 g.) in ethanol (100 cc.) with N-sodium hydroxide solution. Add a solution of silver nitrate (7.5 g.) in water (20 cc.) with stirring, and filter, wash and dry the silver salt at 110° C.; powder the product dry at 100° C. and 0.05 mm. pressure. Suspend the dried silver salt in dry carbon tetrachloride (125 cc.) and add a solution of bromine (6 g.) in carbon tetrachloride. Reflux the mixture for 3 hours, then filter and evaporate; distill the residue to obtain 3-m-nitrophenylpropyl bromide (5 g.), b.p. 140° C./0.05 mm.

PREPARATION 6

3-m-hydroxyphenylpropan-1-ol

An m-hydroxyphenylpropionic acid (57 g.) in dry tetrahydrofuran (250 cc.) dropwise into a vigorously stirred suspension of lithium aluminum hydride (20 g.) in tetrahydrofuran (1 liter), at a rate of addition such that gentle refluxing takes place. Reflux the mixture for 6 hours, allow to cool, and stir for 12 hours. Decompose the excess lithium aluminum hydride by careful addition of 50% aqueous ethanol (about 200 cc.), and then add 10% aqueous ethanol (about 200 cc.), and then add 10% aqueous sulphuric acid until the precipitated salts dissolve (ca. 500 cc. acid). Saturate the aqueous layer with salt while stirring, and separate the tetrahydrofuran layer. Wash the resulting aqueous layer with ether. Evaporate the tetrahydrofuran solution under reduced pressure to remove the solvent, take up the residue in ether, and add the other washings to it. Wash the ether solution with saturated potassium bicarbonate, saturated brine, and finally dry over anhydrous magnesium sulphate. Evaporate the solvent, distill the residue under reduced pressure to obtain a liquid, b.p. 130–2°/0.2 mm., which crystallizes on standing, forming colorless waxy crystals of 3-m-hydroxyphenylpropan-1-ol (40 g.), m.p. ca. 30°.

PREPARATION 7

3-m-hydroxyphenylpropylbromide

Heat and stir the hydroxyphenylpropanol of Preparation 6 (10 g.) with 48% aqueous hydrogen bromide solution (5 cc.) under reflux for 3 hours, then add a further quantity of the aqueous acid (4 cc.) and continue refluxing for 12 hours. Cool, add ether (100 cc.) and wash the ether solution with water, aqueous potassium bicarbonate, and saturated brine. Dry the solution over anhydrous magnesium sulphate, remove the ether and distill to obtain 3-m-hydroxyphenylpropyl bromide (10 g.), b.p. 115–7°/0.25 mm., as a colorless viscous liquid.

PREPARATION 8

Methyl 3-hydroxy-3-(3-methoxyphenyl)butanoate

Add m-methoxy acetophenone (100 g.) in benzene (450 cc.) and methyl bromoacetate (153 g.) dropwise to a mixture of acid washed activated zinc (67 g.), methyl bromoacetate (5 cc.) and a crystal of iodine in benzene (20 cc.) at such a rate that gentle refluxing takes place. After the addition is complete continue refluxing for 1 hour, cool the mixture and pour onto ice and 10% aqueous sulphuric acid. Separate the benzene layer, wash, dry, evaporate the solvent and distill the residue to give after a forerun of reactants methyl 3-hydroxy-3-(3-methoxyphenyl)butanoate, b.p. 140°, 0.65 mm. Hg.

PREPARATION 9

Methyl 3-(3-methoxyphenyl)butanoate

Shake methyl 3-hydroxy-3-(3-methoxyphenyl)butanoate (116 g.) in acetic acid (1 l.) with 10% palladized charcoal (20 g. prehydrogenated) in an atmosphere of hydrogen until uptake of hydrogen virtually ceases (12.5 liters of hydrogen absorbed). Filter off the catalyst, evaporate the solvent and distill the residue to obtain methyl 3-(3-methoxyphenyl)butanoate, b.p. 139–142° at 5 mm. Hg $\mu_D^{26°}$ 1.5060, 112.4 g.

Infrared absorption peak at 5.75$\mu$.

PREPARATION 10

3-(3-methoxyphenyl)-butan-1-ol

Add methyl 3-(3-methoxyphenyl)-butanoate (112 g.) in ether (500 cc.) slowly to a stirred suspension of lithium aluminum hydride (40 g.) in ether (500 cc.). Reflux the mixture for 30 minutes, cool and decompose by adding methanol and water. Dissolve the precipitate by adding 10% sulphuric acid, separate the ether layer and extract the aqueous layer with ether. Wash the combined organic extracts with water, dry ($Na_2SO_4$), remove the solvent and distill the residue to obtain 3-(3-methoxyphenyl)butan-1-ol, b.p. 118–121°/0.4 mm. Hg $\mu_D^{21}$ 1.5260.

Ultraviolet absorption peaks at 274, 285 m$\mu$ ($\epsilon$ 1800, 1650).

Infrared absorption peaks at 3.05, 6.25$\mu$.

PREPARATION 11

3-(3-methoxyphenyl)-n-butyl bromide

Cool 3-(3-methoxyphenyl)butan-1-ol (84 g.) in benzene (125 cc.) to 0° and add a solution of phosphorus tribromide (55 g.) in benzene (100 cc.) dropwise so that the temperature of the mixture does not rise above 5°. Heat the mixture at 60° for 3 hours, cool, pour onto ice, dilute the organic layer with ether and separate it. Wash the organic solution with 3N aqueous sodium hydroxide, water and dry. Remove the solvent and distill the residue to obtain 3-(3-methoxyphenyl)-n-butyl bromide, 92.8 g., b.p. 100–104° C./0.15 mm.

$C_{11}H_{15}OBr$ calculated: C, 54.4%; H, 6.23%; Br, 32.85%. Found: C, 54.48%; H, 6.37%; Br, 32.58%.

Infrared absorption peaks at 6.25, 12.66, 11.71$\mu$.

To prepare 3-(3 - methoxyphenyl)-n-propyl bromide, treat 3-(3 - methoxyphenyl)propan-1-ol with a slight stoichiometric excess of phosphorus tribromide according to the manipulative procedure set forth above.

To prepare 3-(3-ethoxyphenyl)-n-pentyl chloride, treat 3-(3-ethoxyphenyl)pentan-1-ol with a slight stoichiometric excess of phosphorus trichloride according to the manipulative procedure set forth above.

To prepare 3 - (3 - methoxy-4-ethoxyphenyl)-n-propyl chloride, treat 3-(3-methoxy-4-ethoxyphenyl)propan-1-ol with a slight stoichiometric excess of phosphorus trichloride according to the manipulative procedure set forth above.

To prepare 3-(3-ethoxyphenyl)-n-butyl bromide, treat 3-(3-ethoxyphenyl)butan-1-ol with a slight stoichiometric excess of phosphorus tribromide according to the manipulative procedure set forth above.

To prepare 3-(3,5-diethoxyphenyl)-n-propyl bromide, treat 3-(3,5-diethoxyphenyl)propan-1-ol with a slight stoichiometric excess of phosphorus tribromide according to the manipulative procedure set forth above.

To prepare 3-(3-propoxyphenyl)-n-propyl chloride, treat 3-(3-propoxyphenyl)propan-1-ol with a slight stoichiometric excess of phosphorus trichloride according to the manipulative procedure set forth above.

To prepare 3-(3-propoxyphenyl)-n-butyl bromide, treat 3-(3-propoxyphenyl)butan-1-ol with a slight stoichiometric excess of phosphorus tribromide according to the manipulative procedure set forth above.

To prepare 3-(3-methoxy-4-propoxyphenyl)-n-propyl chloride, treat 3-(3-methoxy-4-propoxyphenyl)propan-1-ol with a slight stoichiometric excess of phosphorus trichloride according to the manipulative procedure set forth above.

To prepare 3-(3-methoxy-4-propoxyphenyl)-n-butyl bromide, treat 3-(3-methoxy-4-propoxyphenyl)butan-1-ol with a slight stoichiometric excess of phosphorus tribromide according to the manipulative procedure set forth above.

To prepare 3-(3-pentyloxyphenyl)-n-propyl bromide, treat 3-(3-pentyloxyphenyl)propan-1-ol with a slight stoichiometric excess of phosphorus tribromide according to the manipulative procedure set forth above.

To prepare 3-(3-cyclopentyloxyphenyl)-n-propyl chloride, treat 3-(3-cyclopentyloxypehnyl)propan-1-ol with a slight stoichimetric excess of phosphorus trichloride according to the manipulative procedure set forth above.

To prepare 3-phenyl-n-propyl bromide, treat 3-phenylpropan-1-ol with a slight stoichiometric excess of phosphorus tribromide according to the manipulative procedure set forth above.

To prepare 3-(3,4-methylenedioxyphenyl)-n-propyl bromide, treat 3-(3,4-methylenedioxyphenyl)propan-1-ol with a slight stoichiometric excess of phosphorus tribromide according to the manipulative procedure set forth above.

To prepare 3-(3,4-dimethoxyphenyl)-n-propyl bromide, treat 3-(3,4-dimethoxyphenyl)propan-1-ol with a slight stoichiometric excess of phosphorus tribromide according to the manipulative procedure set forth above.

To prepare 2-methyl-3-(3-methoxyphenyl-n-propyl bromide, treat 2 - methyl-3-(3-methoxyphenyl)propan-1-ol with a slight stoichiometric excess of phosphorus tribromide according to the manipulative procedure set forth above.

PREPARATION 12

1-(m-methoxyphenyl)-2-bromopropane

Reflux m-methoxyphenylacetic acid (16 g.) with thionyl chloride (35 cc.) for 1 hour. Distill off the thionyl chloride at atmospheric pressure and the residue at 20 mm. pressure to give m-methoxyphenylacetyl chloride. Add dropwise simultaneously this acid chloride (15 g.) in ether (20 cc.) and a solution of sodium ethoxide (from 5 g. of the metal) in ethanol (80 cc.) to a stirred solution of diethylmalonate (18.5 g.), cooled in an ice bath at such a rate that the temperature does not rise above 5°. Pour the solution slowly into dilute sulphuric acid, extract with ether, wash, dry, evaporate the solvent and reflux with a solution of sulphuric caid (48 cc.) in water (150 cc.) for 4 hours. Extract the cooled solution with ether and remove the solvent from the washed and dried solution to obtain m-methoxyphenyl acetone as an oil. Add this ketone (10 g.) in ether (50 cc.) dropwise to a stirred suspension of lithium aluminum hydride (2 g.) in ether (60 cc.) and reflux the mixture for 1 hour, then cool and decompose by carefully adding water. Dissolve the precipitate with 10% sulphuric acid and collect the product in ether. Wash, dry and evaporate the ether solution and distill the residue at 20 mm. to obtain 1-(m-methoxyphenyl)propan-2-ol. Cool this alcohol (8 g.) in benzene (5 cc.) to 0° and add phosphorus tribromide (6 g.) in benzene (5 cc.) dropwise with stirring, keeping the temperature below 5°. After the addition is complete, heat the mixture at 60° for 3 hours and pour the cooled solution onto ice and extract the product with ether. Wash the ethereal solution sequentially with dilute aqueous sodium hydroxide, water, dilute hydrochloric acid, and brine, and then dry. Remove the solvent and distill the residue at 20 mm. to give 1-(m-methoxyphenyl)-2-bromopropane.

PREPARATION 13

3-(3,5-dimethoxyphenyl)-n-propyl bromide

Add phosphorus tribromide (10.7 g.) in benzene (20 cc.) dropwise to 3-(3,5-dimethoxyphenyl)propan-1-ol (16 g.) in benzene (25 cc.) at 0°. Keep the mixture at 0° for 1 hour and then heat at 60° for 3 hours. Decompose the cooled solution by adding ice cold water. Separate the benzene layer and wash it with dilute aqueous sodium hydroxide, water, dilute hydrochloric acid and then dry. Remove the solvent and distill the residue at 20 mm. Hg to give 3-(3,5-dimethoxyphenyl)-n-propyl bromide.

PREPARATION 14

5-m-methoxyphenylpent-1-yne

Add 3-(3-methoxyphenyl)-m-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distill to obtain 5-m-methoxyphenylpent-1-yne (7.1 gr., 66%), b.p. 75–78° C./0.06 mm. Hg.

$C_{12}H_{14}O$ calculated: C, 82.7%; H, 8.1%. Found: C, 82.2%; H, 7.8%.

To prepare 5-m-ethoxyphenylhept-1-yne treat 3-(3-ethoxyphenyl)-m-pentyl chloride with a stoichiometric excess of sodium acetylide according to the manipulative procedure set forth above.

To prepare 5-m-propoxypent-1-yne treat 3-(3-propoxyphenyl)-m-propyl chloride with a stoichiometric excess of sodium acetylide according to the manipulative procedure set forth above.

To prepare 5-m-pentyloxypent-1-yne treat 3-(3-pentyloxyphenyl)-n-propyl bromide with a stoichiometric excess of sodium acetylide according to the manipulative procedure set forth above.

To prepare 5-cyclopentyloxpent-1-yne treat 3-(3-cyclopentyloxyphenyl)-n-propyl chloride with a stoichiometric excess of sodium acetylide according to the manipulative procedure set forth above.

To prepare 5-m-propoxyhex-1-yne treat 3-(3-propoxyphenyl)-n-butyl bromide with a stoichiometric excess of sodium acetylide according to the manipulative procedure set forth above.

To prepare 5-(3,5-diethoxy)pent-1-yne treat 3-(3,5-diethyoxyphenyl)-n-propyl bromide with a stoichiometric excess of sodium acetylide according to the manipulative procedure set forth above.

To prepare 5-(3-methoxy-4-propoxy)pent-1-yne treat 3-(3-methoxy-4-propoxyphenyl)-n-propyl chloride with a stoichiometric excess of sodium acetylide according to the manipulative procedure set forth above.

To prepare 5-(3-methoxy-4-propoxy)hex-1-yne treat 3-(3-methoxy-4-propoxyphenyl)-m-butyl bromide with a stoichiometric excess of sodium acetylide according to the manipulative procedure set forth above.

PREPARATION 15

5-phenylpent-1-yne

Add a mixture of dimethylformamide (880 cc.) and xylene (1120 cc.) to sodium acetylide (from the metal, 43.75 g.) in liquid ammonia (1250 cc.) and allow the ammonia to evaporate. Add 3-phenylpropyl bromide with stirring and continue the stirring for 5 hours while maintaining the reaction mixture at 25–30°. Then add ice-water (600 cc.) and extract the mixture thoroughly with ether. Dry the washed ether solution, evaporate the ether and distill the residue to give 5-phenylpent-1-yne as an oil (121 g.), b.p. 94°/50 mm.

$C_{11}H_{12}$ calculated: C, 91.6%; H, 8.4%. Found: C, 91.7%; H, 8.1%.

PREPARATION 16

5-m-nitrophenylpent-1-yne

Add 3-(3-nitrophenyl)-n-propyl bromide (5 g.) to a solution of sodium acetylide (from sodium, 0.48 g.) in liquid ammonia (100 cc.). Stir the dark solution for 12 hours, add excess ammonium chloride, evaporate the ammonia and work up the residue with ether. Distill a portion (2 g.) of the residue to obtain 5-m-nitrophenylpent-1-yne (1.8 g.), b.p. 130° C./0.1 mm.

PREPARATION 17

5-m-hydroxyphenylpent-1-yne

Pass dry acetylene into stirred liquid ammonia (800 cc.) and add portions of sodium (totalling 10.2 g.) piece by piece as the blue color discharges. When the addition of the sodium is complete, continue to pass acetylene into the mixture for 15 minutes. Add dimethylformamide (350 cc.) and allow the ammonia to evaporate. To the suspension of sodium acetylide thus obtained, add dropwise 3-(3-hydroxyphenyl)-m-propyl bromide (33.5 g.), and heat the mixture to 60° and maintain at that temperature for 4 hours. Allow to cool, add ice and dilute sulphuric acid until the aqueous mixture is at pH 6. Extract the mixture with ether (a total of 1000 cc.) and wash the extract with saturated brine, concentrate the washed extract to 300 cc., dry over anhydrous magnesium sulphate, and evaporate off the remaining ether. Azeotrope the product with benzene to ensure no trace of water remains, to obtain as residue a dry oil, crude 5-m-hydroxyphenylpent-1-yne (about 20 g.).

PREPARATION 18

5-m-acetoxyphenylpent-1-yne

Mix 5-m-hydroxyphenylpent-1-yne (about 20 g.) with pyridine (70 cc.) and acetic anhydride (30 cc.) and allow the homogeneous mixture to stand for 12 hours at room temperature. Remove excess acetic anhydride by successive additions of 95% aqueous ethanol (20 cc.) and evaporation of the ethyl acetate formed. Remove the remaining solvent and water present by adding benzene and evaporating on a water bath, to obtain a brown oil which on distillation gives 5-m-acetoxyphenylpent-1-yne as a pale yellow mobile liquid (24.2 g.), b.p. 104–8°/0.1 mm.

PREPARATION 19

5-(3,4-methylenedioxyphenyl)pent-1-yne

Add sodium (4.6 g.) in small pieces to a stirred solution of liquid ammonia (250 cc.) through which a rapid stream of purified acetylene is passed. When the blue color is discharged, continue the acetylene stream for 15 minutes, and then add dry dimethylformamide (120 cc.). Allow most of the ammonia to evaporate, and then add 3-(3,4-methylenedioxyphenyl)propyl bromide (Preparation 11) (25 g.) slowly. Stir for 3 hours at 60–70°, cool the mixture in ice and decompose by the addition of water (75 cc.). Collect the product in ether and wash with 2N-sulphuric acid, 2N-sodium carbonate solution, water and dry. Remove the solvent by evaporation and distill the residue at 0.1 mm. Hg to obtain 5-(3,4-methylenedioxyphenyl)pent-1-yne.

Infrared (liquid film) absorption peaks at 3.06 and 6.25μ.

To prepare 5-(3,4-dimethoxyphenyl)pent-1-yne treat 3-(3,4-dimethoxyphenyl)propyl bromide (25 g.) with sodium acetylide according to the manipulative procedure described above.

To prepare 5-(3,5-dimethoxyphenyl)pent-1-yne treat 3-(3,5-dimethoxyphenyl)propyl bromide (25 g.) with sodium acetylide according to the manipulative procedure described above.

PREPARATION 20

5-(3-methoxyphenyl)hex-1-yne

Add sodium (11.5 g.) slowly in small pieces to a stirred solution of liquid ammonia (750 cc.) through which a rapid stream of acetylene is passing at such a rate that no blue color is formed. Add 3-(3-methoxyphenyl)-n-butyl bromide (84 g.) in tetrahydrofuran rapidly to the well stirred mixture, and after 22 hours decompose the mixture with water, collect the product with ether, wash and dry the ethereal solution and remove solvent by evaporation. Distill the residue to obtain 5-(3-methoxyphenyl)-hex-1-yne, 56.6 g., b.p. 84–95°/0.55–0.35 mm. Hg.

$C_{13}H_{16}O$ calculated: C, 83.00%; H, 8.57%. Found: C, 82.79%; H, 8.32%.

Infrared absorption peaks at 3.06, 4.75, 6.25μ.

PREPARATION 21

5-(m-methoxyphenyl)-4-methyl-pent-1-yne

Add 1-(m-methoxyphenyl)-2-bromo-propane (10 g.) to a stirred suspension of magnesium (1.7 g.) in anhydrous ether (40 cc.) containing a crystal of iodine and treat the resulting Grignard solution at 0° with 2,3-dibromoprop-1-ene (9 g.) for a period of 1 hour. Reflux the mixture for one hour, cool and decompose with saturated ammonium chloride solution. Wash with water and dry the ethereal phase and evaporate the solvent. Dissolve the residue (9 g.) in ether (25 cc.) and add the solution dropwise to a stirred suspension of sodamide (3.5 g.) in liquid ammonia (100 cc.) with external cooling (acetone-Dry Ice bath). Stir the mixture for 2 hours, and then allow it to warm up to room temperature. Add ether, and then add saturated aqueous ammonium chloride. Wash the ethereal solution, dry, evaporate the solution and distill the residue at 0.2 mm., the fraction boiling between 90° and 100° being collected, to obtain 5-(m-methoxyphenyl)-4-methylpent-1-yne.

Infrared absorption peaks at 3.03 and 4.55μ.

PREPARATION 22

1-diethylamino-6-m-methoxyphenylhex-2-yne

Allow 5-m-methoxyphenylpent-1-yne (8 g.) to stand for 12 hours at 70° C. under nitrogen with water (2.5 cc.), trioxan (0.5 g.), 30% formalin (5.5 g.), diethylamine (4. g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid; wash the acid extract with ether, make alkaline with 10% aqueous sodium hydroxide, extract with ether, and then wash and dry the ether extract. Distill to obtain 1-diethylamino-6-m-methoxyphenylhex-2-yne (10.6 g., 88%), b.p. 130–131° C./0.1 mm.

$C_{17}H_{25}N$ calculated: C, 78.7%; H, 9.7%. Found: C, 78.9%; H, 9.6%.

To prepare 1-diethylamino-6-m-ethoxyphenyloct-2-yne treat 5-m-ethoxyphenylhept-1-yne (ca. 8 g.) according to the manipulative procedure described above.

To prepare 1 - diethylamino-6-m-propoxyphenylhex-2-yne treat 5-m-propoxyphenylpent-1-yne (ca. 8 g.) according to the manipulative procedure described above.

To prepare 1 - diethylamino-6-m-pentoxyphenylhex-2-yne treat 5-m-pentoxyphenylpent-1-yne (ca. 8 g.) according to manipulative procedure described above.

To prepare 1-diethylamino-6-m-cyclopentyloxyphenylhex-2-yne treat 5-m-cyclopentyloxyphenylpent-1-yne (ca. 8 g.) according to the manipulative procedure described above.

To prepare 1 - diethylamino-6-m-propoxyphenylhep-2-yne treat 5-m-propoxyphenylhex-1-yne (ca. 8 g.) according to the manipulative procedure described above.

To prepare 1-diethylamino-6-(3,5-diethoxyphenyl)-hex-2-yne treat 5-(3,5-diethoxyphenyl)pent-1-yne (ca. 8 g.) according to the manipulative procedure described above.

To prepare 1-diethylamino-6-(3-ethoxy-4-propoxyphenyl)-hex-2-yne treat 5-(3-ethoxy-4-propoxy)pent-1-yne (ca. 8 g.) according to the manipulative procedure described above.

To prepare 1-diethylamino-6-(3-ethoxy-4-propoxyphenyl)-hex-2-yne treat 5-(3-ethoxy-4-propoxy)-hex-1-yne (ca. 8 g.) according to the manipulative procedure described above.

PREPARATION 23

1-diethylamino-6-phenylhex-2-yne

Maintain 5-phenylpent-1-yne (20 g.) for 12 hours at 70° under nitrogen with water (6.2 cc.), trioxan (1.2 g.), 30% formalin (13.8 g.), diethylamine (10 g.), acetic acid (6.9 g.), dioxan (62 cc.) and cuprous chloride (0.35 g.). Make the cooled solution alkaline with sodium hydroxide. Extract with ether and extract the ether extract itself with hydrochloric acid. Make the purified aqueous hydrochloride solution thus obtained alkaline again and extract with ether. Dry, evaporate the ether extract and distill the residue to obtain 1-diethylamino-6-phenylhex-2-yne, (27.1 g.), b.p. 104–6° /0.2 mm.

$C_{16}H_{23}N$ calculated: C, 83.8%; H, 10.1%. Found: C, 83.9%; H, 10.1%.

Prepare 1-diethylamino-6-m-nitrophenylhex-2-yne (1.5 g.), b.p. 148° C./0.05 mm., by treating 5-m-nitrophenylpent-1-yne (1.8 g.) with water (0.6 cc.), trioxan (0.1 g.), 30% formalin (1.4 g.), diethylamine (1 g.), acetic acid (0.7 g.), dioxan (6.2 cc.) and cuprous chloride (0.03 g.) according to the manipulative procedure described above.

PREPARATION 24

1-diethylamino-6-m-acetoxyphenylhex-2-yne

Add 5-m-acetoxyphenylpent-1-yne (9.5 g.) to a mixture of trioxan (0.5 g.), 40% formalin (5.5 g.), diethylamine (4 g.), acetic acid (2.75 g.), dioxan (25 cc.) and cuprous chloride (0.13 g.), at room temperature. Heat the mixture thus obtained to 70°, to obtain a clear green solution, and maintain under nitrogen at that temperature for 12 hours. Cool and add ice, pour the product into ice-cold saturated potassium bicarbonate and the extract mixture with ether. Wash and dry, evaporate the extracts under reduced pressure and distill to obtain 1-diethylamino-6-m-acetoxyphenylhex-2-yne (9.9 g.), b.p. 152–4°/0.1 mm., as a pale yellow mobile liquid.

PREPARATION 25

1-diethylamino-6-(3,4-methylenedioxyphenyl)-hex-2-yne

All 5-(3,4-methylenedioxyphenyl)pent-1-yne (24.5 g.) in dioxan (15 cc.) to a mixture of diethylamine (16 g.), trioxan (7.2 g.) and cuprous chloride (0.3 g.) in dioxan (20 cc.) and heat the mixture at 100° for 15 hours under an atmosphere of nitrogen. Filter the cooled solution, remove the solvent and distill the residue at 0.1 mm. Hg to obtain 1-diethylamino-6-(3,4-methylenedioxyphenyl)-hex-2-yne after a forerun of more volatile material.

Infrared absorption peaks at 6.25, 12.20μ.

PREPARATION 26

1-diethylamino-6-(3,4-dimethoxyphenyl)-hex-2-yne

Heat a mixture of 5-(3,4-dimethoxyphenyl)-pent-1-yne (8 g.), water (2.5 cc.), trioxan (0.5 g.), 30% formalin (5.5 g.), diethylamine (4 g.), acetic acid (2.75 g.), dioxan (25 cc.) and cuprous chloride (0.13 g.) at 70° for 15 hours. Make the cooled solution alkaline with 10% aqueous sodium hydroxide and collect the product. Wash the ethereal solution with water and extract with 10% hydrochloric acid (3× 30 cc.). Wash the combined aqueous extracts with ether, make it alkaline with 10% sodium hydroxide solution and extract with ether. Wash and dry the ethereal solution, evaporate the solvent and distill the residue at 0.1 mm. Hg to obtain 1-diethylamino-6-(3,4-dimethoxyphenyl)-hex-2-yne.

Infrared absorption peaks at 6.25, 12.20μ.

Prepare 1-diethylamino-6-(3,5-dimethoxyphenyl)-hex-2-yne by treating with water, trioxan, 30% formalin, diethylamine, acetic acid, dioxan and cuprous chloride according to the manipulative procedure described above.

PREPARATION 27

1-diethylamino-6-(3-methoxyphenyl)-hept-2-yne

Heat a mixture of 5-(3-methoxyphenyl)-hex-1-yne (56.6 g.), water (17.5 cc.), 40% formalin (38.5 cc.), diethylamine (40 cc.), acetic acid (19 cc.), dioxan (175 cc.) and cuprous chloride (1 g.) at 70° for 16 hours in an atmosphere of nitrogen. Make the cooled solution alkaline with 10% aqueous sodium hydroxide and extract twice with ether. Wash the ether extracts with water, filter and extract with 4N hydrochloric acid (3× 350 cc.). Make the acid extracts alkaline with 10% aqueous sodium hydroxide, extract with ether and wash the organic solution with water, brine and dry. Evaporate the solvent and distill the residue to obtain 1-diethylamino-6-(3-methoxyphenyl)-hept-2-yne, 79.5 g., b.p. 135–40°/0.2 mm. Hg. $\mu_D^{25}$ 1.5116.

$C_{18}H_{27}ON$ calculated: C, 79.07%; H, 9.95%. Found: C, 78.99%; H, 9.67%.

PREPARATION 28

1-diethylamino-5-methyl-6-(m-methoxyphenyl)-hex-2-yne

Heat 5-(m-methoxyphenyl)-4-methyl-pent-1-yne (8 g.) trioxan (0.5 g.) 30% formalin (5.5 cc.), diethylamine (4 g.), acetic acid (2.75 g.), dioxan (25 cc.) and cuprous chloride (0.12 g.) together at 70° for 15 hours. Make cooled solution alkaline with 10% aqueous sodium hydroxide and extract with ether. Wash the ethereal solution with water and extract with 10% hydrochloric acid (3× 20 cc.). Combine the acid extracts, wash with ether and make alkaline with 10% aqueous sodium hydroxide and extract with ether. Wash the ethereal solution, dry, remove the solvent and distill the residue at 0.1 mm. to obtain 1 - diethylamino-5-methyl-6-(m-methoxyphenyl)-hex-2-yne.

PREPARATION 29

1-chloro-6-m-methoxyphenylhexan-3-one

Saturate 6-m-methoxyphenylhex-1-en-3-one (1 g.) with dry hydrogen chloride gas at 0° C. and keep the mixture at 0° C. for 48 hours. Remove the excess hydrogen chloride at 0° C. by subjecting the product to a reduced pressure of 15 mm. for 30 minutes and then at a pressure of 0.1 mm. for 15 minutes. The product obtained shows infra-red absorption peaks at 5.87μ, representing a saturated ketone group, and does not give a precipitate with aqueous-ethanolic silver nitrate solution: however, on boiling with aqueous sodium hydroxide followed by acidification with nitric acid and addition of silver nitrate, a copious precipitate of silver chloride is obtained. This behaviour indicates the product is the expected 1-chloro-6-m-methoxyphenylhexan-3-one.

PREPARATION 30

1-bromo-6-m-methoxyphenylhexane-3-one

Prepare 1-bromo-6-m-methoxyphenylhexane-3-one by saturation of 6-methoxyphenylhex-1-en-3-one (g.) with dry hydrogen bromide, keeping at 0° for 12 hours, and afterwards subjecting the product to a reduced pressure of 0.03 mm. for 10 minutes.

The following examples illustrate the manner of using the claimed processes of the invention for the preparation of the claimed compositions of the invention, and for the preparation of natural steroids.

EXAMPLE 1

1-diethylamino-6-m-methoxyphenylhexan-3-one and 6-m-methoxyphenylhex-1-en-3-one

Add mercuric sulphate (0.45 g.) to a swirled solution of 1-diethylamino-6-m-methoxyphenylhex-2-yne (8.5 g.) in concentrated sulphuric acid (2.5 cc.) and water (25 cc.). Keep the solution unnder nitrogen at 75° C. for 1 hour, then cool, make basic with 10% aqueous sodium hydroxide, and filter through glass wool to remove mercuric oxide. Extract product with ether and wash and dry the ethereal solution. Remove the solvent to obtain the crude ketoamine 1 - diethylamino-6-m-methoxyphenylhexan-3-one, infrared absorption peak at 1710$\mu$. Distill under reduced pressure with partial elimination of diethylamine, to obtain a mixture of the ketoamine 1-diethylamino-6-m-methoxyphenylhexan-3-one and the vinyl ketone 6-m-methoxyphenylhex-1-en-3-one (7.1 g., ca. 76%), b.p. 140–145° C./0.1 mm.; infrared absorption peaks at 5.85 and 5.95$\mu$, the ketoamine predominating.

Distill a second portion of the crude ketoamine 1-diethylamino-6-m-methoxyphenylhexan-3-one very slowly over a period of 30 minutes through a Vigreux fractionating column 10 cm. high and 1 in. diameter under reduced pressure to eliminate most of the diethylamine. Dissolve the 6-m-methoxyphenylhex-1-en-3-one obtained (b.p. 114–4° C./0.7 mm.) in ether and wash the ether solution with dilute hydrochloric acid, followed by aqueous sodium bicarbonate and water. Dry and evaporate. Distill the residue to give the pure vinyl ketone as a colorless liquid, b.p. 75° C./0.3 mm.

$C_{13}H_{16}O_2$ calculated: C, 76.4%; H, 7.9%. Found: C, 76.3%; H, 8.0%.

Mix a third portion of the crude undistilled 1-diethylamino-6-m-methoxyphenylhexan-3-one (3 g.) with methyl iodide (3 g.). An exothermic reaction soon develops. After 12 hours wash the mixture with ether to remove unchanged reactants and subject to reduced pressure (15 min.) to remove ether remaining: the residue is the crude methiodide of the ketoamine (4.6 g.).

Infrared absorption peaks at 5.85$\mu$.

This compound is useful for preparing the novel compositions of this invention which have hormonal activity.

EXAMPLE 2

1-diethylamino-6-phenylhexan-3-one and 6-phenylhex-1-en-3-one

Add to a solution of 1-diethylamino-6-phenylhex-2-yne (27.1 g.) in concentrated sulphuric acid (7.6 cc.) diluted with water (77 cc.) at 70° mercuric sulphate (1.6 g.), and keep the solution under nitrogen for 1 hour; cool, make basic with sodium hydroxide solution, and filter through glass wool to remove mercuric oxide. Extract the product with ether and evaporate the washed and dried ethereal solution, leaving crude 1-diethylamino-6-phenylhexan-3-one. Distill under reduced pressure with this ketoamine undergoing partial elimination of diethylamine, to obtain a mixture of the ketoamine, and 6-phenylhex-1-en-3-one (18.9 g.), b.p. 96°/0.003 mm.

Infrared absorption peaks at 5.88 and 5.95$\mu$.

To prepare 1-diethylamino-6-m-ethoxyphenyloctan-3-one and 6-m-ethoxyphenyloct-1-en-3-one hydrate and distill 1-diethylamino-6-m-ethoxyphenyloct-2-yne in the presence of mercury salts according to the manipulative procedure set forth above.

To prepare 1-diethylamino-6-m-propoxyphenylhexan-3-one and 6-m-propoxyphenylhex-1-en-3-one hydrate and distill 1-diethylamino-6-m-propoxyphenylhex-2-yne in the presence of mercury salts according to the manipulative procedure set forth above.

To prepare 1-diethylamino-6-m-pentoxyphenylhexan-3-one and 6-m-pentoxyphenylhex-1-en-3-one hydrate and distill 1-diethylamino-6-m-pentoxyphenylhex-2-yne in the presence of mercury salts according to the manipulative procedure set forth above.

To prepare 1-diethylamino-6-m-cyclopentyloxyphenylhexan-3-one and 6-m-cyclopentyloxyphenylhex-1-en-3-one hydrate and distill 1-diethylamino-6-m-cyclopentyloxyphenylhex-2-yne in the presence of mercury salts according to the manipulative procedure set forth above.

To prepare 1-diethylamino-6-m-propoxyphenylheptan-3-one and 6-m-propoxyhept-1-en-3-one hydrate and distill 1-diethylamino-6-m-propoxyphenylhept-2-yne in the presence of mercury salts according to the manipulative procedure set forth above.

To prepare 1-diethylamino-6-(3,5-diethoxyphenylhexan-3-one and 6-(3,5-diethoxyphenyl)-hex-1-en-3-one hydrate and distill 1-diethylamino-6-(3,5-diethoxyphenyl)hex-2-yne in the presence of mercury salts according to the manipulative procedure set forth above.

To prepare 1-diethylamino - 6 - (3-ethoxy-4-propoxyphenyl)-hexan-3-one and 6-(3-ethoxy-4-propoxyphenyl)hex-1-en-3-one hydrate and distill 1-diethylamino-6-(3-ethoxy-4-propoxyphenyl)hex-2-yne in the presence of mercury salts according to the manipulative procedure set forth above.

These compounds are useful for preparing the novel compositions of this invention which have hormonal activity.

EXAMPLE 3

1-diethylamino-6-*m*-nitrophenylhexan-3-one and 6-*m*-Nitrophenylhex-1-en-3-one

Hydrate 1-diethylamino-6-*m*-nitrophenylhex-2-yne (1.5 g.) using the procedure of Example 2 with one-twentieth of the quantities of reagents. Remove the solvent to obtain crude 1-diethylamino-6-m-nitrophenylhexan-3-one as a clear pale yellow liquid. Distill under reduced pressure, with considerable elimination of diethylamine, to obtain crude 6-m-nitrophenylhex-1-en-3-one (1 g.) as a clear pale yellow liquid.

EXAMPLE 4

1-diethylamino-6-*m*-hydroxyphenylhexan-3-one

Add mercuric sulphate (0.27 g.) rapidly with swirling to a solution of 1-diethylamino-6-m-acetoxyphenylhex-2-yne (3.1 g.) in 10% aqueous sulphuric acid (15 cc.), and heat the resulting green solution at 75° under nitrogen for 1½ hours. After cooling, filter to remove mercuric sulphate and add solid potassium bicarbonate until the product has pH 8.8. Extract the solution with ether. Wash the other extracts with brine made alkaline to pH 8.8, and dry over anhydrous magnesium sulphate. Evaporate the ether at room temperature to obtain as residue crude 1-diethylamino-6-m-hydroxyphenylhexan - 3 - one as a viscous brown oil (2.4 g.), showing infrared absorption at 5.85$\mu$ indicating the presence of a keto group, together with the characteristic band of a phenolic hydroxy group and the complete absence of a band at 5.68$\mu$ corresponding to a phenolic acetate group.

This compound is useful for preparing the novel compositions of this invention which have hormonal activity.

EXAMPLE 5

1-diethylamino-6-m-acetoxyphenylhexan-3-one and 6-m-acetoxyphenylhex-1-en-3-one Acetylate the crude 1-diethylamino-6-m-hydroxyphenylhexan-3-one (2.4 g.) by adding pyridine (7 cc.) and acetic anhydride (3 cc.) and allow the mixture to stand overnight at room temperature. Work up the mixture as in the acetylation stage described in the preparation of 5-m-acetoxyphenylpent-1-yne above, to obtain crude 1-diethylamino-6-m-acetoxyphenylhexan - 3 - one as a viscous brown oil (2.7 g.).

Infrared absorption peaks at $5.68\mu$ with a shoulder at $5.85\mu$ and no appreciable phenolic absorption.

Distill in a Hickman still at 0.1 mm., with partial elimination of diethylamine, and collect a colorless mobile liquid, b.p., 160–70°/0.1 mm., which is a mixture (1.8 g.) of the ketoamine and 6-m-acetoxyphenylhex-1-en-3-one.

Infrared absorption peaks at 5.68, 5.88, $5.95\mu$, the nature of the absorption indicating a predominance of the vinyl ketone in the mixture.

These compounds are useful for preparing the novel compositions of this invention which have hormonal activity.

EXAMPLE 6

1-diethylamino-6-(3,4-dihydroxyphenyl)hexan-3-one

Add mercuric sulphate (0.27 g.) to a swirled solution of 1 - diethylamino - 6 - (3,4 - methylenedioxyphenylhex-2-yne) (3 g.) in 10% aqueous sulphuric acid (15 cc.) and heat the mixture for 90 minutes at 75° in an atmosphere of nitrogen. Filter the cooled reaction mixture and add solid potassium carbonate to pH 8.5. Extract the product with ether, wash and dry and evaporate the solvent to leave as residue crude 1-diethylamino-6-(3,4-hydroxyphenyl)hexane-3-one.

Infrared absorption peaks at $5.85\mu$.

This compound is useful for preparing the novel compositions of this invention which have hormonal activity.

EXAMPLE 7

1-diethylamino-6-(3,4-dimethoxyphenyl)hexan-3-one and 6-(3,4-dimethoxyphenyl)hex-1-en-3-one Add mercuric sulphate (0.45 g.) to a stirred solution of 1 - diethylamino - 6-(3,4-dimethoxyphenyl)hex-2-yne (8.5 g.) in concentrated sulphuric acid (2.5 cc.) and water (25 cc.) and maintain the solution at 75° for 90 minutes. Make the cooled solution basic with 10% aqueous sodium hydroxide and filter to remove mercuric oxide. Extract the product with ether and wash and dry the ethereal solution. Evaporate the solvent to obtain 1-diethylamino-6-(3,4-dimethoxyphenyl)hexan-3-one as an oily residue.

Infrared absorption peaks (liquid film) $5.85\mu$.

Slowly distill through a short fractionating column at 0.1 mm. Hg to obtain mainly the eliminated product 6-(3,4-dimethoxyphenyl)hex-1-en-3-one.

Infrared absorption peaks (liquid film) $5.95\mu$.

This compound is useful for preparing the novel compositions of this invention which have hormonal activity.

EXAMPLE 8

1-diethylamino-6-(3,5-dimethoxyphenyl)hexan-3-one and 6-(3,5-dimethoxyphenyl)hex-1-en-3-one Proceed exactly as described for the preparation of the 3,4-dimethoxy compounds above, using 6-(3,5-dimethoxyphenyl)-1-diethylaminohex-2-yne (8.5 g.), mercuric sulphate (0.45 g.), and 10% sulphuric acid (25 cc.) to obtain 1 - diethylamino - 6 - (3,5 - dimethoxyphenyl)hexan-3-one and 6-(3,5-dimethoxyphenyl)hex-1-en-3-one.

EXAMPLE 9

1-diethylamino-6-(m-methoxyphenyl)heptan-3-one and 6-(m-methoxyphenyl)hept-1-en-3-one Dissolve 1 - diethylamino - 6 - (m - methoxyphenyl)hept-2-yne (13.6 g.) in 10% aqueous sulphuric acid (40 cc.) and stir with mercuric sulphate (0.69 g.) for 2 hours at 70°. Filter the cooled solution, make basic with 10% aqueous sodium hydroxide and extract with ether. Wash the ethereal solution with water and brine, and dry $(Na_2SO_4)$. Evaporate the solvent and distill the residue to obtain 1-diethylamino-6-(m-methoxyphenyl)heptan-3-one which has partially eliminated to 6-(m-methoxyphenyl)hept-1-en-3-one during the distillation, b.p. 145°/12 mm. Hg.

Infrared absorption peaks at $5.95\mu$.

This compound is useful for preparing the novel compositions of this invention which have hormonal activity.

EXAMPLE 10

1-diethylamino-6-(m-methoxyphenyl)-5-methylhexan-3-one and 5-methyl-6-(m-methoxyphenyl)hex-1-en-3-one Add mercuric sulphate (0.45 g.) to a stirred solution of 1 - diethylamino - 5 - methyl - 6 - (m - methoxyphenyl)hex-2-yne (8 g.) in concentrated sulfuric acid (2.5 cc.) and water (25 cc.) and heat the mixture at 70° for 1½ hrs. Filter the cooled solution, make basic with 10% aqueous sodium hydroxide extract with ether. Wash and dry the ethereal solution and evaporate to leave as residue crude 1-diethylamino-6-(m-methoxyphenyl)-5-methylhexan-3-one; infrared absorption peaks at $5.85\mu$. Slowly distill at 0.1 mm. Hg to obtain 5-methyl-6-(m-methoxyphenyl)hex-1-en-3-one; infrared absorption peaks at $5.85\mu$.

This compound is useful for preparing the novel compositions of this invention which have hormonal activity.

EXAMPLE 11

6-(m-methoxyphenyl)hex-1-en-3-one

Add mercuric sulphate (1.12 g.) to a swirled solution of 1-diethylamino-6-(m-methoxyphenyl)hex-2-yne (2.5 g.) in concentrated sulphuric acid (6.25 g.) and water (62 cc.). Maintain the solution at 75° C. for 2 hours, then cool, filter, make basic and extract with ether. After the solvent has been removed, distill the residue slowly over a period of 30 minutes through a Vigreux fractionating column of height 10 cm. and diameter 1 cm. under reduced pressure, to obtain the crude vinyl ketone (14.5 g., b.p. 115–23° C./0.05 mm.) containing a very small amount of ketoamine.

To obtain the pure vinyl ketone, dissolve the distillate (5.2 g.) in ether, wash the solution with dilute hydrochloric acid, followed by water and sodium bicarbonate solution, dry, and evaporate the ether and redistill the residue. The pure vinyl ketone, 6-(m-methoxyphenyl)hex-1-en-3-one (b.p. 116.8° C./0.5 mm.), shows infrared absorption peak at $5.97\mu$.

$C_{13}H_{16}O_2$ calculated: C, 76.4%; H, 7.9%. Found: C, 76.3%, H, 8.0%.

This compound is useful for preparing the novel compositions of this invention which have hormonal activity.

EXAMPLE 12

1-diethylamino-6-m-methoxyphenylhexan-3-one methiodide

Mix crude undistilled 1-diethylamino-6-m-methoxyphenylhexan-3-one (3 g.) with methyl iodide (3 g.). An exothermic reaction soon develops and after 12 hours wash the mixture with ether to remove unchanged reactants and evaporate under reduced pressure (15 mm.) to remove ether remaining; the residue is the crude methiodide of the keto-amine (4.8 g.); infrared absorption peak at 1710 m$\mu$.

This compound is useful for preparing the novel compositions of this invention which have hormonal activity.

EXAMPLE 13

2-ethylcyclopentane-1,3-dione

Dissolve 2-ethylcyclopentane-1,3,4-trione hydrate (30 g., m.p. 65–69°, Koenigs and Hopmann, Ber., 1921, 54, 1343) in ethanol (200 cc.) and water (100 cc.). To this solution add dropwise during 1 hour a solution of semicarbazide hydrochloride (21 g.) and sodium acetate (28.2 g.) in water (200 cc.) with vigorous stirring throughout. Filter off the semicarbazone precipitated wash with methanol, and purify by stirring in refluxing methanol; filter to obtain a pale cream powder, m.p. 179–82°.

Dissolve the semicarbazone (34 g.) in a solution of potassium hydroxide (34 g.) in dry ethylene glycol at 130°, and heat the mixture to 160° for 1 hour, followed by 30 minutes at 180°. Distill the glycol at 0.01 mm., dissolve the residual solid in water (150 cc.) and make the solution acid to Congo red with hydrochloric acid. Cool to 0° overnight and filter. Recrystallize the residue from water to obtain 2-ethylcyclopentane-1,3-dione (10 g.), m.p. 180° with sublimation.

This compound is useful for preparing the novel compositions of this invention which have hormonal activity.

EXAMPLE 14

3-n-propylcyclopentane-1,3-dione

Condense methyl n-butyl ketone with diethyl oxalate in the presence of sodium ethoxide, and convert the glyoxylate obtained by heating with hydrochloric acid to 2-n-propylcyclopentane-1,3,5-trione, from which prepare the semicarbazone, m.p. 285–289° (decomp.) using semicarbazide hydrochloride and sodium acetate. Heat the semicarbazone with potassium hydroxide in ethylene glycol to obtain 2-n-propylcyclopentane-1,3-dione, m.p. 175°.

This compound is useful for preparing the novel compositions of this invention which have hormonal activity.

EXAMPLE 15

2-isopropylcyclopentane-1,3-dione

Add methyl isobutyl ketone (50 g.) and diethyl oxalate (160 g.) to an ice-cold solution of sodium (23 g.) in dry ethanol (350 cc.) with efficient stirring, and then reflux the mixture for 30 minutes, cool in ice and quickly add aqueous sulphuric acid (50%, 55 cc.). After 15 minutes filter off sodium sulphate, wash with ethanol and add the washings to the filtrate; next evaporate to dryness under reduced pressure to obtain ethyl 4-isopropyl-2,3,5-trioxocyclopentylglyoxalate as an uncrystallizable oil. Boil this oil with 2N hydrochloric acid (1500 cc.) for 1 hour and decant the hot solution from residual tarry material. Filter off the crystals which precipitate from the cooled decanated solution and recrystallize from aqueous ethanol as 2-isopropylcyclopentane-1,3,5-trione, m.p. 109–112°.

Treat the trione thus obtained (25 g.) by a procedure analogous to that described for the corresponding 2-ethyl compound to obtain 2-isopropylcyclopentane-1,3-dione (8.9 g.), m.p. 146°.

To prepare 2-(2-hydroxyethyl)-cyclopentane-1,3-dione treat 4-oxopentan-1-ol with diethyl oxalate, then subject to acid hydrolysis and treat the triene so obtained by the procedure described for the above isopropyl compound.

To prepare 2-(2-dimethylaminopropyl)-cyclopentane-1,3-dione treat 1-dimethylamino-hexan-5-one with diethyl oxalate, then subject to acid hydrolysis and treat the trione so obtained by the procedure described for the above isopropyl compound.

To prepare 2-(2-hydroxypropyl)-cyclopentane-1,3-dione treat 2-hydroxy-hexan-5-one with diethyl oxalate, then subject to acid hydrolysis and treat the trione so obtained by the procedure described for the above isopropyl compound.

To prepare 2-phenethylcyclopentane-1,3-dione treat 1-phenylpentan-4-one with diethyl oxalate, then subject to acid hydrolysis and treat the trione so obtained by the procedure described for the above isopropyl compound.

To prepare 2-isopentyl-cyclopentane-1,3-dione treat 2-methylheptan-6-one with diethyl oxalate, then subject to acid hydrolysis and treat the trione so obtained by the procedure described for the above isopropyl compound.

These compounds are useful for preparing the novel compositions of this invention which have hormonal activity.

EXAMPLE 16

2-n-butylcyclopentane-1,3-dione

Condense methyl n-pentyl ketone with diethyl oxalate in the presence of sodium ethoxide, and convert the glyoxylate obtained by heating with hydrochloric acid to 2-n-butylcyclopentane-1,3,5-trione, from which prepare the semicarbazone, m.p. 285–90° (decomp.) using semicarbazide hydrochloride and sodium acetate. Heat the semicarbazone with potassium hydroxide in ethylene glycol to obtain 2-n-butylcyclopentane-1,3-dione, m.p. 149–51°.

This compound is useful for preparing the novel compositions of this invention which have hormonal activity.

EXAMPLE 17

2-isobutyl-1,3-cyclopentanedione

Add methyl isoamyl ketone (228.4 g.) and diethyl oxalate (644.1 g.) to an ice-cold solution of sodium methoxide (224 g.) in dry ethanol (1400 cc.) with vigorous stirring and reflux the mixture for 1½ hours, cool in ice water and then add aqueous sulfuric acid (202 cc. conc. sulfuric acid; 1460 cc. $H_2O$). After refluxing for 1½ hours, cool the reaction mixture containing 2-isobutylcyclopentane-1,3,5-trione to 25° and treat with aqueous sodium hydroxide (50%; 585 cc.). Filter off sodium sulfate precipitate and wash with methanol (800 cc.). Add the washings to the filtrate and adjust the pH of the resulting solution to 4.5 by adding glacial acetic acid (96 cc.). To this solution add dropwise and with stirring over a period of 40 minutes a solution of semicarbazide hydrochloride (223 g.) and sodium acetate (196 g.) in water (860 cc.). Filter off the precipitate, wash with water (3 × 380 cc.), methanol (3 × 380 ml.) and dry, to obtain 3-isobutyl-1,2,4 - cyclopentanetrione - 1 - semicarbazone (184 g., 40.8%); m.p. 277°.

Add the semicarbazone (184 g.) to a solution of sodium methoxide (140 g.) in decanol (817 cc.) at 120° during 30 minutes and slowly raise the temperature to 200° to remove volatiles boiling below this temperature and then maintain between 205–215° for 3 hours. After lowering the temperature to 80°, add water (820 cc.) and stir the mixture until the solids dissolve. Adjust the pH of the mixture to 8 by adding aqueous hydrochloric acid and separate the two layers. Extract the decanol layer with 2 portions (each 150 cc.) of water and wash the combined water layers with toluene. Make the aqueous solution acid to Congo red with hydrochloric acid, cool to 10°, filter and dry the product, to obtain 2-isobutyl-1,3-cyclopentanedione (113.6 g., 90.6%), m.p. 194–196° after crystallization from ethanol.

$C_9H_{14}O$ calculated: C, 70.02%; H, 9.15%. Found: C, 70.31%; H, 9.25%.

This compound is useful for preparing the novel compositions of this invention which have hormonal activity.

EXAMPLE 18

2-cetylcyclopentane-1,3-dione

Condense methyl n-heptadecyl ketone with diethyl oxalate in the presence of sodium ethoxide to give ethyl 4-cetyl-2,3,5-trioxocyclopentyl glyoxalate, which is isolated and recrystallized from hexane, m.p. 69°. Reflux this ester with concentrated hydrochloric acid to obtain 2-cetylcyclopentane-1,3,5-trione monohydrate, m.p. 97–102°, from which prepare the semicarbazone, m.p. 261° (decomp.) using semicarbazide hydrochloride and sodium acetate. Heat the semicarbazone with potassium hydroxide in ethylene glycol to obtain 2-cetylcyclopentane-1,3-dione, m.p. 128–30°, on recrystallization from chloroform.

This compound is useful as an intermediate for preparing the novel compositions of this invention having hormonal activity.

EXAMPLE 19

2-diethylaminoethylcyclopentane-1,3-dione

Dissolve sodium (11.5 g.) in absolute alcohol (175 ml.), cool to 0° C., and add a solution of ethyloxalate (80.0 g.) and 5-diethylaminopentanone-2 (38.0 g.) while stirring during ¾ hour. After the reaction mixture is stirred another hour, reflux for 30 minutes followed by cooling to 5° C. Acidify the reaction mixture with HCl gas and after separating from NaCl, evaporate to dryness (86.0 g.). Reflux the ester with 2N HCl (500 ml.) for 1 hour and evaporate the reaction mixture to approximately 100 ml. After neutralizing with $NaHCO_3$, extract the reaction mixture with $CHCl_3$ in a continuous extractor. Dry the original layer over $Na_2SO_4$ and remove the solvent. Dissolve the residue (21.1 g.) in water (500 ml.) and adjust the pH of the resulting solution to 7 by addition of 2N hydrochloric acid. Extract the solution with chloroform. Dry the organic layer, filter and remove the chloroform by distillation. Distill the product at 0.01 mm., m.p. 95° C.

$C_{11}H_{19}NO_2$ Calculated: C, 66.97%; H, 9.71%; N, 7.10%. Found: C, 66.76%; H, 10.35%; N, 6.91%.

This compound is useful as an intermediate for preparing the novel compositions of this invention having hormonal activity.

EXAMPLE 20

2-(6-m-methoxyphenyl-3-oxohexyl)-2-methylcyclohexane-1,3-dione

Reflux a mixture (9 g.) of 1 - diethylamino-6-m-methoxyphenylhexan-3-one and 6-m-methoxyphenylhex-1-en-3-one with 2-methylcyclohexane-1,3-dione (4 g.) in benzene (46 cc.) containing pyridine (3.5 cc.) for 15 hours. Wash and dry the cooled solution. Remove the solvent to obtain the triketone 2-(6-m-methoxyphenyl-3-oxohexyl)-2-methylcyclohexane-1,3-dione (8.2 g.); infrared absorption peaks at 5.88, 5.85, 5.83μ.

This compound is useful as an intermediate for preparing the novel compositions of this invention having hormonal activity.

EXAMPLE 21

2-(6-m-methoxyphenyl-3-oxohexyl)-2-methylcyclohexane-1,3-dione

To a mixture of 1-chloro-6-(m-methoxyphenyl)hexan-3-one (0.625 g.), 2 - methylcyclohexane-1,3-dione (0.47 g.) and tert-butyl alcohol (0.06 cc.) slowly add triethylamine (0.4 cc.). Heat the mixture at 60° C. for 10 minutes, cool and add ether, wash the solution with dilute sulphuric acid followed by ammonium sulphate solution and dry; evaporate to obtain the Michael adduct 2-(6-m-methoxyphenyl - 3 - oxohexyl) - 2 - methylcyclohexane-1,3-dione as a gum.

This compound is useful as an intermediate for preparing the novel compositions of this invention having hormonal activity.

EXAMPLE 22

2-(6-m-methoxyphenyl-3-oxohexyl)-2-methylcyclohexane-1,3-dione

Add to the crude undistilled ketoamine 1-diethylamino-6-(m-methoxyphenyl)hexan-3-one (2.3 g.), the material obtained by hydration of the acetylenic amine, 2-methylcyclohexane-1,3-dione (1 g.), pyridine (1 cc.) and benzene (12 cc.) and reflux the mixture for 15 hours. Cool the mixture and filter off unreacted dione, add a little ether to the filtrate, and wash the ethereal solution with acid, and then water, and dry. Evaporate the solvents to obtain as residue crude 2 - (6-m-methoxyphenyl-3-oxohexyl)-2-methylcyclohexane-1,3-dione (1.7 g.).

This compound is useful as an intermediate for preparing the novel compositions of this invention having hormonal activity.

EXAMPLE 23

2-(6-m-methoxyphenyl-3-oxohexyl)-2-methylcyclopentane-1,3-dione

Reflux a mixture (6 g.) of 1 - diethylamino-6-m-methoxyphenylhexan-3-one and 6-m-methoxyphenylhex-1-en-3-one with 2-methylcyclopentane-1,3-dione (2.8 g.) in 0.12% dry methanolic potassium hydroxide solution (20 cc.) for 12 hours. Remove most of the methanol under reduced pressure and add a mixture (50 cc.) of equal volumes of benzene and ether; wash the solution with water, alkali and hydrochloric acid, and dry. Evaporate the solvent to obtain the adduct, the triketone 2-(6-m-methoxyphenyl - 3 - oxohexyl) - 2 - methylcyclopentane-1,3-dione (6.7 g.), a viscous brown gum.

To prepare 2 - (6-m-methoxyphenyl-3-oxohexyl)-2-n-butylcyclopentane-1,3-dione, treat a mixture of 1-diethylamino-6-m-methoxyphenylhexan-3-one and 6-m-methoxyphenylhex-1-en-3-one with 2-butylcyclopentane-1,3-dione and dry methanolic potassium hydroxide solution according to the manipulative procedure described above.

To prepare 2 - (6-m-methoxyphenyl-3-oxohexyl)-2-hydroxypropylcyclopentane-1,3-dione, treat a mixture of 1-diethylamino-6-m-methoxyphenylhexan-3-one and 6-m-methoxyphenylhex-1-en-3-one with 2-hydroxypropylcyclopentane-1,3-dione and dry methanolic potassium hydroxide solution according to the manipulative procedure described above.

To prepare 2-(6-m-ethoxyphenyl-3-oxohexyl)-2-ethylcyclopentane-1,3-dione, treat a mixture of 1-diethylamino-6-m-ethoxyphenylhexan-3-one and 6-m-ethoxyphenylhex-1-en-3-one with 2 - ethylcyclopentane-1,3-dione and dry methanolic potassium hydroxide solution according to the manipulative procedure described above.

To prepare 2-(6-m-propoxyphenyl - 3 - oxohexyl)-2-phenethylcyclopentane-1,3-dione, treat a mixture of 1-diethylamino-6-m-propoxyphenylhexan - 3 - one and 6-m-propoxyphenylhex - 1 - en-3-one with 2-phenethylcyclopentane-1,3-dione and dry methanolic potassium hydroxide solution according to the manipulative procedure described above.

To prepare 2-(6-m-pentyloxyphenyl-3-oxohexyl)-2-isobutylcyclopentane-1,3-dione, treat a mixture of 1-diethylamino-6-m-pentyloxyphenylhexan-3-one and 6-m-pentyloxyphenylhex-1-en-3-one with 2-isobutylcyclopentane-1,3-dione and dry methanolic potassium hydroxide solution according to the manipulative procedure described above.

To prepare 2-(6-m-cyclopentyloxphenyl-3-oxohexyl)-2-hydroxypropylcyclopentane-1,3-dione, treat a mixture of 1-diethylamino-6-m-cyclopentyloxyphenylhexan-3-one and 6-m-cyclopentyloxyphenylhex-1-en-3-one with 2-hydroxypropylcyclopentane-1,3-dione and dry methanolic potassium hydroxide solution according to the manipulative procedure described above.

To prepare 2-(6-m-hydroxyphenyl - 3 - oxohexyl)-2-phenethylcyclopentane-1,3-dione, treat a mixture of 1-diethylamino-6-m-hydroxyphenylhexan-3-one and 6-m-hydroxyphenylhex - 1 - en-3-one with 2-phenethylcyclopentane-1,3-dione and dry methanolic potassium hydroxide solution according to the manipulative procedure described above.

To prepare 2-[6-(3,4-dimethoxyphenyl) - 3 - oxohexyl]-2-dimethylaminoethylcyclopentane-1,3-dione, treat a mixture of 1-diethylamino-6-(3,4-dimethoxyphenyl)hexan-3-one and 6-(3,4-dimethoxyphenyl)hex-1-en-3-one with 2-diethylaminoethylcyclopentane-1,3-dione and dry methanolic potassium hydroxide solution according to the manipulative procedure described above.

To prepare 2-[6-(3,5-dimethoxyphenyl)-3-oxoheptyl]-2-dimethylaminopropylcyclopentane - 1,3 - dione, treat a mixture of 1 - diethylamino - 6-(3,5 - dimethoxyphenyl) heptan-3-one and 6-(3,5 - dimethoxyphenyl)hept-1-en-3-one with 2 - dimethylaminopropylcyclopentane-1,3-dione and dry methanolic potassium hydroxide solution according to the manipulative procedure described above.

To prepare 2-[6-(3,5-diethoxyphenyl) - 3 - oxooctyl]-2-n-butylcyclopentane-1,3-dione, treat a mixture of 1-diethylamino-6-(3,5 - diethoxyphenyl)octan - 3 - one and 6-(3,5 - diethoxyphenyl)oct-1-en-3-one with 2-butylcyclopentane-1,3-dione and dry methanolic potassium hydroxide solution according to the manipulative procedure described above.

To prepare 2-[6-(3 - methoxy - 4 - ethoxyphenyl)-3-oxohexyl] - 2 - n - propylcyclopentane-1,3-dione, treat a mixture of 1-diethylamino-6-(3-methoxy-4-ethoxyphenyl) hexan-3-one and 6-(3-methoxy-4-ethoxyphenyl)hex-1-en-3-one with 2-propylcyclopentane-1,3-dione and dry methanolic potassium hydroxide solution according to the manipulative procedure described above.

To prepare 2 - (6-m-methoxyphenyl-3-oxohexyl)-2-n-propylcyclopentane-1,3-dione, treat a mixture of 1-diethylamino-6-m-methoxyphenylhexan - 3 - one and 6-m-methoxyphenylhex-1-en-3-one with 2-propylcyclopentane-1,3-dione and dry methanolic potassium hydroxide solution according to the manipulative procedure described above.

To prepare 2-(6-m-acetoxyphenyl - 3 - oxohexyl)-2-ethylcyclopentane-1,3-dione, treat a mixture of 1-diethylamino-6-m-acetoxyphenylhexan - 3 - one and 6-m-acetoxyphenylhex-1-en-3-one with 2-ethylcyclopentane-1,3-dione and dry methanolic potassium hydroxide solution according to the manipulative procedure described above.

To prepare 2-(6-m-hydroxyphenyl - 3 - oxohexyl)-2-ethylcyclopentane-1,3-dione, treat a mixture of 1-diethylamino-6-m-hydroxyphenylhexan-3-one and 6-m-hydroxyphenylhex-1-en-3-one with 2-ethylcyclopentane-1,3-dione and dry methanolic potassium hydroxide solution according to the manipulative procedure described above.

EXAMPLE 24

2-(6-m-methoxyphenyl-3-oxohexyl)-2-methylcyclopentane-1,3-dione

Add the crude methiodide of 1-diethylamino-6-m-methoxyphenylhexan-3-one (2.5 g.) in methanol (10 cc.) ice-cold to a solution obtained by adding 2-methylcyclopentane-1,3-dione (0.5 g.) to an ice-cold solution of sodium (0.21 g.) in methanol (10 cc.). Allow the reaction mixture to warm to room temperature and leave for 16 hours, after which add N hydrochloric acid (10 cc.) and saturated brine (100 cc.), and ether-extract the solution. Evaporate the washed and dried extracts to obtain the crude adduct 2-(6-m-methoxyphenyl-3-oxohexyl)-2-methylcyclopentane-1,3-dione as a gum.

This compound is useful as an intermediate for preparing the novel compositions of this invention having hormonal activity.

EXAMPLE 25

2-(6-m-methoxyphenyl-3-oxohexyl)-2-methylcyclopentane-1,3-dione

Reflux 6-m-methoxyphenylhex-1-en-3-one, containing a small amount of 1 - diethylamino-6-m-methoxyphenylhexan-3-one (6 g., the material produced by the slow distillation of the latter substance), with 2-methylcyclopentane-1,3-dione (3.5 g.) in 0.12% anhydrous methanol in potassium hydroxide (10 cc.) for 10 hours. Work up the reaction mixture as described for the preparation of the compound as titled above, to obtain the crude triketone 2-(6-m-methoxyphenyl-3-oxohexyl) - 2 - methylcyclopentane-1,3-dione (8 g.). Distill a small portion of this at 0.02 mm. for analysis.

$C_{19}H_{24}O_4$ calculated: C, 72.1%; H, 7.65%. Found: C, 72.3%; H, 7.45%.

This compound is useful as an intermediate for preparing the novel compositions of this invention having hormonal activity.

EXAMPLE 26

2-(6-m-methoxyphenyl-3-oxohexyl)-2-methylcyclopentane-1,3-dione

Add sodium (0.05 g.) to a 0.12% methanolic potassium hydroxide solution (15 cc.). To this solution add 1-bromo - 6 - (m-methoxyphenyl)hexan-3-one (0.9 g.) in methanol (5 cc.) and 2-methylcyclopentane-1,3-dione (0.4 g.), and reflux the mixture for 6 hours. After working up as in the preparation of the title compound in a previous example, obtain the crude Michael adduct 2-(6-m-methoxyphenyl - 3 - oxohexyl) - 2 - methylcyclopentane-1,3-dione as a yellow gum.

This compound is useful as an intermediate for preparing the novel compositions of this invention having hormonal activity.

EXAMPLE 27

2-(6-m-methoxyphenyl-3-oxohexyl)-2-ethylcyclohexane-1,3-dione

Reflux 2-ethylcyclohexane-1,3-dione (30.6 g.), pyridine (20 cc.), benzene (372 cc.) and a mixture of 1-diethylamino-6-m-methoxyphenylhexan-3-one and 6-m-methoxyphenylhex-1-en-3-one (40.3 g., produced by the distillation of the former substance) for 15 hours. Wash the cooled reaction mixture with water, 10% aqueous sulphuric acid, water, 10% aqueous sodium carbonate, water, and brine, and filter. Evaporate the solvent to leave as residue 2-(6-m-methoxyphenyl-3-oxohexyl) - 2 - ethylcyclohexane-1,3-dione, 38.1 g., 56.2%.

This compound is useful as an intermediate for the preparation of the novel compositions of this invention which have hormonal activity.

EXAMPLE 28

2-(6-m-methoxyphenyl-3-oxohexyl)-2-ethylcyclopentane-1,3-dione

Reflux a mixture (5.25 g.) of 1-diethylamino-6-m-methoxyphenylhexan-3-one and 6-m-methoxyphenylhex-1-en-3-one with 2-ethylcyclopentane-1,3-dione (3.3 g.) in dry 0.12% methanolic solution of potassium hydroxide for 18 hours. Filter the resulting solution, evaporate to dryness and dissolve the residue in ether. Wash the ether solution with alkali, hydrochloric acid, and water, dry and evaporate to obtain as residue the triketone 2-(6-m-methoxyphenyl - 3 - oxohexyl) - 2 - ethylcyclopentane-1,3-dione (7.1 g.) as a gum.

This compound is useful as an intermediate for the preparation of the novel compositions of this invention which have hormonal activity.

EXAMPLE 29

2-isopropyl-2-(6-m-methoxyphenyl-3-oxohexyl)cyclopentane-1,3-dione

Condense a mixture (6 g.) of 1-diethylamino-6-(m-methoxyphenyl-hexan-3-one and 6-(m-methoxyphenyl)-hex-1-en-3-one with 2-isopropylcyclopentane-1,3-dione (3 g.) using a procedure similar to that described for the condensation of the 2-ethyl compound. Obtain the corresponding triketone, 2-isopropyl-2-(6-m-methoxyphenyl-3-oxohexyl)cyclopentane-1,3-dione (7.2 g.) as an uncrystallizable gum.

This compound is useful as an intermediate for the preparation of the novel compositions of this invention which have hormonal activity.

EXAMPLE 30

2-(6-m-methoxyphenyl-3-oxohexyl)-2-isobutyl-1,3-cyclopentanedione

Reflux 6-m-methoxyphenylhex-1-en-3-one (126.9 g.) with 2-isobutyl-1,3-cyclopentanedione (108 g.) in 0.12% methanolic potassium hydroxide solution for 20 hours. After removing the solvent in vacuo, dissolve the residue in a mixture of benzene-ether (1:1, 600 cc.) and filter the solution. Wash the filtrate successively with sulfuric acid, sodium bicarbonate, and water, and dry. Evaporate the solvents to obtain 2 - (6-m-methoxyphenyl - 3 - oxohexyl)-2 - isobutyl - 1,3 - cyclopentanedione (154.9 g., 69.6%) as a gum.

This compound is useful as an intermediate for the preparation of the novel compositions of this invention which have hormonal activity.

EXAMPLE 31

2-cetyl-2-(6-m-methoxyphenyl-3-oxohexyl)-1,3-cyclopentanedione

Reflux a mixture of cetylcyclopentanedione (10.1 g.), m-methoxyphenylhex-1-en-3-one (6.0 g.) and 0.02% methanolic potassium hydroxide solution (120 cc.) for 26 hours and then cool. Dissolve the residue obtained after removal of solvent under reduced pressure in a mixture of benzene (50 cc.) and ether (50 cc.), and wash the solution in turn with sodium carbonate solution, 10% aqueous sulphuric acid and water. Remove the solvent by evaporation under reduced pressure to obtain as residue crude 2-cetyl-2-(6-m-methoxyphenyl-3-oxohexyl)-1,3-cyclopentanedione (11.4 g.).

This compound is useful as an intermediate for the preparation of the novel compositions of this invention which have hormonal activity.

EXAMPLE 32

2-(6-m-methoxyphenyl-3-oxoheptyl)-2-ethylcyclopentane-1,3-dione

Reflux a mixture of 6-(m-methoxyphenyl)hept-1-en-3-one and 1 - diethylamino-6-(m-methoxyphenyl)heptan-3-one (10 g., obtained by slow distillation of the latter substance) with 2-ethylcyclopentane-1,3-dione (7 g.) in 0.12% methanolic potassium hydroxide solution (40 cc.) for 15 hours. Remove most of the methanol under reduced pressure and add a mixture of equal volumes of ether and benzene (50 cc.). Wash the solution with 5% aqueous sodium hydroxide, water, 10% hydrochloric acid, and brine, and dry. Evaporate the solvent to leave as residue the triketone adduct 2-(6-m-methoxyphenyl-3-oxoheptyl)-2-ethylcyclopentane-1,3-dione (14 g.); infrared absorption peak at $5.80\mu$.

This compound is useful as an intermediate for the preparation of the novel compositions of this invention which have hormonal activity.

EXAMPLE 33

2-ethyl - 2-(6-m-methoxyphenyl-5-methyl-3-oxohexyl)cyclopentane-1,3-dione

Add a mixture of 1-diethylamino - 6 - (m-methoxyphenyl)-5-methylhexan-3-one and 5-methyl-6-(m-methoxyphenyl)hex-1-en-3-one (6 g., prepared by slow distillation of the former substance) to 2-ethylcyclopentane-1,3-dione (3.5 g.) in 0.12% methanolic potassium hydroxide (10 cc.) and heat the mixture under reflux for 16 hours. Remove most of the solvent under reduced pressure and add ether (25 cc.) and benzene (25 cc.) to the residue. Wash the solution with 5% aqueous sodium hydroxide, water, dilute hydrochloric acid, and brine, and dry. Evaporate the solvent to obtain a viscous brown gum, which is the triketone 2-ethyl-2 - (6-m-methoxyphenyl-5-methyl-3-oxohexyl)cyclopentane-1,3-dione.

This compound is useful as an intermediate for preparing the novel compositions of this invention having hormonal activity.

EXAMPLE 34

2-(6-phenyl-3-oxohexyl)-2-methylcyclohexane-1,3-dione

Reflux the mixture of 1-diethylamino-6-phenylhexan-3-one and 6-phenyl-hex-1-en-3-one (19 g.) with 2-methylcyclohexane-1,3-dione (8.4 g.) in benzene (97 cc.) containing pyridine (7.4 cc.) for 15 hours. Wash and dry the cooled solution. Remove the solvent to obtain the crude triketone 2-(6-phenyl-3-oxo-hexyl)-2-methylcyclohexane-1,3-dione.

This compound is useful as an intermediate for preparing the novel compositions of this invention having hormonal activity.

EXAMPLE 35

2-(6-phenyl-3-oxohexyl)-2-methylcyclopentane-1,3-dione

Reflux a mixture of crude 6-phenylhex-1-en-3-one (3.3 g., obtained by slow distillation of the ketoamine 1-diethylamino - 6 - phenylhexan-3-one), 2-methylcyclopentane-1,3-dione (1.5 g.), and 0.12% anhydrous methanolic potassium hydroxide (5.8 cc.) for 5 hours. Remove the solvent under reduced pressure and treat the residue with water. Extract with ether. Evaporate the washed and dried ether extracts, leaving the crude triketone 2-(6-phenyl-3-oxohexyl) - 2 - methylcyclopentane-1,3-dione (6 g.) as a reddish yellow gum; infrared absorption peaks at 2.86, 3.40, 5.81, $16.39\mu$, indicating the presence of some aldol form in equilibrium with triketone.

This compound is useful as an intermediate for preparing the novel compositions of this invention having hormonal activity.

EXAMPLE 36

2-(6-m-nitrophenyl-3-oxohexyl)-2-methylcyclopentane-1,3-dione 6-m-nitrophenylhex-1-en - 3 - one (1.0 g., containing a small amount of 1-diethylamino - 6 - m - nitrophenylhexan-3-one) in anhydrous 0.1% methanolic potassium hydroxide (10 cc.) with 2-methylcyclopentane-1,3-dione (1.5 g.) for 12 hours. Cool the solution, pour into water and ether-extract. Wash the extracts with sodium bicarbonate solution, dry and evaporate to obtain a gum (1.3 g.). Crystallize by adding ethanol, recrystallize from ethanol to obtain 2-(6-m-nitrophenyl - 3 - oxohexyl)-2-methylcyclopentane-1,3-dione, m.p. 81–3° C.; infrared absorption peaks at 5.70, 5.80, 5.83, 6.54, $7.33\mu$ (the first three peaks representing carbonyl groups and the others a nitro group).

This compound is useful as an intermediate for preparing the novel compositions of this invention having hormonal activity.

EXAMPLE 37

2-(6-m-aminophenyl-3-oxohexyl)-2-methylcyclopentane-1,3-dione

Hydrogenate 2 - (6-m-nitrophenyl - 3 - oxohexyl)-2-methylcyclopentane-1,3-dione (0.165 g.) in ethanol (30 cc.) at atmospheric pressure using 10% palladised charcoal (0.1 g.) as catalyst. Hydrogenation will cease when hydrogen (39 cc.) equivalent to 3.2 molecular equivalents have been adsorbed. Filter and evaporate to obtain as residue a gum, infrared absorption peaks at 2.88, 2.90, 5.83, 6.21, 12.74, $14.29\mu$, indicating the product to be 2-(6-m-aminophenyl - 3 - oxohexyl)-2-methylcyclopentane-1,3-dione, the corresponding triketone in which the nitro group has been reduced to a free amino group.

This compound is useful as an intermediate for preparing the novel compositions of this invention having hormonal activity.

EXAMPLE 38

2-(6-m-acetamidophenyl-3-oxohexyl)-2-methylcyclopentane-1,3-dione

Mix 2-(6-m-aminophenyl - 3 - oxohexyl) - 2 - methylcyclopentane - 1,3 - dione with acetic anhydride (0.25 cc.) and pyridine (3 cc.) and allow to stand overnight. Add ethanol to convert excess anhydride to ethyl acetate and remove all solvent under reduced pressure to obtain as a gum 2-(6-m-acetamidophenyl - 3 - oxohexyl)-2-methylcyclopentane - 1,3 - dione. Infrared absorption peaks at (liquid film) 2.98–3.03µ (bonded NH); 5.88µ (carbonyl in pentane ring); 5.87µ (acylic carbonyl), 5.95 and 6.43µ (two amide bands); 6.25, 12.74, and 14.29µ (disubstituted aromatic nucleus).

This compound is useful as an intermediate for preparing the novel compositions of this invention having hormonal activity.

EXAMPLE 39

2-(6-m-hydroxyphenyl-3-oxohexyl-2-methylcyclopentane-1,3-dione

Reflux 1-diethylamino - 6 - m - hydroxyphenylhexan-3-one (0.72 g.) with 2-methylcyclopentane-1,3-dione (0.70 g.) in 0.12% methanolic potassium hydroxide (5 cc.) for 18 hours. Remove the solvent under reduced pressure. Add chloroform (50 cc.) and wash the solution in turn with dilute sulphuric acid, saturated aqueous potassium bicarbonate, and brine, dry and evaporate the solvent. The product, an amber gum, is the adduct 2-(6-m-hydroxyphenyl - 3 - oxohexyl) - 2 - methylcyclopentane-1,3-dione. Infrared absorption peaks at 2.94, 5.71, 5.83 and 5.87µ. This compound is useful as an intermediate for preparing the novel compositions of this invention having hormonal activity.

EXAMPLE 40

2-(6-m-acetoxyphenyl-3-oxohexyl)-2-methylcyclopentane-1,3-dione

Reflux a mixture of 6-(m-acetoxyphenyl) - 1 - diethylaminohexan-3-one and 6 - (m-acetoxyphenyl)hex-1-en-3-one (1 g.), with 2-methylcyclopentane-1,3-dione (1.5 g.) in 0.12% methanolic potassium hydroxide (6 cc.) for 18 hours. Remove methanol (2 cc.) under reduced pressure and add chloroform (60 cc.). Wash the solution in turn with dilute sulphuric acid (25 cc.), saturated potassium bicarbonate solution, and brine; dry and evaporate the solvent. The product (0.8 g.) is the adduct 2-(6-m-acetoxyphenyl - 3 - oxohexyl) - 2 - methylcyclopentane-1,3-dione in admixture with some of the corresponding free phenol; infrared absorption: 2.86 to 3.08 (broad low-intensity band), 5.71, 5.81, 5.85, and 8.26µ.

This compound is useful as an intermediate for preparing the novel compositions of this invention having hormonal activity.

EXAMPLE 41

2-(6-m-hydroxyphenyl-3-oxohexyl)-2-n-propyl-cyclopentane-1,3-dione

Heat together 2-n-propylcyclopentane-1,3-dione (13 g.) 1-diethylamino - 6 - m - hydroxyphenylhexan - 3 - one and 0.12% methanolic potassium hydroxide solution (38 cc.) under gentle reflux for 12 hours. Isolate the product to obtain the Michael adduct, 2-(6-m-hydroxyphenyl-3-oxohexyl) - 2 - n - propylcyclopentane - 1,3 - dione as a brown gum (7.18 g.).

This compound is useful as an intermediate for preparing the novel compositions of this invention having hormonal activity.

EXAMPLE 42

2-[6-(3,4-dimethoxyphenyl)-3-oxohexyl]-2-ethylcyclopentane-1,3-dione

Reflux 6 - (3,4-dimethoxyphenyl)hex-1-en-3-one, containing a small amount of 6-(3,4-dimethoxyphenyl)-1-diethylaminohexan-3-one (6 g., produced by slow distillation of the latter substance) with 2-ethylcyclopentane-1,3-dione (3.5 g.) in 0.12% anhydrous methanolic potassium hydroxide (10 cc.) for 10 hours. Remove most of the methanol under reduced pressure, add benzene (25 cc.) and ether (25 cc.) and wash the solution with water, dilute aqueous potassium hydroxide, dilute hydrochloric acid and water. Dry and evaporate the solvent to give the triketone adduct 2-[6-(3,4-dimethoxyphenyl)-3-oxohexyl]- 2-ethylcyclopentane-1,3-dione; infrared absorption (gum) 5.80, 6.25µ (split peak).

This compound is useful as an intermediate for preparing the novel compositions of this invention having hormonal activity.

EXAMPLE 43

2-[6-3,5-dimethoxyphenyl)-3-oxohexyl]-2-ethylcyclopentane-1,3-dione

Reflux 6-(3,5-dimethoxyphenyl)hex-1-en-3-one, containing a small amount of 6-(3,5-dimethoxyphenyl)-1-diethylaminohexan-3-one (6 g., produced by slow distillation of the latter substance) with 2-ethylcyclopentane-1,3-dione (3.5 g.) in 0.12% anhydrous methanolic potassium hydroxide (10 cc.) for 10 hours. Work up the reaction mixture as for the preparation of 2-(6-m-acetoxyphenyl-3-oxohexyl)-2-methylcyclopentane-1,3-dione to obtain 2-[6-(3,4 - dimethoxyphenyl)-3-oxohexyl]-2-ethylcyclopentane-1,3-dione as a viscous gum; infrared absorption peaks at 5.80, 6.25µ (split peak).

This compound is useful as an intermediate for preparing the novel compositions of this invention having hormonal activity.

EXAMPLE 44

Diethyl 2-(6-$m$-methoxyphenyl-3-oxohexyl)-2-methyl-3-oxoadipate

Stir a mixture of diethyl 2-methyl-3-oxoadipate (2.3 g., b.p. 111–2° C./0.2 mm.), prepared from 2-methyl-acetoacetic ester and ethoxycarbonylpropionyl chloride by the method of Cardwell, J. Chem. Soc., 1949, 715, and the methiodide of 1-diethylamino-6-m-methoxyphenyl-hexan-3-one (4.6 g.) in benzene (20 cc.) in an ice bath and add a solution of potassium (0.4 g.) in ethanol (10 cc.) dropwise over 1 hour. After stirring for a further 4 hours add ether (50 cc.) and evaporate the washed and dried ether extracts. Heat the residue at 160° C. and 0.2 mm. pressure to remove unchanged starting materials. The residual gum is diethyl 2-(6-$m$-methoxyphenyl-3-oxohexyl)-2-methyl-3-oxoadipate (2.7 g.); infrared absorption peaks at 5.78, 5.88, 6.25, 12.82 14.49µ.

This compound is useful as an intermediate for preparing the novel compositions of this invention which have hormonal activity.

EXAMPLE 45

5-$m$-methoxyphenethyl-9-methyl-$\Delta^{5(10)}$-octalin-1,6-dione

Reflux 2-(6-m-methoxyphenyl-3-oxohexyl)-2-methylcyclohexane-1,3-dione (8.2 g.) in xylene for 24 hours with benzoic acid (3.5 g.) and triethylamine (2.9 cc.) using a Dean-Stark water trap. Dilute the cooled solution with ether, wash and dry. Distill the product to obtain the diketone 5-(m-methoxyphenethyl)-9-methyl-$\Delta^{5(10)}$-octalin-1,6-dione as a viscous oil (6.5 g.); ultraviolet absorption peak at 251 mµ (ε 10,000).

To prepare 5-$m$-methoxyphenethyl-9-ethyl$\Delta^{5(10)}{}_5$octalin-1,6 - dione treat 2 - (6-$m$-methoxyphenyl-3-oxohexyl)-2-methylcyclohexane-1,3-dione with benzoic acid and triethylamine according to the manipulative procedure described above.

To prepare 5,6,7,8-tetrahydro-4-$m$-methoxyphenethyl-8-isopropylindane-1,5-dione treat 2-(6-$m$-methoxyphenyl-3-oxohexyl)-2-isopropylcyclopentane-1, 3-dione with benzoic acid and triethylamine according to the manipulative procedure described above.

To prepare 5,6,7,8-tetrahydro-4-$m$-methoxyphenethyl-8-isobutylindane-1, 5-dione treat 2-(6-$m$-methoxyphenyl-3-oxohexyl)-2-isobutylcyclopentane-1, 3-dione with benzoic acid and triethylamine according to the manipulative procedure described above.

To prepare 5,6,7,8-tetrahydro-4-$m$-methoxyphenethyl-8-cetylindane-1, 5-dione treat 2-(6-$m$-methoxyphenyl-3-oxohexyl)-2-cetylcyclopentane-1,3-dione with benzoic acid and triethylamine according to the manipulative procedure described above.

To prepare 5,6,7,8-tetrahydro-4-*m*-methoxyphenylpropyl-8-methylindane-1, 5-dione treat 2-(7-*m*-methoxyphenyl-3-oxoheptyl) - 2 - methylcyclopentane-1,3-dione with benzoic acid and triethylamine according to the manipulative procedure described above.

To prepare 5,6,7,8-tetrahydro-4-(α-methyl-*m*-methoxyphenethyl)-8-methylindane-1,5-dione treat 2 - (6-*m*-methoxyphenyl-3-oxo-5-methylhexyl) - 2 - methylcyclopentane-1,3-dione with benzoic acid and triethylamine according to the manipulative procedure described above.

To prepare 5,6,7,8-tetrahydro-4-*m*-hydroxyphenethyl-8-methylindane-1, 5-dione treat 2-(6-*m*-hydroxyphenyl-3-oxohexyl)-2-methylcyclopentane-1,3-dione with benzoic acid and triethylamine according to the manipulative procedure described above.

To prepare 5,6,7,8-tetrahydro-4-*m*-hydroxyphenethyl-8-n-propylindane-1, 5-dione treat 2-(6-*m*-hydroxyphenyl-3-oxohexyl)-2-propylcyclopentane-1,3-dione with benzoic acid and triethylamine according to the manipulative procedure described above.

To prepare 5,6,7,8-tetrahydro-4-(3,4-dimethoxyphenethyl-8-ethylindane-1,5-dione treat 2[6-(3,4-dimethoxyphenyl)-3-oxohexyl]-2-ethylcyclopentane-1,3 - dione with benzoic acid and triethylamine according to the manipulative procedure described above.

To prepare 5,6,7,8-tetrahydro-4-*m*-methoxyphenethyl-8-hydroxypropylindane-1,5-dione treat 2-(6-*m*-methoxyphenyl-3-oxohexyl)-2 - hydroxypropylcyclopentane - 1,3-dione with benzoic acid and triethylamine according to the manipulative procedure described above.

To prepare 5,6,7,8-tetrahydro-4-*m*-ethoxyphenethyl-8-ethylindane-1,5-dione treat 2-(6-*m*-ethoxyphenyl-3-oxohexyl)-2-ethylcyclopentane-1,3-dione with benzoic acid and triethylamine according to the manipulative procedure described above.

To prepare 5,6,7,8-tetrahydro-4-*m*-n-propoxyphenethyl-8-phenethylindane-1,5-dione treat 2-(6-*m*-propoxyphenly-3-oxohexy)-2-phenethylcyclopentane-1, 3-dione with benzoic acid and triethylamine according to the manipulative procedure described above.

To prepare 5,6,7,8-tetrahydro-4-m-pentyloxyphenethyl)-8-isobutylindane-1,5-dione treat 2-(6-*m*-pentyloxyphenyl-3-oxohexyl)-2-isobutylcyclopentane-1,3-dione with benzoic acid and triethylamine according to the manipulative procedure described above.

To prepare 5,6,7,8-tetrahydro-4-*m*-cyclopentyloxyphenethyl-8-hydroxypropylindane-1,5-dione treat 2-(6-*m*-cyclopentyloxyphenyl-3-oxohexyl) - 2 - hydroxypropylcyclopentane-1,3-dione with benzoic acid and triethylamine according to the manipulative procedure described above.

To prepare 5,6,7,8-tetrahydro-4-*m*-hydroxyphenethyl-8-phenethylindane-1,5-dione treat 2-(6-*m*-hydroxyphenyl-3-oxohexyl)-2-phenethylcyclopentane-1,3-dione with benzoic acid and triethylamine according to the manipulative procedure described above.

To prepare 5,6,7,8-tetrahydro-4(3,4-dimethoxyphenethyl)-8-diethylamino ethylindane-1,5-dione treat 2-[6-(3, 4-dimethoxyphenyl)-3-oxohexyl]-2 - diethylaminoethylcyclopentane-1,3-dione with benzoic acid and triethylamine according to the manipulative procedure described above.

To prepare 5,6,7,8-tetrahydro-4[2-(3,5-dimethoxyphenyl)propyl]-8-dimethylaminoethylindane-1,5-dione treat 2-[6-(3,5-dimethoxyphenyl)-3 - oxoheptyl] - 2 - dimethylaminoethylcyclopentane-1,3-dione with benzoic acid and triethylamine according to the manipulative procedure described above.

To prepare 5,6,7,8-tetrahydro-4-[2,-(3,5-diethoxyphenyl)butyl]-8-n-butylindane-1,5-dione treat 2-[6-(3,5-diethoxyphenyl)-3-oxoctyl]-2-butylcyclopentane - 1,3 - dione with benzoic acid and triethylamine according to the manipulative procedure described above.

To prepare 5,6,7,8-tetrahydro-4-(3-methoxy-4-ethoxyphenethyl)-8-n-propylindane-1,5-dione treat 2[6-(3-methoxy - 4 - ethoxyphenyl) - 3 - oxohexyl] - 2 - propylcyclopentane-1,3-dione with benzoic acid and triethylamine according to the manipulative procedure described above.

To prepare 5,6,7,8-tetrahydro-4-*m*-acetoxyphenethyl-8-ethylindane-1,5-dione treat 2-(6-*m*-acetoxyphenyl-3-oxohexyl)-2-ethylcyclopentane-1,3-dione with benzoic acid and triethylamine according to the manipulative procedure described above.

These compounds are useful as intermediates for preparing the novel compositions of this invention which have hormonal activity.

EXAMPLE 46

5,6,7,8-tetrahydro-4-(*m*-methoxyphenethyl)-8-methylindane-1,5-dione

To 2-(6-*m*-methoxyphenyl-3-oxohexyl)-2-methylcyclopentane-1,3-dione (16.5 g.) in xylene (20 cc.) add benzoic acid (7.1 g.) and triethylamine (5.9 cc.). Reflux the mixture for 6 days using a Dean-Stark water trap, then cool. Add ether and wash the solution, then dry and evaporate. Take up the resulting gum in a mixture of light petroleum and benzene and chromatograph on neutral alumina. Elute with a benzene-ether mixture to obtain the ethylenic diketone 5,6,7,8-tetrahydro-4-(*m*-methoxyphenethyl)-8-methylindane-1,5-dione (12.5 g., 59%); ultraviolet absorption peak at 248 mμ (ε 8,500).

This compound is useful as an intermediate for preparing the novel compositions of this invention which have hormonal activity.

EXAMPLE 47

5,6,7,8-tetrahydro-4-(*m*-methoxyphenethyl)-8-methylindane-1,5-dione

Treat 2-(6-*m*-methoxyphenyl-3-oxohexyl)-2-methylcyclopentane-1,3-dione (0.74 g.) as in the previous example but using xylene (20 cc.) and aluminum *tert* butoxide (0.50 g.). Work up the product with ether and chromatograph as before. Elute the column with ether containing a small proportion of benzene to obtain the ethylenic diketone (0.11 g., 15%). Infrared absorption peaks at 5.75 and 6.02μ; elute further with ether containing methanol to obtain the aldol (0.05 g., 7%); infrared absorption peaks at 2.94, 5.75, 5.85, 6.25μ.

This compound is useful as an intermediate for preparing the novel compositions of this invention which have hormonal activity.

EXAMPLE 48

5,6,7-8-tetrahydro-4-(m-methoxyphenethyl)-8-methylindane-1,5-dione

Add 5,6,7,8-tetrahydro-8-methylidane-1,5-dione (5.5 g.) (Panouse and Sannie, *Bull. Soc. Chim. France, 1955*, 1036; Boyce and Whitehurst, J. Chem. Soc., 1959, 2022) in benzene (30 cc.) with vigorous stirring to potassium *tert*-butoxide (from the metal, 1.45 g.) in benzene (150 cc.) under dry nitrogen. Remove the benzene-*tert*-butanol azetrope using a Fenske fractionating column with variable take-off head. Cool the residual benzene solution of the potassium enolate to room temperature and add m-methoxyphenethyl bromide (8 g.) (Collins and Smith, *J. Chem. Soc., 1956*, 4308) in benzene (50 cc.) dropwise over 15 minutes, after which stir the mixture for 1 hour, then reflux for a further hour. Work up the product with ether and evaporate the ether extract to obtain a gum. Distill to yield fraction A (5 g.), b.p. 60–150°/0.05 mm. and fraction B (2.1 g.), b.p. 160–90°/0.05 mm. Fraction B is the diketone 5,6,7,8-tetrahydro-4-(m-methoxyphenethyl)-8-methylindane-1,5-dione, a viscous oil containing some impurity; ultraviolet absorption peak at 245 mμ (ε 8,300); infrared absorption peaks at 5.75, 6.02, 6.23, 6.29, 12.82, 14.33μ.

This compound is useful as an intermediate for preparing the novel compositions of this invention which have hormonal activity.

EXAMPLE 49

8-ethyl-5,6,7,8-tetrahydro-4-(m-methoxyphenethyl)-indane-1,5-dione

Reflux 2-ethyl-2(6-m-methoxyphenyl - 3 - oxohexyl) cyclopentane-1,3-dione (15 g.) in xylene (120 cc.) with benzoic acid (7.1 g.) and triethylamine (5.9 cc.) using a Dean-Stark water separator for 14 days. Add ether and wash the cooled solution free from benzoic acid with sodium carbonate solution. Dry the solution and evaporate to a brown gum. Distill at 220° (0.01 mm. Hg) to obtain 8-ethyl-5,6,7,8-tetrahydro-4 - (m - methoxyphenethyl)-indane-1,5-dione as a yellow gum; ultraviolet absorption peak at 247 m$\mu$ ($\epsilon$ 8,400); infrared absorption peak at 5.76 and 6.03$\mu$.

This compound is useful as an intermediate for preparing the novel compositions of this invention which have hormonal activity.

EXAMPLE 50

9-methyl-5-phenylethyl-$\Delta^{5(10)}$-octalin-1,6-dione

Reflux the crude triketone 2-(6-phenyl-3-oxohexyl)-2-methylcyclohexane-1,3-dione (28 g.) for 24 hours in xylene (162 cc.) with a mixture of triethylamine (9.9 cc.) and benzoic acid (11.95 g.) using a Dean-Stark water separator. Dilute the cooled solution with ether, wash and dry. Distill the product to obtain the diketone 9-methyl-5-phenethyl-$\Delta^{5(10)}$-octalin-1,6-dione as a viscous oil (15 g.), b.p. 184°/0.05 mm.; ultraviolet absorption peaks at 253 m$\mu$ ($\epsilon$ 9,500).

This compound is useful as an intermediate for preparing the novel compositions of this invention which have hormonal activity.

EXAMPLE 51

Dissolve the Michael adduct 2-(6-phenyl-3-oxohexyl)-2-methylcyclopentane-1,3-dione (3.8 g.), benzoic acid 1.9 g.) and triethylamine (1.6 cc.) in xylene (30 cc.) and reflux for 27 hours using a Dean-Stark water trap. Dilute the cooled solution with ether, wash with water, followed by acid, and dry. Evaporate the ether to obtain as residue a gum which is taken up in light petroleum (10 cc.) and chromatograph the solution on neutral alumina. Recover three fractions; vinyl ketone from the reversal of the Michael condensation, to be eluted with light petroleum; a second fraction to be eluted with a mixture of light petroleum and benzene; and a third fraction to be eluted with benzene. The second fraction is the desired ethylenic diketone, 5,6,7,8-tetrahydro-4 - phenethyl - 8 - methylindane-1,5-dione, a viscous oil (1.2 g., 32%); ultraviolet absorption peak at 248 m$\mu$ ($\epsilon$ 9,650); infrared absorption peaks at 5.75, 13.46$\mu$.

This compound is used as an intermediate for preparing the novel compositions of this invention which have hormonal activity.

EXAMPLE 52

5,6,7,8-tetrahydro-4-phenethyl-8-methylindane-1,5-dione

Reflux 2-(6-phenyl-3-oxohexyl)-2-methylcyclopentane-1,3-dione (5.0 g.) in benzene (20 cc.) and toluene-$p$-sulphonic acid (0.16 g.) using a Dean-Stark water separator. After 2 hours add a second quantity of the acid (0.16 g.) and continue the refluxing until the theoretical amount of water for a single dehydration has been collected. Dilute the cooled reaction mixture with ether and wash and dry the solution. Remove the solvent by evaporation to obtain a gum which one then distills to obtain 5,6,7,8-tetrahydro-4-phenethyl-8-methylindane-1,5 - dione, b.p. 145–50° C./0.5 mm., as a pale yellow gum (5 g., 87%); ultraviolet absorption peak at 249 m$\mu$ ($\epsilon$ 9,000). Infrared absorption peaks at 5.75 and 6.02$\mu$.

The compound is useful as an intermediate for preparing the novel compositions of this invention which have hormonal activity.

EXAMPLE 53

8-methyl-4-m-nitrophenethyl-5,6,7,8-tetrahydroindane-1,5-dione

Reflux 2-methyl-2-(6-$m$-nitrophenyl-3-oxohexyl)cyclopentane-1,3-dione (1 g.) with toluene-$p$-sulphonic acid (0.1 g.) in dry benzene (35 cc.) for 4 hours, using a Dean-Stark water separator. Cool the mixture and dilute with a little ether; wash and dry. Evaporate the solvent to obtain as residue a gum (0.82 g.) which readily crystallizes; recrystallize from ethanol to obtain the ethylenic diketone 8-methyl-4-$m$-nitrophenethyl)-5,6,7,8 - tetrahydroindane-1,5-dione, m.p. 101–0°; infrared absorption peaks at 5.75, 6.02, 6.54, 7.35$\mu$; ultraviolet absorption peak (in ethanol) at 252 m$\mu$ ($\epsilon$ 18,000).

This compound is useful as an intermediate for preparing the novel compositions of this invention which have hormonal activity.

EXAMPLE 54

4-$m$-aminophenethyl-8-methyl-5,6,7,8-tetrahydro-indane-1,5-dione

Hydrogenate the crude nitro ethylenic diketone product of the previous example (0.155 g.) in ethanol (30 cc.) at atmospheric pressure using 10% palladized charcoal (0.09 g.) as catalyst. Hydrogen uptake will cease when the equivalent of 3 molecules of hydrogen (43 cc.) has been absorbed. Filter and evaporate to obtain as residue the amino ethylenic diketone 4-($m$-aminophenethyl)-8-(methyl-5,6,7,8-tetrahydroindane-1,5-dione as a gum; infrared absorption peaks at 2.87 and 2.95$\mu$ (primary amino group); 5.78$\mu$ (carbonyl in pentane ring); 6.05$\mu$ ($\alpha,\beta$-unsaturated carbonyl).

This compound is useful as an intermediate for preparing the novel compositions of this invention which have hormonal activity.

EXAMPLE 55

4-$m$-acetamidophenethyl)-8-methyl-5,6,7,8-tetra-hydroindane-1,5-dione

Mix the amino ethylenic diketone product of the previous example (0.1 g.) with acetic anhydride (0.25 cc.) and pyridine (3 cc.) and allow to stand for 15 hours. Add ethanol to decompose excess anhydride, and remove the total solvents under reduced pressure to obtain as residue a gum which is 4-$m$-acetamidophenethyl-8-methyl-5,6,7,8-tetrahydroindane-1,5-dione by its infrared absorption (liquid film); infrared absorption peaks at 2.99–3.00$\mu$ (bonded NH); 5.78$\mu$ (carbonyl in pentane ring); 6.02–6.06$\mu$ ($\alpha,\beta$-unsaturated carbonyl and first amide band); and 6.45$\mu$ (second amide band).

This compound is useful as an intermediate for preparing the novel compositions of this invention which have hormonal activity.

EXAMPLE 56

4-$m$-hydroxyphenethyl-8-ethyl-5,6,7,8-tetrahydro-indane-1,5-dione

Reflux the triketone 2-(6-$m$-hydroxyphenyl-3-oxohexyl)-2-ethylcyclopentane-1,3-dione (5 g.) in xylene (40 cc.) with benzoic acid (1.4 g.) and triethylamine (1.2 cc.) for 10 days with continuous water separation. Dilute the cooled solution with ether and wash free from benzoic acid with saturated aqueous potassium bicarbonate, then with water and dry. Evaporate the solvent and take up the residual gum in benzene and chromatograph on silica gel (150 g.). Elute with benzene-ether to obtain 4-$m$-hydroxyphenethyl-8-ethyl - 5,6,7,8 - tetrahydroindane-1,5-dione as gum; ultraviolet absorption peak at 250 m$\mu$ ($\epsilon$ 9,000); infrared absorption peaks at 5.75 and 6.02$\mu$.

The compound is useful as an intermediate for preparing the novel compositions of this invention which have hormonal activity.

EXAMPLE 57

5-m-methoxyphenethyl-9-methyl-6-oxo-$\Delta^{5(10)}$-octalin-1-ol

Add sodium borohydride (0.55 g.) in ethanol (80 cc.) to 5-m-methoxyphenethyl - 9 - methyl-$\Delta^{5(10)}$-octalin-1,6-dione (3 g.) in ethanol (80 cc.) at 8° C. After 12 minutes add an excess of acetic acid and evaporate the solution to dryness under reduced pressure. Add water (75 cc.) and extract the product with ether. Wash, dry and evaporate the ethereal solution.

Recrystallize the product from ether to obtain the keto alcohol, 5-m-methoxyphenethyl - 9-methyl-6-oxo-$\Delta^{5(10)}$-octalin-1-ol (2.0 g., 66%), m.p. 96–97° C.

$C_{20}H_{26}O_3$ calculated: C, 76.4%; H, 8.35%. Found: C, 76.2%; H, 8.2%.

This compound is useful as an intermediate for preparing the novel compositions of this invention which have hormonal activity.

EXAMPLE 58

5,6,7,8-tetrahydro-4-m-methoxyphenethyl-8-methyl-5-oxoindane-1-ol

To the ethylenic diketone, 5,6,7,8-tetrahydro-4-m-methoxyphenethyl-8-methylindane-1,5-dione (12.35 g.) in ethanol (500 cc.) at 0° C. add sodium borohydride (1 g.) in ethanol (50 cc.) over 20 minutes. Allow the mixture to warm to room temperature and then stir for 12 minutes. Add a slight excess of acetic acid and evaporate the solvent under reduced pressure. Treat the residue with water (60 cc.) and ether extract. Wash, dry and evaporate the extracts to obtain a glassy residue which crystallizes on cooling and scratching. Recrystallize the ethylenic keto alcohol, 5,6,7,8-tetrahydro - 4-m - methoxyphenethyl-8-methyl-5-oxoindane-1-ol (9.4 g.) from a mixture of light petroleum and diisopropyl ether, m.p. 88–90° C.; infrared absorption peaks at 2.95 and 6.02$\mu$.

$C_{19}H_{24}O_3$ calculated: C, 76.0%; H, 8.05%. Found: C, 75.7%; H, 8.0%.

To prepare 4-m-methoxyphenethyl-8-isopropyl-5-oxo-5,6,7, 8-tetrahydroindane-1-ol treat 4-m-methoxyphenethyl-8-isopropyl-5,6,7,8-tetrahydroindane-1,5-dione with sodium borohydride according to the manipulative procedure described above.

To perpare 4-m-methoxyphenethyl-8-cetyl-5-oxo-5,6,7, 8-tetrahydroindane-1-ol treat 4-m-methoxyphenethyl-8-cetyl-5,6,7,8-tetrahydroindane-1,5-dione with sodium borohydride according to the manipulative procedure described above.

To prepare 4-(2-m-methoxyphenylpropyl)-8-methyl-5-oxo-5,6,7,8-tetrahydroindane-1-ol treat 4-(2-m-methoxyphenylpropyl) - 8-methyl-5,6,7,8 - tetrahydroindane-1,5-dione with sodium borohydride according to the manipulative procedure described above.

To prepare 4-m-hydroxyphenethyl-8-methyl-5-oxo-5,6,7,8-tetrahydroindane-1-ol treat 4-m-hydroxyphenethyl-8-methyl-5,6,7,8 - tetrahydroindane-1,5-dione with sodium borohydride according to the manipulative procedure described above.

To prepare 4-(3,4-dimethoxyphenethyl)-8-ethyl-5-oxo-5,6,7,8-tetrahydroindane-1-ol treat 4-(3,4-dimethoxyphenethyl)-8-ethyl-5,6,7,8 - tetrahydroindane-1,5-dione with sodium borohydride according to the manipulative procedure described above.

To prepare 4-m-ethoxyphenethyl-8-ethyl-5-oxo-5,6,7,8-tetrahydroindane-1-ol treat 4-m-ethoxyphenethyl - 8-ethyl-5,6,7,8-tetrahydroindane-1,5-dione with sodium borohydride according to the manipulative procedure described above.

To prepare 4-m-n-pentyloxyphenethyl - 8 - isobutyl-5-oxo-5,6,7,8-tetrahydroindane-1-ol treat 4-m-n-pentyloxyphenethyl-8-isobutyl-5,6,7,8-tetrahydroindane - 1,5 - dione with sodium borohydride according to the manipulative procedure described above.

To prepare 4-(3,5-dimethoxyphenethyl)-8-dimethylaminopropyl-5-oxo-5,6,7,8-tetrahydroindane-1-ol treat 4-(3,5-dimethoxyphenethyl) - 8 - dimethylaminopropyl-5,6,7,8-tetrahydroindane-1,5-dione with sodium borohydride according to the manipulative procedure described above.

To prepare 4-n-methoxyphenethyl-8-isopropyl-5-oxo-hexahydroindane-1-ol treat 4-m-methoxyphenethyl-8-isopropylhexahydroindane-1,5-dione with sodium borohydride according to the manipulative procedures described above.

To prepare 4-m-methoxyphenethyl-8-cetyl-5-oxo-hexahydroindane-1-ol treat 4-m-methoxyphenethyl-8-cetylhexahydroindane-1,5-dione with sodium borohydride according to the manipulative procedure described above.

To prepare 4-(2-m-methoxyphenylpropyl) - 8 - methyl-5-oxohexahydroindane-1-ol treat 4-(2-m-methoxyphenylpropyl)-8-methylhexahydroindane-1,5-dione with sodium borohydride according to the manipulative procedure described above.

To prepare 4-m-hydroxyphenethyl-8-methyl-5-oxohexahydroindane-1-ol treat 4-m-hydroxyphenethyl-8-methylhexahydroindane-1,5-dione with sodium borohydride according to the manipulative procedure described above.

To prepare 4(3,4-dimethoxyphenethyl)-8-ethyl-5-oxo-hexahydroindane-1-ol treat 4-(3,4-dimethoxyphenethyl)-8-ethylhexahydroindane-1,5-dione with sodium borohydride according to the manipulative procedure described above.

To prepare 4-m-ethoxyphenethyl-8-ethyl-5-oxohexahydroindane - 1 - ol treat 4-m-ethoxyphenethyl-8-ethylhexahydroindane-1,5-dione with sodium borohydride according to the manipulative procedure described above.

To prepare 4-pentyloxyphenethyl - 8 - isobutyl-5-oxo hexahydroindane-1-ol treat 4-m-pentyloxyphenethyl-8-isobutylhexahydroindane-1,5-dione with sodium borohydride according to the manipulative procedure described above.

To prepare 4-(3,5-dimethoxyphenethyl)-8-dimethylaminopropyl - 5 - oxohexahydroindane-1-ol treat 4-(3,5-dimethoxyphenethyl) - 8 - dimethylaminopropylhexahydroindane-1,5-dione with sodium borohydride according to the manipulative procedure described above.

These compounds are useful as intermediates for preparing the novel compositions of this invention which have hormonal activity.

EXAMPLE 59

4-m-methoxyphenethyl-8-methyl-5,6,7,8-tetrahydro-1-methoxyindan-5-one

Treat 4-m-methoxyphenethyl - 8 - methyl-5-oxo-5,6,7,8-tetrahydroindan-1-ol (1 g.) in methylene chloride (50 cc.) containing 1 drop of boron trifluoride etherate with a solution of diazomethane (from N-nitrosomethylurea 2 g.) in methylene chloride (40 cc.). Stir the mixture for 5 minutes and then decompose the excess diazomethane by the addition of acetic acid. Wash, dry and evaporate the solution and chromatograph the residue on alumina (30 g.) to obtain 4-m-methoxyphenethyl-8-methyl - 1 - methoxy-5,6,7,8-tetrahydroindan-5-one; ultraviolet absorption peak at 249 m$\mu$ ($\epsilon$ 9,500).

This compound is useful as an intermediate for preparing the novel compositions of this invention which have hormonal activity.

EXAMPLE 60

1,1-ethylenedioxy-4-methoxyphenethyl-8-methyl-5,6,7,8-tetrahydroindan-5-one

Reflux the diketone 4-m-methoxyphenethyl-8-methyl-5,6,7,8-tetrahydroindan-1,5-dione (1.15 g.) in benzene (26 cc.) and ethylene glycol (0.25 cc.) and toluene-p-sulphonic acid (0.11 g.) using a Dean-Stark trap to remove water and remove the solvent from the cooled reaction mixture to give a pale yellow gum (1 g.). Dissolve in light petroleum and chromatograph the solution on neutral alumina. Carry out the elution first with mixtures of petroleum and benzene and subsequently with benzene: this latter solvent elutes the required ketal 1,1-ethylenedioxy-4-*m*-methoxyphenethyl - 8 - methyl-5,6,7,8-tetrahydroindan-5-one (0.6 g.); infrared absorption peaks at 6.02, 6.25, 12.82 and 14.29μ.

This compound is useful as an intermediate for preparing the novel compositions of this invention which have hormonal activity.

To prepare 1,1-ethylenedioxy-4-*m*-methoxyphenethyl-8-isobutyl-5,6,7,8-tetrahydroindan - 5 - one treat 4-*m*-methoxyphenethyl-8-isobutyl-5,6,7,8-tetrahydroindane - 1,5-dione with ethylene glycol and toluene-*p*-sulphonic acid according to the manipulative procedure described above.

To prepare 1,1-ethylenedioxy-4-(α-methyl-*m*-methoxyphenethyl)-8-methyl - 5,6,7,8 - tetrahydroindan-5-one treat 4-(α-methyl - *m* - methoxyphenethyl)-8-methyl-5,6,7,8-tetrahydroindane-1,5-dione with ethylene glycol and toluene-*p*-sulphonic acid according to the manipulative procedure described above.

To prepare 1,1 - ethylenedioxy-4-*m*-nitrophenethyl-8-methyl - 5,6,7,8 - tetrahydroindan-5-one treat 4-*m*-nitrophenethyl-8-methyl-5,6,7,8-tetrahydroindane - 1,5 - dione with ethylene glycol and toluene *p*-sulphonic acid according to the manipulative procedure described above.

To prepare 1,1-ethylenedioxy-4-*m*-hydroxyphenethyl-8-propyl- 5,6,7,8 - tetrahydroindan-5-one treat 4-*m*-hydroxyphenethyl-8-propyl - 5,6,7,8 - tetrahydroindane-1,5-dione with ethylene glycol and toluene-*p*-sulphonic acid according to the manipulative procedure described above.

To prepare 1,1 - ethylenedioxy - 4 - (3,5 - dimethoxyphenethyl) - 8 - ethyl - 5,6,7,8 - tetrahydroindan-5-one treat 4-(3,5-dimethoxyphenethyl) - 8 - ethyl-5,6,7,8-tetrahydroindane - 1,5 - dione with ethylene glycol and toluene-*p*-sulphonic acid according to the manipulative procedure described above.

To prepare 1,1-ethylenedioxy-4-*m*-propoxyphenethyl-8-phenethyl - 5,6,7,8 - tetrahydroindan-5-one treat 4-*m*-propoxyphenethyl-8-phenethyl-5,6,7,8-tetrahydroindane - 1,5-dione with ethylene glycol and toluene-*p*-sulphonic acid according to the manipulative procedure described above.

To prepare 1,1-ethylenedioxy-4-*m*-cyclopentyloxyphenethyl - 8 - hydroxypropyl - 5,6,7,8 - tetrahydroindan-5-one treat 4-m-cyclopentyloxyphenethyl - 8 - hydroxypropyl-5,6,7,8-tetrahydroindane - 1,5 - dione with ethylene glycol and toluene - *p* - sulphonic acid according to the manipulative procedure described above.

These compounds are useful as intermediates for preparing the novel compositions of this invention which have hormonal activity.

EXAMPLE 61

1-acetoxy-4-*m*-methoxyphenethyl-8-methyl-5,6,7,8-tetrahydroindane

To 4-*m*-methoxyphenethyl - 8 - methyl-5,6,7,8-tetrahydroindan-1-ol (0.45 g.) in pyridine (2 cc.) at 0° add acetic anhydride (2 cc.), and allow the mixture to stand at room temperature for 18 hours. Add water and isolate the product by means of ether. Dissolve in benzene and filter the solution through alumina; evaporate the solvent to obtain the acetate as a gum; infrared absorption peaks at 6.02 and 5.75μ; ultraviolet absorption peaks at 248 mμ (ε 10,-500).

This compound is useful as an intermediate for preparing the novel compositions of this invention which have hormonal activity.

EXAMPLE 62

1-benzoyloxy - 4 - *m* - methoxyphenethyl-8-methyl-5,6,7,8-tetrahydroindane

To 4-*m*-methoxyphenethyl - 8 - methyl-5,6,7,8-tetrahydroindan-1-ol (0.34 g.) in pyridine (5 cc.) at 0° add benzoyl chloride (0.5 cc.) and allow the mixture to stand at room temperature for 18 hours. After decomposition of excess benzoyl chloride with water, isolate the product by means of ether, dissolve in benzene and filter the solution through alumina; evaporate the solvent to obtain the solid benzoate (0.22 g.) which is recrystallized from methanol, m.p. 116–8°; infrared absorption peaks at 6.02 and 5.85μ; ultraviolet absorption peaks at 229 mμ (ε 23,000).

To prepare 1-acetoxy-4-*m*-methoxyphenethyl - 8 - isopropyl - 5 - oxo - 5,6,7,8 - tetrahydroindane treat 4-*m*-methoxyphenethyl-8-isopropyl - 5 - oxo-5,6,7,8-tetrahydroindan-1-ol with acetic anhydride according to the manipulative procedure described above.

To prepare 1-acetoxy-4-*m*-methoxyphenethyl-8-cetyl-5-oxo-5,6,7,8-tetrahydroindane treat 4-*m*-methoxyphenethyl-8-cetyl-5-oxo-5,6,7,8-tetrahydroindan-1-ol with acetic anhydride according to the manipulative procedure described above.

To prepare 1-acetoxy - 4 - (2-*m*-methoxyphenylpropyl)-8-methyl-5-oxo - 5,6,7,8 - tetrahydroindane treat 4-(2-*m*-methoxyphenylpropyl) - 8 - methyl - 5 - oxo - 5,6,7,8-tetrahydroindan-1-ol with acetic anhydride according to the manipulative procedure described above.

To prepare 1-propionoxy - 4 - *m* - hydroxyphenethyl-8-methyl-5-oxo-5,6,7,8-tetrahydroindane treat 4-*m*-hydroxyphenethyl - 8 - methyl-5-oxo 5,6,7,8-tetrahydroindan-1-ol with propionic anhydride according to the manipulative procedure described above.

To prepare 1-propionoxy - 4-(3,4-dimethoxyphenethyl)-8-ethyl-5-oxo-5,6,7,8-tetrahydroindane treat 4-(3,4-dimethoxyphenethyl) - 8 - ethyl - 5 - oxo - 5,6,7,8 - tetrahydroindan - 1 - ol with propionic anhydride according to the manipulative procedures described above.

To prepare 1-benzoyloxy - 4 - *m* - pentyloxyphenethyl-8-isobutyl - 5 - oxo - 5,6,7,8 - tetrahydroindane treat 4-*m*-pentyloxyphenethyl - 8 - isobutyl - 5 - oxo - 5,6,7,8 - tetrahydroindan-1-ol with benzoyl chloride according to the manipulative procedure described above.

To prepare 1-benzoyloxy - 4(3,4-dimethoxyphenethyl)-8-ethyl-5-oxo - 5,6,7,8 - tetrahydroindane treat 4-(3,4-dimethoxyphenethyl) - 8 - ethyl - 5 - oxo-5,6,7,8-tetrahydroindan - 1 - ol with benzoyl chloride according to the manipulative procedure described above.

These compounds are useful as intermediates for preparing the novel compositions of this invention which have hormonal activity.

EXAMPLE 63

4-*m*-methoxyphenethyl - 8 - ethyl - 5 - oxo-5,6,7,8-tetrahydroindan-1-ol

Add sodium borohydride (0.4 g.) in ethanol (80 cc.) to the diketone 4-*m*-methoxyphenethyl) - 8 - ethyl-5,6,7,8-tetraphydroindane-1,5-dione (3 g.) in ethanol (80 cc.) and allow the mixture to stand at 20° for 10 minutes. Add a slight excess of acetic acid and evaporate the solution almost to dryness under reduced pressure. Add water, extract the mixture with ether and wash the ethereal solution with aqueous sodium carbonate and water and dry. Evaporate the solvent to obtain 4-*m*-methoxyphenethyl - 8 - ethyl - 5 - oxo - 5,6,7,8 - tetrahydroindan-1-ol; infrared absorption peaks at 2.94 and 6.01μ.

This compound is useful as an intermediate for preparing the novel compositions of this invention which have hormonal activity.

EXAMPLE 64

4-m-methoxyphenethyl-8-ethyl-1-acetoxy-5-oxo-5,6,7,8-tetrahydroindane

Dissolve 4-m-methoxyphenethyl-8-ethyl-5-oxo-5,6,7,8-tetrahydroindan-1-ol (1 g.) in pyridine (5 cc.), cool to 0° and add acetic anhydride (5 cc.). After 18 hours add water and allow the mixture to stand for 30 minutes. Extract the product with ether, and wash the ethereal solution with water, 10% aqueous potassium hydroxide, water, 10% hydrochloric acid, and brine and dry. Evaporate the solvent to obtain a gum which one dissolves in a minimal volume of benzene and filters through neutral alumina. Evaporate the solvent to obtain 4-m-methoxyphenethyl-8-ethyl-1-acetoxy-5-oxo - 5,6,7,8 - tetrahydroindane as a gum; ultraviolet absorption peaks at 2.48 mµ (ε 9,500), infrared absorption peaks at 5.75 and 6.02µ.

This compound is useful as an intermediate for preparing the novel compositions of this invention having hormonal activity.

EXAMPLE 65

1,1-ethylenedioxy-4-m-methoxyphenethyl-8-ethyl-5,6,7,8-tetrahydroindan-5-one

Reflux 4-m-methoxyphenethyl - 8 - ethyl-5,6,7,8-tetrahydroindane-1,5-dione (1 g.) in benzene (25 cc.) ethylene glycol (0.25 cc.) and p-toluene sulphonic acid (0.1 g.) for 5 hours using a Dean-Stark water trap. Wash the cooled solution and evaporate. Take up the residue in a minimal amount of light petroleum and chromatograph on neutral alumina (50 g.). Elute the column with light petroleum containing increasing portions of benzene to obtain a fraction which on evaporation gives the keto-ketal 1,1 - ethylenedioxy-4-m-methoxyphenethyl-8-ethyl-5,6,7,8-tetrahydroindan-5-one as a gum; infrared absorption peaks at 6.01 and 8.55µ.

This compound is useful as an intermediate for preparing the novel compositions of this invention having hormonal activity.

EXAMPLE 66

1,1-ethylenedioxy-9-methyl-5-phenethyl-$\Delta^{5(10)}$-octalin-6-one

Reflux 9 - methyl-5-phenethyl-$\Delta^{5(10)}$-octalin-1,6-dione (6.3 g.) in benzene (315 cc.), ethylene glycol (1.50 cc.) and toluene-p-sulphonic acid (0.63 g.) during 4 hours using a Dean-Stark trap for removal of water. Cool the solution obtained, wash, dry and evaporate to obtain a yellow gum; dissolve in light petroleum ether and chromatograph the solution on neutral alumina. Elute with light petroleum and then elute with mixtures of petroleum and benzene to obtain a fraction which on evaporation gives the ketal 1,1-ethylenedioxy-9-methyl-5-phenethyl-$\Delta^{5(10)}$-octalin-6-one as a gum (5.05 g.); infrared absorption peaks at 6.01, 8.55, 13.33 and 14.29µ.

$C_{21}H_{26}O_3$ calculated: C, 77.3%; H, 8.0%. Found: C, 77.2%; H, 7.9%.

This compound is useful as an intermediate for preparing the novel compositions of this invention having hormonal activity.

EXAMPLE 67

1,1-ethylenedioxy-8-methyl-4-phenethyl-5,6,7,8-tetrahydroindan-5-one

Reflux the diketone 8-methyl-4-phenethyl-5,6,7,8-tetrahydroindane-1,5-dione (0.8 g.) in benzene (20 cc.), ethylene glycol (0.2 cc.) and toluene-p-sulphonic acid (0.085 g.) using a Dean-Stark trap to remove water. Remove the solvent from the cooled reaction mixture and dissolve the residue in light petroleum, chromatograph on fuller's earth. After elution with light petroleum, use a mixture of petroleum and benzene to elute the ketal 1,1-ethylenedioxy-8-methyl-4-phenethyl - 5,6,7,8 - tetrahydroindan-5-one (0.54 g.); infrared absorption peaks at 6.02, 13.33 and 14.29µ.

This compound is useful as an intermediate for preparing the novel compositions of this invention having hormonal activity.

EXAMPLE 68

8-methyl-4-m-nitrophenethyl-5-oxo-5,6,7,8-tetrahydroindan-1-ol

Dissolve the crude 8 - methyl-4-m-nitrophenethyl-5,6,7,8-tetrahydroindane-1,5-dione (0.5 g.) in ethanol (45 cc.) at 18°, and add sodium borohydride (0.05 g.). Shake the mixture for 5 minutes and allow the homogeneous solution obtained to stand for a further 6 minutes, after which acidify with acetic acid and evaporate almost to dryness under reduced pressure. Then add ether (35 cc.), together with water to dissolve the inorganic salts present. Separate the organic layer, wash and dry; evaporate the solvent and recrystallize the residue from a mixture of ethyl acetate and light petroleum to obtain the ethylenic keto alcohol 8 - methyl-4-m-nitrophenethyl-5-oxo-5,6,7,8-tetrahydroindan-1-ol (0.33 g.), m.p. 117–9°; ultraviolet absorption (in ethanol) peaks at 252 mµ (ε 17,060); infrared absorption peaks at 2.92, 6.06, 6.55 and 7.40µ.

This compound is useful as an intermediate for preparing the novel compositions of this invention having hormonal activity.

EXAMPLE 69

4-m-aminophenethyl-8-methyl-5-oxo-5,6,7,8-tetrahydroindan-1-ol

Hydrogenate the nitro ethylenic keto alcohol product of the previous example (0.155 g.) in ethanol (30 cc.) at atmospheric pressure using 10% palladised charcoal (0.09 g.) as catalyst. Uptake of hydrogen ceases when the equivalent of 3 molecules has been absorbed; filter and evaporate to obtain as residue a gum, which is 4-m-aminophenethyl-8-methyl - 5 - oxo-5,6,7,8-tetrahydroindan-1-ol by its infrared absorption; infrared absorption peaks at 2.94µ (a broad band indicating a free amino group; 6.10µ (α,β-unsaturated carbonyl); 6.21µ (shoulder); 12.82 and 14.4µ (disubstituted aromatic nucleus).

This compound is useful as an intermediate for preparing the novel compositions of this invention having hormonal activity.

EXAMPLE 70

4-m-acetamidophenethyl-1-acetoxy-8-methyl-5-oxo-5,6,7,8-tetrahydroindane

Acetylate the amino ethylenic keto alcohol of the previous example (0.15 g.) by allowing it to stand in pyridine (5 cc.) containing acetic anhydride (1 cc.), with subsequent addition of ethanol and evaporation to dryness. The residue, uncrystallizable gum, has infrared absorption: 2.30µ (acetamido NH); 5.77–5.85µ (acetamido NH and acetoxy carbonyl); 6.05µ (acetamido carbonyl); 12.82 and 14.29µ in concordance with the structure of 4-m-acetamidophenethyl - 1 - acetoxy-8-methyl-5-oxo-5,6,7,8-tetrahydroindane.

This compound is useful as an intermediate for preparing the novel compositions of this invention having hormonal activity.

EXAMPLE 71

5-m-methoxyphenethyl-9-methyldecalin-1,6-dione

Shake 5 - m-methoxyphenethyl-9-methyl-$\Delta^{5(10)}$-octalin-1,6-dione in ethanol (50 cc.) containing palladised charcoal (0.6 g.) with hydrogen for 5 hours; hydrogen uptake ceases when the theoretical amount has been absorbed. Remove the catalyst, and evaporate the solution to a gum consisting of mixed stereoisomers of the reduced diketone 5-m-methoxyphenethyl - 9 - methyldecalin-1,6-dione.

This compound is useful as an intermediate for preparing the novel compositions of this invention having hormonal activity.

EXAMPLE 72

Hexahydro-4-m-methoxyphenethyl-8-methylindane-1,5-dione

Hydrogenate 5,6,7,8 - tetrahydro-4-m-methylphenethyl-8-methylindane-1,5-dione (0.95 g.) in ethanol (40 cc.) at atmospheric pressure with 10% palladium on charcoal catalyst (0.2 g.); the calculated amount of hydrogen is taken up in 10 hours. Filter and remove solvent to obtain a colorless gum (0.88 g.), ultraviolet absorption peaks at 277, 270 mµ (ε 1,600, 1,700), as the crude saturated diketone, hexahydro - 4 - m - methoxyphenethyl-8-methylindane-1,5-dione.

To prepare hexahydro 5-m-methoxyphenethyl-9-ethyldecalin-1,6-dione, hydrogenate 5-m-methoxyphenethyl-9-ethyl-$\Delta^{5(10)}$-octalin-1,6-dione at atmospheric pressure with 10% palladium on charcoal catalyst according to the manipulative procedure described above.

To prepare hexahydro 4-m-methoxyphenethyl-8-isopropylindane-1,5-dione hydrogenate 4-m-methoxyphenethyl-8-isopropyl-5,6,7,8-tetrahydroindane-1,5-dione at atmospheric pressure with 10% palladium on charcoal catalyst according to the manipulative procedure described above.

To prepare hexahydro 4-m-methoxyphenethyl-8-isobutylindane-1,5-dione hydrogenate 4-m-methoxyphenethyl-8-isobutyl - 5,6,7,8 - tetrahydroindane-1,5-dione at atmospheric pressure with 10% palladium on charcoal catalyst according to the manipulative procedure described above.

To prepare hexahydro 4-m-methoxyphenethyl-8-cetylindane-1,5-dione hydrogenate 4-m-methoxyphenethyl-8-cetyl - 5,6,7,8 - tetrahydroindane-1,5-dione at atmospheric pressure with 10% palladium on charcoal catalyst according to the manipulative procedure described above.

To prepare hexahydro 4-(2-m-methoxyphenylpropyl)-8-methylindane-1,5-dione hydrogenate 4-(2-m-methoxyphenylpropyl)-8-methyl - 5,6,7,8 - tetrahydroindane-1,5-dione at atmospheric pressure with 10% palladium on charcoal catalyst according to the manipulative procecedure described above.

To prepare hexahydro 4-(α-methyl-m-methoxyphenethyl)-8-methylindane-1,5-dione hydrogenate 4-(α - methyl-m-methoxyphenethyl)-8-methyl-5,6,7,8-tetrahydroindane-1,5-dione at atmospheric pressure with 10% palladium on charcoal catalyst according to the manipulative procecedure described above.

To prepare hexahydro 4-phenethyl-8-methylindane-1,5-dione hydrogenate 4-phenethyl-8-methyl-5,6,7,8-tetrahydroindane-1,5-dione at atmospheric pressure with 10% palladium on charcoal catalyst according to the manipulative procedure described above.

To prepare hexahydro 4-m-nitrophenethyl-8-methylindane-1,5-dione, hydrogenate 4-m-nitrophenethyl-8-methyl-5,6,7,8-tetrahydroindane-1,5-dione at atmospheric pressure with 10% palladium on charcoal catalyst according to the manipulative procedure described above.

To prepare hexahydro 4-m-hydroxyphenethyl-8-methylindane-1,5-dione hydrogenate 4-m-hydroxyphenethyl-8-methyl-5,6,7,8-tetrahydroindane-1,5-dione at atmospheric pressure with 10% palladium on charcoal catalyst according to the manipulative procedure described above.

To prepare hexahydro 4-m-hydroxyphenethyl-8-n-propylindane-1,5-dione, hydrogenate 4-m-hydroxyphenethyl-8-propyl - 5,6,7,8 - tetrahydroindane-1,5-dione at atmospheric pressure with 10% palladium on charcoal catalyst according to the manipulative procedure described above.

To prepare hexahydro 4-(3,4-dimethoxyphenethyl)-8-ethylindane-1,5-dione hydrogenate 4-(3,4-dimethoxyphenethyl)-8-ethyl - 5,6,7,8 - tetrahydroindane - 1,5 - dione at atmospheric pressure with 10% palladium on charcoal catalyst according to the manipulative procedure described above.

To prepare hexahydro 4-(3,5-dimethoxyphenethyl)-8-ethylindane-1,5-dione hydrogenate 4-(3,5-dimethoxyphenethyl)-8-ethyl - 5,6,7,8 - tetrahydroindane - 1,5 - dione at atmospheric pressure with 10% palladium on charcoal catalyst according to the manipulative procedure described above.

To prepare hexahydro 4-m-acetoxyphenethyl-8-methylindane-1,5-dione hydrogenate 4 - m - acetoxyphenethyl-8-methyl-5,6,7,8-tetrahydroindane-1,5-dione at atmospheric pressure with 10% palladium on charcoal catalyst according to the manipulative procedure described above.

To prepare hexahydro 4-m-methoxyphenethyl-8-hydroxypropylindane-1,5-dione hydrogenate 4-m-methoxyphenethyl-8-hydroxypropyl-5,6,7,8-tetrahydroindane - 1,5-dione at atmospheric pressure with 10% palladium on charcoal catalyst according to the manipulative procedure described above.

To prepare 4-m-ethoxyphenethyl-8-ethylindane-1,5-dione, hydrogenate 4-m-ethoxyphenethyl-8-ethyl-5,6,7,8-tetrahydroindane-1,5-dione at atmospheric pressure with 10% palladium on charcoal catalyst according to the manipulative procedure described above.

To prepare hexahydro 4-m-propxyphenethyl-8-phenethylindane-1,5-dione, hydrogenate 4-m-propoxyphenethyl-8-phenethyl-5,6,7,8-tetrahydroindane-1,5-dione at atmospheric pressure with 10% palladium on charcoal catalyst according to the manipulative procedure described above.

To prepare hexahydro 4-m-pentyloxyphenethyl-8-isobutylindane-1,5-dione hydrogenate 4-m-pentyloxyphenethyl-8-isobutyl-5,6,7,8-tetrahydroindane - 1,5 - dione at atomspheric pressure with 10% palladium on charcoal catalyst according to the manipulative procedure described above.

To prepare hexahydro 4-m-cyclopentyloxyphenethyl-8-hydroxypropylindane-1,5-dione hydrogenate 4-m-cyclopentyloxyphenethyl-8-hydroxypropyl - 5,6,7,8 - tetrahydroindane-1,5-dione at atmospheric pressure with 10% palladium on charcoal catalyst according to the manipulative procedure described above.

To prepare hexahydro 4-m-hydroxyphenethyl-8-phenethylindane-1,5-dione hydrogenate 4-m-hydroxyphenethyl-8-phenethyl-5,6,7,8-tetrahydroindane-1,5-dione according to the manipulative procedure described above.

To prepare hexahydro 4-(3,4-dimethoxyphenethyl)-8-diethylaminoethylindane-1,5-dione hydrogenate 4-(3,4-dimethoxyphenethyl)-8-diethylaminoethyl-5,6,7,8 - tetrahydroindane-1,5-dione according to the manipulative procedure described above.

To prepare hexahydro 4-[2-(3,5-dimethoxyphenyl)propyl]-8-dimethylaminopropylindane-1,5 - dione hydrogenate 4-[2-(3,5-dimethoxyphenyl)propyl]-8 - dimethylaminopropyl-5,6,7,8-tetrahydroindane-1,5-dione according to the manipulative procedure described above.

To prepare hexahydro-4-[2-(3,5-diethoxyphenyl)butyl]-8-butylindane-1,5-dione, hydrogenate 4-[2-(3,5-diethoxyphenyl)butyl]-8-butyl-5,6,7,8-tetrahydroindane-1,5 - dione at atmospheric pressure with 10% palladium on charcoal catalyst according to the manipulative procedure described above.

To prepare hexahydro 4-(3-methoxy-4-ethoxyphenethyl)-8-propylindane-1,5-dione, hydrogenate 4-(3-methoxy-4-ethoxyphenethyl)-8-propyl - 5,6,7,8-tetrahydroindane-1,5-dione at atmospheric pressure with 10% palladium on charcoal catalyst according to the manipulative procedure described above.

These compounds are useful as intermediates for preparing the novel compositions of this invention having hormonal activity.

EXAMPLE 73

Hexahydro-4-m-methoxyphenethyl-8-methyl-5-oxoindan-1-ol

Dissolve 5,6,7,8-tetrahydro-4-m-methoxyphenethyl - 8-methyl-5-oxoindan-1-ol in ethanol (30 cc.) and add 10% palladium on charcoal catalyst (0.3 g.). Shake the mixture in hydrogen at atmospheric pressure, the theoretical amount of hydrogen being taken up in 8 hours. Filter off the catalyst and remove the solvent under reduced pressure, to obtain a gum, ultraviolet absorption peaks at 277, 270 mμ (ε 1,500, 1,700), consistent with the structure of hexahydro-4-m-methoxyphenethyl-8-methyl-5 - oxoindan-1-ol.

This compound possesses estrogenic activity and is useful as an intermediate for preparing the hormonal compounds of this invention.

EXAMPLE 74

Hexahydro-4-m-methoxyphenethyl-8-methylindan-1,5-dione

Dissolve the saturated keto-alcohol of the previous example (0.815 g.) in pyridine (25 cc.), cool in ice and add recrystallized chromium trioxide (0.815 g.) gradually with stirring under nitrogen. Allow the mixture to stand at room temperature for 20 hours, then dilute with ethyl acetate (20 cc.). Filter the brown mixture through a short alumina column wetted with ethyl acetate and remove the solvent from the filtrate, to obtain as gummy residue crude hexahydro-4-m-methoxyphenethyl-8 - methylindane - 1,5-dione (0.77 g.); infrared absorption peaks at 5.75, 5.85μ.

This compound is useful as an intermediate for preparing the novel compositions of this invention having a hormonal activity.

EXAMPLE 75

4-m-methoxyphenethyl-8-ethyl-trans-hexahydroindane-1,5-dione

Dissolve 4-m-methoxyphenethyl-8-ethyl-5,6,7,8-tetrahydroindane-1,5-dione (2 g.) in ethanol (50 cc.) containing 10% palladised charcoal (0.6 g.) and shake in an atmosphere of hydrogen for 12 hours, when hydrogen uptake almost ceases. Remove the catalyst by filtration and evaporate the solvent to a gum which is dissolved in a little benzene and filtered through a short column of alumina. Evaporate the solvent to obtain a gum consisting of stereoisomers of the diketone 4-m-methoxyphenethyl-8-ethyl-trans-hexahydroindane - 1,5 - dione; infrared absorption peaks at 5.75, 5.85μ.

This compound is useful as an intermediate for preparing the novel compositions of this invention having a hormonal activity.

EXAMPLE 76

4-m-methoxyphenethyl-8-ethyl-5-oxo-trans-hexahydroindan-1-ol

Hydrogenate 4-m-methoxyphenethyl-8-ethyl-5-oxo-5,6,7,8-tetrahydroindan-1-ol (2 g.) as for the preparation of the corresponding 8-methyl compound to obtain 4-m-methoxyphenethyl-8-ethyl-5-oxo-trans-hexahydroindan-1 - ol as a gum.

This compound is useful as an intermediate for preparing the novel compositions of this invention having hormonal activity.

EXAMPLE 77

4-m-methoxyphenethyl-8-ethyl-trans-hexahydroindane-1,5-dione

Dissolve 5-m-methoxyphenethyl - 8 - ethyl-5-oxo-trans-hexahydroindan-1-ol (1 g.) in pyridine (30 cc.) and add chromium trioxide (1.6 g.) carefully with stirring under nitrogen. Allow the mixture to stand at room temperature for 24 hours, add ethyl acetate (20 cc.), and filter the mixture through a short column of alumina with ethyl acetate. Remove the solvent to obtain 4-m-methoxyphenethyl-8-ethyl-trans-hexahydroindane-1,5-dione as a gum; infrared absorption peaks at 5.75, 5.85μ.

This compound is useful as an intermediate for preparing the novel compositions of this invention having hormonal activity.

EXAMPLE 78

9-methyl-5-phenethyldecalin-1,6-dione

Dissolve the tricyclic diketone 9-methyl-5-phenethyl-$\Delta^{5(10)}$-octalin-1,6-dione (3 g.) in ethanol (75 cc.) and add 10% palladised charcoal (0.9 g.); shake the mixture in hydrogen until a molecular equivalent of hydrogen has been absorbed. Isolate the product from the mixture as a gum, which is taken up in ethanol (300 cc.) containing 20% sulphuric acid (3 cc.) and reflux for 2 hours to ensure equilibration at the 5-position. Work up and recrystallize from ethanol to obtain the diketone 9-methyl-5-phenethyldecalin-1,6-dione (1.7 g.), m.p. 96–8°; infrared absorption peaks at 5.86μ.

$C_{19}H_{24}O_2$ calculated: C, 80.2%; H, 8.5%. Found: C, 80.1%; H, 8.65%.

This compound is useful as an intermediate for preparing the novel compositions of this invention having hormonal activity.

EXAMPLE 79

4-m-hydroxyphenethyl-8-ethyl-trans-hexahydroindane-1,5-dione

Shake 4-m-hydroxyphenethyl - 8 - ethyl-5,6,7,8-tetrahydroindane-1,5-dione (2 g.) in ethanol (30 cc.) with 10% palladised charcoal (0.7 g.) in an atmosphere of hydrogen until 1.1 M of hydrogen has been absorbed. Filter the catalyst and evaporate the solvent to obtain 4-m-hydroxyphenethyl - 8 - ethyl - trans - hexahydroindane-1,5-dione; infrared absorption peaks at 5.75, 5.85μ.

This compound is useful as an intermediate for preparing the novel compositions of this invention having hormonal activity.

EXAMPLE 80

5-m-methoxyphenethyl-9-methyl-6-oxodecalin-1-ol

Add 5-m-methoxyphenethyl - 9 - methyl-6-oxo$\Delta^{(10)}$-octalin-1-ol (2.8 g.) in tetrahydrofuran (30 cc.) with stirring to lithium (350 mg.) in liquid ammonia (300 cc.). Stir the mixture for a further 5 minutes and add sodium nitrate to discharge the blue color. The gummy product has an infrared spectrum consistent with the structure of 5-m-methoxyphenethyl - 9 - methyl-6-oxo-decalin-1-ol.

This compound is useful as an intermediate for preparing the novel compositions of this invention having hormonal activity.

EXAMPLE 81

5-m-methoxyphenethyl-9-methyl-trans-decalin-1,6-dione

Dissolve the product of the previous example in pyridine (30 cc.), add to chromium trioxide (4 g.) in pyridine (40 cc.) and keep the mixture 24 hours. Add water, and extract the mixture with etherbenzene; wash and dry the extracts. Remove the solvent and recrystallize the residue from ether and from light petroleum-ethyl acetate to obtain the diketone, 5-m-methoxyphenethyl-9-methyl-trans-decalin-1,6-dione (1.72 g.; 61%), m.p. 92–93° C.

$C_{20}H_{26}O_3$ calculated: C, 76.4%; H, 8.4%. Found: C, 76.3%; H, 8.3%.

This compound is useful as an intermediate for preparing the novel compositions of this invention having hormonal activity.

EXAMPLE 82

1,1-ethylenedioxy-9-methyl-5-phenethyldecalin-6-one

Add the ketal 1,1-ethylenedioxy-9-methyl-5-phenethyl-$\Delta^{5(10)}$-octalin-6-one (5 g.) in tetrahydrofuran (47 cc.) to a solution of lithium (0.54 g.) in liquid ammonia (460 cc.). Stir the mixture for 15 minutes and discharge the blue color by the addition of solid sodium nitrite. Work up the product in the usual way by means of ether to obtain a gum which crystallizes on adding ethanol. Recrystallize from methanol to obtain the reduced ketal 1,1-ethylenedioxy-9-methyl-5-phenethyldecalin-6-one (4.6 g.), m.p. 81–2° C.; infrared absorption peaks at 5.88, 8.40, 13.33, 14.29μ.

$C_{21}H_{28}O_3$ calculated: C, 76.8%; H, 8.6%. Found: C, 77.0%; H, 8.7%.

This compound is useful as an intermediate for preparing the novel compositions of this invention having hormonal activity.

EXAMPLE 83

4-m-methoxyphenethyl-8-methyl-1-methoxy-trans-hexahydroindan-5-one

Shake 4-m-methoxyphenethyl-8-methyl - 1 - methoxy-5,6,7,8-tetrahydroindan-5-one (0.32 g.) in ethanol (20 cc.) with 10% palladium on charcoal catalyst (0.2 g.) in an atmosphere of hydrogen until 25 cc. of hydrogen has been absorbed. Filter the catalyst and evaporate the solvent to obtain 4-m-methoxyphenethyl-8-methyl-1-methoxy-trans-hexahydroinindan-5-one as a gum; infrared absorption peak at 5.85μ.

This compound is useful as an intermediate for preparing the novel compositions of this invention having hormonal activity.

EXAMPLE 84

13β-methyl-3-methoxy-D-homogona-1,3,5(10),8,14-pentaen-17a-one

Reflux the dicyclic triketone 2-(6-m-methoxyphenyl-3-oxohexyl)-2-methylcyclohexane-1,3-dione (2 g.) for 2 hours in benzene (35 cc.) containing anhydrous toluene-p-sulphonic acid (1 g.) using a Dean-Stark trap to remove the water formed. The worked-up product is a solid which one recrystallizes from light petroleum (b.p. 60–80°) and from methanol to give the diene 13β-methyl-3-methoxy-D-homogona-1,3,5(10),8,14-pentaen-17a-one (0.5 g.), m.p. 135–37° C.; ultraviolet absorption peak at 310 mμ (ε 30,000).

$C_{20}H_{22}O_2$ calculated: C, 81.6%; H, 7.5%. Found: C, 81.45%; H, 7.7%.

This compound has estrogenic activity, lowers the blood lipid level, and is useful as an intermediate for preparing the hormonal compound of this invention.

EXAMPLE 85

13β-methyl-3-methoxygona-1,3,5(10),8,14-pentaen-17-one

Dissolve the triketone 2-(6-m-methoxyphenyl-3-oxohexyl)-2-methylcyclopentane-1,3-dione (6.7 g.), in dry benzene (100 cc.) containing anhydrous toluene-p-sulphonic acid (2.4 g.). Reflux the mixture using a Dean-Stark water separator until the equivalent of two molecular proportions of water (0.99 cc.) is collected (30 min.), indicating a double cyclodehydration. Cool and wash to remove acid, and dry. Evaporate the dried solution to obtain a red gum. Distill the gum under reduced pressure (bath temp. 210°, 0.5 mm.). Recrystallize the solidified distillate from methanol, giving 13β-methyl-3-methoxygona-1,3,5(10),8,14-pentaen-17-one (3.9 g.), m.p. 115–6°; ultraviolet absorption peak at 313 mμ (ε 35,100). The light absorption is in agreement with the structure assigned.

$C_{19}H_{20}O_2$ calculated: C, 81.4%; H, 7.2%. Found: C, 81.1%; H, 7.0%.

This compound has estrogenic activity, lowers the blood lipid level, and is useful as an intermediate for preparing the hormonal compound of this invention.

EXAMPLE 86

13β-methyl-3-methoxygona-1,3,5(10),8,14-pentaen-17-one

Add the crude methiodide of 1-diethylamino-6-m-methoxyphenylhexan-3-one (2.5 g.) in methanol (10 cc.) ice-cold to a solution obtained by adding 2-methylcyclopentane-1,3-dione (0.5 g.) to an ice-cold solution of sodium (0.21 g.) in methanol (10 cc.). Allow the reaction mixture to warm to room temperature and leave for 16 hours, after which add N hydrochloric acid (10 cc.) and saturated brine (100 cc.) ether-extracting the solution. Evaporate the washed and dried extracts to obtain crude 2-(6-m-methoxyphenyl-3-oxohexyl)-2-methylcyclopentane-1,3-dione as a gum; dissolve in benzene (25 cc.) containing toluene-p-sulphonic acid (0.4 g.) and reflux the mixture for 1 hour. Cool, add ether (25 cc.), and wash, dry, and evaporate the solution. Take up the resulting gum in benzene (5 cc.) and adsorb on a column of fuller's earth (100 g.). Elute with a mixture of benzene and light petroleum to obtain a series of fractions, one of which crystallizes (0.04 g.). Boil this fraction with methanol and decant the solution from insoluble oil which forms. Reduce the solution in bulk by evaporation, depositing crystals on cooling: recrystallize from methanol to obtain 13β - methyl - 3-methoxygona-1,3,5(10),8,14-pentaen-17-one, m.p. 111–3° C.; ultraviolet absorption peak at 312 mμ (ε 34,800).

This compound has estrogenic activity, lowers the blood lipid level, and is useful as an intermediate for preparing the hormonal compound of this invention.

EXAMPLE 87

13β-methyl-3-methoxygona-1,3,5(10),8,14-pentaen-17-one

To 2-(6-m-methoxyphenyl-3-oxohexyl)-2-methylcyclopentane-1,3-dione (3 g.) in benzene (100 cc.) polyphosphoric acid (from orthophosphoric acid, 15 g. and phosphorus pentoxide, 6 g.) and heat the mixture at 90° for 4 minutes under such reduced pressure as the need to control frothing will allow. Cool, add water, and extract the mixture with ether and ethyl acetate; isolate the product from the resulting solution to obtain the colorless crysalline 13β - methyl - 3-methoxygona-1,3,5(10),8,14-pentaen-17-one (2 g.), m.p. 115–116°; ultraviolet absorption peak at 313 mμ (ε 35,100).

To prepare 13β-(3-hydroxypropyl)-3-methoxygona-1,3,5(10),8,14-pentaen-17-one treat 2-(6-m-methoxyphenyl-3 - oxohexyl) - 2 - (3-hydroxypropyl)cyclopentane-1,3-dione with polyphosphoric acid according to the manipulative procedure described above.

To prepare 13β-phenethyl-3-propoxygona-1,3,5(10),8,14 - pentaen - 17 - one treat 2-(6-m-propoxyphenyl-3-oxohexyl)-2-phenethylcyclopentane-1,3-dione with polyphosphoric acid according to the manipulative procedure described above.

To prepare 13β-isobutyl-3-pentyloxygona-1,3,5(10),8,14-pentaen-17-one treat 2-(6-m-pentyloxyphenyl-3-oxohexyl)-2-isobutylcyclopentane-1,3-dione with polyphosphoric acid according to the manipulative procedure described above.

To prepare 13β-(3-hydroxypropyl)-3-cyclopentyloxygona - 1,3,5(10),8,14 - pentaen - 17 - one treat 2-(6-m-cyclopentyloxyphenyl - 3-oxohexyl)-2-(3-hydroxypropyl) cyclopentane-1,3-dione with polyphosphoric acid according to the manipulative procedure described above.

To prepare 13β-phenethyl-3-hydroxygona-1,3,5(10),8, 14 - pentaen-17-one treat 2-(6-m-hydroxyphenyl-3-oxohexyl)-2-phenethylcyclopentane-1,3-dione with polyphosphoric acid according to the manipulative procedure described above.

To prepare 13β - (2 - diethylaminoethyl) - 2,3 - dimethoxygona - 1,3,5(10),8,14 - pentaen - 17 - one treat 2 - [6 - (3,4 - dimethoxyphenyl)-3-oxohexyl] - 2 - (2-diethylaminoethyl)cyclopentane - 1,3 - dione with polyphosphoric acid according to the main-pulative procedure described above.

To prepare 13β - (3 - dimethylaminopropyl) - 1,3 - dimethoxy - 6 - methylgona - 1,3,5(10),8,14 - pentaen - 17-one treat 2[6 - (3,5 - dimethoxyphenyl) - 3 - oxoheptyl]-(2,3-dimethylaminopropyl)cyclopentane - 1,3 - dione with polyphosphoric acid according to the manipulative procedure described above.

To prepare 13β - butyl - 1,3 - diethoxy - 6 - ethylgona-1,3,5(10),8,14 - pentaen - 17 - one treat 2 - [6 - (3,5-diethoxyphenyl) - 3 - oxooctyl] - 2 - butylcyclopentane-1,3-dione with polyphosphoric acid according to the manipulative procedure described above.

To prepare 13β - propyl - 2 - ethoxy - 3 - methoxygona-1,3,5(10),8,14 - pentaen - 17 - one treat 2 - [6 - (3 - methoxy - 4 - ethoxyphenyl) - 3 - oxohexyl] - 2 - propylcyclopentane-1,3-dione with polyphosphoric acid according to the manipulative procedure described above.

To prepare 13β-6 - dimethyl - 3 - methoxygona - 1,3,5-(10),8,14 - pentaen - 17 - one treat 2 - [6 - (3,5 - dimethoxyphenyl) - 3 - oxoheptyl] - 2 - methylcyclopentane-1,3-dione with polyphosphoric acid according to the manipulative procedure described above.

These compounds have estrogenic activity, lower the blood lipid level, and are useful as intermediates in the preparation of the hormonal compounds of the invention

EXAMPLE 88

13β-methyl-3-methoxygona-1,3,5(10),8,14-pentaen-17-one

Heat the tricyclic diketone 5,6,7,8-tetrahydro-4-m-methoxyphenethyl-8-methylindane-1,5-dione (0.25 g.), under nitrogen at 60° with a mixture of orthophosphoric acid (5 cc., S.G. 1.8) and phosphorus pentoxide (3.25 g.) for 20 minutes. Work up by means of ether to obtain a partially crystalline product which one takes up in benzene (10 cc.) and filters. Recrystallize the residue to obtain the diene 13β - methyl - 3 - methoxygona - 1,3,5(10), 8,14-pentaen-17-one (0.6 g.), m.p. 110–2° C.; ultraviolet absorption peaks at 310 mμ ($\epsilon$ 37,200); infrared absorption peak at 5.78μ.

This compound has estrogenic activity, lowers the blood lipid level, and is useful as an intermediate for preparing the hormonal compounds of this invention.

EXAMPLE 89

13β-ethyl-3-methoxy-D-homogona-1,3,5(10),8,14-pentaen-17a-one

Add 2 - (6 - m - methoxyphenyl - 3 - oxohexyl) - 2-ethylcyclohexane - 1,3 - dione (32.8 g.) in benzene (400 cc.) to polyphosphoric acid (150 g.) in an atmosphere of nitrogen and stir the mixture at 60° for 3 hours. Add water, separate the benzene layer and wash with water until neutral. Dry the solution, remove the solvent, and recrystallize the residue from ethanol to obtain 13β-ethyl - 3 - methoxy - D - homogona - 1,3,5(10),8,14-pentaen-17a-one, m.p. 90–92°; ultraviolet absorption peak at 311 mμ ($\epsilon$ 28,500).

This compound has estrogenic activity, lowers the blood lipid level, and is useful as an intermediate for preparing the hormonal compounds of this invention.

EXAMPLE 90

13β-Ethyl-3-methoxygona-1,3,5(10),8,14-pentaen-17-one

Reflux the triketone 2-ethyl-2-(6-m-methoxyphenyl-3-oxohexyl)cyclopentane-1,3-dione (7.1 g.), in benzene (150 cc.) and toluene-p-sulphonic acid (2 g.) until the theoretical amount of water (0.72 cc.) for double cyclodehydration has been collected in a Dean-Stark separator. Wash the cooled reaction mixture after removal of solvent under reduced pressure, b.p. ca. 220°/0.01 mm., to obtain an almost colorless glass (5.7 g.). Crystalize the glass from methanol containing a little ethyl acetate to obtain pure 13β - ethyl - 3 - methoxygona - 1,3,5(10), 8,14-pentaen-17-one (3.7 g.), m.p. 77–80°; ultraviolet absorption peak at 311 mμ ($\epsilon$ 28,000).

$C_{20}H_{22}O_2$ calculated: C, 81.6%; H, 7.5%. Found: C, 81.3%; H, 7.3%.

This compound has estrogenic activity, lowers the blood lipid level, and is useful as an intermediate for preparing the hormonal compounds of this invention.

EXAMPLE 91

13β-propyl-3-methoxygona-1,3,5(10),8,14-pentaen-17-one

Condense 2-propylcyclopentane-1,3-dione (13.1 g.) in 0.12% methanolic potassium hydroxide solution (90 cc.) with 6 - m - methoxyphenylhex - 1 - en - 3 - one (19.0 g.), to obtain crude 2 - n - propyl - 2 - (6 - m - methoxyphenyl - 3 - oxohexyl)cyclopentane - 1,3 - dione (25.5 g.). Submit this Michael condensation product (23.4 g.) to double cyclodehydration by heating with toluene-p-sulphonic acid, and distill the product at 200°/10⁻⁴ mm.; crystallize the distillate from ethanol to obtain the tetracyclic diene ketone 13β - propyl - 3 - methoxygona-1,3,5(10),8,14-pentaen-17-one, m.p. 82–4°; ultraviolet absorption peak at 310 mμ ($\epsilon$ 24,700).

This compound has estrogenic activity, lowers the blood lipid level, and is useful as an intermediate for preparing the hormonal compounds of this invention.

EXAMPLE 92

13β-isopropyl-3-methoxygona-1,3,5(10),8,14-pentaen-17-one

Reflux the triketone 2-isopropyl-2-(6-m-methoxyphenyl-3-oxohexyl)cyclo-pentane-1,3-dione (7.2 g.) in benzene (150 cc.) and toluene-p-sulfonic acid (2 g.) until the theoretical amount of water (0.72 cc.) for double cyclodehydration has been collected in a Dean-Stark trap. Wash the cooled reaction mixture to remove acid and dry. Remove the solvent to obtain a gum. Distill the gum to obtain a glass (5 g.), which one crystallizes from methanol to obtain pure 13β-isopropyl-3-methoxygona-1,3,5(10),8,14-pentaen-17-one (4.5 g.), m.p. 112–3°.

$C_{21}H_{24}O_2$ calculated: C, 81.8%; H, 7.8%. Found: C, 81.8%; H, 7.6%

This compound has estrogenic activity, lowers the blood lipid level, and is useful as an intermediate for preparing the hormonal compounds of this invention.

EXAMPLE 93

13β-butyl-3-methoxygona-1,3,5(10),8,14-pentaen-17-one

Condense n-butylcyclopentane-1,3-dione (2.8 g.) in 0.12% methanolic potassium hydroxide solution (8 cc.) with 6-m-methoxyphenylhex-1-en-3-one (5 g.) by heating the mixture at 80° for 10 hours. Evaporate the solvent under reduced pressure and heat the residue with toluene-p-sulphonic acid (2 g.) in benzene (50 cc.) for 45 minutes using a Dean-Stark trap to effect double cyclodehydration. Add ether to the cooled reaction mixture, and evaporate the washed and dried ether solution; recrystallize the residue from ethanol to obtain 13β-butyl-3-methoxy-gona-1,3,5(10)8,14-pentaen-17-one (1.9 g.), m.p. 53–5°; ultraviolet absorption peak at 312 mμ ($\epsilon$ 29,200).

This compound has estrogenic activity, lowers the blood lipid level, and is useful as an intermediate for preparing the hormonal compounds of this invention.

EXAMPLE 94

13β-isobutyl-3-methoxygona-1,3,5(10),8,14-pentaen-17-one

Reflux a mixture of crude 2-(6-m-methoxyphenyl)-(3-oxohexyl)-2-isobutyl-1,3-cyclopentanedione (154.9 g.) and anhydrous p-toluenesulfonic acid (177 g.) in 5.2 liters of dry benzene for 3 hours using a Dean-Stark water separator. After cooling, filter the solution, wash, dry, and concentrate to ⅓ of its volume. Then filter through charcoal (Darco, 310 g.). Distill the filtrate to obtain a viscous oil, b.p. 203° (bath temp.), 0.01 mm. Recrystallize from methanolacetone to get 13β-isobutyl-3-methoxygona-1,3,5-(10),8,14-pentaen-17-one, m.p. 57–60°; ultraviolet absorption peak at 312 mμ ($\epsilon$ 25,200).

$C_{22}H_{26}O_2$ calculated: C, 81.9%; H, 8.1%. Found: C, 81.6%; H, 8.1%.

This compound has estrogenic activity, lowers the blood lipid level, and is useful as an intermediate for preparing the hormonal compounds of this invention.

EXAMPLE 95

13β-cetyl-3-methoxygona-1,3,5(10),8,14-pentaen-17-one

Reflux a mixture of 2-cetylcyclopentane-1,3-dione (10.1 g.), 6-m-methoxyphenylhex-1-en-3-one (6.0 g.) and 0.02% methanolic potassium hydroxide solution (120 cc.) for 26 hours and then cool. Dissolve the residue obtained after removal of solvent under reduced pressure in a mixture of benzene (50 cc.) and ether (50 cc.), and wash the solution in turn with sodium carbonate solution, 10% aqueous sulphuric acid and water. Remove the solvent by evaporation under reduced pressure to obtain as residue crude 2-cetyl-2-(6-m-methoxyphenyl-3-oxohexyl)-1,3-cyclopentanedione ( 11.4 g.).

Add a solution of this Michael condensate in dry benzene (80 cc.) to a mixture of anhydrous toluene-p-sulphonic acid (2.4 g.) and dry benzene (80 cc.) and reflux the mixture for 1 hour, using a Dean-Stark water separator, until the equivalent of 2 moles of water (0.75 cc.) has been collected. Wash the cooled solution, dry, and remove the solvent, leaving a purple oil (10.2 g.) which one then distills at about 220°/0.001 mm. Recrystallize the solidified distillate from acetonitrile, to obtain 13β-cetyl-3-methoxygona-1,3,5(10),8,14-pentaen-17-one, m.p. 55–56.5° C.; ultraviolet absorption peak at 316 mµ (e 24,000).

$C_{34}H_{50}O_2$ calculated: C, 83.2%; H, 10.3%. Found: C, 83.3%; H, 10.3%.

This compound has estrogenic activity, lowers the blood lipid level, and is useful as an intermediate for preparing the hormonal compounds of this invention.

EXAMPLE 96

13β-ethyl-3-methoxy-6-methylgona-1,3,5(10),8,14-pentaen-17-one

Reflux 2-(6-m-methoxyphenyl-3-oxoheptyl)-2-ethylcyclopentane-1,3-dione (14 g.) with anhydrous toluene-p-sulphonic acid (4 g.) in benzene (50 cc.) with continuous water separation for 20 minutes. Wash the cooled solution with water, dry, and evaporate the solvent. Distill the residual red gum to obtain 13β-ethyl-3-methoxy-6-methylgona-1,3,5(10),8,14-pentaen-17-one as a gum; ultraviolet absorption peak at 315 mµ (e 21,000); infrared absorption peak at 5.75µ.

This compound has estrogenic activity, lowers the blood lipid level, and is useful as an intermediate for preparing the hormonal compounds of this invention.

EXAMPLE 97

13β-ethyl-3-methoxy-7-methylgona-1,3,5(10),8,14-pentaen-17-one

Dissolve the crude triketone 2-ethyl-2-(6-m-methoxyphenyl-5-methyl-3-oxohexyl)cyclopentane-1,3-dione (3 g.) in benzene (50 cc.) containing anhydrous toluene-p-sulphonic acid (1.5 g.) and reflux the mixture with continuous water separation for 45 minutes. Dilute the cooled solution with ether, and wash with water; dry and evaporate. Distill the red residue at 230° bath temperature) at 0.02 mm. to give 13β-ethyl-3-methoxy-7-methyl-gona-1,3,5(10),8,14-pentaen-17-one; infrared absorption peak at 5.78µ; ultraviolet absorption peak at 310 mµ (e 25,000).

This compound has estrogenic activity, lowers the blood lipid level, and is useful as an intermediate for preparing the hormonal compounds of this invention.

EXAMPLE 98

13β-methyl-3-hydroxygona-1,3,5(10),8,14-pentaen-17-one

Reflux 2 - (6- m - hydroxyphenyl-3-oxohexyl) - 2-methylcyclopentane - 1,3 - dione (0.5 g.), the product of Michael condensation of 2 - methylcyclopentane - 1,3-dione with 6 - m - hydroxyphenyl - 1 - diethylaminohexan-3-one for 50 minutes in benzene (30 cc.) containing toluene-p-sulphonic acid (0.3 g.) using a Dean-Stark trap. Add ether (80 cc.) to the cooled product and filter off the resulting insoluble material. Wash the ethereal solution in turn with water, saturated aqueous potassium bicarbonate, and brine, and dry. The product is a deep green gum which one takes up in a small quantity of ether; precipitate the insoluble impurities by the addition of light petroleum and filter off. Evaporate the resulting solution to obtain a crystalline residue, which one takes up in a mixture of benzene (10 cc.) and ether (2 cc.); adsorb the solution on an activated fuller's earth (10 g.). Elute with benzene to obtain 13β - methyl - 3 - hydroxygona-1,3,5-(10),8,14 - pentaen - 17 - one (0.19 g.), m.p. 225° (decomp.).

$C_{18}H_{18}O_2$ calculated: C. 81.2%; H, 6.8%. Found: C, 80.7%; H, 7.0%.

This compound has estrogenic activity, lowers the blood lipid level, and is useful as an intermediate for preparing the hormonal compounds of this invention.

EXAMPLE 99

13β-methyl-3-hydroxygona-1,3,5(10),8,14-pentaen-17-one

Allow 2 - (6 - m - hydroxyphenyl - 3 - oxohexyl)-2-methylcyclopentane-1,3,-dione (0.8 g.) to stand for 90 minutes at room temperature in benzene (80 cc.) containing anhydrous toluene-p-sulphonic acid (5 g.). Wash the product with water, followed by aqueous sodium bicarbonate solution, and dry. Remove the solvent by evaporation to obtain a deep green gum; ultraviolet absorption peak at 313 mµ (e 13,000). When this gum is seeded it becomes solid. Take up the crude material in benzene (15 cc.) and adsorb the solution on an activated fuller's earth (30 g.); elute with benzene to obtain pale yellow 13β - methyl - 3 - hydroxygona - 1,3,5(10),8,14-pentaen-17-one (0.6 g.).

This compound has estrogenic activity, lowers the blood lipid level, and is useful as an intermediate for preparing the hormonal compounds of this invention.

EXAMPLE 100

13β-methyl-3-hydroxygona-1,3,5(10),8,14-pentaen-17-one

Reflux 2 - (6 - m - acetoxyphenyl - 3 - oxohexyl)-2-methylcyclopentane - 1,3-dione (0.8 g.), the product of Michael condensation of 2-methylcyclopentanedione and a mixture of 6-m-acetoxyphenyl - 1 - diethylaminohexan-3-one and 6 - m - acetoxyphenyl - hex-1-en-3-one, and containing some of the corresponding free phenolic compound) in benzene (25 cc.) with toluene-p-sulphonic acid (0.3 g.) for 50 minutes. On cooling add ether (50 cc.) and wash the mixture in turn with water, saturated aqueous potassium bicarbonate, and brine; dry over anhydrous magnesium sulphate. The residue after removal of solvent is a purple gum (0.6 g.), part of which can be induced to crystallize. Dissolve a portion (0.45 g.) of this gum in benzene and adsorb on an activated fuller's earth (40 g.); elute with benzene to obtain 13β - methyl - 3 - hydroxygona - 1,3 - 5(10),8,14 - pentaen - 17 - one, which one recrystallizes from diisopropyl ether, m.p. 225–6°; ultraviolet absorption peak at 312.5 mµ (e 23,000); infrared absorption peaks at 2.99µ, 5.81µ, and 8.00µ.

This compound has estrogenic activity, lowers the blood lipid level, and is useful as an intermediate for preparing the hormonal compounds of this invention.

EXAMPLE 101

13β-methyl-3-hydroxygona-1,3,5(10),8,14-pentaen-17-one

Place 300 g. of warm polyphosphoric acid in a 1 l. flask fitted with dropping funnel, stirrer and thermometer. Add crude 2 - (6 - m - hydroxyphenyl - 3 - oxohexyl)-2 - methylcyclopentane - 1,3-dione Michael adduct (28.3 g.), dissolved by warming in dry benzene (70 cc.) dropwise with stirring during 45 minutes to the acid at 40–50°. Stir the mixture for a further 45 minutes by which time it becomes a very deep red. Add crushed ice with vigorous stirring and extract the resulting mixture with ether (3 × 250 cc.). A small quantity of black tar remains insoluble in either phase. Wash the combined ethereal extracts with saturated $KHCO_3$ and brine, and then dry ($MgSO_4$). Remove the solvent on the rotary evaporator (temperature not greater than 40°) to obtain a bright yellow crystalline solid. Wash by decantation with cold 20% ethyl acetate—60–80° petroleum ether (20 cc.), filter and dry to obtain crude 13β - methyl - 3 -hydroxygona - 1,3,5(10),8 - 14 - pentaen - 17 - one (19.35 g., 77%), m.p. 160–162° (dec.); ultraviolet absorption peak at 312mµ (e 22,200).

This compound has estrogenic activity, lowers the blood lipid level, and is useful as an intermediate for preparing the hormonal compounds of this invention.

EXAMPLE 102

13β-methyl-3-acetoxygona-1,3,5(10),8,14-pentaen-17-one

Mix 13β - methyl - 3 - hydroxygona - 1,3,5(10),8,14-pentaen - 17 - one with pyridine (3 cc.) and acetic anhydride (1 cc.) and keep at room temperature for 4 hours. Add ethanol (1 cc.) and remove low-boiling material under reduced pressure (0.1 mm.) to leave a red gum which crystallizes from a mixture of ethyl acetate and light petroleum. Recrystallize from methanol to obtain crystals of 13β - methyl - 3 - acetoxygona - 1,3,5(10),8,14-pentaen-17-one, melting partially at 161–6° with resolidification at about 220° and finally melting at 260–5° (decomp.); infrared absorption peaks at 5.75μ and 8.27μ, with absence of an absorption band due to a hydroxy group; ultraviolet absorption peak at 307.5μ ($\epsilon$ 24,000).

This compound has estrogenic activity, lowers the blood lipid level, and is useful as an intermediate for preparing the hormonal compounds of this invention.

EXAMPLE 103

13β-ethyl-3-hydroxygona-1,3,5(10),8,14-pentaen-17-one

Reflux 2-(6-m-hydroxyphenyl-3-oxohexyl) - 2 - ethylcyclopentane-1,3-dione (2.6 g.) for 30 minutes in benzene (70 cc.) containing toluene-p-sulphonic acid (0.38 g.), and collect the water evolved in the cyclodehydration in a Dean-Stark separator. Work up to obtain a green gum which one dissolves in benzene (30 cc.); adsorb the benzene solution on a column of activated fuller's earth, and elute with benzene to obtain crude 13β-ethyl-3-hydroxygona-1,3,5(10),8,14-pentaen-17-one (0.75 g.), as pale yellow crystals, m.p. 153–6°; ultraviolet absorption peak at 313.5 mμ ($\epsilon$ 30,300); infrared absorption peaks at 3.99μ and 5.81μ.

This compound has estrogenic activity, lowers the blood lipid level, and is useful as an intermediate for preparing the hormonal compounds of this invention.

EXAMPLE 104

13β-ethyl-3-hydroxygona-1,3,5(10),8,14-pentaen-17-one

Allow 2-(6-m-hydroxyphenyl-3-oxohexyl) - 2 - ethylcyclopentane-1,3-dione (8.8 g.) to stand 24 hours at room temperature in solution in benzene (430 cc.) containing anhydrous toluene-p-sulphonic acid (20 g.). Work up the product to obtain a deep red and green gum; take up in benzene (50 cc.) and adsorb on activated fuller's earth (300 g.). Elute with benzene to obtain pale green crystals of crude 13β-ethyl-3-hydroxygona-1,3,5(10),8,14-pentaen-17-one (2.05 g.), m.p. 149–51°, the substance melting to a clear liquid on rapid heating; ultraviolet absorption peak at 314 mμ ($\epsilon$ 30,000).

This compound has estrogenic activity, lowers the blood lipid level, and is useful as an intermediate for preparing the hormonal compounds of this invention.

EXAMPLE 105

13β-ethyl-3-hydroxygona-1,3,5(10),8,14-pentaen-17-one

Add 2 - (6-m-hydroxyphenyl-3-oxohexyl)-2-ethylcyclopentane-1,3-dione (28.3 g.) in benzene (70 cc.) during 45 minutes to polyphosphoric acid (300 g. containing 80% phosphorus pentoxide) and maintain at 40–50°, with stirring. Stir the reaction mixture for a further 45 minutes during which it develops a deep red coloration. Add crushed ice and extract the product with ether. Evaporate the washed and dried extracts at a temperature not greater than 40° to obtain a bright yellow crystalline solid; wash by decantation with light petroleum containing a small proportion of ether; filter and dry to obtain 13β-ethyl-3-hydroxygona - 1,3,5(10),8,14-pentaen-17-one (19.35 g.), m.p. 160–2°; ultraviolet absorption peak at 312 mμ ($\epsilon$ 22,200).

This compound has estrogenic activity, lowers the blood lipid level, and is useful as an intermediate for preparing the hormonal compounds of this invention.

EXAMPLE 106

13β-ethyl-3-hydroxygona-1,3,5(10),8,14-pentaen-17-one

Add a solution of 2 - (6-m-acetoxyphenyl-3-oxohexyl)-2 - ethylcyclopentane-1,3-dione (18.0 g.) in benzene (40 cc.) during 1½ hours to stirred polyphosphoric acid (180 g., containing 80% phosphorus pentoxide) and maintain at 40–2°. Keep the reaction mixture at this temperature for a further hour with occasional stirring, add ice and water, and extract the product with ether. Evaporate the washed and dried extracts under reduced pressure to obtain a crude solid product (13.4 g.), containing 13β-ethyl-3-hydroxygona-1,3,5(10),8,14 - pentaen-17-one and its 3-acetate in a proportion indicated by spectroscopic analysis to be 7:3; ultraviolet absorption peak at 312 mμ ($\epsilon$ 12,700).

This 3-hydroxy compound has estrogenic activity, lowers the blood lipid level, and is useful as an intermediate for preparing the hormonal compounds of this invention.

EXAMPLE 107

13β-ethyl-3-acetoxygona-1,3,5(10),8,14-pentaen-17-one

Dissolve 13β-ethyl - 3- hydroxygona - 1,3,5(10),8,14-pentaen-17-one (2.45 g.) in pyridine (7 cc.) and acetic anhydride (4 cc.) and allow to stand at room temperature for 16 hours. Remove the solvent under reduced pressure, add ethanol (20 cc.) and again evaporate the solvent. Recrystallize the residue from ethanol to give a red crystalline solid, m.p. 122–4°. Filter the solid through "Florisil" (100 g.) with benzene, evaporate the solvent and recrystallize the product from ethanol to obtain 13β-ethyl-3-acetoxygona-1,3,5(10),8,14 - pentaen-17-one, m.p. 129–30° C.; ultraviolet absorption peak at 306 mμ ($\epsilon$ 25,500), infrared absorption peaks at 5.78μ, 8.27μ, and 9.85μ.

$C_{21}H_{22}O_3$ calculated: C, 78.25%; H, 6.9%. Found: C, 78.4%; H, 6.65%.

This compound has estrogenic activity, lowers the blood lipid level, and is useful as an intermediate for preparing the hormonal compounds of this invention.

EXAMPLE 108

13β-propyl-3-hydroxygona-1,3,5(10),8,14-pentaen-17-one

Cyclodehydrate 2-(6-m-hydroxyphenyl-3-oxohexyl)-2-n-propylcyclopentane-1,3-dione (7.18 g.) by heating in benzene (210 cc.) containing toluene-p-sulphonic acid (0.75 g.), to obtain a deep green gum (6.4 g.); chromatograph in benzene on a column of activated fuller's earth, to give a yellow gum. Crystallize from ethanol, and then from a mixture of benzene and light petroleum to obtain 13β-propyl-3-hydroxygona-1,3,5(10),8,14-pentaen-17-one (0.59 g.), m.p. 149–55° with some premelting at 135–8°; ultraviolet absorption peak at 313 mμ ($\epsilon$ 27,000).

This compound has estrogenic activity, lowers the blood lipid level, and is useful as an intermediate for preparing the hormonal compounds of this invention.

EXAMPLE 109

13β-ethyl-2,3-dimethoxygona-1,3,5(10),8,14-pentaen-17-one

Dissolve the crude triketone 2-[6-(3,4- dimethoxyphenyl)-3-oxohexyl]-2- ethylcyclopentane-1,3-dione (6.5 g.) in dry benzene (100 cc.) containing anhydrous toluene-p-sulphonic acid (2.4 g.) and reflux under a Dean-Stark water separator for 45 minutes. Wash the cooled solution with water, sodium carbonate solution, and water, and dry. Evaporate the solvent and distill the red gummy residue at 220° (bath temperature) 0.01 mm. to give a yellow gum; recrystallize from methanol to obtain 13β-ethyl-2,3-dimethoxygona-1,3,5(10),8,14-pentane - 17-one;

ultraviolet absorption peak at 314 m$\mu$ ($\epsilon$ 20,000); infrared absorption peaks at 5.84$\mu$ and 8.00$\mu$.

This compound has estrogenic activity, lowers the blood lipid level, and is useful as an intermediate for preparing the hormonal compounds of this invention.

EXAMPLE 110

13$\beta$-ethyl-1,3-dimethoxygona-1,3,5(10),8,14-pentaen-17-one

Using the triketone 2-[6-(3,5-dimethoxyphenyl)-3-oxohexyl]-2-ethylcyclopentane - 1,3 - dione (6.5 g.), proceed exactly as described in the preceding example to obtain 13$\beta$-ethyl - 1,3-dimethoxygona-1,3,5(10),8,14-pentaen-17-one; infrared absorption peaks at 5.74$\mu$ and 8.00$\mu$.

This compound has estrogenic activity, lowers the blood lipid level, and is useful as an intermediate for preparing the hormonal compounds of this invention.

EXAMPLE 111

13$\beta$-ethyl-3-ethoxygona-1,3,5(10),8,14-pentaen-17-one

Dissolve 13$\beta$ - ethyl-3-hydroxygona-1,3,5(10),8,14-pentaen-17-one (0.5 g.) in methanol (30 cc.) and add a slight excess of a solution of diazoethane in ether. Stir the mixture for 10 minutes, and decompose the excess diazoethane by the addition of acetic acid. Evaporate the reaction mixture to dryness, dissolve the residue in benzene, and filter through "Florex" (20 g.) with benzene. Evaporate the eluate to obtain 13$\beta$-ethyl-3-ethoxygona-1,3,5(10),8,14-pentaen-17-one; infrared absorption peak at 5.78$\mu$; ultraviolet absorption peak at 312 m$\mu$ ($\epsilon$ 27,200).

This compound has estrogenic activity, lowers the blood lipid level, and is useful as an intermediate for preparing the hormonal compounds of this invention.

EXAMPLE 112

13$\beta$-ethyl-3-benzyloxygona-1,3,5(10),8,14-pentaen-17-one

Treat 13$\beta$-ethyl - 3 - hydroxygona-1,3,5(10),8,14-pentaen-17-one (0.3 g.) in methanol (15 cc.) with an excess of an ethereal solution of phenyldiazomethane. Stir the solution for 3 hours and decompose the excess reagent by the addition of acetic acid. Evaporate the solution to dryness and take up the residue in ether; wash with saturated sodium bicarbonate solution and then water; dry and evaporate. Dissolve the product in benzene and filter through "Florisil" (25 g.); remove the eluate under reduced pressure to obtain 13$\beta$-ethyl-3-benzyloxygona-1,3,5(10),8,14-pentaen-17-one; ultraviolet absorption peaks at 310 m$\mu$ ($\epsilon$ 27,000).

This compound has estrogenic activity, lowers the blood lipid level, and is useful as an intermediate for preparing the hormonal compounds of this invention.

EXAMPLE 113

13$\beta$-methyl-3-methoxygona-1,3,5(10),8,11-pentaen-17$\beta$-ol

Add 13$\beta$-methyl-3-methoxygona-1,3,5(10),8,14 - pentaen-17-one (6.8 g.) in ethanol (300 cc.) to a solution of sodium borohydride (4.2 g.) in ethanol (200 cc.). Stir the mixture for 30 minutes at room temperature and then reflux for 45 minutes. After cooling and acidification with 1N acetic acid, remove most of the solvent under reduced pressure and extract the mixture with ether. Evaporate the washed and dried ethereal extract and distill the residue (6.7 g.) under reduced pressure (bath temp. 240°/0.0003 mm.), to obtain 13$\beta$-methyl-3-methoxygona-1,3,5 (10),8,14-pentaen-17$\beta$-ol as a pale yellow oil (4.9 g.); infrared absorption (KBr disc) showed a band due to hydroxyl (3.36$\mu$); ultraviolet absorption peak at 310 m$\mu$ ($\epsilon$ 19,800).

To prepare 7,13$\beta$-dimethyl-3-methoxygona-1,3,5(10,8, 14-pentaen-17$\beta$-ol treat 7,13$\beta$-dimethyl-3-methoxygona-1,3,5(10),8,14-pentaen-17-one with sodium borohydride according to the manipulative procedure described above.

To prepare 13$\beta$ - methylgona-1,3,5(10),8,14-pentaen-3, 17$\beta$-diol treat 13$\beta$-methyl - 3 - hydroxygona-1,3,5(10),8, 14-pentaen-17-one with sodium borohydride according to the manipulative procedure described above.

To prepare 13$\beta$-ethyl-2,3-dimethoxygona - 1,3,5(10),8, 14-pentaen-17$\beta$-ol treat 13$\beta$-ethyl-2,3-dimethoxygona-1,3, 5(10),8,14-pentaen-17-one with sodium borohydride according to the manipulative procedure described above.

To prepare 13$\beta$-isobutyl-3-pentyloxygona - 1,3,5(10),8, 14-pentaen-17$\beta$-ol treat 13$\beta$ - isobutyl-3-pentyloxygona-1,3,5(10),8,14-pentaen-17-one with sodium borohydride according to the manipulative procedure described above.

To prepare 13$\beta$ - (3 - dimethylaminopropyl) - 1,3 - dimethoxygona-1,3,5(10),8,14-pentaen-17$\beta$-ol treat 13$\beta$-(3-dimethylaminopropyl)-1,3-dimethoxygona - 1,3,5(10),8, 14-pentaen-17-one with sodium borohydride according to the manipulative procedure described above.

These compounds have estrogenic activity, lower the blood lipid level, and are useful as intermediates in the preparation of the hormonal compounds of the invention.

EXAMPLE 114

13$\beta$-ethyl-3-methoxygona-1,3,5(10),8,14-pentaen-17$\beta$-ol

Treat 13$\beta$ - ethyl - 3-methoxygona-1,3,5(10),8,14-pentaen-17-one (8 g.) in ethanol (200 cc.) with a solution of sodium borohydride (1.4 g.) in ethanol (120 cc.), and stir the mixture at room temperature for 20 hours. Add 50% aqueous acetic acid (40 cc.) and evaporate the mixture to dryness under reduced pressure. Add water (300 cc.) to the residue, and extract the mixture with ether. Evaporate the washed and dried extracts and distill the residual oil at 170–210° (bath temp.)/0.0003 mm. to obtain 13$\beta$ - ethyl - 3-methoxygona-1,3,5(10),8,14-pentaen-17$\beta$-ol (5.8 g.).

This compound has estrogenic activity, lowers the blood lipid level and is useful as an intermediate for preparing the hormonal compounds of this invention.

EXAMPLE 115

13$\beta$-isopropyl-3-methoxygona-1,3,5(10),8,14-pentaen-17-ol

Reduce 13$\beta$ - isopropyl-3-methoxygona-1,3,5(10),8,14-pentaen-17-one exactly as described in the previous example to obtain 13$\beta$ - isopropyl-3-methoxygona-1,3,5(10),8, 14-pentaen-17$\beta$-ol as a gum; ultraviolet absorption peak at 312 m$\mu$ ($\epsilon$ 25,800).

This compound has estrogenic activity, lowers the blood lipid level, and is useful as an intermediate for preparing the hormonal compounds of this invention.

EXAMPLE 116

13$\beta$-cetyl-3-methoxygona-1,3,5(10),8,14-pentaen-17$\beta$-ol

To a solution of 13$\beta$-cetyl-3-methoxygona-1,3,5(10),8, 14-pentaen-17-one (2.45 g.) in ethanol (65 cc.) add a solution of sodium borohydride (0.775 g.) in ethanol (65 cc.), and stir the mixture at room temperature for 30 minutes, then reflux for 3 hours and finally cool. Treat with aqueous acetic acid and work up to obtain a dark red gum (2.2 g.), which one takes up in a mixture of equal volumes of benzene and light petroleum ether and passes through a column of activated fuller's earth (160 g.); elute with benzene; evaporate the eluate to obtain 13$\beta$-cetyl - 3-methoxygona-1,3,5(10),8,14-pentaen-17$\beta$-ol as a yellow gum (1.2 g.); infrared absorption peak at 3.00 (hydroxyl), no band in the 5.71–5.88$\mu$ region. Ultraviolet absorption peak at 310 m$\mu$ ($\epsilon$ 25,000).

$C_{34}H_{52}O_2$ calculated: C, 82.85%; H, 10.65%. Found: C, 82.95%; H, 10.85%.

This compound has estrogenic activity, lowers the blood lipid level, and is useful as an intermediate for preparing the hormonal compounds of this invention.

EXAMPLE 117

13β-ethylgona-1,3,5(10),8,14-pentaene-3,17β-diol

Reflux 13β - ethyl - 3-hydroxygona-1,3,5(10),8,14-pentaen-17-one (0.6 g.) in ethanol (30 cc.) with sodium borohydride (0.3 g.) for 30 minutes. Acidify the cooled solution with acetic acid and evaporate almost to dryness under reduced pressure. Add water, extract the product with ether, and wash, dry and evaporate the ethereal solution. Recrystallize the residue from chloroform to obtain 13β - ethylgona-1,3,5(10),8,14-pentaene-3,17β-diol, m.p. 135–6° C.; ultraviolet absorption peak at 310 mμ (ε 20,000).

This compound has estrogenic activity, lowers the blood lipid level, and is useful as an intermediate for preparing the hormonal compounds of this invention.

EXAMPLE 118

13β-propylgona-1,3,5(10),8,14-pentaene-3,17β-diol

Reduce 13β - propyl-3-hydroxygona-1,3,5(10),8,14-pentaen-17-one (0.6 g.) exactly as described in the previous example to obtain 13β - propylgona-1,3,5(10),8,14-pentaene - 3,17β-diol; ultraviolet absorption peak at 311 mμ (ε 21,000).

This compound has estrogenic activity, lowers the blood lipid level, and is useful as an intermediate for preparing the hormonal compounds of this invention.

EXAMPLE 119

13β-ethyl-3-ethoxygona-1,3,5(10),8,14-pentaen-17β-ol

Reflux 13β - ethyl-3-ethoxygona-1,3,5(10),8,14-pentaen-17-one (0.3 g.) with sodium borohydride (0.1 g.) in ethanol (15 cc.) for 30 minutes. Acidify the cooled solution with acetic acid and evaporate almost to dryness. Add water and extract the product with ether. Wash, dry and evaporate the ethereal solution to obtain as residue 13β - ethyl-3-ethoxygona-1,3,5(10),8,14-pentaen-17β-ol as a gum; ultraviolet absorption peak at 312 mμ (ε 27,600).

This compound has estrogenic activity, lowers the blood lipid level, and is useful as an intermediate for preparing the hormonal compounds of this invention.

EXAMPLE 120

13β-ethyl-3-benzyloxygona-1,3,5(10),8,14-pentaen-17β-ol

Reflux 13β - ethyl-3-benzyloxygona-1,3,5(10),8,14-pentaen-17-one (0.5 g.) with sodium borohydride (0.15 g.) in ethanol (40 cc.) for 30 minutes. Acidify the cooled solution with acetic acid and evaporate almost to dryness under reduced pressure. Add water and extract the product with ether. Wash, dry and evaporate the ethereal solution to obtain as residue 13β-ethyl-3-benzyloxygona-1,3,5(10), 8,14-pentaen-17β-ol; ultraviolet absorption peak at 310 mμ (ε 24,800).

This compound has estrogenic activity, lowers the blood lipid level, and is useful as an intermediate for preparing the hormonal compounds of this invention.

EXAMPLE 121

13β-ethyl-3,17β-dimethoxygona-1,3,5(10),8,14-pentaene

Methylate 13β-ethyl-3-methoxygona - 1,3,5(10),8,14-pentaen-17β-ol (1 g.) in methylene chloride (50 cc.) containing one drop of boron trifluoride etherate with diazomethane (from N-nitrosomethylurea 2.05 g.) in methylene chloride (40 cc.). Work up to obtain a gum which one chromatographs on neutral alumina. Recrystallize the benzene-hexane (1:1)-eluted material from methanol-ethyl acetate to obtain 13β-ethyl-3,17β-dimethoxygona-1,3,5(10),8,14-pentaene (.4 g.), m.p. 59–61°; infrared absorption peaks at 6.25μ, 6.41 μ, and 6.45μ; ultraviolet absorption peak at 312 mμ (ε 29,000).

$C_{21}H_{26}O_2$ calculated: C, 81.25%; H, 8.4%. Found: C, 80.9%; H, 8.4%.

This compound has estrogenic activity, lowers the blood lipid level, and is useful as an intermediate for preparing the hormonal compounds of this invention.

EXAMPLE 122

13β-ethyl-3-methoxy-17β-acetoxygona-1,3,5(10),8,14-pentaene

To a solution of 13β-ethyl-3-methoxygona-1,3,5(10), 8,14-pentaen-17β-ol (2 g.) in pyridine (15 cc.) add acetic anhydride (15 cc.) and allow the mixture to stand at room temperature for 20 hours. After pouring into icewater, extract the mixture with ether. Wash the ether solution with hydrochloric acid, sodium bicarbonate, and water, and dry. After removal of the solvent, distill the residue at 0.05 mm. (185–195° bath temp.). Crystallize the distillate from methanol to obtain 13β-ethyl-3-methoxy-17β-acetoxygona-1,3,5(10),8,14-pentaene (1.1 g., 54.4%), m.p. 89–90°.

Infrared absorption peaks at 5.75μ, 8.08μ.

$C_{22}H_{26}O_3$ calculated: C, 78.0%; H, 7.7%. Found: C, 78.2%; H, 8.0%.

This compound has estrogenic activity, lowers the blood lipid level, and is useful as an intermediate for preparing the hormonal compounds of this invention.

EXAMPLE 123

13β-ethyl-3-methoxy-17β-benzoyloxygona-1,3,5(10),8,14-pentaene

Add benzoyl chloride (2 g.) in benzene (10 cc.) to 13β-ethyl-3-methoxygona - 1,3,5(10),8,14-pentaen-17β-ol (2 g.) in pyridine (10 cc.) at 5°. Keep the mixture for 24 hours, then add to crushed ice and extract with ether. Evaporate the washed and dried extracts to obtain a residue. Recrystallize from 95% ethanol to obtain 13β-ethyl-3 - methoxy - 17β - benzoyloxygona - 1,3,5(10),8,14-pentaene, m.p. 99–101°.

$C_{27}H_{28}O_3$ calculated: C, 81.0%; H, 7.05%. Found: C, 81.0%; H, 7.1%.

To prepare 13β-methyl-3-methoxy-17β-acetoxygona- 1, 3,5(10),8,14-pentaene treat 13β-methyl-3-methoxygona-1,3,5(10),8,14-pentaen-17β-ol with acetic anhydride according to the manipulative procedure described above.

To prepare 13β-methyl-3-methoxy-17β-benzoyloxygona-1,3,5(10),8,14-pentaene treat 13β - methyl-3-methoxygona-1,3,5(10),8,14-pentaen-17β-ol with benzoyl chloride according to the manipulative procedure described above.

These compounds have estrogenic activity, lower the blood lipid level, and are useful as intermediates in the preparation of the hormanal compounds of the invention.

EXAMPLE 124

13β-ethyl-3,17β-diacetoxygona-1,3,5(10),8,14-pentaene

Dissolve 13β-ethylgona-1,3,5(10),8,14-pentaene-3,17β-diol (0.397 g.) in pyridine (7 cc.) and acetic anhydride (4 cc.) and allow the mixture to stand at room temperature for 16 hours. Remove the solvent in vacuo, and dissolve the residue in a little benzene; filter through a short column of "Florisil." Evaporate the solvent and recrystallize from aqueous ethanol to obtain 13β-ethyl-3, 17β-diacetoxygona-1,3,5(10),8,14-pentaene, m.p. 86–9°, infrared absorption peaks at 5.73μ, 5.88μ; ultraviolet absorption peak at 306 mμ (ε 25,000).

This compound has estrogenic activity, lowers the blood lipid level, and is useful as an intermediate for preparing the hormonal compounds of this invention.

EXAMPLE 125

13β-propyl-3-methoxy-17β-acetoxygona-1,3,5(10),8,14-pentaene

Esterify 13β - propyl-3-methoxygona-1,3,5(10),8,14-pentaen-17β-ol (2 g.) with acetic anhydride to obtain a product which one recrystallizes from methanol to obtain 13β-propyl-3-methoxy - 17β - acetoxygona-1,3,5(10),8,14-pentaene (1.5 g.), m.p. 95–96°.

$C_{23}H_{28}O_3$ calculated: C, 78.4%; H, 8.4%. Found: C, 78.2%; H, 7.8%.

This compound has estrogenic activity, lowers the blood lipid level and is useful as an intermediate for preparing the hormonal compounds of this invention.

EXAMPLE 126

13β-propyl-3-methoxy-17β-propionoxygona-1,3,5 (10),8,14-pentaene

Add propionic anhydride (15 cc.) to 13β-propyl-3-methoxygona-1,3,5(10),8,14-pentaene-17β-ol (2 g.) in pyridine (10 cc.) and keep the mixture at room temperature overnight, then pour onto crushed ice and extract with ether. Evaporate the washed and dried extracts to a residue. Recrystallize from methanol to obtain 13β-propyl-3-methoxy - 17β - propionoxygona-1,3,5(10),8,14-pentaene (1.3 g.), m.p. 104°.

$C_{24}H_{30}O_3$ calculated: C, 78.65%; H, 8.25%. Found: C, 78.85%; H, 8.3%.

This compound has estrogenic activity, lowers the blood lipid level, and is useful as an intermediate for preparing the hormonal compounds of this invention.

EXAMPLE 127

13β-propyl-3-methoxy-17β-benzoyloxygona-1,3,5(10),8,14-pentaene

Esterify 13β - propyl-3-methoxygona-1,3,5(10),8,14-pentaen-17β-ol (1 g.) with benzoyl chloride to obtain a product which on recrystallization from 95% ethanol gives 13β-propyl - 3 - methoxy-17β-benzoyloxygona-1,3,5(10),8,14-pentaene.

$C_{28}H_{30}O_3$ calculated: C, 81.1%; H, 7.3%. Found: C, 81.0%; H, 7.2%.

This compound has estrogenic activity, lowers the blood lipid level, and is useful as an intermediate for preparing the hormonal compounds of this invention.

EXAMPLE 128

13β-ethyl-3-methoxy-17-acetoxygona-1,3,5(10),16-tetraene

Distill 13β-ethyl-3-methoxygona-1,3,5(10)-trien-17-one (5.97 g.), p-toluenesulphonic acid (1 g.) and isopropenyl acetate (90 cc.) slowly through a Vigreux column over a period of 12 hours, by which time the solution (ca. 40 cc.) has become dark brown in color. Cool the reaction mixture, dilute with ether (150 cc.), and wash with aqueous sodium bicarbonate and water, and dry. Evaporate the solvent and filter the residue through "Florisil" (65 g.) with petroleum ether. Evaporate the eluate, recrystallize the residue from benzene-petroleum ether to obtain 13β - ethyl-3-methoxy-17-acetoxygona-1,3,5(10),16-tetraene, m.p. 136–9°; infrared absorption peak at 5.70:, ultraviolet absorption peaks at 218 mμ (ε 11,400), 279 mμ (ε 2,040), 287 mμ (ε 1,890).

This compound has estrogenic activity, lowers the blood lipid level, and is useful as an intermediate for preparing the hormonal compounds of this invention.

EXAMPLE 129

13β-ethyl-3,17β-dibenzoyloxygona-1,3,5(10),8,14-pentaene

Dissolve 13β-ethylgona-1,3,5(10),8,14-pentaene-3,17β-diol (0.35 g.) in pyridine (5 cc.) and benzoyl chloride (1 ml.) and allow the solution to stand at room temperature for 48 hours. Add water and extract the mixture with ether. Wash the ethereal solution with water, 10% aqueous potassium hydroxide, water, 10% hydrochloric acid, and brine, and dry. Evaporate the solvent and filter the residue through alumina (20 g.) with benzene. Evaporate the solvent and crystallize the residue from ethanol to obtain 13β-ethyl-3,17β-dibenzoyloxygona-1,3,5(10),8,14-pentaen; ultraviolet absorption peak at 304 mμ (ε 26,000).

This compound has estrogenic activity, lowers the blood lipid level, and is useful as an intermediate for preparing the hormonal compounds of this invention.

EXAMPLE 130

13β-ethyl-3-ethoxy-17β-acetoxygona-1,3,5(10),8,14-pentaene

Dissolve 13β - ethyl-3-ethoxygona-1,3,5(10),8,14-pentaen-17β-ol (0.5 g.) in pyridine (3 cc.) and acetic anhydride (3 cc.) and allow the mixture to stand at room temperature for 15 hours. Remove the solvent in vacuo and extract the product with ether. Wash, dry and evaporate the ethereal solution and recrystallize the residue from methanol to obtain 13β-ethyl-3-ethoxy-17β-acetoxygona-1,3,5(10),8,14-pentaene; ultraviolet absorption peak at 311 mμ (ε 27,400).

This compound has estrogenic activity, lowers the blood lipid level, and is useful as an intermediate for preparing the hormonal compounds of this invention.

EXAMPLE 131

13β-ethyl-3-ethoxy-17β-benzoyloxygona-1,3,5(10),8,14-pentaene

Dissolve 13β - ethyl-3-ethoxygona-1,3,5(10),8,14-pentaen-17β-ol (0.2 g.) in pyridine (4 cc.) and benzoyl chloride (0.75 cc.) and allow the mixture to stand at room temperature for 24 hours. Add water (10 cc.) and stir the mixture for a further hour. Add more water and extract the product with ether. Wash, dry and evaporate the ethereal solution and crystallize the residue from ethanol to obtain 13β-ethyl-3-ethoxy-17β-benzoyloxygona-1,3,5(10),8,14-pentaene; ultraviolet absorption peak at 312 mμ (ε 25,000).

This compound has estrogenic activity, lowers the blood lipid level, and is useful as an intermediate for preparing the hormonal compounds of this invention.

EXAMPLE 132

13β-ethyl-3-benzyloxy-17β-acetoxygona-1,3,5(10),8,14-pentaene

Dissolve 13β - ethyl-3-benzyloxygona-1,3,5(10),8,14-pentaen-17β-ol (0.1 g.) in pyridine (0.5 cc.) and acetic anhydride (0.5 cc.) and allow the mixture to stand at room temperature for 16 hours. Remove the solvent in vacuo and extract the product with ether. Wash, dry and evaporate the ethereal solution, recrystallize the residue from methanol to obtain 13β-ethyl-3-benzyloxy-17β-acetoxygona-1,3,5(10),8,14-pentaene; ultraviolet absorption peak at 310 mμ (ε 25,300).

This compound has estrogenic activity, lowers the blood lipid level, and is useful as an intermediate for preparing the hormonal compounds of this invention.

EXAMPLE 133

13β-ethyl-3-benzyloxy-17β-benzoyloxygona-1,3,5(10),8,14-pentaene

Dissolve 13β - ethyl-3-benzyloxygona-1,3,5(10),8,14-pentaen-17β-ol (0.1 g.) in pyridine (2 cc.) and benzoyl chloride (0.55 cc.) and allow the mixture to stand at room temperature for 24 hours. Add water (20 cc.) and stir the mixture for a further hour. Extract the product with ether and wash, dry and evaporate the ethereal solution. Filter through "Florisil" (10 g.) with benzene. Evaporate the solvent and recrystallize the residue from methanol to obtain 13β-ethyl-3-benzyloxy-17β-benzoyloxygona-1,3,5(10),8,14-pentaene. Ultraviolet absorption peak at 310 mμ (ε 24,800).

This compound possesses estrogenic and blood lipid lowering activity and is useful as an intermediate for preparing the hormonal compounds of this invention.

EXAMPLE 134

13β-methyl-3-methoxy-17a,17a-ethylenedioxy-D-homogona-1,3,5(10),8,14-pentaene

Reflux 13β-methyl-3-methoxy-D-homogona-1,3,5(10),8,14-pentaen-17a-one (0.3 g.) in benzene (20 cc.) containing ethylene glycol (1 cc.) and anhydrous toluene-$p$-sulphonic acid (0.05 g.) for 18 hours using a Dean-Stark trap. Isolate the product to obtain a gum which is dissolved in benzene (2 cc.), wash through alumina (25 g.) with light petroleum containing 20% benzene. Evaporate the solvent to obtain a solid; recrystallize from light petroleum containing a little ether to obtain 13β-methyl-3-methoxy - 17a,17a-ethylenedioxy-D-homogona-1,3,5(10),8,14-pentaene (0.145 g.), m.p. 123–6°; ultraviolet absorption peak at 311 mµ (ε 24,000); no ketone absorption in the infrared.

To prepare 13β-isobutyl-3-methoxy-17,17-ethylenedioxygona-1,3,5(10),8,14-pentaene treat 13β-isobutyl-3-methoxygona-1,3,5(10),8,14-pentaen-17-one with anhydrous toluene-p-sulphonic acid, ethylene glycol, and benzene according to the manipulative procedure described above.

To prepare 13β-methyl-3-methoxy-17,17-ethylenedioxygona-1,3,5(10),8,14-pentaene treat 13β-methyl-3-methoxygona - 1,3,5(10),8,14 - pentaen - 17 - one with anhydrous toluene p-sulphonic acid, ethylene glycol, and benzene according to the manipulative procedure described above.

To prepare 13β-ethyl-1,3-dimethoxy-17,17-ethylenedioxygona-1,3,5(10),8,14-pentaene treat 13β-ethyl-1,3-dimethoxygona-1,3,5(10),8,14-pentaen-17-one with anhydrous toluene-p-sulphonic acid, ethylene glycol, and benzene according to the manipulative procedure described above.

To prepare 13β-phenethyl-3-propoxy-17,17-ethylenedioxygona-1,3,5(10),8,14-pentaene treat 13β-phenethyl-3-propoxygona-1,3,5(10),8,14-pentaene-17-one with anhydrous toluene-p-sulphonic acid, ethylene glycol, and benzene according to the manipulative procedure described above.

To prepare 13β-(3-hydroxypropyl)-3-cyclopentyloxy-17,17-ethylenedioxygona-1,3,5(10),8,14-pentaene treat 13β-(3 - hydroxypropyl) - 3 - cyclopentyloxygona-1,3,5(10),8,14-pentaen-17-one with anhydrous toluene-p-sulphonic acid, ethylene glycol, and benzene according to the manipulative procedure described above.

These compounds have estrogenic activity, lower the blood lipid level, and are useful as intermediates in the preparation of the hormonal compounds of the invention.

EXAMPLE 135

13β-methyl-3-methoxy-17,17-ethylenedioxygona-1,3,5(10),8,14-pentaene

Reflux 13β - methyl - 3 - methoxygona - 1,3,5(10),8,14-pentaen-17-one (5.0 g.) in benzene (560 cc.) containing ethylene glycol (50 cc.) and anhydrous toluene-$p$-sulphonic acid (from the monhydrate, 1.6 g.) for 19 hours using a Dean-Stark trap to remove the water formed. Wash the cooled mixture to remove acid, dry and evaporate the solvent to obtain a pink gum; crystallize the gum from ethanol to obtain 13β-methyl-3-methoxy-17,17-ethylenedioxygona-1,3,5(10),8,14-pentaene (4.7 g.), m.p. 94–7°. High vacuum distillation of a sample of the ketal and recrystallization of the distillate from ethanol gives material, m.p. 93–95.5°; ultraviolet absorption peak at 310 mµ (ε 31,000); no infrared band in the 5.71–5.88µ region.

$C_{21}H_{24}O_3$ calculated: C, 77.8%; H, 7.5%. Found: C, 77.7%; H, 7.2%.

This compound has estrogenic activity, lowers the blood lipid level, and is useful as an intermediate for preparing the hormonal compounds of this invention.

EXAMPLE 136

13β-methyl-3-methoxy-17,17-propylenedioxygona-1,3,5(10),8,14-pentaene

Reflux 13β - methyl - 3 - methoxygona - 1,3,5(10),8,14-pentaen-17-one (3.0 g.) in benzene (550 cc.) containing propane-1,3-diol (50 cc.) and anhydrous toluene-$p$-sulphonic acid (from the monhydrate, 0.96 g.) for 19 hours using a Dean-Stark trap. Isolate the product to obtain a material which one recrystallizes from methanol to obtain 13β-methyl-3-methoxy-17,17-propylenedioxygona-1,3,5(10),8,14-pentaene (0.85 g.), m.p. 127–37°; a portion sublimes at 110°/10⁻³ mm. to give the purified ketal, m.p. 136–41°; ultraviolet absorption peak at 310 mµ (ε 27,900); no infrared band in the 5.71–5.88µ region.

$C_{22}H_{26}O_3$ calculated: C, 78.1%; H, 7.7%. Found: C, 78.0%; H, 7.7%.

This compound has estrogenic activity, lowers the blood lipid level, and is useful as an intermediate for preparing the hormonal compounds of this invention.

EXAMPLE 137

13β-methyl-3-methoxy-17,17-(2,2-dimethylpropylenedioxy)gona-1,3,5(10),8,14-pentaene Reflux 13β - methyl - 3 - methoxygona - 1,3,5(10),8,14-pentaen-17-one (3.0 g.) in benzene (560 cc.) containing 2,2-dimethylpropane-1,3-diol (10.4 g.) and anhydrous toluene-$p$-sulphonic acid (from the monhydrate, 0.96 g.) for 19 hours using a Dean-Stark trap. Isolate the product to obtain a material which one recrystallizes from methanol containing a small proportion of acetone, to obtain 13β - methyl - 3 - methoxy - 17,17 - (2,2 - dimethylpropylenedioxy)gona-1,3,5(10),8,14-pentaene (2.44 g.), m.p. 115–7°; ultraviolet peak at 311 mµ (ε 29,900); no infrared band in the 5.71–5.88µ region.

$C_{24}H_{30}O_3$ calculated: C, 78.65%; H, 8.25%. Found: C, 78.5%; H, 8.4%.

This compound has estrogenic activity, lowers the blood lipid level, and is useful as an intermediate for preparing the hormonal compounds of this invention.

EXAMPLE 138

13β-ethyl-3-methoxy-17,17-ethylenedioxygona-1,3,5(10),8,14-pentaene

Add a solution of 2-ethyl-2-(6-$m$-methoxyphenyl-3-oxohexyl)-1,3-cyclopentanedione (3.8 g.) in benzene (25 cc.) to a mixture of anhydrous toluene-$p$-sulphonic acid (1 g.) and benzene (50 cc.) and reflux the mixture for 1 hour using a Dean-Stark trap. Add ethylene glycol (26 cc.) and benzene (150 cc.) and continue refluxing for 20 hours. Wash the cooled product to remove acid, dry and evaporate. Treat the residual oil with a mixture of ether (30 cc.) and hexane (10 cc.), induce crystallization; filter off the crystalline product and distill (bath temp. 190°/0.0002 mm.). Crystallize the distillate from ethanol (20 cc.) to obtain the ketal 13β-ethyl-3-methoxy-17,17-ethylenedioxygona-1,3,5(10),8,14-pentaene (0.9 g.), m.p. 127°; ultraviolet absorption peak at 312 mµ (ε 31,200); no infrared band in the 5.71–5.88µ region.

$C_{22}H_{26}O_3$ calculated: C, 78.05%; H, 7.75%. Found: C, 78.0%; H, 7.75%.

This compound has estrogenic activity, lowers the blood lipid level, and is useful as an intermediate for preparing the hormonal compounds of this invention.

EXAMPLE 139

13β-ethyl-3-methoxy-17,17-ethylenedioxygona-1,3,5,(10),8,14-pentaene

Add a solution of 2-ethyl-2-(6-$m$-methoxyphenyl-3-oxohexyl)-1,3-cyclopentanedione (11.4 g.) in a dry benzene, (150 cc.) to a mixture of anhydrous toluene-$p$-sulphonic acid (14.4 g.) and dry benzene (350 cc.) and stir the mixture for 1 hour at room temperature. Add Ethylene glycol (78 cc.) and reflux the mixture for 16 hours; wash the cooled product to remove acid, dry and evaporate to obtain an oil which one then distills (bath temp. 190°/0.0002 mm.). Crystallize the distillate from ethanol to obtain the ketal 13β-ethyl-3-methoxy-17,17-ethylenedioxygona-1,3,5(10),8,14-pentaene, m.p. 125°.

This compound has estrogenic activity, lowers the blood lipid level, and is useful as an intermediate for preparing the hormonal compounds of this invention.

EXAMPLE 140

13β-ethyl-3-methoxy-17,17-ethylenedioxygona-1,3,5,(10),8,14-pentaene

Reflux a mixture of benzene (1560 cc.), ethylene glycol (345 cc.), and toluene-p-sulphonic acid monohydrate (16.0 g.) using a Dean-Stark trap, until no more water is collected. Cool the solution to room temperature and rapidly add 13β-ethyl - 3 - methoxygona-1,3,5(10),8,14-pentaen-17-one (50 g.) in benzene (660 cc.) to the vigorously stirred mixture in an atmosphere of nitrogen. Continue vigorous stirring while refluxing the mixture for 20 hours. Separate the excess ethylene glycol layer from the cooled mixture and wash the benzene layer, first with aqueous sodium carbonate and then with brine, and dry over anhydrous magnesium sulphate. Evaporate the filtered solution and distill the residue at 210–20°/0.006 mm., to obtain a gum which crystallizes from ethanol to obtain the ethylene ketal (42.2 g.,) m.p. 125–7°.

This compound has estrogenic activity, lowers the blood lipid level, and is useful as an intermediate for preparing the hormonal compounds of this invention.

EXAMPLE 141

13β-ethyl-3-methoxy-17,17-(2,2-dimethylpropylenedioxy)gona-1,3,5(10),8,14-pentaene Reflux 13β-ethyl - 3 - methoxygona-1,3,5(10),8,14-pentaen-17-one (3.0 g.) in benzene (600 cc.) containing 2,2-dimethylpropane-1,3-diol (10.4 g.) and anhydrous toluene-p-sulphonic acid (from the monhydrate, 0.96% g.) for 18 hours and isolate product as in the previous example. Crystallize the product from methanol containing a small proportion of acetone to obtain the title product (2.13 g.), m.p. 97–100°; ultraviolet absorption peak at 311 mμ (ε 29,400); no infrared band in the 5.71–5.88μ region.

$C_{25}H_{32}O_3$ calculated: C, 78.9%; H, 8.5%. Found: C, 78.7%; H, 8.6%.

This compound has estrogenic activity, lowers the blood lipid level, and is useful as an intermediate for preparing the hormonal compounds of this invention.

EXAMPLE 142

13β-propyl-3-methoxy-17,17-ethylenedioxygona-1,3,5(10),8,14-pentaene

Reflux 13β-propyl-3-methoxygona-1,3,5(10),8,14-pentaen-17-one (5.0 g.) in benzene (100 cc.), anhydrous toluene-p-sulphonic acid (from the monohydrate, 1.6 g.) and ethylene glycol (50 cc.) for 19 hours using a Dean-Stark trap. Separate the ethylene glycol layer, wash the benzene layer free of acid, dry and evaporate; crystallize the residue from methanol, then from a mixture of methanol (30 cc.) and ethyl acetate (5 cc.) with charcoaling; crystallize the product (2.6 g.) from a mixture of acetone (5 cc.) and methanol (25 cc.) to obtain the title product (2.3 g.), m.p. 106–8°; ultraviolet absorption peak at 310 mμ (ε 29,200); no infrared band in the 5.56–6.25μ region.

$C_{23}H_{28}O_3$ calculated: C, 78.4%; H, 8.0%. Found: C, 78.4%; H, 7.7%.

This compound has estrogenic activity, lowers the blood lipid level, and is useful as an intermediate for preparing the hormonal compounds of this invention.

EXAMPLE 143

13β-propyl-3-methoxy-17,17-ethylenedioxygona-1,3,5(10),8,14-pentaene

Stir a solution of 2-propyl-2(6-m-methoxyphenyl-3-oxohexyl)cyclopentane-1,3-dione (10.0 g.) in benzene (460 cc.), containing anhydrous toluene-p-sulphonic acid (from the monohydrate, 12.6 g.) for 1½ hours at room temperature; add ethylene glycol (68 cc.) and reflux the mixture for 19 hours using a Dean-Stark trap. Separate the ethylene glycol layer and wash the benzene layer to remove acid; dry and evaporate the benzene, distill the residue to obtain a gum, b.p. 170–230°/10⁻⁴ mm.; crystallize from a mixture of acetone (10 cc.) and methanol (40 cc.), to obtain the title product (4.2 g.), m.p. 104–6°.

This compound has estrogenic atcivity, lowers the blood lipid level, and is useful as an intermediate for preparing the hormonal compounds of the invention.

EXAMPLE 144

13β-butyl-3-methoxy-17,17-ethylenedioxygona-1,3,5(10),8,14-pentaene

Carry out the reaction as in the previous example but use the corresponding trione having a 2-butyl group (10.0 g.). Isolate the product as before to obtain on evaporation a gum which one crystallizes from methanol containing a small proportion of acetone to obtain a material (1.8 g.), m.p. 85–90°, with infrared showing ketone impurity. Remove ketone by heating with pyridine and a little hydroxylamine hydrochloride; remove the pyridine by evaporation, dilute with benzene and chromatograph on neutral alumina. Elute with benzene and recrystallize from methanol to obtain the title product (0.8 g.), m.p. 94–7°; ultraviolet absorption peak at 311 mμ (ε 28,700); no infrared band in the 5.71–5.88μ region.

$C_{24}H_{30}O_3$ calculated: C, 78.65; H, 8.25%. Found: C, 78.8; H, 8.0%.

This compound has estrogenic activity, lowers the blood lipid level, and is useful as an intermediate for preparing the hormonal compounds of this invention.

EXAMPLE 145

13β-cetyl-3-methoxy-17,17-ethylenedioxygona-1,3,5(10),8,14-pentaene

Add a solution of 13β-cetyl-3-methoxygona-1,3,5(10),8,14-pentaen-17-one (2.5 g.) in benzene (50 cc.) to a mixture of anhydrous toluene-p-sulphonic acid (from the monohydrate, 2.5 g.), ethylene glycol (25 cc.) and benzene (150 cc.). Reflux the mixture for 14 hours, and wash the cooled product to remove acid; dry and evaporate. Take up the resulting gum in benzene and pass through activated fuller's earth to remove impurity. Remove traces of ketonic material by heating the evaporated product for 30 minutes with a small amount of pyridine and hydroxylamine hydrochloride, followed by dilution with benzene (20 cc.) and filtration through an activated fuller's earth. Evaporate the solvent to obtain the title product (2.2 g.), as a colorless gum; ultraviolet absorption peak at 310 mμ (ε 26,400); no infrared band in the 5.71–5.88μ region.

$C_{36}H_{54}O_3$ calculated: C, 80.85%; H, 10.1%. Found: C, 81.12%; H, 10.1%.

This compound is useful as an intermediate for preparing the hormonal compounds of this invention.

EXAMPLE 146

13β-methyl-3-methoxy-D-homogona-1,3,5(10),8-tetraen-17a-one

To 13β-methyl - 3 - methoxy-D-homogona-1,3,5(10),8,14-pentaen-17a-one (0.3 g.) in dioxan (20 cc.) add a moderately active Raney nickel catalyst (ca. 0.2 g.). Hydrogenate at room temperature and atmospheric pressure until 24 cc. hydrogen has been absorbed. Filter off the catalyst and evaporate the filtrate to obtain a solid; recrystallize from a mixture of ethanol and ethyl acetate to obtain the title product (0.15 g.), m.p. 120–50° C. Ultraviolet absorption peak at 275 mμ (ε 14,000).

This compound has estrogenic activity, lowers the blood lipid level, and is useful as an intermediate for preparing the hormonal compounds of this invention.

EXAMPLE 147

13β-methyl-3-methoxygona-1,3,5(10),8-tetraen-17-one

Dissolve 13β-methyl - 3 - methoxygona-1,3,5(10),8,14-pentaen-17-one (1 g.) in dioxan (33 cc.). To the solution add Raney nickel catalyst (ca. 0.5 g.) which has been prepared by the method of Pavlic and Adkins, *J. Amer. Chem. Soc.*, 1946, 68, 1471 and allow to stand for 24 hours. Hydrogenate at room temperature and pressure until the theoretical amount of hydrogen (92 cc.) for saturation of one ethylenic linkage has been absorbed. Towards the end of this period (5 hours) the rate of hydrogenation drops markedly. Evaporate the solvent after removal of catalyst to obtain a gum which readily crystallizes. Recrystallize once from ethanol to obtain the crude title product (0.69 g.), m.p. 110–20°; ultraviolet absorption peak at 278 mμ (ε 14,700).

This compound has estrogenic activity, lowers the blood lipid level, and is useful as an intermediate for preparing the hormonal compounds of this invention.

EXAMPLE 148

13β-methyl-3-methoxygona-1,3,5(10),8-tetraen-17-one

Shake 13β-methyl - 3 - methoxygona-1,3,5(10),8,14-pentaen-17-one (1 g.) in benzene (35 cc.) with a 10% palladium on barium sulphate catalyst (0.3 g.) in the presence of hydrogen at atmospheric pressure until 90 cc. hydrogen has been absorbed. By the end of this period (1½ hours) the rate of hydrogenation will have slowed down. Filter the mixture and evaporate the solvent to obtain a gum which solidifies; recrystallize from ethanol to obtain the title product (0.68 g.), m.p. 110–20°; ultraviolet absorption peak at 278 mμ (ε 3,200).

This compound has estrogenic activity, lowers the blood lipid level, and is useful as an intermediate for preparing the hormonal compounds of this invention.

EXAMPLE 149

13β-ethyl-3-methoxy-D-homogona-1,3,5(10),8-tetraen-17a-one

Shake 13β-ethyl - 3 - methoxy-D-homogona-1,3,5(10),8,14-pentaen-17a-one (1.175 g.) in tetrahydrofuran (100 cc.) with 2% palladium or calcium carbonate (0.5 g., pre-reduced) in an atmosphere of hydrogen until one molecular equivalent of hydrogen has been absorbed. Filter the catalyst; evaporate the solvent, recrystallize the residue from ethanol to obtain the title product (0.925 g.), m.p. 104–107°; ultraviolet absorption peak at 278 mμ (ε 15,680).

This compound has estrogenic activity, lowers the blood lipid level, and is useful as an intermediate for preparing the hormonal compounds of this invention.

EXAMPLE 150

13β-ethyl-3-methoxygona-1,3,5(10),8-tetraen-17-one

Dissolve 13β-ethyl - 3 - methoxygona-1,3,5(10),8,14-pentaen - 17 - one (2 g.) in dioxan (50 cc.) containing Raney nickel (ca. 0.5 g.) of moderate activity and shake with hydrogen until 160 cc., the amount corresponding to one molecular proportion has been absorbed. Recrystallize the isolated product from methanol to obtain the title product (1.2 g.), m.p. 110–125°; ultraviolet absorption peak at 280 mμ (ε 13,200).

This compound has estrogenic activity, lowers the blood lipid level, and is useful as an intermediate for preparing the hormonal compounds of this invention.

EXAMPLE 151

13β-propyl-3-methoxygona-1,3,5(10),8-tetraen-17-one

Condense 2-propyl-1,3-cyclopentanedione (13.1 g.) in 0.12% methanolic potassium hydroxide solution (90 cc.) with 6-m-methoxyphenylhex-1-en-3-one (19.0 g.), to obtain crude 2-propyl-2-(6-m-methoxyphenyl-3-oxohexyl) cyclopentane-1,3-dione (25.5 g.). Submit this Michael condensation product (23.4 g.) to double cyclodehydration; distill the product at 200°/10⁻⁴ mm. and crystallize the distillate from ethanol, to obtain the tetracyclic diene ketone, m.p. 82–4°; ultraviolet absorption peak at 310 mμ (ε 24,700).

Selectively hydrogenate the diene ketone (5 g.) in benzene solution with a palladium on calcium carbonate catalyst until sufficient hydrogen has been taken up to saturate the 14,15-ethylenic bond. Isolate the product (3.5 g.) as pink crystals from methanol, m.p. 111–3°.

This compound has estrogenic activity, lowers the blood lipid level, and is useful as an intermediate for preparing the hormonal compounds of this invention.

EXAMPLE 152

13β-isopropyl-3-methoxygona-1,3,5(10),8-tetraen-17-one

Shake 13β - isopropyl-3-methoxygona-1,3,5(10),8,14-pentaen-17-one (2 g.) in dioxan (50 cc.) with a freshly prepared but moderately active Raney nickel catalyst (ca. 0.5 g.) in hydrogen at atmospheric pressure. When, after several hours the theoretical amount of hydrogen for half-hydrogenation (160 cc.) has been absorbed, filter off the nickel catalyst and remove the solvent by evaporation. Crystallize the residual gum from methanol to obtain the title product (1.2 g.), m.p. 85–100° C.; ultraviolet absorption peak at 280 mμ (ε 11,800).

This compound has estrogenic activity, lowers the blood lipid level, and is useful as an intermediate for preparing the hormonal compounds of this invention.

EXAMPLE 153

13β-butyl-3-methoxygona-1,3,5(10),8-tetraen-17-one

Condense 2-butyl-1,3-cyclopentanedione (2.8 g.) in 0.12% methanolic potassium hydroxide solution (8 cc.) with 6-m-methoxyphenylhex-1-en-3-one (5 g.) by heating the mixture at 80° for 10 hours. Evaporate the solvent under reduced pressure and heat the residue with toluene-p-sulphonic acid (2 g.) in benzene (50 cc.) for 45 minutes using a Dean-Stark trap, to effect double cyclodehydration. Add ether to the cooled reaction mixture and evaporate the washed and dried ether solution; recrystallize the residue from ethanol to obtain the tetracyclic diene (1.9 g.), m.p. 53–5°; ultraviolet absorption peak at 312 mμ (ε 29,200).

Shake this tetracyclic diene (1.38 g.) in benzene (45 cc.) in hydrogen at atmospheric pressure with a previously reduced 2% palladium on calcium carbonate catalyst (0.5 g.). When 100 cc. hydrogen has been absorbed discontinue the hydrogenation and filter off the catalyst. Evaporate solvent and recrystallize the residue from methanol to obtain the title product (1.02 g.), m.p. 105–8°; ultraviolet absorption peak at 278 mμ (ε 16,700).

This compound has estrogenic activity, lowers the blood lipid level, and is useful as an intermediate for preparing the hormonal compounds of this invention.

EXAMPLE 154

13β-isobutyl-3-methoxygona-1,3,5(10),8-tetraen-17-one

To a pre-reduced suspension of 2% palladium on calcium carbonate catalyst (7.0 g.) in benzene (30 cc.) add a solution of 13β - isobutyl-3-methoxygona-1,3,5(10),8,14-pentaen-17-one (20.0 g.) in benzene (500 cc.) and hydrogenate the mixture at atmospheric pressure until one mole equivalent of hydrogen is consumed. After the catalyst is removed by filtration, evaporate the solvent to obtain a gum which on crystallization from ethanol affords the title product (17.1 g.; 71%), m.p. 117–119°; ultraviolet absorption peak at 278 mµ (ε 14,560).

To prepare 6,13β-dimethyl-3-methoxygona-1,3,5(10),8-tetraen-17-one hydrogenate 6,13β - dimethyl-3-methoxygona-1,3,5(10),8,14-pentaen-17-one over a 2% palladium on calcium carbonate catalyst in benzene according to the manipulative procedure described above.

To prepare 7,13β-dimethyl-3-methoxygona-1,3,5(10),8-tetraen-17-one hydrogenate 7,13β - dimethyl-3-methoxygona-1,3,5(10),8,14-pentaen-17-one over a 2% palladium on calcium carbonate catalyst in benzene according to the manipulative procedure described above.

To prepare 13β-ethyl-1,3-dimethoxygona-1,3,5(10),8-tetraen-17-one hydrogenate 13β-ethyl-1,3-dimethoxygona-1,3,5(10),8,14-pentaen-17-one over a 2% palladium on calcium carbonate catalyst in benzene according to the manipulative procedure described above.

To prepare 13β-ethyl - 3 - acetoxygona-1,3,5(10),8-tetraen-17-one over a 2% palladium on calcium carbonate tetraen-17-one hydrogenate 13β-ethyl-3-acetoxygona-1,3,5(10),8,14-pentaen-17-one over a 2% palladium on calcium carbonate catalyst in benzene according to the manipulative procedure described above.

To prepare 13β-(3-hydroxypropyl) - 3 - methoxygona-1,3,5(10),8-tetraen - 17 - one hydrogenate 13β-(3-hydroxypropyl) - 3 - methoxygona-1,3,5(10),8,14-pentaen-17-one over a 2% palladium on calcium carbonate catalyst in benzene according to the manipulative procedure described above.

To prepare 13β-ethyl-3-ethoxygona-1,3,5(10),8-tetraen-17-one hydrogenate 13β-ethyl - 3 - ethoxygona-1,3,5(10),8,14-pentaen-17-one over a 2% palladium on calcium carbonate catalyst in benzene according to the manipulative procedure described above.

To prepare 13β-phenethyl - 3 - propoxygona-1,3,5(10),8-tetraen-17-one hydrogenate 13β - phenethyl-3-propoxygona-1,3,5(10),8,14 - pentaen-17-one over a 2% palladium on calcium carbonate catalyst in benzene according to the manipulative procedure described above.

To prepare 13β-isobutyl-3-pentyloxygona-1,3,5(10),8-tetraen-17-one hydrogenate 13β-isobutyl-3-pentyloxygona-1,3,5(10),8,14-pentaen-17-one over a 2% palladium on calcium carbonate catalyst in benzene according to the manipulative procedure described above.

To prepare 13β-(3-hydroxypropyl)-3-cyclopentyloxygona-1,3,5(10),8 - tetraen-17-one hydrogenate 13β-(3-hydroxypropyl) - 3 - cyclopentyloxygona-1,3,5(10),8,14-pentaen-17-one over a 2% palladium on calcium carbonate catalyst in benzene according to the manipulative procedure described above.

To prepare 13β-phenethyl-3-hydroxygona-1,3,5(10),8-tetraen-17-one hydrogenate 13β-phenethyl - 3 - hydroxygona-1,3,5(10),8,14-pentaen-17-one over a 2% palladium on calcium carbonate catalyst in benzene according to the manipulative procedure described above.

To prepare 13β-(2-diethylaminoethyl)-2,3-dimethoxygona-1,3,5(10),8-tetraen-17-one hydrogenate 13β-(2-diethylaminoethyl)-2,3-dimethoxygona - 1,3,5(10),8,14-pentaen-17-one over a 2% palladium on calcium carbonate catalyst in benzene according to the manipulative procedure described above.

To prepare 13β-(3-dimethylaminopropyl)-1-methoxy-3-ethoxy-6-methylgona - 1,3,5(10),8 - tetraen-17-one hydrogenate 13β - (3 - dimethylaminopropyl)-1-methoxy-3-ethoxy-6-methylgona - 1,3,5(10),8,14 - pentaen-17-one over a 2% palladium on calcium carbonate catalyst in benzene according to the manipulative procedure described above.

To prepare 13β-propyl - 2 - ethoxy-3-methoxygona-1,3,5(10),8 - tetraen-17-one hydrogenate 13β-propyl-2-ethoxy-3-methoxygona - 1,3,5(10),8,14 - pentaen-17-one over a 2% palladium on calcium carbonate catalyst in benzene according to the manipulative procedure described above.

These compounds have estrogenic activity, lower the blood lipid level, and are useful as intermediates in the preparation of the hormonal compounds of the invention.

EXAMPLE 155

13β-cetyl-3-methoxygona-1,3,5(10),8-tetraen-17-one

Hydrogenate 13β-cetyl - 3 - methoxygona-1,3,5(10),8,14-pentaen-17-one (2.39 g.) in benzene (140 cc.) at atmospheric pressure with a previously reduced 2% palladium oxide on calcium carbonate catalyst (0.3 g.) until one molecular equivalent of hydrogen has been absorbed. Remove the catalyst and evaporate to obtain a residue which one crystallizes from ethanol to obtain the title product (2.4 g.), as colorless crystals m.p. 54–6°; ultraviolet absorption peak at 278 mµ (ε 11,500).

$C_{34}H_{52}O_2$ calculated: C, 82.85%; H, 10.65%. Found: C, 82.75%; H, 10.75%.

This compound has estrogenic activity, and is useful as an intermediate for preparing the hormonal compounds of this invention.

EXAMPLE 156

13β-methyl-3-hydroxygona-1,3,5(10),8-tetraen-17-one

Hydrogenate 13β-methyl-3-acetoxygona - 1,3,5(10),8,14-pentaen-17-one (0.05 g.), obtained by the acetylation of 13β-methyl-3-hydroxygona-1,3,5(10),8,14-pentaen-17-one using pyridine and acetic anhydride in benzene (15 cc.) at atmospheric pressure using a 10% palladized charcoal catalyst (0.025 g.). Hydrogenation slows down markedly after the requisite quantity of hydrogen for monohydrogenation has been absorbed. Remove the catalyst by filtration and evaporate the solvent to obtain as residue the crude title product.

Immediately take the product up in methanol (4 cc.), add 3N sodium hydroxide solution (1 cc.) and shake the mixture for 20 minutes. Acidify and extract with ether to obtain a product which one dissolves in benzene and passes through a column of activated fuller's earth. Evaporate the resulting solution and recrystallize the residue from methanol to obtain the title product, m.p. 225–7°; ultraviolet absorption peak at 278 mµ (ε 15,300).

This compound has estrogenic activity, lowers the blood lipid level, and is useful as an intermediate for preparing the hormonal compounds of this invention.

EXAMPLE 157

13β-methyl-3-hydroxygona-1,3,5(10),8-tetraen-17-one

Shake 13β-methyl - 3 - hydroxygona - 1,3,5(10),8,14-pentaen-17-one (0.05 g.) in benzene (25 cc.) in hydrogen at atmospheric pressure using a 10% palladized charcoal catalyst (0.025 g.). Hydrogenation becomes very slow when 1.1 moles hydrogen has been absorbed. Filter and evaporate to obtain the title product (0.035 g.), recrystallize from methanol to get pale blue crystals, m.p. 225–8°, melting to a red liquid; ultraviolet absorption peak at 280 mµ (ε 12,000).

This compound has estrogenic activity, lowers the blood lipid level, and is useful as an intermediate for preparing the hormonal compounds of this invention.

EXAMPLE 158

13β-ethyl-3-hydroxygona-1,3,5(10),8-tetraen-17-one

Hydrogenate 13β - ethyl - 3 - hydroxygona - 1,3,5-(10),8,14 - pentaen 17 one (0.5 g.) in benzene (25 cc.) at atmospheric pressure using a 10% palladized charcoal catalyst (0.025 g.). After the absorption of 1.1 molar equivalents of hydrogen, hydrogenation becomes very slow; remove the catalyst by filtration and evaporate the filtrate to obtain the title product which crystallizes from methanol in colorless plates (0.35 g.), m.p. 235–9°; ultraviolet absorption peak at 280.5 mµ (ε 15,500).

This compound has estrogenic activity, lowers the blood lipid level, and is useful as an intermediate for preparing the hormonal compounds of this invention.

EXAMPLE 159

13β-ethyl-3-acetoxygona-1,3,5(10),8-tetraen-17-one

Hydrogenate 13β - ethyl - 3 - acetoxygona - 1,3,5(10),8,14-pentaen-17-one (1.8 g.) dissolved in benzene (25 ml.) at atmospheric pressure in the presence of 10% palladized charcoal (100 mg.). After 1.1 molar equivalents of hydrogen has been absorbed (ca. 12 hr.) filter off the catalyst, evaporate the filtrate under reduced pressure and recrystallize the residue from ethanol. Filter the red product through "Florisil" (60 g.) with benzene-petroleum (3:1), remove the solvent and recrystallize the product from ethanol to obtain the title product, m.p. 132.5–134.5°; ultra-violet absorption peak at 277 mμ ($\epsilon$ 12,800).

This compound has estrogenic activity, lowers the blood lipid level, and is useful as an intermediate for preparing the hormonal compounds of this invention.

EXAMPLE 160

13β-ethyl-3-hydroxygona-1,3,5(10),8-tetraen-17-one

Heat 13β ethyl - 3 - acetoxygona - 1,3,5(10),8 - tetraen - 17 - one (0.5 g.) and sodium hydroxide (1.2 g.) in water (10 cc.) and methanol (30 cc.) at 50° for 20 minutes in an atmosphere of nitrogen. Cool the mixture, acidify with dilute acetic acid and extract with a mixture of ether and benzene. Wash, dry and evaporate the organic extract to obtain the title products, m.p. 266–270°; ultraviolet absorpton peak at 278.5 mμ ($\epsilon$ 13,200).

This compound has estrogenic activity, lowers the blood lipid level, and is useful as an intermediate for preparing the hormonal compounds of this invention.

EXAMPLE 161

13β-propyl-3-hydroxygona-1,3,5(10),8-tetraen-17-one

Shake 13β - propyl - 3 - hydroxygona - 1,3,5(10),8,14-pentaen - 17 - one (0.59 g.) in benzene (30 cc.) with hydrogen at atmospheric pressure in the presence of a palladized charcoal catalyst (0.3 g.) until the requisite amount of hydrogen for selective semihydrogenation has been absorbed. Filter the catalyst and evaporate the solvent to obtain a green crystalline material which one recrystallizes from methanol to obtain the title product (0.36 g.), m.p. 210–20°, with much decomposition to a red liquid; ultraviolet absorption peak at 281 mμ ($\epsilon$ 11,800).

This compound has estrogenic activity, lowers the blood lipid level, and is useful as an intermediate for preparing the hormonal compounds of this invention.

EXAMPLE 162

13β-methyl-3-acetoxygona-1,3,5(10),8-tetraen-17-one

Hydrogenate 13β - methyl - 3 - acetoxygona - 1,3,5-(10),8,14 - pentaen - 17 - one (0.05 g., obtained by the acetylation of 13β - methyl - 3 - hydroxgona - 1,3,5(10),-8,14 - pentaen - 17 - one using pyridine and acetic anhydride) in benzene (15 cc.) at atmospheric pressure using a 10% palladized charcoal catalyst (0.025 g.). Hydrogenation slows down markedly after the requisite quantity of hydrogen for monohydrogenation has been absorbed. Remove the catalyst by filtration and evaporate the solvent, to obtain as residue the crude title product.

This compound has estrogenic activity, lowers the blood lipid level, and is useful as an intermediate for preparing the hormonal compounds of this invention.

EXAMPLE 163

13β-ethyl-3-benzyloxygona-1,3,5(10),8-tetraen-17-one

Treat 13β-ethyl-3-hydroxygona-1,3,5(10),8-tetraen-17-one (0.2 g.) in methanol (20 cc.) with an excess of an ethereal solution of phenyldiazomethane. After 18 hours add acetic acid (3 cc.) and evaporate the mixture to dryness. Take up the residue in ether, wash with sodium bicarbonate solution, dry and evaporate. Filter the residue through a column of alumina (15 g.) and evaporate the solvent to obtain th title product; ultraviolet absorption peak at 280 mμ ($\epsilon$ 15,000).

This compound has estrogenic activity, lowers the blood lipid level, and is useful as an intermediate for preparing the hormonal compounds of this invention.

EXAMPLE 164

13β-methyl-3-methoxy-D-homogona-1,3,5(10),8-tetraen-17aβ-ol

Add 13β-methyl-3-methoxy-D-homogona-1,3,5(10),8-tetraen-17a-one to sodium borohydride (7 g.) in methanol (400 cc.) and reflux for 30 minutes. Acidify the mixture with 50% aqueous acetic acid and evaporate almost to dryness. Add water and extract the product with ether. Wash, dry and evaporate the ethereal solution and crystallize the residue from ethanol to obtain the title product (19 g.), m.p. 83–6°; ultraviolet absorption peak of 278 mμ ($\epsilon$ 15,800); infrared absorption peaks at 2.96μ and 6.22μ.

To prepare 7,13β-dimethyl-3-methoxygona - 1,3,5(10),8-tetraen-17β-ol treat 7,13β-dimethyl-3-methoxygona-1,3,5(10),8-tetraen-17-one with sodium borohydride according to the manipulative procedure described above.

To prepare 13β-methylgona - 1,3,5(10),8 - tetraene-3,17β-diol treat 13β - methyl - 3 - hydroxygona-1,3,5(10),8-tetraen - 17 - one with sodium borohydride according to the manipulative procedure described above.

To prepare 13β-ethyl - 2,3 - dimethoxygona-1,3,5(10),8-tetraen - 17β - ol treat 13β-ethyl - 2,3 - dimethoxygona-1,3,5(10),8-tetraen-17-one with sodium borohydride according to the manipulative procedure described above.

To prepare 13β-ethyl - 3 - ethoxygona - 1,3,5(10),8-tetraen-17β-ol treat 13β-ethyl - 3 - ethoxygona-1,3,5(10),8-tetraen-17-one with sodium borohydride according to the manipulative procedure described above.

To prepare 13β-isobutyl - 3 - pentyloxygona-1,3,5(10),8-tetraen-17β-ol treat 13β - isobutyl - 3 - pentyloxygona-1,3,5(10),8-tetraen - 17 - one with sodium borohydride according to the manipulative procedure described above.

To prepare 13β-(3 - dimethylaminopropyl) - 1,3 - dimethoxygona - 1,3,5(10),8 - tetraen - 17β - ol treat 13β-(3 - dimethylaminopropyl) - 1,3 - dimethoxygona-1,3,5(10),8-tetraen-17-one with sodium borohydride according to the manipulative procedure described above.

These compounds have estrogenic activity, lower the blood lipid level, and are useful as intermediates in the preparation of the hormonal compounds of the invention.

EXAMPLE 165

13β-methyl-3-methoxygona-1,3,5(10),8-tetraen-17β-ol

Add sodium borohydride (0.5 g.) in ethanol (60 cc.) with stirring to 13-methyl - 3 - methoxygona - 1,3,5(10),8-tetraen-17-one (2.0 g.) in ethanol (150 cc.) at 14–15°. Leave the mixture at room temperature for 1 hour, acidify with glacial acetic acid and evaporate to dryness under reduced pressure. Treat the residue with water, ether-extract and wash and dry. Evaporate the extracts. Recrystallize the residue from a mixture of methanol (15 cc.) and water (3 cc.) to obtain the title product (0.90 g.), m.p. 110–2°. A sample sublimes at 110°/10$^{-4}$ mm. and has an ultraviolet absorption peak at 277 mμ ($\epsilon$ 14,500).

$C_{19}H_{24}O_2$ calculated: C, 80.2%; H, 8.5%. Found: C, 79.3%; H, 8.4%.

This compound has estrogenic activity, lowers the blood lipid level, and is useful as an intermediate for preparing the hormonal compounds of this invention.

EXAMPLE 166

13β-ethyl-3-methoxygona-1,3,5(10),8-tetraen-17β-ol

Hydrogenate 13β - ethyl-3-methoxygona-1,3,5(10),8,14-pentaen-17β-ol (0.31 g.) and recrystallize the product from hexane-ethyl acetate to obtain the title product; ultraviolet absorption peak at 280 mμ ($\epsilon$ 15,000).

This compound has estrogenic activity, lowers the blood lipid level, and is useful as an intermediate for preparing the hormonal compounds of this invention.

EXAMPLE 167

13β-ethyl-3-methoxygona-1,3,5(10),8-tetraen-17β-ol

Add 13β-ethyl - 3 - methoxygona-1,3,5(10),8-tetraen-17-one (16.8 g.) to a solution of sodium borohydride (6 g.) in methanol (500 cc.), swirl the mixture which boils spontaneously. When all the material has been added and the reaction has subsided, add acetic acid (15 cc.). Reduce the mixture in volume by evaporation of most of the solvent, add water and extract the product with ether. Evaporate the washed and dried extracts to obtain crude crystalline product (16.8 g.), m.p. 102–5° on recrystallization from acetonitrile.

This compound has estrogenic activity, lowers the blood lipid level, and is useful as an intermediate for preparing the hormonal compounds of this invention.

EXAMPLE 168

13β-ethyl-3-methoxy-D-homogona-1,3,5(10),8-tetraen-17aβ-ol

Reduce 13β - ethyl - 3 - methoxy-D-homogona - 1,3,5(10),8-tetraen-17a-one (20.9 g.) exactly as described for the preparation of the 13β-methyl compound to obtain the title product (20 g.), m.p. 110–112°; infrared absorption peaks at 2.96μ and 6.23μ.

This compound has estrogenic activity, lowers the blood lipid level, and is useful as an intermediate for preparing the hormonal compounds of this invention.

EXAMPLE 169

13β-propyl-3-methoxygona-1,3,5(10),8-tetraen-17β-ol

Hydrogenate 13β-propyl - 3 - methoxygona-1,3,5(10),8,14-pentaen-17β-ol (0.32 g.) and recrystallize the product from hexane-ethyl acetate to obtain the title product; ultraviolet absorption peak at 280 mμ (ε 15,000).

This compound has estrogenic activity, lowers the blood lipid level, and is useful as an intermediate for preparing the hormonal compounds of this invention.

EXAMPLE 170

13β-propyl-3-methoxygona-1,3,5(10),8-tetraen-17β-ol

Add 13β-propyl - 3 - methoxygona-1,3,5(10),8-tetraen-17-one (3.5 g.) to a solution of sodium borohydride (1.16 g.) in methanol (120 cc.). Heat the reaction mixture to reflux with stirring for 30 minutes. Concentrate the resulting solution, adjust its pH to 6 with aqueous acetic acid and filter off the resulting white precipitate which is the title product, (3.1 g.), m.p. 134–8°; ultraviolet absorption peak at 278 mμ (ε 15,350); infrared showed a band due to hydroxy but no ketone present.

$C_{21}H_{28}O_2$ calculated: C, 80.7%; H, 9.0%. Found: C, 80.5%; H, 9.0%.

This compound has estrogenic activity, lowers the blood lipid level, and is useful as an intermediate for preparing the hormonal compounds of this invention.

EXAMPLE 171

13β-butyl-3-methoxygona-1,3,5(10),8-tetraen-17β-ol

Add sodium borohydride (12.1 g.) to 13β-butyl-3-methoxygona-1,3,5(10),8-tetraen-17-one (36.2 g.) in ethanol (1200 cc.) and reflux the mixture for 1 hour. On cooling, acidify the mixture with aqueous acetic acid and evaporate to dryness under reduced pressure. Add water to the residue and extract the product with ether. Work up in the usual manner to obtain a residue; recrystallize from hexane to obtain the 13-n-butyl-title product (26.9 g.), m.p. 90–100°; ultraviolet absorption peak at 279 mμ (ε 15,600); infrared absorption peak at 2.88μ, no absorption in the 5.71–5.88μ region.

$C_{22}H_{30}O_2$ calculated: C, 80.9%; H, 9.3%. Found: C, 81.0%; H, 9.0%.

This compound possesses estrogenic activity, lowers the blood lipid level, and is useful as an intermediate for preparing the hormonal compounds of this invention.

EXAMPLE 172

13β-isobutyl-3-methoxygona-1,3,5(10),8-tetraen-17β-ol

To a stirred solution of sodium borohydride (6.0 g.) in methanol (500 cc. under nitrogen) add 13β-isobutyl-3-methoxygona-1,3,5,(10),8-tetraen-17-one (17 g.). Gently heat the reaction mixture for one minute to initiate the reaction and then allow to stand for one hour at room temperature. After adding cautiously glacial acetic acid (20 cc.), concentrate the solution in vacuo to ⅓ of its volume followed by addition of water. Extract the product with ether. Wash the ethereal solution successively with water, sodium bicarbonate, and water, and dry. Evaporate the ether to obtain 14β-isobutyl-3-methoxygona-1,3,5(10),8-tetraen-17β-ol as a gum (17.0 g.; 99%); ultraviolet absorption peak at 278 mμ (ε 14,560).

This compound has estrogenic activity, lowers the blood lipid level, and is useful as an intermediate for preparing the hormonal compounds of this invention.

EXAMPLE 173

13β-cetyl-3-methoxygona-1,3,5(10),8-tetraen-17β-ol

Stir a solution of 13β-cetyl-3-methoxygona-1,3,5(10),8-tetraen-17-one (0.60 g.) and sodium borohydride (0.20 g.) in ethanol (110 cc.) for 2 hours and leave overnight. Reflux with stirring for 2 hours, cool, and add an excess of 50% aqueous acetic acid. Evaporate the mixture to dryness under reduced pressure and partition the residue between ether and water. Work up in the usual manner to get an ether solution of the title product as a gum; infrared absorption peak at 3.37μ (hydroxyl) with no band in the 5.71–5.88 mμ region; ultraviolet absorption peak at 278 mμ.

This compound has estrogenic activity, lowers the blood lipid level, and is useful as an intermediate for preparing the hormonal compounds of this invention.

EXAMPLE 174

13β-ethylgona-1,3,5(10),8-tetraene-2,17β-diol

Shake 13β-ethylgona-1,3,5,(10),8,14 - pentaene-3,17β-diol (0.28 g.) in benzene (35 cc.) with 10% palladised charcoal (300 mg.) in an atmosphere of hydrogen until 25 cc. of hydrogen has been absorbed. Filter off the catalyst, evaporate the solvent and recrystallize the residue from methanol to obtain the title product, m.p. 234–8°; ultraviolet absorption peak at 280 mμ (ε 14,200).

This compound has estrogenic activity, lowers the blood lipid level, and is useful as an intermediate for preparing the hormonal compounds of this invention.

EXAMPLE 175

13β-propylgona-1,3,5(10),8-tetraene-3,17β-diol

Hydrogenate 13β-propylgona-1,3,5(10),8,14 - pentaene-3,17β-diol (0.31 g.) exactly as described in the previous example to obtain the title product, m.p. 210–218°; ultraviolet absorption peak at 280 mμ (ε12,000).

This compound possesses estrogenic activity, lowers the blood lipid level, and is useful as an intermediate for preparing the hormonal compounds of this invention.

EXAMPLE 176

13β-ethyl-3,17β-dimethoxygona-1,3,5(10),8-tetraene

Methylate 13β-ethyl - 3 - methoxygona - 1,3,5(10),8-tetraene-17β-ol (1 g.) in methylene chloride (50 cc.) containing boron trifluoride etherate (0.1 cc.) with diazomethane (from N-nitrosomethylurea 3.1 g.) in methylene chloride (60 cc.). Leave the mixture for 5 minutes, filter, and wash the filtrate with aqueous sodium bicarbonate, 10% aqueous potassium hydroxide, and water, and dry.

Recrystallize the product from hexane containing a few drops of ethanol to obtain the title product (.3 g.), m.p. 95–97°; ultraviolet absorption peak at 279 mμ (ε 16,500).

$C_{21}H_{28}O_2$ calculated: C, 80.7%; H, 9.0%. Found: C, 80.5%; H, 8.8%.

This compound possesses estrogenic activity, lowers the blood lipid level, and is useful as an intermediate for preparing the hormonal compounds of this invention.

EXAMPLE 177

13β-ethyl-3,17β-dimethoxygona-1,3,5(10),8-tetraene

Shake 13β - ethyl-3,17β-dimethoxygona-1,3,5(10),8,14-pentaene (1 g.) in benzene (50 cc.) with 2% palladium on calcium carbonate (0.5 g.) in an atmosphere of hydrogen until 1 molar equivalent of hydrogen (85 cc.) has been absorbed. Filter the catalyst and evaporate the solvent to obtain the title product, m p. 94–7°; ultraviolet absorption peak at 278 mμ (ε 16,400).

This compound possesses estrogenic activity, lowers the blood lipid level, and is useful as an intermediate for preparing the hormonal compounds of this invention.

EXAMPLE 178

13β-butyl-3,17β-dimethoxygona-1,3,5(10),8-tetraene

Methylate 13β - butyl-3-methoxygona-1,3,5(10),8-tetraen-17β-ol (1 g.) in methylene chloride (50 cc.) with diazomethane. Recrystallize the crude product from ethanol and then take up in benzene chromatograph on neutral alumina. Benzene-ether (2:1) elutes a fraction which one recrystallizes from ethanol (6 cc.) to obtain the title product (.2 g.), m.p. 87°; ultraviolet absorption peak at 279 mμ (ε 16,700).

$C_{23}H_{32}O_2$ calculated: C, 81.1%; H, 9.5%. Found: C, 81.0%; H, 9.4%.

This compound has estrogenic activity, lowers the blood lipid level, and is useful as an intermediate for preparing the hormonal compounds of this invention.

EXAMPLE 179

13β-ethyl-3-methoxy-17,17-ethylenedioxygona-1,3,5(10),8-tetraene

Hydrogenate 13β-ethyl-3-methoxy-17,17-ethylenedioxygona-1,3,5(10),8,14-pentaene (2.0 g.) in benzene (70 cc.) at atmospheric pressure using a 5% palladium on calcium carbonate catalyst (0.70 g.). Uptake of hydrogen ceases after 150 cc. has been absorbed. Isolate the product and recrystallize from 95% ethanol to obtain the title product (1.3 g.), m.p. 135–137°; ultraviolet absorption peak at 278 mμ (ε 15,100).

$C_{22}H_{28}O_3$ calculated: C, 77.6%; H, 8.3%. Found: C, 77.5%; H, 8.6%.

This compound possesses estrogenic activity and blood lipid lowering activity, and is useful as an intermediate for preparing the hormonal compounds of this invention.

To prepare 6,13β-dimethyl-3-methoxy-17,17-ethylenedioxygona-1,3,5(10),8-tetraene hydrogenate 6,13β-dimethyl-3 - methoxy-17,17-ethylenedioxygona-1,3,5(10),8,14-pentaene using a 5% palladium on calcium carbonate catalyst according to the manipulative procedure described above.

To prepare 13β-ethyl-1,3-dimethoxy-17,17-ethylenedioxygona-1,3,5(10),8-tetraene hydrogenate 13β-ethyl-1,3-dimethoxy - 17,17 - ethylenedioxygona - 1,3,5(10),8,14-pentaene using a 5% palladium on calcium carbonate catalyst according to the manipulative procedure described above.

To prepare 13β - ethyl-1,3-dimethoxy-17,17-ethylenedioxygona-1,3,5(10),8-tetraene hydrogenate 13β-phenethyl-3-propoxy - 17,17 - ethylenedioxygona - 1,3,5(10),8,14-pentaene using a 5% palladium on calcium carbonate catalyst according to the manipulative procedure described above.

To prepare 13β-(3-hydroxypropyl)-3-cyclopentyloxy-17,17 - ethylenedioxygona-1,3,5(10),8-tetraene hydrogenate 13β-(3-hydroxypropyl)-3-cyclopentyloxy-17,17-ethylenedioxygona-1,3,5(10),8,14-pentaene using a 5% palladium on calcium carbonate catalyst according to the manipulative procedure described above.

These compounds possess estrogenic and blood lipid lowering activity and are useful as intermediates in the preparation of the hormonal compounds of this invention.

EXAMPLE 180

13β-ethyl-3-methoxy-17,17-(2,2-dimethylpropylenedioxy)-gona-1,3,5(10),8-tetraene Shake 13β-ethyl-3-methoxy - 17,17 - (2,2-dimethylpropylenedioxy)gona-1,3,5(10),8,14-pentaene (5 g.) in benzene (75 cc.) containing 2% palladised calcium carbonate (1.75 g.) with hydrogen at atmospheric pressure until one molecular equivalent has been absorbed. Recrystallize the product from 95% ethanol to obtain the title product; ultraviolet absorption peak at 276.5 mμ (ε 13,500).

This compound has estrogenic activity, lowers the blood lipid level, and is useful as an intermediate for preparing the hormonal compounds of this invention.

EXAMPLE 181

13β-propyl-3-methoxy-17,17-ethylenedioxygona-1,3,5(10),8-tetraene

Shake 13β-propyl-3-methoxy-17,17-ethylenedioxygona-1,3,5(10)8,14-pentaene (2.5 g.) in benzene (80 cc.) with hydrogen at atmospheric pressure in the presence of a 2% palladium on calcium carbonate catalyst (0.9 g.); hydrogen uptake ceases after the requisite amount (161 cc.) for monohydrogenation has been absorbed. Filter and evaporate to obtain a gum, which one crystallizes from ethanol to obtain the title product (1.8 g.), m.p. 119–120°; ultraviolet absorption peak at 278 mμ (ε 15,300).

$C_{23}H_{30}O_3$ calculated: C, 77.9%; H, 8.5%. Found: C, 77.7%; H, 8.5%.

This compound possesses estrogenic and blood lipid lowering activities and is useful as an intermediate for preparing the hormonal compounds of this invention.

EXAMPLE 182

13β-ethyl - 3 - methoxy-17α-ethynylgona - 1,3,5(10),8-tetraen-17β-ol

To 13β-ethyl-3-methoxygona-1,3,5(10),8 - tetraen - 17-one (5.0 g.) in tetrahydrofuran (10 cc.) add 200 cc. of lithium aluminum acetylide suspension and reflux the mixture for 4 hours. Add ice water with stirring, follow by 3N sulphuric acid to dissolve the resulting precipitate, and work up the product with ether in the usual way, to obtain the title product (5.0 g.); ultraviolet absorption peak at 276 mμ (ε 13,300).

This compound possesses estrogenic and blood lipid lowering activity and is useful as an intermediate for preparing the hormonal compounds of this invention.

EXAMPLE 183

13β-ethyl - 3 - methoxy-17α-ethynylgona - 1,3,5(10),8-tetraen-17β-ol

Add 13β-ethyl-3-methoxygona-1,3,5(10),8 - tetraen-17-one (92 g.) in aniline (300 cc.) with stirring to lithium acetylide (from commercial lithium amide, (50 g.) in aniline (500 cc.) under an acetylene atmosphere). Pass acetylene into the mixture with stirring for 3 days. Add water and extract the mixture with ether; free the extracts from aniline by washing with 10% sulphuric acid, and isolate the product to obtain the title product as a gum (88 g.); infrared absorption peaks at 2.75, 3.03μ.

This compound has estrogenic and blood lipid lowering activity and is useful as an intermediate for preparing the hormonal compounds of this invention.

EXAMPLE 184

13β-ethyl - 3 - methoxy-17α-ethynylgona - 1,3,5(10),8-tetraen-17β-ol

To a stirred suspension of lithium acetylide (42.4 g.) in a mixture of dioxan (240 cc.), ethylenediamine (10 cc.), and dimethylacetamide (250 cc.) add a solution of 13β-ethyl-3-methoxygona-1,3,5(10),8-tetraen-17-one (66.6 g.) in dimethylacetamide (450 cc.) in an atmosphere of acetylene. Continue stirring for an additional 20 hours (under acetylene). Pour the reaction mixture into crushed ice (1.5 kg.) and extract with four 200 cc. portions of benzene. Wash the combined extracts with sulfuric acid and water and dry. Evaporate the solvent to obtain a crude oil which one dissolves in methanol (450 cc.) and treats with charcoal (6.5 g.). After concentrating the filtrate to 300 cc. add water (45 cc.) and cool to obtain the title compound (62.4 g., 86%). Recrystallization from methanol furnishes an analytical sample, m.p. 101–103°; ultraviolet absorption peak at 278 mμ (ε 16,100); infrared absorption peaks at 2.79, 3.04, 3.53, 4.81μ.

$C_{22}H_{26}O_2$ calculated: C, 82.3%; H, 8.3%. Found: C, 82.0%; H, 8.1%.

This compound has estrogenic activity, lowers the blood lipid level, and is useful as an intermediate for preparing the hormonal compounds of this invention.

To prepare 13β-cetyl-3-methoxy-17α-ethynylgona-1,3,5(10),8-tetraen-17β-ol treat 13β-cetyl-3-methoxygona-1,3,5(10),8-tetraen-17-one with lithium acetylide according to the manipulative procedure described above.

To prepare 6,13β-dimethyl-3-methoxy-17α - ethynylgona-1,3,5(10),8-tetraen - 17β-ol treat 6,13β-dimethyl-3-methoxygona-1,3,5(10),8-tetraen-17 - one with lithium acetylide accordnig to the manipulative procedure described above.

To prepare 7,13β-dimethyl-3-methoxy-17α-ethynylgona-1,3,5(10),8-tetraen-17β-ol treat 7,13β-dimethyl - 3-methoxygona-1,3,5(10),8-tetraen-17-one with lithium acetylide according to the manipulative procedure described above.

To prepare 13β-methyl-2,3-dimethoxy-17α-ethynylgona-1,3,5(10),8-tetraen-17β-ol treat 13β-methyl-2,3-dimethoxygona-1,3,5(10),8 - tetraen-17-one with lithium acetylide according to the manipulative procedure described above.

To prepare 13β-ethyl-3-ethoxy-17α - ethynylgona-1,3,5(10),8-tetraen-17β-ol treat 13β-ethyl-3-ethoxygona - 1,3,5(10),8-tetraen-17-one with lithium acetylide according to the manipulative procedure described above.

To prepare 13β-phenethyl-3-propoxy-17α-ethynylgona-1,3,5(10),8-tetraen-17β-ol treat 13β-phenethyl-3-propoxygona-1,3,5(10),8-tetraen-17-one with lithium acetylide according to the manipulative procedure described above.

To prepare 13β-(3 - hydroxypropyl)-3-cyclopentyloxy-17α-ethynylgona-1,3,5(10),8-tetraen-17β-ol treat 13β-(3-hydroxypropyl) - 3 - cyclopentyloxygona - 1,3,5(10),8-tetraen-17 - one with lithium acetylide according to the manipulative procedure described above.

To prepare 13β-(2 - diethylamnioethyl)-2,3-dimethoxy-17α-ethynylgona-1,3,5(10),8-tetraen-17β-ol treat 13β-(2-diethylaminoethyl)-2,3 - dimethoxygona - 1,3,5(10),8-tetraen-17-one with lithium acetylide according to the manipulative procedure described above.

These compounds have estrogenic activity, and are useful in the preparation of the hormonal compounds of this invention.

EXAMPLE 185

13β-ethyl-3-methoxy-17α-ethynylgona-1,3,5(10),8-tetraen-17β-ol

To a stirred suspension of lithium carbide (2.5 g.) in a mixture of dioxan (40 cc.), ethylenediamine (10 cc.), and dimethylacetamide (50 cc.) add a solution of 13β-ethyl-3-methoxygona-1,3,5(10),8-tetraen-17-one (5 g.), in dimethylacetamide (50 cc.) in an atmosphere of acetylene. Continue stirring for an additional 20 hours under acetylene. Pour the reaction mixture into crushed ice (200 g.) and extract with ether. Wash the ethereal solution with sulfuric acid and water, and dry. Evaporate the ether to obtain a crude oil which one dissolves in methanol (50 cc.); treat with charcoal (6 g.) and filter. Concentrate the filtrate to about ½ of its volume, add water (6 cc.), cool to obtain the title product (4.2 g., 77%). Recrystallize from methanol, m.p. 101–103°; ultraviolet absorption peak at 278 mμ (ε 16,100); infrared absorption peaks at 2.79, 3.04, 3.53, 4.81μ.

This compound possesses estrogenic and blood lipid lowering activity and is useful as an intermediate for preparing the hormonal compounds of this invention.

EXAMPLE 186

13β-propyl-3-methoxy-17α-ethynylgona-1,3,5(10),8-tetraen-17β-ol

Add 13β-propyl-3-methoxygona-1,3,5(10),8-tetraen-17-one (2.0 g.) in aniline (30 cc.) with stirring to lithium acetylide (from lithium, 1 g.) in aniline (60 cc.) under an acetylene atmosphere. Pass a vigorous stream of acetylene into the mixture with stirring for 26 hours. Work up to obtain the title product as a red gum (2.0 g.); infrared absorption peaks at 2.80, 3.05μ.

This compound has estrogenic activity, lowers the blood lipid level, and is useful as an intermediate for preparing the hormonal compounds of this invention.

EXAMPLE 187

13β-butyl-3-methoxy-17α-ethynylgona-1,3,5(10),8-tetraen-17β-ol

Add 13β-butyl - 3 - methoxygona-1,3,5(10),8-tetraen-17-one (3.5 g.) in aniline (35 cc.) with stirring to lithium acetylide (from commercial lithium amide, 4 g.) in aniline (55 cc.) under an acetylene atmosphere. Pass acetylene into the mixture with stirring for 40 hours. Work up to obtain the title product as a red gum (3.7 g.); infrared absorption peaks at 2.93, 3.08, 4.59μ.

This compound has estrogenic activity, lowers the blood lipid level, and is useful as an intermediate for preparing the hormonal compounds of this invention.

EXAMPLE 188

13β,17α-diethyl-3-methoxygona-1,3,5(10),8-tetraen-17β-ol

Shake 13β-ethyl - 3 - methoxy - 17α - ethylgona-1,3,5(10),8-tetraen-17β-ol (1.9 g.) in benzene (100 cc.) with hydrogen at atmospheric pressure in the presence of a prereduced 2% palladium on calcium carbonate catalyst (0.6 g.) until no more hydrogen is absorbed. Hydrogenation ceases when the requisite amount of hydrogen for selective saturation of the ethynyl group has been absorbed. Filter and evaporate the solvent to obtain a crystalline residue which one recrystallizes from methanol, to obtain the title product (1.5 g.), m.p. 139–140°; ultraviolet absorption peak at 276 mμ (ε 15,500); infrared absorption peak at 2.79μ.

This compound has estrogenic activity, and is useful in the preparation of the hormonal compounds of this invention.

To obtain 13β-cetyl - 3 - methoxy - 17α - ethylgona-1,3,5(10),8 - tetraen - 17β- ol hydrogenate 13β-cetyl-3-methoxy - 17α - ethynylgona - 1,3,5(10),8 - tetraen-17β-ol using a prereduced 2% palladium on calcium carbonate catalyst according to the manipulative procedure described above.

To obtain 6,13β-dimethyl - 3 - methoxy - 17α - ethylgona - 1,3,5(10),8 - tetraen-17β-ol hydrogenate 6,13β-dimethyl - 3 - methoxy - 17α - ethynylgona - 1,3,5(10),8-tetraen-17β-ol using a prereduced 2% palladium on calcium carbonate catalyst according to the manipulative procedure described above.

To obtain 7,13β-dimethyl - 3 - methoxy - 17α - ethylgona - 1,3,5(10),8 - tetraen - 17β - ol hydrogenate 7,13β-dimethyl - 3 - methoxy - 17α - ethynylgona - 1,3,5(10),8-tetraen-17β-ol using a prereduced 2% palladium on calcium carbonate catalyst according to the manipulative procedure described above.

To obtain 13β,17α - diethyl - 2,3 - dimethoxygona-1,3,5(10),8 - tetraen - 17β - ol hydrogenate 13β-ethyl-2,3-dimethoxy - 17α - ethynylgona - 1,3,5(10),8 - tetraen-17β-ol using a prereduced 2% palladium on calcium carbonate catalyst according to the manipulative procedure described above.

To obtain 13β,17α-diethyl - 3 - ethoxygona-1,3,5(10),8-tetraen-17β-ol hydrogenate 13β - ethyl - 3 - ethoxy - 17α-ethynylgona - 1,3,5(10),8 - tetraen - 17β - ol using a prereduced 2% palladium on calcium carbonate catalyst according to the manipulative procedure described above.

To obtain 13β - phenethyl - 3 - propoxy - 17α - ethylgona - 1,3,5(10),8 - tetraen - 17β - ol hydrogenate 13β-phenethyl - 3 - propoxy - 17α - ethynylgona - 1,3,5(10),8-tetraen-17β-ol using a prereduced 2% palladium on calcium carbonate catalyst according to the manipulative procedure described above.

To obtain 13β-(3-hydroxypropyl)-3-cyclopentyloxy-17α - ethylgona-1,3,5(10),8-tetraen-17β-ol hydrogenate 13β-(3-hydroxypropyl) - 3 - cyclopentyloxy-17α-ethynylgona-1,3,5(10),8-tetraen-17β-ol using a prereduced 2% palladium on calcium carbonate catalyst according to the manipulative procedure described above.

To obtain 13β-(2-diethylaminoethyl)-2,3-dimethoxy-17α - ethylgona-1,3,5(10),8-tetraen-17β-ol hydrogenate 13β-(2-diethylaminoethyl)-2,3-dimethoxy - 17α - ethylgona-1,3,5(10),8-tetraen-17β-ol using a prereduced 2% palladium on calcium carbonate catalyst according to the manipulative procedure described above.

These compounds possess estrogenic activity, and are useful as intermediates in the preparation of the hormonal compounds of this invention.

EXAMPLE 189

13β-propyl-3-methoxy-17α-ethylgona-1,3,5(10),8-tetraen-17β-ol

Shake 13β - propyl-3-methoxy-17α-ethynylgona-1,3,5(10),8-tetraen-17β-ol (1 g.) in benzene (100 cc.) with hydrogen at atmospheric pressure in the presence of a prereduced 2% palladium on calcium carbonate catalyst (0.35 g.). Hydrogenation is interrupted after the requisite amount of hydrogen for selective saturation of the ethynyl group has been absorbed; filter and evaporate to obtain a residue; crystallize from methanol to obtain the title product (0.5 g.), m.p. 106–108°; ultraviolet absorption peak at 278 mμ (ε 14,700); infrared absorption peak at 2.80μ.

This compound possesses estrogenic activity, and is useful as an intermediate in the preparation of the hormonal compounds of this invention.

EXAMPLE 190

13β-butyl-3-methoxy-17α-ethylgona-1,3,5(10),8-tetraen-17β-ol

Shake 13β-butyl-3-methoxy - 17α - ethynylgona-1,3,5(10),8-tetraen-17β-ol (3.7 g.) in benzene (150 cc.) with hydrogen at atmospheric pressure in the presence of a prereduced 2% palladium on calcium carbonate catalyst (1.2 g.) until the amount of hydrogen required for selective saturation of the ethynyl group has been absorbed. Crystallize the red gum (3.7 g.) obtained on filtration and evaporation from methanol to obtain crude product (2.9 g.), a portion is further recrystallized from aqueous acetonitrile to give the pure compound, m.p. 72–76°; ultraviolet absorption peak at 278 mμ (ε 15,600); infrared absorption peak at 2.97μ.

This compound has estrogenic activity, and is useful in the preparation of the hormonal compounds of this invention.

EXAMPLE 191

13β-ethyl-3-methoxy-17α-allylgona-1,3,5(10),8-tetraen-17β-ol

To a suspension of magnesium turnings (20 g.) in tetrahydrofuran (50 cc.) add several milliliters of a solution of allyl bromide (11.8 g.) in tetrahydrofuran (225 cc.) and initiate the reaction by crushing a piece of the suspended magnesium with a glass rod and add a small crystal of iodine. Slowly add the rest of the solution of allyl bromide in tetrahydrofuran over 30 minutes followed by the dropwise addition of a solution of 13β-ethyl-3-methoxygona-1,3,5(10),8-tetraen-17-one in tetrahydrofuran (1 liter) and allyl bromide (220 g.) over a period of 45 minutes. Reflux the reaction mixture for 3 hours, cool to 5° and add 20% aqueous ammonium chloride with vigorous stirring. Separate the organic layer, extract the aqueous layer with ether (400 cc.) and add ether (500 cc.) to the combined organic extracts which are then washed with cold water (5× 300 cc.), dried, the solvent evaporated and the residue recrystallized from n-hexane to obtain the title product (51 g., 88%), m.p. 123–125°; ultraviolet absorption peak at 280 mμ (ε 18,300); infrared absorption (KBr disc) peaks at 2.88, 3.43, 6.12, 6.23, 6.36, 6.67μ.

$C_{23}H_{30}O_2$ calculated: 81.6%; H, 8.92%. Found: 81.55%; H, 8.81%.

This compound possesses estrogenic activity, and is useful as an intermediate in the preparation of the hormonal compounds of this invention.

EXAMPLE 192

13β-ethyl-3-methoxy-17α-propylgona-1,3,5(10),8-tetraen-17β-ol

Shake 13β-ethyl-3-methoxy-17α-allylgona-1,3,5(10),8-tetraen-17β-ol (50 g.) with prereduced 2% palladium on calcium carbonate catalyst (25 g.) in benzene (500 cc.) in an atmosphere of hydrogen until one molecular equivalent of hydrogen has been absorbed (3.6 l.). Filter off the catalyst, evaporate the solvent and recrystallize the residue from hexane to obtain the title product. (40 g., 80%), m.p. 137–139°; ultraviolet absorption peak at 278 mμ (ε 16,800); infrared absorption (KBr disc) peaks at 2.95, 3.5, 6.25, 6.37, 6.68μ.

This compound possesses estrogenic activity, and is useful as an intermediate in the preparation of the hormonal compounds of this invention.

EXAMPLE 193

D-homo-13β-methyl-3-methoxy-gona-1,3,5(10),9-tetraen-17a-one

Dissolve the crude reduced diketone obtained by catalytic hydrogenation of 5-(2-m-methoxyphenylethyl)-9-methyl-6-oxo-$\Delta^{5(10)}$-octalin-1-one in methanol (16 cc.) containing concentrated hydrochloric acid (4 cc.). Keep the solution for 3 hours at room temperature and then 1 hour at 0° C. Filter the crystalline precipitate of cyclodehydrated product and recrystallize from ethyl acetate to obtain D-homo-13β-methyl-3-methoxy-gona-1,3,5(10),9-tetraen-17a-one (0.96 g., 51%), m.p. 172–175° C.; ultraviolet absorption peak at 262 mμ (ε 18,700).

$C_{20}H_{24}O_2$ calculated: C, 81.0%; H, 8.2%. Found: C, 80.8%; H, 8.1%.

This compound possesses estrogenic activity, lowers the blood lipid level and is useful as an intermediate in the preparation of the hormonal compounds of this invention.

EXAMPLE 194

D-homo-13β-methyl-3-methoxy-gona-1,3,5(10), 9-tetraen-17a-one

Reflux the crude reduced diketone (1 g.) starting material of the previous example in ethanol (25 cc.) with 20% sulphuric acid (0.2 cc.) for 2 hours. Cool, and filter the precipitate solid (273 mg.) and recrystallize from ethanol-ethyl acetate mixture to obtain D-homo-13β-methyl-3-methoxy-gona-1,3,5(10),9-tetraen-17a-one.

This compound possesses estrogenic and blood lipid lowering activity and is useful as an intermediate for preparing the hormonal compounds of this invention.

EXAMPLE 195

D-homo - 13β - methyl - 3 - methoxy-gona-1,3,5(10),9-tetraen-17a-one and D - homo-13β-methyl-3-methoxy-gona-1,3,5(10),8-tetraen-17a-one Reflux the crude reduced diketone (0.5 g.) starting material of the previous example in ethanol (25 cc.) with 20% sulphuric acid (10 cc.) for 2 hours; add water to the cooled solution and ether extract the mixture. Evaporate the washed and dried ether extract and obtain a tultraviolet absorption characteristics identical with those of the mixed dehydro compounds.

These compounds possess estrogenic and blood lipid lowering activity and are useful as intermediates in the preparation of the hormonal compounds of the invention.

EXAMPLE 196

D-homo-13β-methyl-3-methoxy-gona-1,3,5(10),9-tetraen-17a-one

Keep 5-(2-m-methoxyphenylethyl) - 9 - methyl-*trans*-decalin-1,6-dione (0.5 g.) in methanol (8 cc.) containing 10N hydrochloric acid (2 cc.) for 3 hours at room temperature, then cool to 0° C. for an hour. Recrystallize the filtered precipitate from ethanol-ethyl acetate mixture, to obtain D-homo-13β-methyl-3-methoxy-gona - 1,3,5(10),9-tetraen-17a-one (0.32 g., 68%), m.p. 172–175° C.

This compound possesses estrogenic activity, lowers the blood lipid level, and is useful as an intermediate for preparing the hormonal compounds of this invention.

EXAMPLE 197

13β-methyl-3-methoxy-gona-1,3,5(10),9-tetraen-17-one

Allow the diketone 4 - (2-m-methoxyphenylethyl)-8-methyl-*trans*-hexahydroindan - 1,5 - dione (0.77 g.) in methanol (25 cc.) and concentrated hydrochloric acid (4 cc.) to stand overnight at 0° C. Treat the mixture with water (50 cc.) and extract with a mixture of ether and benzene. Evaporate the washed and dried extracts to leave a gum which crystallizes (0.65 g.). Recrystallize from a mixture of ethyl acetate and ethanol to obtain 13β-methyl-3-methoxy-gona-1,3,5(10),9-tetraen - 17 - one, m.p. 144–148° C.

This compound possesses estrogenic and blood lipid lowering activity and is useful as an intermediate for preparing the hormonal compounds of this invention.

EXAMPLE 198

13β-ethyl-3-methoxy-gona-1,3,5(10),9-tetraen-17-one

Allow the diketone 4 - (2-m-methoxyphenylethyl)-3-ethyl-*trans*-hexahydroindan-1,5-dione (0.8 g.) in methanol (25 cc.) and concentrated hydrochloric acid (4 cc.) to stand 15 hours at 0° C. Filter the precipitate and recrystallize from methanol to give 13β-ethyl-3-methoxy-gona-1,3,5(10),9-tetraene-17-one; ultraviolet absorption peak at 264 mμ (ε 18,000); infrared absorption peak at 5.78μ.

This compound possesses estrogenic and blood lipid lowering activity and is useful as an intermediate for preparing the hormonal compounds of this invention.

EXAMPLE 199

13β-ethyl-3-methoxy-gona-1,3,5(10),9-tetraen-17β-ol

Add concentrated hydrochloric acid to a solution of 4-(2-m-methoxyphenylethyl) - 8 - ethyl - 5 - oxo - 5,6,7,8-tetrahydroindan-1-ol (0.5 g.) in methanol (10 cc.) until the solution becomes permanently cloudy. Scratch the solution with a seed of product, filter the precipitate and recrystallize from hexane to obtain 13β-ethyl-3-methoxy-gona-1,3,5(10),9-tetraen - 17β - ol; ultraviolet absorption peak at 264 mμ (ε 17,600).

This compound possesses estrogenic and blood lipid lowering activity and is useful as an intermediate for preparing the hormonal compounds of this invention.

EXAMPLE 200

13β-ethyl-3-methoxy-gona-1,3,5(10),9-tetraen-17β-ol

Reflux 13β-ethyl - 3-methoxy-gona-1,3,5(10),9-tetraen-17-one (0.5 g.) and sodium borohydride (0.2 g.) in ethanol (20 cc.) for 30 minutes. Add excess acetic acid and evaporate the solution almost to dryness under reduced pressure. Add water and collect the product in ether. Wash, dry, and evaporate the ethereal solution and recrystallize the residue from methanol to obtain 13β-ethyl-3-methoxy-gona-1,3,5(10),9-tetraen-17β - ol; ultraviolet absorption peak at 265 mμ (ε 14,800).

This compound possesses estrogenic and blood lipid lowering activity and is useful as an intermediate for preparing the hormonal compounds of this invention.

EXAMPLE 201

13β-ethyl-3-methoxy-gona-1,3,5(10),9-tetraen-17β-ol

Reflux 13β - ethyl - 3 - methoxy-gona-1,3,5(10),8-tetraene - 17β - ol (0.5 g.) in ethanol (15 cc.) and concentrated hydrochloric acid (3 cc.) for 2 hours. Dilute the cooled solution with water and collect the product in ether. Wash, dry and evaporate the ethereal solution and recrystallize the residue from methanol to obtain 13β-ethyl-3-methoxy-gona-1,3,5(10),9-tetraen-17β-ol; ultraviolet absorption peaks at 265 mμ (ε 15,000).

This compound has estrogenic activity, lowers the blood lipid level, and is useful as an intermediate for preparing the hormonal compounds of this invention.

EXAMPLE 202

13β-ethyl-3-methoxy-gona-1,3,5(10),9-tetraen-17-one

Treat 13β-ethyl-3-methoxy-17,17-ethylenedioxy-gona-1,3,5(10),8-tetraene (0.5 g.) exactly as described in the previous example to obtain 13β-ethyl-3-methoxy-gona-1,3,5(10),9-tetraen-17-one; ultraviolet absorption peak at 266 mμ (ε 15,000); infrared absorption peaks at 5.78μ.

This compound has estrogenic activity, lowers the blood lipid level, and is useful as an intermediate for preparing the hormonal compounds of this invention.

EXAMPLE 203

13β-n-butyl-3-methoxy-gona-1,3,5(10),9-tetraen-17-one

Reflux 13β-n-butyl-3-methoxy-gona-1,3,5(10),8-tetraen-17-one (0.2 g.) in methanol (25 cc.) and concentrated hydrochloric acid (15 cc.) for 20 minutes. Remove most of the solvent under reduced pressure, add water and extract the mixture with ether. Evaporate the washed and dried extracts and crystallise the pink gum from methanol to obtain 13β-butyl-3-methoxy-gona-1,3,5(10),9-tetraen-17-one (0.075 g.), m.p. 109–114°; ultraviolet absorption peaks at 264 mμ (ε 17,800).

To prepare 13β-isopropyl-3-methoxy-gona-1,3,5(10), 9 - tetraen - 17 - one treat 13β-isopropyl-3-methoxy-gona-1,3,5(10),8-tetraene-17-one with methanolic hydrochloric acid according to the manipulative procedure described above.

To prepare 13β-isobutyl-3-methoxy-gona-1,3,5(10),9-tetraen - 17-one treat 13β-isobutyl-3-methoxy-gona-1,3, 5(10),8 - tetraen - 17 - one with methanolic hydrochloric acid according to the manipulative procedure described above.

To prepare 13β - cetyl - 3-methoxy-gona-1,3,5(10),9-tetraen-17-one treat 13β-cetyl-3-methoxy-gona-1,3,4(10), 8-tetraen-17-one wth methanolic hydrochloric acid according to the manipulative procedure described above.

To prepare 6,13β-dimethyl-3-methoxy-gona-1,3,5(10), 9 - tetraen - 17 - one treat 6,13β-dimethyl-3-methoxygona - 1,3,5(10),8 - tetraen - 17 - one with methanolic hydrochloric acid according to the manipulative procedure described above.

To prepare 7,13β-dimethyl-3-methoxy-gona-1,3,5(10), 9 - tetraen - 17 - one treat 7,13β-dimethyl-3-methoxygona-1,3,5(10),8-tetraen-17-one with methanolic hydrochloric acid according to the procedure described above.

To prepare 13β-ethyl-2,3-dimethoxy-gona-1,3,5(10),9-tetraen-17-one treat 13β-ethyl-2,3-dimethoxy-gona-1,3,5(10),8-tetraen-17-one with methanol and hydrochloric acid according to the manipulative procedure described above.

To prepare 13β - ethyl-1,3-dimethoxy-gona-1,3,5(10),9-tetraen-17-one treat 13β - ethyl-1,3-dimethoxy-gona-1,3,5(10),8-tetraen-17-one with methanol and hydrochloric acid according to the manipulative procedure described above.

To prepare 13β - methyl-3-acetoxy-gona-1,3,5(10),9-tetraen-17-one treat 13β-methyl-3-acetoxy-gona-1,3,5(10),8-tetraen-17-one with methanol and hydrochloric acid according to the manipulative procedure described above.

To prepare 13β-(3-hydroxypropyl)-3-methoxy - gona-1,3,5(10),9-tetraen-17-one treat 13β-(3-hydroxypropyl)-3-methoxy-gona-1,3,5(10),8-tetraen-17-one with methanol and hydrochloric acid according to the manipulative procedure described above.

To prepare 13β-ethyl - 3 - ethoxy-gona - 1,3,5(10),9-tetraen-17-one treat 13β-ethyl-3-ethoxy-gona-1,3,5(10),8-tetraen-17-one with methanol and hydrochloric acid according to the manipulative procedure described above.

To prepare 13β-phenethyl-3-propoxy-gona-1,3,5(10),9-tetraen-17-one treat 13β - phenethyl-3-propoxy-gona-1,3,5(10),8-tetraen-17-one with methanol and hydrochloric acid according to the manipulative procedure described above.

To prepare 13β-isobutyl-3-pentyloxy-gona-1,3,5(10),9-tetraen-17-one treat 13β-isobutyl-3-pentyloxy-gona-1,3,5(10),8-tetraen-17-one with methanol and hydrochloric acid according to the manipulative procedure described above.

To prepare 13β-(3-hydroxypropyl)-3-cyclopentyloxy-gona-1,3,5(10),9-tetraen-17-one treat 13β-(3-hydroxypropyl)-3-cyclopentyloxy - gona-1,3,5(10),8-tetraen-17-one with methanol and hydrochloric acid according to the manipulative procedure described above.

To prepare 13β-phenethyl-3-hydroxy-gona-1,3,5(10),9-tetraen-17-one treat 13β - phenethyl-3-hydroxy-gona-1,3,5(10),8-tetraen-17-one with methanol and hydrochloric acid according to the manipulative procedure described above.

To prepare 13β-(2-diethylaminoethyl)-2,3-dimethoxy-gona-1,3,5(10),9-tetraen - 17 - one treat 13β-(2-diethylaminoethyl) - 2,3 - dimethoxy-gona-1,3,5(10),8-tetraen-17-one with methanol and hydrochloric acid according to the manipulative procedure described above.

To prepare 13β-(3-dimethylaminopropyl)-6-methyl-1,3 - dimethoxy-gona-1,3,5(10),9-tetraen-17-one treat 13β-(3 - dimethylaminopropyl) - 6 - methyl-1,3-dimethoxy-gona-1,3,5(10),8-tetraen-17-one with methanol and hydrochloric acid according to the manipulative procedure described above.

To prepare 13n-butyl-1,3-diethoxy - 6 - ethyl-gona-1,3,5-(10),9-tetraen - 17 - one treat 13β-n-butyl-1,3-diethoxy-6-ethyl-gona-1,3,5(10),8-tetraen - 17 - one with methanol and hydrochloric acid according to the manipulative procedure described above.

To prepare 13n-propyl-2-ethoxy - 3 - methoxy-gona-1,3,5(10),9-tetraen - 17 - one treat 13n-propyl - 2 - ethoxy-3-methoxy-gona - 1,3,5(10),8 - tetraen - 17 - one with methanol and hydrochloric acid according to the manipulative procedure described above.

To prepare 13β-ethyl - 3 - benzyloxy-gona-1,3,5(10),9-tetraen - 17 - one treat 13β-ethyl - 3 - benzyloxy-gona-1,3,5(10),8-tetraen - 17 - one with methanol and hydrochloric acid according to the manipulative procedure described above.

These compounds have estrogenic activity, lower the blood lipid level, and are useful as intermediates in the preparation of the hormonal compounds of the invention.

EXAMPLE 204

13β-ethyl-3-hydroxy-gona-1,3,5(10),9-tetraen-17-one

Dissolve 4-(2-m-hydroxyphenylethyl) - 8 - ethyl-trans-hexahydroindan-1,5-dione (1 g.) in methanol (15 cc.) and add concentrated hydrochloric acid (3 cc.). Warm the mixture at 40° for 1 hour, and then cool to 0°. Filter the precipitate and wash with cold methanol. Dry the product over phosphorus pentoxide to obtain 13β-ethyl-3-hydroxygona-1,3,5(10),9-tetraen-17-one, m.p. 262–4°; ultraviolet absorption peak at 267 mμ (ε 15,000).

This compound has estrogenic activity, lowers the blood lipid level, and is useful as an intermediate for preparing the hormonal compounds of this invention.

EXAMPLE 205

13β-ethyl-3-hydroxy-gona-1,3,5(10),9-tetraen-17-one

Dissolve 13β - ethyl - 3 - hydroxy-gona-1,3,5(10),8-tetraen-17-one in warm methanol (125 ml.) and treat with concentrated hydrochloric acid (25 cc.). Heat the solution under reflux for 45 minutes, cool and keep at 0° for 1 hour; then filter the solid and wash with cold methanol. Dry the product in vacuo to obtain 13β-ethyl-3-hydroxygona-1,3,5(10),9-tetraen - 17 - one, m.p. 265°; ultraviolet absorption peak at 266 mμ (ε 15,400).

This compound has estrogenic activity, lowers the blood lipid level, and is useful as an intermediate for preparing the hormonal compounds of this invention.

EXAMPLE 206

13β-ethyl-gona-1,3,5(10),9-tetraen-3,17β-diol

Reflux 13β-ethyl - 3 - hydroxy-gona-1,3,5(10),9-tetraen-17-one (0.5 g.) in ethanol (25 cc.) with sodium borohydride (0.12 g.) for 30 minutes. Treat the cooled solution with a slight excess of acetic acid to decompose the reagent and evaporate the mixture almost to dryness. Add water and collect the product in ether. Wash, dry and evaporate the ethereal solution, evaporate to a residue and recrystallize from methanol to obtain 13β - ethyl - gona-1,3,5(10),9-tetraen-3,17β-diol; ultraviolet absorption peaks at 265 mμ (ε 16,200); infrared absorption peaks at 2.92 and 3.07μ, no carbonyl absorption.

This compound has estrogenic activity, lowers the blood lipid level, and is useful as an intermediate for preparing the hormonal compounds of this invention.

EXAMPLE 207

13β-n-propyl-3-hydroxy-gona-1,3,5(10),9-tetraen-17-one

Reflux 13β-n-propyl - 3 - hydroxy-gona-1,3,5(10),8-tetraen-17-one (0.36 g.) with methanol (18 cc.) and concentrated hydrochloric acid (2 cc.) for 15 minutes. To the resulting pink solution add ether (100 cc.) and water (50 cc.), separate the ether solution, wash and dry. Evaporate to a residue and recrystallize from acetone to obtain 13β-n-propyl-3-hydroxy-gona - 1,3,5(10),9 - tetraen-17-one as colorless crystals (0.17 g.), m.p. 220–5°; ultraviolet absorption peaks at 266 mμ (ε 14,000).

This compound has estrogenic activity, lowers the blood lipid level, and is useful as an intermediate for preparing the hormonal compounds of this invention.

EXAMPLE 208

13β-Ethyl-3-benzyloxy-gona-1,3,5(10),9-tetraen-17-one

Treat 13β-ethyl-3-hydroxy-gona-1,3,5(10),9-tetraen-17-one (0.2 g.) in methanol (20 cc.) with an excess of an ethereal solution of phenyldiazomethane and allow the mixture to stand for 18 hours. Add acetic acid (3 cc.) and evaporate to dryness. Take the residue up in ether, wash with sodium bicarbonate solution, dry and evaporate. Filter the residue through a column of alumina (15 g.) and evaporate the solvent to obtain 13β-ethyl-3-benzyloxy-gona-1,3,5(10),9-tetraen-17-one; ultraviolet absorption peak at 260 mμ (ε 18,000).

This compound has estrogenic activity, lowers the blood lipid level, and is useful as an intermediate for preparing the hormonal compounds of this invention.

EXAMPLE 209

13β-ethyl-3-acetoxy-gona-1,3,5(10),9-tetraen-17-one

Dissolve 13β - ethyl - 3 - hydroxy - gona - 1,3,5(10),9-tetraen-17-one (0.5 g.) in pyridine (3 cc.) and acetic anhydride (1 cc.) and allow to stand at room temperature for 5 hours. Remove the solvents at low pressure and dissolve the residue in a little benzene and filter through a short column of Florisil. Evaporate the solvent and recrystallize the residue from ethanol to obtain 13β-ethyl - 3 - acetoxy - gona - 1,3,5(10),9 - tetraen-17-one; ultraviolet absorption peaks at 263 mμ (ε 14,300); infrared absorption peaks at 5.73 and 5.78μ.

This compound has estrogenic activity, lowers the blood lipid level, and is useful as an intermediate for preparing the hormonal compounds of this invention.

EXAMPLE 210

13β-methyl-3-methoxy-gona-1,3,5(10),9-tetraen-17β-ol

Treat the keto-alcohol 4 - (2 - m - methoxyphenylethyl) - 8 - methyl - 5 - oxo - transhexahydroindan-1-ol (0.25 g.) in methanol (2.5 cc.) with concentrated hydrochloric acid (1.5 cc.) at 0°, and afterwards allow the solution to warm up to room temperature. After 30 minutes filter the precipitate formed to obtain 13β - methyl-3 - methoxy - gona - 1,3,5(10)9 - tetraen - 17 - β - ol (0.065 g.), m.p. 114–28°; ultraviolet absorption peak at 264 mμ (ε 18,500).

This compound has estrogenic activity, lowers the blood lipid level, and is useful as an intermediate for preparing the hormonal compounds of this invention.

EXAMPLE 211

13β-methyl-3-methoxy-17,17-ethylenedioxy-gona-1,3,5-(10),9-tetraene

Reflux 13β - methyl - 3 - methoxy - gona - 1,3,5(10),9-tetraen - 17 - one (0.6 g.) in benzene (60 cc.) with ethylene glycol (1 cc.) and toluene-p-sulphonic acid (0.04 g.) for 15 hours using a Dean-Stark apparatus. Work up by means of ether in the usual way to obtain the ketal 13β - methyl - 3 - methoxy - 17,17 - ethylenedioxy-gona-1,3,5(10),9-tetraene as a solid (0.45 g.); recrystallize it from light petroleum, m.p. 130–2° C.

$C_{21}H_{26}O_3$ calculated: C, 77.3%; H, 8.0%. Found: C, 77.2%; H, 8.05%.

To prepare 13β - ethyl - 3 - methoxy - 17,17-ethylenedioxy-gona-1,3,5(10),9 - tetraene treate 13β - ethyl - 3-methoxy - gona - 1,3,5(10),9 - tetraen - 17 - one with excess ethylene glycol in benzene in the presence of a catalytic amount of toluene-p-sulphonic acid according to the manipulative procedure described above.

To prepare 13β - n - propyl - 3 - methoxy - 17,17-ethylenedioxy - gona - 1,3,5(10),9 - tetraene treat 13β-propyl - 3 - methoxy - gona - 1,3,5(10),9 - tetraen - 17-one with excess ethylene glycol in benzene in the presence of a catalytic amount of toluene-p-sulphonic acid according to the manipulative procedure described above.

To prepare 13β - ethyl - 2,3 - dimethoxy - 17,17-ethylenedioxy - gona - 1,3,5(10),9 - tetraene, treat 13β-ethyl-2,3, dimethoxy - gona - 1,3,5(10),9 - tetraen - 17 - one with excess ethylene glycol in benzene in the presence of a catalytic amount of toluene-p-sulphonic acid according to the manipulative procedure described above.

To prepare 13β - ethyl - 1,3 - dimethoxy - 17,17-ethylenedioxy - gona - 1,3,5(10),9 - tetraene, treat 13β-ethyl-1,3 - dimethoxy - gona - 1,3,5(10),9 - tetraen - 17-one with excess ethylene glycol in benzene in the presence of a catalytic amount of toluene-p-sulphonic acid according to the manipulative procedure described above.

To prepare 13β - ethyl - 3 - ethoxy - 17,17 - ethylenedioxy - gona - 1,3,5(10),9-tetraene, treat 13β-ethyl-3 - ethoxy - gona - 1,3,5(10),9 - tetraen - 17 - one with excess ethylene glycol in benzene in the presence of a catalytic amount of toluene-p-sulphonic acid according to the manipulative procedure described above.

To prepare 13β - phenethyl - 3 - propoxy - 17,17-ethylenedioxy - gona - 1,3,5(10),9 - tetraene, treat 13β-phenethyl - 3 - propoxy - gona - 1,3,5(10),9 - tetraen-17-one with excess ethylene glycol in benzene and toluene-p-sulphonic acid according to the manipulative procedure described above.

To prepare 13β - isobutyl - 3 - pentyloxy - 17,17-ethylenedioxy - gona - 1,3,5(10),9 - tetraene, treat 13β - isobutyl - 3 - pentyloxy - gona - 1,3,5(10),9 - tetraen-17-one with excess ethylene glycol in benzene in the presence of a catalytic amount of toluene-p-sulphonic acid according to the manipulative procedure described above.

To prepare 13β - (3 - hydroxyphenyl) - 3 - cyclopentyloxy - 17,17 - ethylenedioxy - gona - 1,3,5(10),9-tetraene, treat 13β - (3 - hydroxyphenyl) - 3 - cyclopentyloxy - gona - 1,3,5(10),9 - tetraen - 17 - one with excess ethylene glycol in benzene in the presence of a catalytic amount of toluene-p-sulphonic acid according to the manipulative procedure described above.

To prepare 13β - (3 - dimethylaminopropyl) - 1,3-dimethoxy - 17,17 - ethylenedioxy - gona - 1,3,5(10),9-tetraene, treat 13β - (3 - dimethylaminopropyl) - 1,3-dimethoxy - gona - 1,3,5(10),9 - tetraen - 17 - one with excess ethylene glycol in benzene in the presence of a catalytic amount of toluene-p-sulphonic acid according to the manipulative procedure described above.

These compounds have estrogenic activity, lower the blood lipid level, and are useful as intermediates in the preparation of the hormonal compounds of the invention.

EXAMPLE 212

13β-ethyl-3,17β-diacetoxy-gona-1,3,5(10),9-tetraene

Dissolve 13β - ethyl-gona - 1,3,5(10),9-tetraene-3,17β-diol (0.5 g.) in pyridine (2.5 cc.) and acetic anhydride (2.5 cc.) and allow the mixture to stand at room temperature for 18 hours. Remove the solvent in vacuo and dissolve residue in a little benzene and filter through a short column of neutral alumina. Evaporate the solvent and recrystallize the residue from methanol to obtain 13β-ethyl-3,17β-diacetoxy-gona-1,3,5(10),9-tetraene; ultraviolet absorption peaks at 265 mμ (ε 16,000); infrared absorption peaks at 5.70 and 5.80μ.

This compound possesses estrogenic and blood lipid lowering activity and is useful as an intermediate for preparing the hormonal compounds of this invention.

EXAMPLE 213

13β-ethyl-3-methoxy-17α-ethynyl-gona-1,3,5(10),9-tetraene-17β-ol

Add lithium acetylide (3.5 g.) in dioxane (10 cc.) ethylenediamine (10 cc.), and dimethylacetamide (20 cc.) to 13β - ethyl-3-methoxy-gona-1,3,5(10),9-tetraene-17-one (3.5 g.) in dimethylacetamide (100 cc.) with stirring in an atmosphere of acetylene. Stir the mixture for 16 hours at room temperature then pour over crushed ice and extract with ether. Evaporate the washed and dried extracts to a residue and chromatograph on florex to obtain a product which on recrystallization from methanol-water and then from ethyl acetate-hexane gives 13β - ethyl-3-methoxy - 17α - ethynyl-gona-1,3,5(10),9-tetraene-17β-ol, m.p. 110–112°; ultraviolet absorption peaks at 264 mμ (ε 20,400); infrared absorption peaks at 2.80 and 3.05μ.

To obtain 13β - propyl-3-methoxy-17α-ethynyl-gona-1,3, 5(10),9 - tetraen-17β-ol treat 13β-propyl-3-methoxy-gona- 1,3,5(10),9 - tetraen-17-one with excess lithium acetylide according to the manipulative procedure described above.

To obtain 13β-n-butyl-3-methoxy-17α-ethynyl-gona-1,3,5(10),9-tetraen-17β-ol treat 13β-n-butyl-3-methoxy-gona-1,3,5(10),9-tetraen-17-one with excess lithium acetylide according to the manipulative procedure described above.

To obtain 13β - cetyl-3-methoxy-17α-ethynyl-gona-1,3,5(10),9-tetraen-17β-ol treat 13β-cetyl-3-methoxy-gona-1,3,5(10),9-tetraen-17-one with excess lithium acetylide according to the manipulative procedure described above.

To obtain 13β,6-dimethyl-3-methoxy-17α-ethynyl-gona-1,3,5(10),9 - tetraen-17β-ol treat 13β,6-dimethyl-3-methoxy-gona - 1,3,5(10),9-tetraen-17-one with excess lithium acetylide according to the manipulative procedure described above.

To obtain 13β,7-dimethyl-3-methoxy-17α-ethynyl-gona-1,3,5(10),9 - tetraen-17β-ol treat 13β,7-dimethyl-3-methoxy-gona-1,3,5(10),9-tetraen-17-one with excess lithium acetylide according to the manipulative procedure described above.

To obtain 13β - ethyl-2,3-dimethoxy-17α-ethynyl-gona-1,3,5(10),9-tetraen-17β-ol treat 13β-ethyl-2,3-dimethoxy-gona-1,3,5(10),9-tetraen-17-one with excess lithium acetylidene according to the manipulative procedure described above.

To obtain 13β - ethyl - 3 - ethoxy-17α-ethynyl-gona-1,3,5(10),9-tetraen-17β-ol treat 13β-ethyl-3-ethoxy-gona-1,3,5(10),9 - tetraen-17-one with excess lithium acetylide according to the manipulative procedure described above.

To obtain 13β - phenethyl-3-propoxy-17α-ethynyl-gona-1,3,5(10),9-tetraen-17β-ol treat 13β-phenethyl-3-propoxy-gona-1,3,5(10),9-tetraen-17-one with excess lithium acetylide according to the manipulative procedure described above.

To obtain 13β - (3-hydroxypropyl)-3-cyclopentyl-17α-ethynyl-gona - 1,3,5(10),9-tetraen-17β-ol treat 13β(-3-hydroxypropyl) - 3 - cyclopentyl-gona-1,3,5(10),9-tetraen-17-one with excess lithium acetylide according to the manipulative procedure described above.

To obtain 13β - (2-diethylaminoethyl)-2,3-dimethoxy-17α-ethynyl-gona - 1,3,5(10),9 - tetraen-17β-ol treat 13β-(2 - diethylaminoethyl)-2,3-dimethoxy-gona-1,3,5(10),9-tetraen-17-one with excess lithium acetylide according to the manipulative procedure described above.

These compounds have estrogenic activity, lower the blood lipid level, and are useful as intermediates in the preparation of the hormonal compounds of the invention.

EXAMPLE 214

13β-ethyl-3,17β-dimethoxy-gona-1,3,5(10),9-tetraene

Treat 13β - ethyl-3-methoxy-gona-1,3,5(10),9-tetraen-17β-ol (0.5 g.) in methylene chloride (25 cc.) containing 1 drop of boron trifluoride etherate with a solution of diazomethane (from 1 g. of N-nitrosomethylurea) in methylene chloride (20 cc.). Stir the mixture for five minutes, filter and wash and dry the filtrate. Remove the solvent and recrystallize the residue from methanol to obtain 13β-ethyl - 3,17β-dimethoxy-gona-1,3,5(10),9-tetraene; no infrared absorption due to hydroxyl; ultraviolet absorption peak at 266 mμ (ε 15,200).

This compound has estrogenic activity, lowers the blood lipid level, and is useful as an intermediate for preparing the hormonal compounds of this invention.

EXAMPLE 215

13β-17α-diethyl-3-methoxy-gona-1,3,5(10),9-tetraen-17β-ol

Add 13β - ethyl-3-methoxy-17α-ethynyl-gona-1,3,5(10),9-tetraen-17β-ol (1 g.) in benzene (15 cc.) to 2% prereduced palladium on calcium carbonate catalysts (300 mg.) in benzene (10 cc.) and shake the mixture in an atmosphere of hydrogen until 2 molecular equivalents of hydrogen (170 cc.) has been adsorbed. Filter the catalyst and evaporate the solvent to obtain 13β,17α-diethyl-3-methoxy-gona - 1,3,5(10),9 - tetraen-17β-ol and recrystallize from methanol, m.p. 112–17°; ultraviolet absorption peak at 265 mμ (ε 16,100).

This compound has estrogenic activity, lowers the blood lipid level, and is used as an intemediate for preparing the hormonal compounds of this invention.

To obtain 13β - propyl - 3 - methoxy - 17α - ethylgona - 1,3,5(10),9 - tetraen - 17β - ol hydrogenate 13β-propyl - 3 - methoxy - 17α - ethynyl - gona-1,3,5(10),9-tetraen-17β-ol according to the manipulative procedure described above.

To obtain 13β - butyl - 3 - methoxy - 17α - ethyl - gona-1,3,5(10),9 - tetraen - 17β - ol hydrogenate 13β - butyl-3 - methoxy - 17α - ethynyl - gona - 1,3,5(10),9-tetraen-17β-ol according to the manipulative procedure described above.

To obtain 13β - cetyl - 3 - methoxy-17α-ethyl-gona-1,3,5(10),9 - tetraen - 17β - ol hydrogenate 13β - cetyl - 3-methoxy - 17α - ethynyl - gona - 1,3,5(10),9 - tetraen-17β-ol according to the manipulative procedure described above.

To obtain 6,13β - dimethyl - 3- methoxy - 17α - ethyl-gona - 1,3,5(10),9 - tetraen - 17β - ol hydrogenate 6,13β-dimethyl - 3 - methoxy - 17α - ethynyl - gona - 1,3,5(10),9-tetraen - 17β - ol according to the manipulative procedure described above.

To obtain 7,13β - dimethyl 1 3 - methoxy - 17α-ethyl-gona - 1,3,5(10),9 - tetraen - 17β - ol hydrogenate 7,13β - dimethyl - 3 - methoxy - 17α - ethynyl - gona-1,3,5(10),9 - tetraen - 17β - ol according to the manipulative procedure described above.

To obtain 13β-ethyl-2,3-dimethoxy-17α-ethyl-gona-1,3,5(10),9-tetraene-17β-ol hydrogenate 13α-ethyl-2,3-dimethoxy - 17α - ethynyl-gona-1,3,5(10),9-tetraen-17β-ol according to the manipulative procedure described above.

To obtain 13β,17α - diethyl-3-ethoxy-gona-1,3,5(10),9-tetraen-17β-ol hydrogenate 13β-ethyl-3-ethoxy-17α-ethynyl-gona-1,3,5(10),9-tetraen-17β-ol according to the manipulative procedure described above.

To obtain 13β-phenethyl-3-propoxy-17α-ethyl-gona-1,3,5(10),9-tetraen-17β-ol hydrogenate 13β-phenethyl-3-propoxy-17α-ethynyl-gona-1,3,5(10),9-tetraen-17β-ol according to the manipulative procedure described above.

To obtain 13β-(3 - hydroxypropyl)-3-cyclopentyloxy-17α - ethyl-gona-1,3,5(10),9-tetraen-17β-ol hydrogenate 13β-(3-hydroxypropyl) - 3 - cyclopentyloxy-17α-ethynyl-gona-1,3,5(10),9-tetraen-17β-ol according to the manipulative procedure described above.

To obtain 13β-(2 - diethylaminoethyl)-2,3-dimethoxy-17α - ethyl-gona-1,3,5(10),9-tetraen-17β-ol hydrogenate 13β-(2-diethylaminoethyl) - 2,3 - dimethoxy-17α-ethynyl-gona-1,3,5(10),9-tetraen-17β-ol according to the manipulative procedure described above.

These compounds have estrogenic activity, lower the blood lipid level, and are useful as intermediates in the preparation of the hormonal compounds of the invention.

EXAMPLE 216

D-homo-13β-methyl-3-methoxy-gona-1,3,5(10)-trien-17aβ-ol

Add D-homo-13β-methyl-3-methoxy-gona-1,3,5(10),9-tetraen-17a-one (0.5 g.) in tetrahydrofuran (35 cc.) to a stirred solution of potassium (0.35 g.) in liquid ammonia (125 cc.). After 5 minutes add more potassium (0.35 g.) and after a further 30 minutes add ammonium chloride (2 g.) to discharge the blue color. Add water (75 cc.), collect the product with ether, evaporate the solvent and recrystallize from methanol to obtain D-homo-13β-methyl-3-methoxy-gona-1,3,5(10)-trien-17aβ-ol, m.p. 98–9°. Sublime to obtain the compound, m.p. 138–140°.

Calculated for $C_{20}H_{28}O_2$: C, 80.01%; H, 9.41%. Found: C, 80.2%; H, 9.21%.

This compound has estrogenic activity, lowers the blood lipid level, and is useful as an intermediate for preparing the hormonal compounds of this invention.

EXAMPLE 217

D-homo-13β-methyl-3-methoxy-gona-1,3,5(10)-trien-17a-one

Prepare a solution of 8N chromic acid in aqueous sulphuric acid by dissolving chromium oxide (26.72 g.) in concentrated sulphuric acid (23 cc.) and then diluting with water to 100 cc. Add the solution (0.3 cc.) dropwise to D-homo - 13β - methyl - 3 - methoxy-gona-1,3,5(10)-trien-17aβ-ol (100 mg.) in acetone (30 cc.). After 30 seconds add water (50 cc.) and extract the mixture with ether-benzene. Evaporate the washed and dried extracts and recrystallize the residue from ethanol to obtain D-homo-13β-methyl - 3 - methoxy-gona-1,3,5(10)-trien-17a-one (69 mg., 69%), m.p. 153–5° C.; infrared absorption spectrum (measured in carbon disulphide solution) is identical with that of D-homo-13β-methyl - 3 - methoxy-gona - 1,3,5(10) - trien-17a-one prepared from natural estrone methyl ether by the method of Goldberg and Studer (Helv. Chim. Acta, 1941, 24, 478, 295E). Prepare the benzylidene derivative by refluxing the ketone with benzaldehyde and sodium methoxide in methanol, m.p. 145–6° C.; a mixed melting point proves its identity with the product described by Johnson et al. (J. Amer. Chem. Soc., 1952, 74, 2832) as having m.p. 146–7° C.

$C_{20}H_{26}O_2$ calculated: C, 80.5; H, 8.8%. Found: C, 80.3; H, 8.7%.

This compound has estrogenic activity, lowers the blood lipid level, and is useful as an intermediate for preparing the hormonal compounds of this invention.

EXAMPLE 218

D-homo-13β-methyl-3-methoxy-gona-1,3,5(10)-trien-17a-one

Add D-homo-13β-methyl-3-methoxy-gona - 1,3,5(10),8-tetraen-17a-one (0.1 g.) in tetrahydrofuran (10 cc.) to liquid ammonia (50 cc.) and add potassium (0.15 g.) to the mixture. Stir for 1 hour and then treat with solid ammonium chloride (2 g.). Add water (50 cc.) and ether-extract the product and work up the extract to crude D-homo-13β-methyl-3-methoxy-gona - 1,3,5(10)-trien-17aβ-ol. Dissolve this ether in acetone (20 cc.) and add 8N chromic acid (0.1 cc.) followed after 2 minutes by a little ethanol. Reduce the solution in bulk by evaporating of solvent, add water, extract the mixture with ether-benzene mixture, and wash, dry and evaporate the extracts. Crystallize the gummy product, wash it with a little ether and recrystallize from ethanol. Dissolve the product in benzene, chromatograph on an alumina column. Elute with benzene, evaporate and recrystallize from ethanol to obtain D-homo-13β-methyl - 3 - methoxy-gona-1,3,5(10)-trien-17a-one, m.p. 153–5°.

This compound has estrogenic activity, lowers the blood lipid level, and is useful as an intermediate for preparing the hormonal compounds of this invention.

EXAMPLE 219

13β-methyl-3-methoxy-gona-1,3,5(10)-trien-17β-ol

Add 13β - methyl-3-methoxy-gona-1,3,5(10),9-tetraen-17-one (0.10 g.) in tetrahydrofuran (10 cc.) to a stirred solution of potassium (0.12 g.) in liquid ammonia (150 cc.). After 5 minutes add a further amount (0.12 g.) of potassium and continue stirring for 1 hour. Add ammonium chloride to discharge the blue color, followed by water (100 cc.). Evaporate the ammonia, and ether extract the aqueous mixture, wash and dry the extracts and evaporate to obtain crude 13β-methyl-3-methoxy-gona-1,3,5(10)-trien-17β-ol (.088 g.) as a gum; ultraviolet absorption peak at 280 mμ (ε 1,600).

This compound has estrogenic activity, lowers the blood lipid level, and is useful as an intermediate for preparing the hormonal compounds of this invention.

EXAMPLE 220

13β-methyl-3-methoxy-gona-1,3,5(10)-trien-17β-ol

Add 13β - methyl-3-methoxy-gona-1,3,5(10),8-tetraen-17-one (m.p. 110–20°, 0.25 g.) dissolved in tetrahydrofuran (15 cc.) to a solution of potassium (0.1 g.) in liquid ammonia (70 cc.). Add further potassium (0.3 g.) to the stirred solution during 5 minutes and then stir the solution for 1 hour. Add ammonium chloride (2 g.), followed, when the blue color has been discharged, by water (50 cc.). Extract the mixture with ether and evaporate the washed and dried extracts to a gum to obtain 13β-methyl-3-methoxy-gona-1,3,5(10)-trien-17β-ol.

This compound has estrogenic activity, lowers the blood lipid level, and is useful as an intermediate for preparing the hormonal compounds of this invention.

EXAMPLE 221

13β-methyl-3-methoxy-gona-1,3,5(10)-trien-17-one

Dissolve 13β - methyl-3-methoxy-gona-1,3,5(10)-trien-17β-ol in acetone (30 cc.) and add 8N chromic acid (0.3 cc.) drop by drop to the swirled solution, followed after a 1 minute interval by methanol (5 cc.). Remove most of the solvent under reduced pressure, add water (50 cc.) and extract the product with a mixture of equal volumes of ether and benzene. Evaporate the washed and dried extracts and crystallize the residue from ethanol to obtain 13β-methyl - 3 - methoxy-gona-1,3,5(10)-trien-17-one (0.114 g.), m.p. 137–42°. Purify further by recrystallization to obtain the pure compound, m.p. 143–4°, whose infrared spectrum is identical with that of 13β-methyl-3-methoxy-gona-1,3,5(10)-trien-17-one obtained from natural estrone.

To obtain 13β-isobutyl - 3 - methoxy-gona-1,3,5(10)-trien-17-one treat 13β-isobutyl-3-methoxy-gona-1,3,5(10)-trien-17β-ol with chromic acid and acetone according to the manipulative procedure described above.

To obtain 13β-cetyl - 3 - methoxy-gona-1,3,5(10)-trien-17-one, treat 13β-cetyl-3-methoxy-gona-1,3,5(10)-trien-17β-ol with chromic acid and acetone according to the manipulative procedure described above.

To obtain 13β,6-dimethyl-3-methoxy-gona-1,3,5(10)-trien-17-one treat 13β,6-dimethyl - 3 - methoxy-gona-1,3,5(10)-trien-17β-ol with chromic acid and acetone according to the manipulative procedure described above.

To obtain 13β,7-dimethyl-3-methoxy-gona-1,3,5(10)-trien-17-one treat 13β,7-dimethyl - 3 - methoxy-gona-1,3,5(10)-trien-17β-ol with chromic acid in acetone according to the manipulative procedure described above.

To obtain 13β-ethyl - 2,3 - dimethoxy-gona-1,3,5(10)-trien-17-one treat 13β - ethyl - 2,3 - dimethoxy-gona-1,3,5(10)-trien-17β-ol with chromic acid and acetone according to the manipulative procedure described above.

To obtain 13β-ethyl - 1,3 - dimethoxy-gona-1,3,5(10)-trien-17-one treat 13β - ethyl - 1,3 - dimethoxy-gona-1,3,5(10)-trien-17β-ol with chromic acid and acetone according to the manipulative procedure described above.

To obtain 13β-methyl-3-acetoxy-gona-1,3,5(10)-trien-17-one treat 13β-methyl-3-acetoxy-gona-1,3,5(10)-trien-17β-ol with chromic acid and acetone according to the manipulative procedure described above.

To obtain 13β-(3-oxopropyl) - 3 - methoxy-gona-1,3,5(10)-trien-17-one treat 13β-(3 - hydroxypropyl)-3-methoxy-gona-1,3,5(10)-trien-17β-ol with chromic acid and acetone according to the manipulative procedure described above.

To obtain 13β-ethyl-3-ethoxy-gona-1,3,5(10)-trien-17-one treat 13β-ethyl-3-ethoxy-gona-1,3,5(10)-trien-17β-ol with chromic acid and acetone according to the manipulative procedure described above.

To obtain 13β-isobutyl - 3 - pentyloxy-gona-1,3,5(10)-trien-17-one treat 13β-isobutyl - 3 - pentyloxy-gona-1,3,5(10)-trien-17β-ol with chromic acid and acetone according to the manipulative procedure described above.

To obtain 13β-(3-oxopropyl)-3-cyclopentyloxy-gona-1,3,5(10)-trien-17-one treat 13β-(3-hydroxypropyl)-3-cyclopentyloxy - gona - 1,3,5(10)-trien-17β-ol with chromic acid and acetone according to the manipulative procedure described above.

To obtain 13β-phenethyl - 3 - hydroxy-gona-1,3,5(10)-trien-17-one treat 13β-phenethyl-gona-1,3,5(10)-trien-3,17β-diol with chromic acid in acetone according to the manipulative procedure described above.

To obtain 13β-(2 - diethylaminoethyl)-2,3-dimethoxy-gona-1,3,5(10)-trien-17-one treat 13β-(2-diethylaminoethyl)-2,3-dimethoxy - gona - 1,3,5(10)-trien-17β-ol with chromic acid and acetone according to the manipulative procedure described above.

To obtain 13β-(3-dimethylaminopropyl) - 1,3 - dimethoxy-6-methyl-gona-1,3,5(10)-trien-17-one treat 13β-(3-dimethylaminopropyl) - 1,3 - dimethoxy-6-methyl-gona-1,3,5(10)-trien-17β-ol with chromic acid and acetone according to the manipulative procedure described above.

To obtain 13β-n-butyl - 1,3 - diethoxy-6-ethyl-gona-1,3,5(10)-trien-17-one treat 13β-n-butyl-1,3-diethoxy-6-ethyl-gona-1,3,5(10)-trien-17β-ol with chromic acid and acetone according to the manipulative procedure described above.

To obtain 13β - n - propyl-2-ethoxy-3-methoxy-gona-1,3,5(10)-trien-17-one treat 13β - n - propyl-2-ethoxy-3-methoxy-gona-1,3,5(10)-trien-17β-ol with chromic acid and acetone according to the manipulative procedure described above.

To obtain 13β-ethyl-3-benzyloxy-gona-1,3,5(10)-trien-17-one treat 13β-ethyl-3-benzyloxy-gona-1,3,5(10)-trien-17β-ol with chromic acid and acetone according to the manipulative procedure described above.

To obtain 13β-phenethyl-3-propoxy-gona - 1,3,5(10)-trien-17-one treat 13β-phenethyl-3-propoxy-gona - 1,3,5(10)-trien-17β-ol with chromic acid and acetone according to the manipulative procedure described above.

These compounds have estrogenic activity, lower the blood lipid level, and are useful as intermediates in the preparation of the hormonal compounds of the invention.

EXAMPLE 222

13β-methyl-3-methoxy-gona-1,3,5(10)-trien-17-one

Dissolve 13β-methyl-3-methoxy-gona - 1,3,5(10) - trien-17β-ol (0.085 g.) in acetone (25 cc.) and add 8N chromic acid solution (0.5 cc.). After 3 minutes add ethanol to decompose excess chromic acid, followed by water (100 cc.). Extract with a mixture of ether and benzene, wash and dry the extracts and remove the solvent to obtain a gum which crystallizes (0.07 g.). Recrystallize from methanol to obtain 13β - methyl-3-methoxy-gona-1,3,5(10)-trien-17-one, m.p. 138–141° C.

$C_{19}H_{24}O_2$ calculated: C, 80.2%; H, 8.5%. Found: C, 80.0%; H, 8.2%.

This compound has estrogenic activity, lowers the blood lipid level, and is useful as an intermediate for preparing the hormonal compounds of this invention.

EXAMPLE 223

D-homo-13β-ethyl-3-methoxy-gona-1,3,5(10)-trien-17aβ-ol

Add D-homo-13β-ethyl - 3 - methoxy-gona-1,3,5(10),8-tetraen-17aβ-ol (20 g.) in tetrahydrofuran (525 cc.) to liquid ammonia (1500 cc.) and aniline (250 cc.) and add lithium (5 g.) in pieces. After stirring for 1½ hours discharge the blue color by the addition of sodium nitrite followed by water and isolate the product with ether. Recrystallize the product from methanol to obtain D-homo-13β-ethyl-3-methoxy-gona-1,3,5(10)-trien-17aβ-ol (15 g.), m.p. 103–105° after previous softening; ultraviolet absorption peak at 280 mμ (ε 2,800); infrared absorption peaks at 2.96 and 6.23μ.

This compound has estrogenic activity, lowers the blood lipid level, and is useful as an intermediate for preparing the hormonal compounds of this invention.

EXAMPLE 224

D-homo-13β-ethyl-3-methoxy-gona-1,3,5(10)-triene-17a-one

Add 8N chromic acid (0.5 cc.) to a swirled solution of D-homo-13β-ethyl-3-methoxy - gona - 1,3,5(10) - trien-17aβ-ol (0.3 g.) in acetone (75 cc.) containing anhydrous magnesium sulphate. After 30 seconds add isopropyl alcohol (2 cc.) and evaporate the mixture to dryness. Add water and extract the mixture with ether. Chromatograph the product on activated alumina to afford D-homo-13β-ethyl-3-methoxy-gona-1,3,5(10)-trien-17a-one; ultraviolet absorption peak at 278 mμ (ε 1,900); infrared absorption peak at 5.85μ.

This compound possesses estrogenic and blood lipid lowering activity and is useful as an intermediate for preparing the hormonal compounds of this invention.

EXAMPLE 225

13β-ethyl-3-methoxy-gona-1,3,5(10)-trien-17β-ol

Dissolve 13β-ethyl-3-methoxy-gona 1,3,5(10),8-tetraen-17-one in 100 ml. of tetrahydrofuran and add this solution with stirring to a solution of 0.6 g. of potassium in 150 ml. of liquid ammonia. After stirring the mixture for one hour, add an excess of ammonium chloride and work up the product. Dissolve the gummy product in benzene and chromatograph on activated alumina; elute with ether to obtain 13β-ethyl-3-methoxy-gona-1,3,5(10)-trien-17β-ol; m.p. 131–134° C.; ultraviolet absorption peak at 275 mμ (ε 3,700).

This compound possesses estrogenic and blood lipid lowering activity and is useful as an intermediate for preparing the hormonal compounds of this invention.

EXAMPLE 226

13β-ethyl-3-methoxy-gona-1,3,5(10)-trien-17-one

Add 13β-ethyl - 3 - methoxy-gona-1,3,5(10),8-tetraen-17-one (1.0 g.) in 1-methoxypropan - 2 - ol (100 cc.) to liquid ammonia (150 cc.), followed by lithium metal (2.0 g.) in small pieces during 20 minutes with stirring. Discharge the blue color immediately after completion of the metal addition; add water and filter the solid and recrystallize from methanol to obtain 13β-ethyl-3-methoxy-gona-2,5(10)-dien-17β-ol (0.3 g.); no selective ultraviolet absorption beyond 220 mμ; infrared absorption peaks at 3.08, 5.92, 6.01μ.

To this product (0.3 g.) in acetone (100 cc.) add 8N chromic acid (0.6 cc.), followed after 1 minute by methanol (2 cc.). Remove the solvent, add water, and work up the product with ether to obtain as residue a crude crystalline material (0.3 g.). Recrystallize from methanol to obtain 13β - ethyl-3-methoxy-gona-1,3,5(10)-trien-17-one identical with the material otherwise obtained.

This compound possesses estrogenic and blood lipid lowering activity and is useful as an intermediate for preparing the hormonal compounds of this invention.

EXAMPLE 227

13β-ethyl-3-methoxy-gona-1,3,5(10)-trien-17-one

Add an aqueous 8N solution of chromic acid (0.5 cc.) to a swirled solution of 13β - ethyl-3-methoxy-gona-1,3,5(10)-trien-17β-ol (0.3 g.) in acetone (75 cc.). After 30 seconds add methanol (2 cc.) to remove excess oxidizing agent. Remove most of the solvent under reduced pressure, add water (100 cc.) to the residue, and ether extract the aqueous mixture. Work up and chromatograph the semisolid material on activated alumina (30 g.) to obtain 13β-ethyl-3 - methoxy-gona-1,3,5(10)-trien-17-one (0.3 g.) as hexagonal plates, m.p. 122–124° C. or as isomorphous tablets, m.p. 109–111° C. When a mixture of the two forms is melted rapidly, some melting occurs at 111° C.; this is followed by resolidification and final melting at 124° C.

This compound possesses estrogenic and blood lipid lowering activities and is useful as an intermediate for preparing the hormonal compounds of this invention.

EXAMPLE 228

13β-n-propyl-3-methoxy-gona-1,3,5(10)-trien-17β-ol

Add 13β-n-propyl - 3 - methoxy-gona - 1,3,5(10),8-tetraen-17β-ol (3.1 g.) dissolved in a mixture of tetrahydrofuran (10 cc.) and freshly distilled aniline (60 cc.) to liquid ammonia (160 cc.) and add lithium metal (1.5 g.) in small pieces. Stir the reaction mixture for 3 hours, then quench with solid ammonium chloride (12.5 g.) and take up in water. Ether-extract the product and evaporate the washed and dried extracts to obtain a semisolid residue of crude 13β-n-propyl-3-methoxy-gona - 1,3,5(10)-trien-17β-ol (3.1 g.); ultraviolet absorption peak at 279 m$\mu$ ($\epsilon$ 1,800)..

Dissolve the crude material in ether (75 cc.), add heptane (30 cc.) and distill off the ether, filter the small amount of brown flocculent precipitate, and finally cool the filtrate to precipitate the purified product as an off-white solid (2.3 g.) m.p. 141–143° C.

This compound possesses estrogenic and blood lipid lowering activity and is useful as an intermediate for preparing the hormonal compounds of this invention.

EXAMPLE 229

13β-n-propyl-3-methoxy-gona-1,3,5(10)-trien-17-one

To 13β-n-propyl-3-methoxy - gona - 1,3,5(10)-trien-17β-ol (2.5 g.) in acetone (100 cc.) add anhydrous magnesium sulphate (3 g.); stir the mixture at room temperature while adding 8N chromic acid (3.0 cc.). The temperature of the reaction mixture rises spontaneously to about 34°, then returns slowly to room temperature; stir the mixture for a total of 20 minutes, then treat with isopropanol (5 cc.) and sodium bicarbonate (5 g.), and stir for a further 10 minutes. Filter the reaction mixture and wash the insoluble material with methylene dichloride; combine and evaporate the filtrate and washings to obtain a solid yellow residue. Dissolve this residue in ether (100 cc.) and wash the solution with water, dry and evaporate. Recrystallize the crude product (2.5 g.), m.p. 108–118° C. from methanol to obtain 13β-n-propyl-3-methoxy-gona-1,3,5(10)-trien-17-one (2.03 g.), m.p. 120–122° C.; ultraviolet absorption peak at 278.5 m$\mu$ ($\epsilon$ 1,900).

$C_{21}H_{28}O_3$ calculated: C, 80.7; H, 9.0%. Found: C, 80.65; H, 9.0%.

This compound possesses estrogenic and blood lipid lowering activity and is useful as an intermediate for preparing the hormonal compounds of this invention.

EXAMPLE 230

13β-isopropyl-3-methoxy-gona-1,3,5(10)-trien-17β-ol

Add 13β-isopropyl-3-methoxy - gona - 1,3,5(10),8-tetraen-17-one (1.6 g.) in tetrahydrofuran (50 cc.) to liquid ammonia (150 cc.). Add potassium (4.5 g.) in portions and stir the mixture for 2 hours, and then add ammonium acetate to destroy excess metal followed by water. Work up with ether to obtain a yellow gum. Dissolve the gum in benzene and chromatograph on activated alumina; elute with benzene containing a small proportion of ether to obtain a fraction which yields 13β-isopropyl-3-methoxy-gona-1,3,5(10)-trien-17β-ol (0.92 g.) as a colorless uncrystallizable gum, ultraviolet absorption peak at 285 m$\mu$ ($\epsilon$ 2,000).

This compound possesses estrogenic and blood lipid lowering activity and is useful as an intermediate for preparing the hormonal compounds of this invention.

EXAMPLE 231

13β-isopropyl-3-methoxy-gona-1,3,5(10)-trien-17-one

Add 8N chromic acid (1.5 cc.) to a swirled solution of 13β - isopropyl - 3 - methoxy-gona-1,3,5(10)-trien-17β-ol (0.9 g.) in acetone (100 cc.), and after 1 minute add methanol (5 cc.) and remove most of the solvent by evaporation. Add water and work up the product with ether to obtain a yellow gum (0.85 g.). Chromatograph on activated alumina to yield a colorless uncrystallizable gum showing infrared absorption consistent with the structure of 13β-isopropyl-3-methoxy - gona - 1,3,5(10)-trien-17-one.

This compound possesses estrogenic and blood lipid lowering activity and is useful as an intermediate for preparing the hormonal compounds of this invention.

EXAMPLE 232

13-n-butyl-3-methoxy-gona-1,3,5(10)-trien-17β-ol

To 13-n-butyl-3-methoxy-gona-1,3,5(10),8-tetraen-17β-ol (0.8 g.) in aniline (20 cc.) and tetrahydrofuran (10 cc.) add liquid ammonia (100 cc.), followed by sodium (0.8 g.) in small pieces during 5 minutes while stirring the mixture. After a further 15 minutes stirring, discharge the blue color with solid ammonium chloride. Work up the product with ether in the usual way, and evaporate the resulting ether solution to leave as residue a gum; take this up in hot methanol (10 cc.), filter a little insoluble material and allow the solution to stand for 12 hours at 0° C. Crystals of 13-n-butyl-3-methoxy-gona-1,3,5(10)-trien-17β-ol are deposited and filtered off (0.6 g.), m.p. 123–125° C. after previous softening and a little melting at 60–70° C.; ultraviolet absorption peak at 278 m$\mu$ ($\epsilon$ 2,100); infrared absorption peaks at 2.86–2.97 (board band), 6.21, 7.94, 9.62$\mu$.

This compound possesses estrogenic and blood lipid lowering activities and is useful as an intermediate for preparing the hormonal compounds of this invention.

EXAMPLE 233

13-n-butyl-3-methoxy-gona-1,3,5(10)-trien-17-one

To a solution of 13-n-butyl-3-methoxy-gona-1,3,5(10)-trien-17β-ol (0.34 g.) in acetone (50 cc.) containing anhydrous magnesium sulphate (1 g.) add 8N aqueous chromic acid solution, dropwise, until the solution has a permanent yellowish color. Add isopropanol (10 cc.) and remove most of the acetone present under reduced pressure; add water and work up with ether in the usual way to obtain, on recrystallization from ethanol 13β-n-butyl-3-methoxy-gona-1,3,5(10)-trien-17-one (0.27 g.), m.p. 97–99° C., in the form of fine needles or flat rods; infrared absorption peaks at 5.78, 8.07, 9.66$\mu$.

This compound possesses estrogenic and blood lipid lowering activity and is useful as an intermediate for preparing the hormonal compounds of this invention.

EXAMPLE 234

13β-isobutyl-3-methoxy-gona-1,3,5(10)-trien-17β-ol

Add a solution of 13β-isobutyl-3-methoxy-1,3,5(10),8-tetraen-17β-ol (17.0 g.) in dry tetrahydrofuran (125 cc.; distilled) slowly to a mixture of liquid ammonia (680 cc., distilled), aniline (85 cc., distilled) and tetrahydrofuran (125 cc.) with stirring. Then add lithium (7.9 g.) in small portions. After the addition of lithium is completed, stir the blue mixture for another 3 hours. Discharge the blue color by the cautious addition of ammonium chloride followed by warm (50°) water. Extract the crude product with benzene. Wash the extracts with water, hydrochloric acid, (20%) sodium bicarbonate, water and dry. Evaporate the solvent in vacuo to obtain a gum which on crystallization from ether-petroleum ether gives 13β-isobutyl-3-methoxy-gona-1,3,5(10)-trien-17β-ol (13.0 g.; 76%); m.p. 103–104° C.; ultraviolet absorption peak at 2.78 m$\mu$ ($\epsilon$ 1,975); infrared absorption peak at 2.83$\mu$.

This compound possesses estrogenic and blood lipid lowering activity and is useful as an intermediate for preparing the hormonal compounds of this invention.

EXAMPLE 235

13β-ethyl-3-hydroxy-gona-1,3,5(10)-trien-17-one

Fuse 13β-ethyl-3-methoxy-gona-1,3,5(10)-trien-17-one (0.5 g.) and pyridine hydrochloride (5 g.) together under nitrogen for 40 minutes. Take up the cooled melt in methanol (10 cc.), pour into water (100 cc.) and work up by means of ether to obtain a solid. Recrystallize from 95% aqueous ethanol to obtain crystalline 13β-ethyl-3-hydroxy-gona-1,3,5(10)-trien-17-one; m.p. 232–233° C., which shows a change of crystalline form between 190° C. and 200° C.

This compound possesses estrogenic and blood lipid lowering activity and is useful as an intermediate for preparing the hormonal compounds of this invention.

EXAMPLE 236

13β-ethyl-3-methoxy-gona-1,3,5(10)-trien-17β-ol

To 13β-ethyl-3-methoxy-gona-1,3,5(10),8-tetraen-17β-ol (16.8 g.) dissolved in a mixture of aniline (150 cc.) and tetrahydrofuran (50 cc.) add liquid ammonia (400 cc.). Add lithium metal (6.0 g.) gradually in small pieces during 10 minutes, and stir the blue suspension obtained. After 2 hours, add ammonium chloride (50 g.) to the reaction mixture until a clear solution is obtained; then add water (600 cc.) and ether-extract the mixture. Evaporate the washed and dried extracts to obtain as residue a crystalline solid. Recrystallize from hexane (300 cc.), to obtain 13β-ethyl-3-methoxy-gona-1,3,5(10)-trien-17β-ol (14 g.), m.p. 126–30°.

This compound possesses estrogenic and blood lipid lowering activity and is useful as an intermediate for preparing the hormonal compounds of this invention.

To obtain 13β-cetyl-3-methoxy-gona-1,3,5(10)-trien-17β-ol treat 13β-cetyl-3-methoxy-gona-1,3,5(10),8-tetraen-17β-ol with lithium and aniline in liquid ammonia according to the manipulative procedure described above.

To obtain 7,13β-dimethyl-3-methoxy-gona-1,3,5(10)-trien-17β-ol treat 7,13β-dimethyl-3-methoxy-gona-1,3,5-(10),8-tetraen-17β-ol with lithium and aniline in liquid ammonia according to the manipulative procedure described above.

To obtain 13β - ethyl - 2,3 - dimethoxy-gona-1,3,5(10)-trien-17β-ol treat 13β-ethyl-2,3-dimethoxy-gona-1,3,5-(10),8-tetraen-17β-ol with lithium and aniline in liquid ammonia according to the manipulative procedure described above.

To obtain 13β-ethyl-1,3 - dimethoxy-gona - 1,3,5(10)-trien - 17β - ol treat 13β - ethyl - 1,3-dimethoxy-gona-1,3,5(10),8-tetraen-17β-ol with lithium and aniline in liquid ammonia according to the manipulative procedure described above.

To prepare 13β-ethyl-3-ethoxy-gona - 1,3,5(10)-trien-17β-ol treat 13β-ethyl-3-ethoxy-gona-1,3,5(10),8-tetraen-17β-ol with lithium and aniline in liquid ammonia according to the manipulative procedure described above.

To prepare 13β-phenethyl-3-propoxy - gona-1,3,5(10)-trien-17β-ol treat 13β-phenethyl-3-propoxy - gona - 1,3,5(10),8-tetraen-17β-ol with lithium and aniline in liquid ammonia according to the manipulative procedure described above.

To prepare 13β-isobutyl - 3 - pentyloxy-gona-1,3,5(10)-trien-17β-ol treat 13β-isobutyl-3-pentyloxy - gona - 1,3,5(10),8-tetraen-17β-ol with lithium and aniline in liquid ammonia according to the manipulative procedure described above.

To prepare 13β-(3 - hydroxypropyl)-3-cyclopentyloxy-gona-1,3,4(10)-trien-17β-ol treat 13β-(3-hydroxypropyl)-3-cyclopentyloxy-gona - 1,3,5(10),8 - tetraen-17β-ol with lithium and aniline in liquid ammonia according to the manipulative procedure described above.

To obtain 13β-(3 - dimethylaminopropyl) - 3-methoxygona - 1,3,5(10),8-trien-17β-ol treat 13β-(3 - dimethylaminopropyl)-3-methoxy-gona - 1,3,5(10),8-tetraen-17-ol with lithium and aniline in liquid ammonia according to the manipulative procedure described above.

These compounds possess estrogenic and blood lipid lowering activity and are useful as intermediates for preparing the hormonal compounds of this invention.

EXAMPLE 237

13β-ethyl-gona-1,3,5(10)-trien-3,17β-diol

Heat 13β-ethyl - 3 - hydroxy-gona-1,3,5(10)-trien-17-one (0.32 g.) with sodium borohydride (0.13 g.) in ethanol (25 cc.) under reflux for 20 minutes. Cool the reaction mixture, acidify with glacial acetic acid and evaporate to dryness. Take up the residue in ether (50 cc.) and water, and wash and dry the separated ethereal layer. Evaporate the solvent to obtain the crude product (0.33 g.), and recrystallize from aqueous methanol and subsequently from anhydrous methanol to obtain 13β-ethyl-gona-1,3,5(10)-trien-3,17β-diol (0.14 g.) as shining white needles, m.p. 190–3°; infrared absorption peaks at 2.86–3.23 (broad band), 9.48, 9.71μ with no band due to ketone absorption.

This compound possesses estrogenic and blood lipid lowering activity and is useful as an intermediate for preparing the hormonal compounds of this invention.

EXAMPLE 238

13β-n-propyl-3-hydroxy-gona-1,3,5(10)-trien-17-one

Shake 13β-n-propyl - 3-hydroxy-gona-1,3,5(10),9(11)-tetraen-17-one (0.17 g.) in ethanol (30 cc.) with hydrogen at atmospheric pressure in the presence of a 30% palladized charcoal catalyst (0.09 g.) until hydrogenation ceases (8 hrs.). Filter and evaporate the solution to obtain a colorless crystalline solid. Recrystallize from ethanol, to obtain 13β-n-propyl-3-hydroxy-gona - 1,3,5(10)-trien-17-one (0.083 g.), m.p. 206–12°; ultraviolet absorption peak at 281 mμ (ε2,050); infrared absorption peaks at 3.06, 5.85, 6.21, 8.21μ.

This compound possesses estrogenic and blood lipid lowering activity and is useful as an intermediate for preparing the hormonal compounds of this invention.

EXAMPLE 239

13β-n-propyl-3-hydroxy-gona-1,3,5(10)-trien-17-one

Fuse 13β-n-propyl - 3 - methoxy-gona-1,3,5(10)-trien-17-one (0.5 g.) and pyridine hydrochloride (10.7 g.) together under nitrogen for 1 hour at 205–10°. Two phases are present during the first 50 minutes, after which the mixture becomes homogeneous. Mix the cooled product with ether (50 cc.) and water; separate the ether phase and ether extract the aqueous phase; wash the combined extracts with acid to remove pyridine, dry and evaporate. Recrystallize the residue (0.48 g.), m.p. 211–20°, from methanol, to obtain 13β-n-propyl-3-hydroxy-gona - 1,3, 5(10)-trien-17-one (0.24 g.), m.p. 221–3°.

This compound possesses estrogenic and blood lipid lowering activity and is useful as an intermediate for preparing the hormonal compounds of this invention.

EXAMPLE 240

13β-n-propyl-gona-1,3,5(10)-trien-3,17β-diol

Gently reflux 13β-n-propyl - 3 - hydroxy - gona - 1,3, 5(10)-trien-17-one (0.17 g.) in ethanol (20 cc.) and sodium borohydride (0.09 g.) for 15 minutes. Add acetic acid (0.3 cc.) to the cooled solution and remove the solvent under reduced pressure; add ether (50 cc.) and water (25 cc.) and separate, wash and dry the ether layer. Evaporate to a gum which crystallizes on addition of methylene dichloride. Recrystallize from a mixture of ethyl acetate and light petroleum to obtain 13β-n-propyl-gona-1,3,5(10)-trien - 3,17β-diol (0.10 g.), m.p. 183–6°, ultraviolet absorption peak at 281 mµ (ϵ2,000); infrared absorption peaks at 2.92, 3.06, 6.19, 6.32, 9.62µ.

This compound possesses estrogenic and blood lipid lowering activity and is useful as an intermediate for preparing the hormonal compounds of this invention.

EXAMPLE 241

13β-n-butyl-3-hydroxy-gona-1,3,5(10)-trien-17-one

Heat 13β - n - butyl - 3 - methoxy-gona-1,3,5(10)-trien-17-one (0.2 g.) with pyridine hydrochloride at 210° (3 g.) in an atmosphere of nitrogen for 40 minutes. Dissolve the cooled product in aqueous methanol, add more water and extract the mixture with ether. Evaporate the washed and dried ether extracts to a gum which partially crystallizes. Take up the material in a mixture of equal volumes of benzene and ether (20 cc.) and extract with Claisen alkali; acidify the aqueous extract with hydrochloric acid and reextract with ether. Work up the ether extracts to obtain on evaporation a crystalline residue; recrystallize from a mixture of light petroleum and ethyl acetate to obtain 13 - n - butyl - 3 - hydroxy - gona-1,3,5(10) - trien - 17 - one (0.045 g.), m.p. 174–6°; infrared absorption peaks at 2.99, 3.05 (broad band), 5.83µ.

This compound possesses estrogenic and blood lipid lowering activity and is useful as an intermediate for preparing the hormonal compounds of this invention.

EXAMPLE 242

13β-n-butyl-3-methoxy-gona-1,3,5(10)-trien-17-one

Shake 13β - n - butyl - 3 - methoxy - gona-1,3,5(10),9-tetraen - 17 - one (0.065 g.) in ethanol (8 cc.) and benzene (2 cc.) in an atmosphere of hydrogen with a 10% palladized charcoal catalyst (0.05 g.) until hydrogen uptake ceases. Filter the catalyst and evaporate the solvent to obtain a gum, which readily crystallizes on seeding with the product of another example. Recrystallize the material from ethanol to obtain 13β - n - butyl - 3 - methoxy-gona - 1,3,5(10) - trien - 17-one.

This compound possesses estrogenic and blood lipid lowering activity and is useful as an intermediate for preparing the hormonal compounds of this invention.

EXAMPLE 243

13β-n-propyl-3-hydroxy-gona-1,3,5(10)-trien-17-one

Reflux 13β - n - propyl - 3 - methoxy-17,17-ethylene dioxy - gona - 1,3,5(10)-triene (0.50 g.) in piperidine (3.5 cc.) with sodamide (1.0 g.) under nitrogen for 5 hours. Cool, and pour the reaction mixture onto crushed ice, acidify the resulting solution with 2N sulphuric acid and extract the mixture with ether. Wash the ether extracts with water and then extract with Claisen alkali (potassium hydroxide, 35 g.; water, 25 cc.; and methanol, 100 cc.). Acidify the alkaline extracts with 2N sulphuric acid, reextract with ether, and evaporate the washed and dried ether solution of product. Recrystallize the yellow residue obtained from aqueous methanol, to obtain 13β-n - propyl - 3 - hydroxy - gona - 1,3,5(10)-trien-17-one (0.3 g.), m.p. 209–12°.

This compound possesses estrogenic and blood lipid lowering activity and is useful as an intermediate for preparing the hormonal compounds of this invention.

EXAMPLE 244

13β-n-propyl-3-methoxy-gona-1,3,5(10)-trien-17-one

Wash the ether solution remaining after extraction of the solution in the previous example with Claisen alkali with water, dry and evaporate. Recrystallize the residue (0.3 g.) from methanol, to obtain 13β - n - propyl - 3-methoxy-gona - 1,3,5(10) - trien - 17 - one (0.2 g.), m.p. 115–8°; ultraviolet absorption peak at 278–80 mµ (ϵ 1,900).

This compound possesses estrogenic and blood lipid lowering activity and is useful as an intermediate for preparing the hormonal compounds of this invention.

EXAMPLE 245

13β,17α-diethyl-3-methoxy-gona-1,3,5(10)-trien-17β-ol

Shake 13β - ethyl - 3 - methoxy - 17α-ethyl-gona-1,3,5(10),9 - tetraen - 17β-ol (0.3 g.) in ethanol (10 cc.) with 10% palladised charcoal (0.3 g.) in an atmosphere of hydrogen until uptake ceases [(25 cc.) absorbed]. Filter the catalyst and remove the solvent and recrystallize the residue from ethanol to obtain 13β,17α - diethyl-3-methoxy - gona - 1,3,5(10) - trien-17β-ol (0.11 g.), m.p. 160–161°.

This compound has estrogenic activity, and is useful as an intermediate for preparing the hormonal compounds of this invention.

EXAMPLE 246

13β-ethyl-3,17β-dimethoxy gona-1,3,5(10)-triene

Add diazomethane (from 2.05 g. N-nitrosomethylurea) in methylene chloride (40 cc.) with stirring to 13β-ethyl-3 - methoxy - gona - 1,3,5(10) - trien - 17β-ol (1 g.) in methylene chloride (50 cc.) containing 2 drops of boron trifluoride etherate. After stirring for 5 mins. filter the mixture and wash the filtrate with sodium bicarbonate, water and brine, and then dry. Recrystallize the product twice from methanol to obtain 13β - ethyl - 3,17β - dimethoxy gona - 1,3,5(10)-triene (.65 g.), m.p. 100–101°.

$C_{21}H_{30}O_2$ calculated: C, 80.2%; H, 9.6%. Found: C, 80.5%; H, 9.6%.

This compound has estrogenic activity, lowers the blood lipid level, and is useful as an intermediate for preparing the hormonal compounds of this invention.

EXAMPLE 247

13β-n-propyl-3,17β-dimethoxy-gona-1,3,5(10)-triene

Methylate 13β-n-propyl - 3 - methoxy-gona-1,3,5(10)-trien-17β-ol (1 g.) in methylene chloride (50 cc.) with diazomethane as previously described. Recrystallize the product from ethanol (30 cc.) to obtain 13β-n-propyl-3,17β-dimethoxy-gona-1,3,5(10)-triene (0.6 g.), m.p. 138°; ultraviolet absorption peak at 278 mµ (ϵ 2,300).

$C_{22}H_{32}O_2$ calculated: C, 80.4%; H, 9.8%. Found: C, 80.2%; H, 9.8%.

This compound has estrogenic activity, lowers the blood lipid level, and is useful as an intermediate for preparing the hormonal compounds of this invention.

EXAMPLE 248

13β-ethyl-3-methoxy-17β-acetoxy-gona-1,3,5(10)-triene

Add 13β-ethyl-3-methoxy-gona-1,3,5(10)-triene-17β-ol (1 g.) in pyridine (4 cc.) to acetic anhydride (2 g.) in benzene (4 cc.) and allow the mixture to stand at room temperature for 18 hours. Add water and extract the mixture with ether. Wash dry and evaporate the ethereal solution to obtain a residue and recrystallize from methanol to afford 13β-ethyl-3-methoxy-17β-acetoxy-gona-1,3,5(10)-triene, 0.8 g., m.p. 130–131°; ultraviolet absorption peaks at 278 mµ (ϵ 2,000), 286 mµ (ϵ 1,800).

This compound has estrogenic activity, lowers the blood lipid level, and is useful as an intermediate for preparing the hormonal compounds of this invention.

To obtain 13β-ethyl-3-methoxy-17β-propionoxy-gona-1,3,5(10)-triene, treat 13β-ethyl-3-methoxy-gona-1,3,5(10)-trien-17β-ol with propionic anhydride and pyridine according to the manipulative procedure described above.

To obtain 13β-ethyl-2,3-dimethoxy-17β-acetoxy-gona-1,3,5(10)-triene, treat 13β-ethyl-2,3-dimethoxy-gona-1,3,5(10)-trien-17β-ol with acetic anhydride in pyridine according to the manipulative procedure described above.

To obtain 13β-ethyl-1,3-dimethoxy-17β-propionoxy-1,3,5(10)-triene, treat 13β-ethyl-1,3-dimethoxy-gona-1,3,5(10)-trien-17β-ol with propionic anhydride in pyridine according to the procedure described above.

To obtain 13β-ethyl-3-ethoxy-17β-acetoxy-gona-1,3,5(10)-triene, treat 13β-ethyl-3-ethoxy-gona-1,3,5(10)-trien- 17β-ol with acetic anhydride in pyridine according to the manipulative procedure described above.

To obtain 13β-phenethyl-3-propoxy-17β-propionoxy-gona-1,3,5(10)-triene, treat 13β-phenethyl - 3 - propoxy-gona-1,3,5(10)-trien-17β-ol with propionic anhydride and pyridine according to the manipulative procedure described above.

To obtain 13β-isobutyl-3-pentyloxy-17β-acetoxy-gona-1,3,5(10)-triene, treat 13β-isobutyl-3-pentyloxy-gona-1,3,5(10)-trien-17β-ol with acetic anhydride and pyridine according to the manipulative procedure described above.

To obtain 13β-(3-propionoxypropyl)-3-cyclopentyloxy-17β-propionoxy-gona-1,3,5(10)-triene, treat 13β - (3-hydroxypropyl) - 3 - cyclopentyloxy-gona-1,3,5(10)-trien-17β-ol with propionic anhydride in pyridine according to the manipulative procedure described above.

To obtain 13β-(3-dimethylaminopropyl)-3-methoxy-17β-acetoxy-gona-1,3,5(10)-triene, treat 13β-(3-dimethylaminopropyl)-3-methoxy-gona-1,3,5(10)-trien-17β-ol with acetic anhydride in pyridine according to the manipulative procedure described above.

These compounds have estrogenic activity, lower the blood lipid level, and are useful as intermediates in the preparation of the hormonal compounds of the invention.

To obtain 13β-ethyl-2,3-dimethoxy-17β-acetoxy-8-iso-gona-1,3,5(10)-triene, treat 13β-ethyl-2,3-dimethoxy-8-iso-gona-1,3,5(10)-trien-17β-ol with acetic anhydride according to the manipulative procedures described above.

To obtain 13β-ethyl-1,3-dimethoxy-17β-propionoxy-8-iso-gona-1,3,5(10)-triene, treat 13β-ethyl-1,3-dimethoxy-8-iso-gona-1,3,5(10)-trien-17β-ol with propionyl chloride according to the manipulative procedures described above.

To obtain 13β-ethyl-3-ethoxy-17β-acetoxy-8-iso-gona-1,3,5(10)-triene, treat 13β-ethyl-3-ethoxy-8-iso-gona-1,3,5(10)-trien-17β-ol with acetic anhydride according to the manipulative procedures described above.

To obtain 13β-phenethyl-3-propoxy-17β-propionoxy-8-iso-gona-1,3,5(10)-triene, treat 13β-phenethyl-3-propoxy-8-iso-gona-1,3,5(10)-trien-17β-ol with propionyl chloride according to the manipulative procedures described above.

To obtain 13β-isobutyl-3-pentoxy-17β-acetoxy-8-iso-gona-1,3,5(10)-triene, treat 13β-isobutyl-3-pentoxy-8-iso-gona-1,3,5(10)-trien-17β-ol with acetic anhydride according to the manipulative procedures described above.

To obtain 13β-(3-propionoxypropyl)-3-cyclopentoxy-17β-propionoxy-8-iso-gona-1,3,5(10)-triene, treat 13β-(3-hydroxypropyl) - 3 - cyclopentoxy-8-iso-gona-1,3,5(10)-trien-17β-ol with propionyl chloride according to the manipulative procedures described above.

To obtain 13β-(3-dimethylaminopropyl)-3-methoxy-17β-acetoxy-8-iso-gona-1,3,5(10)-triene, treat 13β-(3-dimethylaminopropyl) - 3 - methoxy-8-iso-gona-1,3,5(10)-trien-17β-ol with acetic anhydride according to the manipulative procedures described above.

These compounds have estrogenic activity, lower the blood lipid level, and are useful as intermediates in the preparation of the hormonal compounds of the invention.

EXAMPLE 249

13β-ethyl-3-methoxy-17,17-diethoxy-gona-1,3,5(10)-triene

Heat 13β - ethyl-3-methoxy-gona-1,3,5(10)-trien-17-one (1 g.) in ethanol, ethyl orthoformate (1 cc.) and concentrated sulphuric acid (1 drop) at 40° for 30 minutes. Add ethyl orthoformate (0.5 cc.) and heat the mixture at 55° for a further 30 minutes. Dilute the cooled solution with saturated aqueous sodium bicarbonate and collect the product in ether. Wash, dry and evaporate the ethereal solution, take up the residue in a little benzene and filter through a column of alumina (50 g.) with hexane-benzene (4:1). Evaporate the solvent to obtain 13β-ethyl-3-methoxy-17,17-diethoxy-gona-1,3,5(10)-triene.

This compound has estrogenic activity, lowers the blood lipid level, and is useful as an intermediate for preparing the hormonal compounds of this invention.

EXAMPLE 250

13β-ethyl-3-methoxy-17,17-ethylenedioxy-gona-1,3,5(10)-triene

Reflux 13β - ethyl-3-methoxy-gona-1,3,5(10)-trien-17-one (3 g.) with toluene-p-sulphonic acid (0.3 g.), dry toluene (105 cc.) and ethylene glycol (3 cc.) for 19 hours. Distil off toluene (65 cc.) over 1½ hours, cool the residue, dilute with ether (35 cc.), wash with water, saturated aqueous sodium hydrogen carbonate, brine, and dry ($MgSO_4$). Remove the solvent under reduced pressure, dissolve the residue in benzene (20 cc.) and filter through alumina (50 g.) with hexane-benzene (4:1). Remove the solvent and recrystallize the product from ethanol to obtain 13β - ethyl-3-methoxy-17,17-ethylenedioxy-gona-1,3,5(10)-triene (2.4 g.) 69%, m.p. 90–92°; ultraviolet absorption peak at 278 mμ ($\epsilon$ 2,200); infrared absorption peak at 3.4, 6.2, 6.35, 6.69μ.

This compound has estrogenic activity, lowers the blood lipid level, and is useful as an intermediate for preparing the hormonal compounds of this invention.

EXAMPLE 251

13β-ethyl-3-methoxy-17,17-propylenedioxy-gona-1,3,5(10)-triene

Reflux 13β - ethyl-3-methoxy-gona-1,3,5(10),8,14-pentaen-17-one (2 g.) in benzene (75 cc.) and propane-1,3-diol (1 cc.) with toluene-p-sulphonic acid (200 mg.) for 16 hours. Dilute the cooled solution with ether, wash, dry, and evaporate and filter the residue through Florisil (100 g.) with hexane-benzene (4:1). Evaporate the solvent to obtain 13β - ethyl-3-methoxy-17,17-propylenedioxy-gona-1,3,5,(10),8,14 - pentaene; ultraviolet absorption peak at 312 mμ ($\epsilon$ 27,500). Shake this product (0.7 g.) in benzene (50 cc.) with prehydrogenated 2%palladium on calcium carbonate (0.4 g.) in an atmosphere of hydrogen until absorption of hydrogen almost ceases (uptake 50 cc.). Filter the catalyst and evaporate the solvent and obtain 13β - ethyl - 3-methoxy-17,17-propylenedioxy-gona-1,3,5 (10),8 - tetraene; ultraviolet absorption peak at 278 mμ ($\epsilon$ 14,700). Add this product (0.4 g.) in tetrahydrofuran (10 cc.) to liquid ammonia (50 cc.) and stir for 10 minutes, and then decompose by the addition of solid ammonium chloride. Add water and take up the product in ether. Wash the ethereal solution with ice-cold 10% hydrochloric acid to remove the aniline, then immediately with water, saturated aqueous sodium bicarbonate, brine, and dry. Remove the solvent by evaporation to obtain 13β-ethyl - 3 - methoxy-17,17-propylenedioxy-gona-1,3,5(10)-triene; ultraviolet absorption peaks at 278 mμ ($\epsilon$ 2,000), 286 mμ ($\epsilon$ 1,750).

This compound has estrogenic and blood lipid lowering activity and is useful as an intermediate for preparing the hormonal compounds of this invention.

EXAMPLE 252

13β-ethyl-3-methoxy-17,17-ethylenedioxy-gona-1,3,5(10)-triene

Reflux 13β - ethyl-3-methoxy-gona-1,3,5(10)-triene-17-one (3 g.) in dry toluene (105 cc.) with toluene-p-sulphonic acid (300 mg.) and ethylene glycol (3 cc.) for 19 hours. Distill the solvent (65 cc.) over a period of 1½ hours. Cool the residue, dilute with ether, wash, dry, and evaporate and dissolve the residue in benzene (20 cc.) and filter through a column of alumina with hexane-benzene (4:1). Evaporate the eluates and recrystallize the residue to obtain the title compound (2.5 g.), m.p. 88–89° C.; ultraviolet absorption peak at 278 mμ ($\epsilon$ 2,200); infrared absorption peaks at 3.4μ, 6.2μ, and 6.35μ.

This compound has estrogenic and blood lipid lowering activity and is useful as an intermediate for preparing the hormonal compounds of this invention.

To obtain 13β - isopropyl-3-methoxy-17,17-ethylenedioxy - 8-iso-gona-1,3,5(10)-triene treat 13β-isopropyl-3-methoxy-8-iso-gona-1,3,5(10)-trien-17-one with ethyleneglycol according to the manipulative procedure described above.

To obtain 13β-acetyl-3-methoxy-17,17-ethylenedioxy-8-iso-gona-1,3,5(10)-triene treat 13β-cetyl-3-methoxy-8-iso-gona-1,3,5(10)-trien-17-one with ethyleneglycol according to the manipulative procedure described above.

To obtain 13β-isobutyl-3-pentoxy-17,17-ethylenedioxy-8 - iso-gona-1,3,5(10)-triene treat 13β-isobutyl-3-pentoxy-8-iso-gona-1,3,5(10)-trien-17-one with ethyleneglycol according to the manipulative procedure described above.

To obtain 7,13β-dimethyl-3-methoxy-17,17-ethylenedioxy - 8-iso-gona-1,3,5(10)-triene treat 7,13β-dimethyl-3-methoxy-8-iso-gona-1,3,5(10)-trien-17-one with ethyleneglycol according to the manipulative procedure described above.

To obtain 13β-methyl-17,17-ethylenedioxy-8-iso-gona-1,3,5(10)-trien-3-ol treat 13β-methyl - 8 - iso - gona-1,3,5(10)-trien-3-ol-17-one with ethyleneglycol according to the manipulative procedure described above.

To obtain 13β-ethyl-2,3-dimethoxy - 17,17 - ethylenedioxy-8-iso-gona-1,3,5(10)-triene treat 13β-ethyl-2,3-dimethoxy-8-iso-gona-1,3,5(10)-trien-17-one with ethyleneglycol according to the manipulative procedure described above.

These compounds have estrogenic and blood lipid lowering activities and are useful as intermediates in the preparation of the hormonal compounds of this invention.

EXAMPLE 253

13β-ethyl-3-methoxy-17,17-propylenedioxy-gona-1,3,5(10)-triene

Reflux 13β-ethyl - 3 - methoxy-gona-1,3,5(10)-trien-17-one (2 g.) in benzene (75 cc.) and propane-1, 3-diol (1 cc.) with toluene-p-sulphonic acid (200 mg.) for 16 hours. Dilute the cooled solution with ether, wash, dry and evaporate and filter the residue through alumina (80 g.) with hexane-benzene (4:1). Evaporate the solvent to obtain 13β-ethyl-3-methoxy-17,17-propylenedioxy-gona-1,3,5(10)-triene; ultraviolet adsorption peaks at 278 mμ (ε 2,000), 286 mμ (ε 1,800).

This compound has estrogenic activity, lowers the blood lipid level, and is useful as an intermediate for preparing the hormonal compounds of this invention.

To obtain 13β - isopropyl-3-methoxy-17,17-ethylenedioxy-gona-1,3,5(10)-triene treat 13β-isopropyl-3-methoxy-gona-1,3,5(10)-trien-17-one with excess ethylene glycol in benzene in the presence of toluene-p-sulphonic acid according to the manipulative procedure described above.

To obtain 13β-cetyl-3-methoxy - 17,17 - ethylenedioxy-gona-1,3,5(10)-triene treat 13β-isopropyl - 3 - methoxy-gona-1,3,5(10)-trien-17-one with ethylene glycol in benzene in the presence of toluene-p-sulphonic acid according to the manipulative procedure described above.

To obtain 13β-methyl-3-methoxy-17,17-ethylenedioxy-gona-1,3,5(10)-triene treat 13β-methyl-3-methoxy-gona-1,3,5(10)-trien-17-one with ethylene glycol in benzene in the presence of toluene-p-sulphonic acid according to the manipulative procedure described above.

To obtain 13β-methyl-3-hydroxy-17,17-ethylenedioxy-gona-1,3,5(10)-triene treat 13β-methyl-3-hydroxy-gona-1,3,5(10)-trien-17-one with ethylene glycol and toluene-p-sulphonic acid in benzene according to the manipulative procedure described above.

To obtain 13β-ethyl-2,3-dimethoxy - 17,17 - ethylenedioxy-gona-1,3,5(10)-triene treat 13β-ethyl-2,3-dimethoxy-gona-1,3,5(10)-trien-17-one with ethylene glycol and toluene-p-sulphonic acid in benzene according to the manipulative procedure described above.

To prepare 13β-isobutyl-3-pentyloxy-17,17-ethylenedioxy-gona-1,3,5(10)-triene treat 13β-isobutyl-3-pentyloxy-gona-1,3,5(10)-trien-17-one with ethylene glycol and toluene-p-sulphonic acid in benzene according to the manipulative procedure described above.

These compounds have estrogenic activity, lower the blood lipid level, and are useful as intermediates in the preparation of the harmonal compounds of the invention.

EXAMPLE 254

13β-n-propyl-3-methoxy-17,17-ethylenedioxy-gona-1,3,5(10)-triene

Add 13β-n-propyl-3-methoxy - 17,17 - ethylenedioxy-gona-1,3,5(10),8-tetraene (0.90 g.) in aniline (20 cc.) to liquid ammonia (50 cc.); to the clear solution obtained add in small pieces lithium metal (0.12 g.) with stirring. Keep the solution for 2 hours, retaining the ammonia by the use of an acetone-solid carbon dioxide cooled condenser. Add ammonium chloride (5 g.), followed by water (100 cc.); work up the product in the usual way with ether, to obtain a residue which is steam-distilled to remove aniline completely. Take up the residue in ether and evaporate the dried ethereal solution to an oil. Crystallize from light petroleum to obtain 13β-n-propyl-3-methoxy - 17,17 - ethylenedioxy-gona-1,3,5(10)-triene (0.4 g.), m.p. 113–4°; ultraviolet absorption peak at 279 mμ (ε 2,000).

This compound has estrogenic activity, lowers the blood lipid level, and is useful as an intermediate for preparing the hormonal compounds of this invention.

EXAMPLE 255

D-homo-13β-methyl-3-methoxy-17aα-ethynyl-gona-1,3,5(10)-triene-17aβ-ol

Add D - homo-13β-methyl-3-methoxy-gona-1,3,5(10)-trien-17a-one (0.6 g.) in dimethylacetamide (5 cc.) to a stirred suspension of lithium acetylide (0.5 g.) in dioxane (2.5 cc.)-ethylenediamine (0.1 cc.)-dimethylacetamide (2.5 cc.) in an atmosphere of acetylene. After stirring for 20 hours pour the mixture onto crushed ice (15 g.) and extract with benzene. Evaporate the washed and dried extracts to obtain a residue. Take up in benzene and chromatograph on alumina to obtain D-homo-3-methoxy-13β-methyl-17aα-ethynyl-gona-1,3,5(10)-trien-17aβ-ol; infrared absorption peaks at 2.90, 3.03μ.

This compound has estrogenic activity, and is useful as an intermediate for preparing the hormonal compounds of this invention.

To obtain D-homo - 13β - ethyl - 3 - methoxy - 17aα-ethynyl-gona-1,3,5(10)-trien-17aβ-ol treat D-homo-13β-ethyl - 3 - methoxy-gona - 1,3,5(10) - trien - 17 - one with excess lithium acetylide according to the manipulative procedure described above.

This compound has estrogenic activity, and is useful as an intermediate for preparing the hormonal compounds of this invention.

EXAMPLE 256

D-Homo-13β-methyl-3-methoxy-17aα-ethyl-gona-1,3,5(10)-trien-17aβ-ol

Hydrogenate D-homo - 13β - methyl - 3 - methoxy-17aα-ethynyl-gona - 1,3,5(10) - trien - 17aβ - ol (0.5 g.) in dry dioxane (20 cc.) at atmospheric pressure over a 5% palladised charcoal catalyst until uptake of hydrogen ceases. Filter and remove the solvent to obtain D-homo - 13β-methyl - 3 - methoxy - 17aα - ethyl-gona-1,3,5(10)-trien-17aβ-ol; infrared absorption peak at 2.87μ.

This compound has estrogenic activity, and is useful as an intermediate for preparing the hormonal compounds of this invention.

To obtain D-homo - 13β,17aα - diethyl - 3 - methoxy-gona - 1,3,5(10) - trien - 17aβ - ol hydrogenate D-homo-13β-ethyl - 3 - methoxy - 17aα - ethynyl-gona-1,3,5(10)-trien-17aβ-ol according to the manipulative procedure described above.

This compound has estrogenic activity, and is useful as an intermediate for preparing the hormonal compounds of this invention.

EXAMPLE 257

13β-Ethyl-3-methoxy-17α-methyl-gona-1,3,5(10)-trien-17β-ol

Add slowly with stirring to a solution 13β - ethyl-3-methoxy-gona - 1,3,5(10) - trien-17-one (1.0 g.) in benzene (50 cc.) an ether solution of methyl magnesium bromide (from magnesium, 0.9 g.) under nitrogen. Reflux the mixture for 4 hours and pour onto ice, acidify with hydrochloric acid. Separate the aqueous layer and ether extract. Wash, dry and evaporate the combined organic solutions and take up the residue in benzene (20 cc.) and chromatograph on neutral alumina; elute with benzene, and then with benzene containing a little chloroform to obtain a crystalline product and then rechromatograph on alumina; recrystallize the product from methanol to obtain 13β-ethyl - 3 - methoxy-17α-methyl-gona-1,3,5(10)-trien-17β-ol (0.9 g.), m.p. 142–5°; ultraviolet absorption peak at 279 mμ (ε 1,950); infrared absorption peak at 2.88μ.

$C_{21}H_{30}O_2$ calculated: C, 80.2%; H, 9.6%. Found: C, 80.5%; H, 9.4%.

This compound has estrogenic activity, and is useful as an intermediate for preparing the hormonal compounds of this invention.

To obtain 13β-n-butyl - 3 - methoxy - 17α - methyl-gona - 1,3,5(10) - trien - 17β - ol treat 13β-n-butyl-3-methoxy-gona - 1,3,5(10) - trien - 17 - one with excess methyl magnesium bromide according to the manipulative procedure described above.

To obtain 13β-cetyl - 3 - methoxy - 17α - methyl-gona-1,3,5(10)-trien - 17β - ol treat 13β-cetyl-3-methoxy-gona-1,3,5(10)-trien-17-one with excess methyl magnesium bromide according to the manipulative procedure described above.

To obtain 13β,6,17α - trimethyl - 3 - methoxy-gona-1,3,5(10) - trien - 17β - ol treat 13β,6-dimethyl-3-methoxy-gona - 1,3,5(10) - trien - 17 - one with excess methyl magnesium bromide according to the manipulative procedure described above.

To obtain 13β,17,17α - trimethyl - 3 - methoxy-gona-1,3,5(10)-trien - 17β - ol treat 13β-7-dimethyl-3-methoxy-gona - 1,3,5(10) - trien - 17 - one with excess methyl magnesium bromide according to the manipulative procedure described above.

To obtain 13β-ethyl - 2,3 - dimethoxy - 17α - methyl-gona - 1,3,5(10) - trien - 17β - ol treat 13β-ethyl-2,3-dimethoxy-gona - 1,3,5(10) - trien - 17 one with excess methyl magnesium bromide according to the manipulative procedure described above.

To obtain 13β-ethyl - 3 - ethoxy - 17α - methyl-gona-1,3,5(10) - trien - 17β - ol treat 13β-ethyl-3-ethoxy-gona-1,3,5(10) - trien - 17β - one with excess methyl magnesium bromide according to the manipulative procedure described above.

To obtain 13β-phenethyl - 3 - propoxy - 17α - methyl-gona - 1,3,5(10) - trien - 17β - ol treat 13β-phenethyl-3-propoxy-gona - 1,3,5(10) -trien - 17 - one with excess methyl magnesium bromide according to the manipulative procedure described above.

To obtain 13β-(3-hydroxypropyl) - 3 - cyclopentyloxy-17α-methyl-gona - 1,3,5(10) - trien - 17β - ol treat 13β-(3 - hydroxypropyl) - 3 - cyclopentyloxy-gona - 1,3,5(10)-trien-17-one with excess methyl magnesium bromide according to the manipulative procedure described above.

To obtain 13β - (2 - diethylanimoethyl) - 2,3 - dimethoxy - 17α - methyl-gona - 1,3,5(10) - trien - 17β - ol treat 13β-(2-diethylanimoethyl) - 2,3 - dimethoxy-gona-1,3,5(10) - trien - 17 - one with excess methyl magnesium bromide according to the manipulative procedure described above.

These compounds have estrogenic activity, and are useful as intermediates in the preparation of the hormonal compounds of this invention.

EXAMPLE 258

13β-n-propyl-3-methoxy-17α-ethynyl-gona-1,3,5(10)-triene-17β-ol

Add 13β-n-propyl - 3 - methoxy-gona-1,3,5(10)-triene-17-one (19.4 g.) in dimethylacetamide (300 cc.) with stirring in a slow stream of acetylene to lithium acetylide (26.7 g.) in dioxane (332 cc.) and ethylenediamine (18 cc.); continue stirring at room temperature for 66 hours and then pour the reaction mixture into ice-water 3 l. Extract the product with ether and evaporate the washed and dried extracts to a residue and then purify by chromatography in benzene on neutral alumina; elute with benzene to obtain crystalline material and then recrystallize from a mixture of acetone and hexane to obtain the title compound (11.0 g.), m.p. 125–30°; ultraviolet absorption peak at 280 mμ (ε 1,900).

This compound has estrogenic activity, and is useful as an intermediate in the preparation of the hormonal compounds of this invention.

EXAMPLE 259

13β-ethyl-3-methoxy-17α-ethynyl - gona-1,3,5(10)-triene-17β-ol

Prepare a suspension of lithium aluminum acetylide by passing a dry stream of acetylene slowly through a saturated solution of lithium aluminum hydride (40 g.) in tetrahydrofuran (500 cc.) over a period of 18 hours. Add to a portion of this suspension (15 cc.) 13β-ethyl-3-methoxy-gona-1,3,5(10)trien-17-one (0.60 g.). Shake the mixture for 5 minutes and then allow to stand for 20 hours at room temperature. Pour the product into ice-cold 10% sulphuric acid (100 cc.) containing crushed ice and extract the mixture with ether; wash, dry and evaporate the ethereal extracts to give a crystalline residue, take it up in benzene (10 cc.) and adsorb on alumina (60 g.). Elute with a mixture of benzene and light petroleum gradually increasing in benzene content to 100% benzene to obtain unchanged starting material (0.166 g.); elute further with benzene containing 10% of ether and finally with a mixture of equal volumes of benzene and ether to obtain 13β-ethyl-3-methoxy-17α-ethynyl-gona-1,3,5(10)-triene - 17β-ol; (0.410 g.), m.p. 148–53°; infrared absorption peaks at 2.90μ (a broad band due to hydroxyl) and 3.03μ (a methine group), with absence of ketonic absorption.

This compound has estrogenic activity, and is useful as an intermediate for preparing the hormonal compounds of this invention.

EXAMPLE 260

13β,17α-diethyl-3-methoxy-gona-1,3,5(10)-triene-17β-ol

Shake 13β-ethyl-3-methoxy - 17α - ethynyl-gona-1,3,5(10)-trien-17β-ol (0.50 g.) in dry dioxane (10 cc.) in hydrogen at atmospheric pressure in the presence of a 5% palladised charcoal catalyst (0.05 g.) until uptake of hydrogen ceases. Filter and remove the solvent to obtain crystalline 13β,17α-diethyl-3-methoxy-gona-1,3,5(10)-trien-17β-ol (0.495 g.), m.p. 145–9°; infrared absorption peak at 2.87μ.

This compound possesses estragenic activity, lowers the blood lipid level, and is useful as an intermediate for preparing the hormonal compounds of this invention.

To obtain 13β-*n*-butyl - 3 - methoxy-17α - ethyl-gona-1,3,5(10) - trien - 17β-ol, hydrogenate 13β-*n*-butyl-3-methoxy-17α - ethynyl-gona-1,3,5(10) - trien - 17β-ol according to the manipulative procedure described above.

To obtain 13β - cetyl-3-methoxy-17α-ethyl-gona-1,3,5 (10)-trien - 17β - ol, hydrogenate 13β-cetyl-3-methoxy-17α - ethynyl-gona-1,3,5(10)-trien-17β-ol according to the manipulative procedure described above.

To obtain 13β,6-dimethyl-3-methoxy - 17α - ethyl-gona-1,3,5(10)-trien-17β-ol, hydrogenate 13β,6-dimethyl - 3 - methoxy - 17α - ethynyl-gona-1,3,5(10)-trien - 17β-ol according to the manipulative procedure described above.

To obtain 13β,7 - dimethyl - 3 - methoxy-17α-ethyl-gona-1,3,5(10) - trien - 17β-ol, hydrogenate 13β,7-dimethyl - 3-methoxy-17α-ethyl-gona-1,3,5(10)trien-17β-ol according to the manipulative procedure described above.

To obtain 13β,17α - diethyl - 2,3 - dimethoxy-gona-1,3,5(10)-trien - 17β - ol, hydrogenate 13β - ethyl-2,3-dimethoxy-17α - ethynyl-gona - 1,3,5(10) - trien-17β-ol according to the manipulative procedure described above.

To obtain 13β,17α-diethyl - 3 - ethoxy-gona-1,3,5(10)-trien-17β-ol, hydrogenate 13β-ethyl - 3 - ethoxy - 17α-ethynyl-gona-1,3,5(10)-trien - 17β-ol according to the manipulative procedure described above.

To obtain 13β-phenethyl-3 - propoxy-17α-ethyl-gona-1,3,5(10)-trien-17β-ol, hydrogenate 13β-phenethyl-3-propoxy - 17α - ethynyl-gona-1,3,5(10)-trien-17β-ol according to the manipulative procedure described above.

To obtain 13β-(3-hydroxypropyl) - 3 - cyclopentyloxy-17α-ethyl-gona-1,3,5(10) - trien - 17β - ol, hydrogenate 13β-(3 - hydroxypropyl) - 3 - cyclopentyloxy - 17α-ethynyl-gona-1,3,5(10) - trien - 17β-ol according to the manipulative procedure described above.

To obtain 13β-(2-diethylaminoethyl)-2,3 - dimethoxy-17α-ethyl-gona-1,3,5(10)-trien - 17β-ol, hydrogenate 13β-(2-diethylaminoethyl)-17α - ethynyl - gona - 1,3,5(10)-trien-17β-ol according to the manipulative procedure described above.

These compounds have estrogenic activity and are useful as intermediates in the preparation of the hormonal compounds of this invention.

EXAMPLE 261

13β,17α-diethyl-3-methoxy-gona-1,3,5(10)-trien-17β-ol

Add liquid ammonia (400 cc.) to 13β,17α-diethyl-3-methoxy-gona-1,3,5(10),8 - tetraen - 17β-ol (13.3 g.) in aniline (200 cc.), followed by lithium (5.0 g.) in small pieces with stirring; after stirring for 1 hour add an excess of ammonium chloride followed by water, and the extract mixture with ether. Wash the ether extracts with water, then with 10% sulphuric acid to remove aniline completely, then again with water, followed by sodium bicarbonate solution, and finally dry. Evaporate to a crystalline residue and recrystallize from methanol to obtain 13β,17α - diethyl-3-methoxy-gona-1,3,5(10) - trien-17β-ol (11.1 g.), m.p. 152–5°; ultraviolet absorption peaks at 289 mμ (ε 1,660), 285–8 mμ (ε 1,480); infrared absorption peak at 2.90μ.

This compound has estrogenic activity and is useful as an intermediate for preparing the hormonal compounds of this invention.

EXAMPLE 262

13β-ethyl-17α-allyl - 3 - methoxy - gona-1,3,5(10)-trien-17β-ol

Add 13β-ethyl-3-methoxy-gona-1,3,5(10)-trien-17 - one (0.895 g.) in a mixture of ether (40 cc.) and allyl bromide (2.9 cc.) to magnesium (0.362 g.) in allyl bromide (0.15 cc.); reflux the mixture gently for 3½ hours, cool to 5°, and add 10% ammonium chloride solution (100 cc.) gradually. Separate the ether layer, wash, dry and evaporate; recrystallize the residue from hexane to obtain 13β-ethyl-17α-allyl - 3 - methoxy - gona - 1,3,5(10)-trien-17β-ol (0.845 g.), m.p. 126–8°; ultraviolet absorption peak at 278.5 mμ (ε 2,000); infrared absorption peaks at 10.9, 11.0μ.

This compound has estrogenic activity and is useful as an intermediate for preparing the hormonal compounds of this invention.

EXAMPLE 263

13β-ethyl-3-methoxy-17α-n-propyl-gona-1,3,5(10)-trien-17β-ol

Hydrogenate 13β-ethyl-3-methoxy-17α-allyl-gona-1,3,5-(10)-trien-7β-ol (0.87 g.) in ethanol (90 cc.) at atmospheric pressure in the presence of a 5% palladised charcoal catalyst until uptake of hydrogen ceases. Filter and evaporate the solvent to obtain a residue and crystallize from hexane to obtain 13β-ethyl-3-methoxy-17α-n-propyl-gona-1,3,5(10)-triene-17β-ol (0.745 g.), m.p. 123–125° C.; ultraviolet absorption peak at 279 mμ (ε 11,950).

This compound possesses estrogenic activity and is useful as an intermediate for preparing the hormonal compounds of this invention.

EXAMPLE 264

13β-n-propyl-3-methoxy-17α-methyl-gona-1,3,5(10)-triene-17β-ol

Add to a solution of 13β-n-propyl-3-methoxy-gona-1,3,5(10)-trien-17-one (2.14 g.) in benzene (60 cc.) slowly with stirring a 3N solution of methyl magnesium bromide in ether (25 cc.) under nitrogen. The mixture is refluxed for 44 hours, until the unreacted ketone content is negligible. Isolate by standard procedure and crystallize from methanol to obtain 13β-n-propyl-3-methoxy-17α-methyl-gona-1,3,5(10)-trien-17β-ol (1.76 g.), m.p. 131–134° C.; ultraviolet absorption peak at 278 mμ (ε 2,300); infrared absorption peak at 2.87μ.

This compound possesses estrogenic activity and is useful in the preparation of the hormonal compounds of this invention.

To obtain 13β-n-butyl-3-methoxy-17α-ethynyl-gona-1,3,5(10)-trien-17β-ol treat 13β-n-butyl-3-methoxy-gona-1,3,5(10)-trien-17-one with excess lithium acetylide according to the manipulative procedure described above.

To obtain 13β-cetyl-3-methoxy-17α-ethynyl-gona-1,3,5-(10)-trien-17β-ol treat 13β-cetyl-3-methoxy-gona-1,3,5-(10)-trien-17-one with excess lithium acetylide according to the manipulative procedure described above.

To obtain 6,13β-dimethyl-3-methoxy-17α-ethynyl-gona-1,3,5(10)-trien-17β-ol treat 6,13β-dimethyl-3-methoxy-gona-1,3,5(10)-triene-17-one with excess lithium acetylide according to the manipulative procedure described above.

To obtain 7,13β-dimethyl-3-methoxy-17α-ethynyl-gona-1,3,5(10)-triene-17β-ol treat 7,13β-dimethyl-3-methoxy-gona-1,3,5(10)-triene-17-one with excess lithium acetylide according to the manipulative procedure described above.

To obtain 13β-ethyl-3-ethoxy-17α-ethynyl-gona-1,3,5-(10)-triene-17β-ol treat 13β-ethyl-3-ethoxy-gona-1,3,5-(10)-triene-17-one with excess lithium acetylide according to the manipulative procedure described above.

To obtain 13β-phenethyl-3-propoxy-17α-ethynyl-gona-1,3,5(10)-trien-17β-ol treat 13β-phenethyl-3-propoxy-gona-1,3,5(10)-triene-17-one with excess lithium acetylide according to the manipulative procedure described above.

To obtain 13β - (3-hydroxypropyl) - 3 - cyclopentyloxy-17α-ethynyl-gona-1,3,5(10)-trien-17β-ol treat 13β-(3-hydroxypropyl) - 3 - cyclopentyloxy-gona-1,3,5(10)-trien-17-one with excess lithium acetylide according to the manipulative procedure described above.

To obtain 13β-(2-diethylaminoethyl)-2,3-dimethoxy-17α-ethynylgona-1,3,5(10)-trien-17β-ol treat 13β-(2-diethylaminoethyl) - 2,3-dimethoxygona-1,3,5(10)-trien-17-one with excess lithium acetylide according to the manipulative procedure described above.

These compounds possess estrogenic activity and are useful as intermediates for preparing the hormonal compounds of this invention.

EXAMPLE 265

13β-ethyl-2,3-dimethoxy-17α-propynyl-gona-1,3,5(10)-trien-17β-ol

Pass excess propyne through a solution of ethyl magnesium bromide (from ethyl bromide 11 g. and magnesium 3 g.) in tetrahydrofuran (150 cc.) and then add 13β - ethyl - 2,3-dimethoxy-gona-1,3,5(10)-trien-17-one (1 g.) in tetrahydrofuran (20 cc.). Reflux the mixture for 20 hours, cool, and decompose by carefully adding saturated aqueous ammonium chloride (200 cc.) followed by ether-benzene (1:1; 200 cc.). Separate the organic layer, wash, dry, evaporate and chromatograph on Florisil to obtain the title compound.

This compound possesses estrogenic activity and is useful as an intermediate for preparing the hormonal compounds of this invention.

EXAMPLE 266

13β-n-propyl-3-methoxy-17α-ethyl-gona-1,3,5(10)-triene-17β-ol

Add lithium (2.0 g.) in small pieces to 13β-n-propyl-3-methoxy-17α-ethyl-gona-1,3,5(10),8-tetraene-17β-ol (1.22 g.) in a mixture of liquid ammonia (120 cc.) and aniline (65 cc.) with stirring. After discharge of the blue color, add an excess of ammonium chloride, followed by water, and the mixture extract with ether. Wash the ether extracts in turn with water, 10% sulphuric acid, and water, dry and evaporate. Obtain a crystalline residue and recrystallize from aqueous acetonitrile, to obtain the title compound (0.9 g.), m.p. 94–5°; infrared absorption peak at 2.97μ.

This compound has estrogenic activity, and is useful as an intermediate for preparing the hormonal compounds of this invention.

EXAMPLE 267

13β-n-propyl-3-methoxy-17α-allyl-gona-1,3,5(10)-triene-17-ol

Reflux magnesium (.97 g.) with allyl bromide (0.57 g.) in ether about 50 cc.) and then add dropwise 13β-n-propyl-3-methoxy-gona-1,3,5(10)-triene - 17 - one (25 g.) in ether (100 cc.) and allyl bromide (10.8 g.) (30 minutes). Stir the mixture and reflux for a further 4 hours and then add ether (30 cc.). Add the cooled mixture to aqueous ammonium chloride and extract the product with ether. Evaporate the washed and dried extracts to a gum and recrystallize from methanol to obtain the title compound (2.5 g.); ultraviolet absorption peak at 280 mμ (ε 2,000); infrared absorption peaks at 2.83, 6.10, 11.1μ.

$C_{24}H_{34}O_2$ calculated: C, 81.3%; H, 9.1%. Found: C, 81.0%; H, 9.1%.

This compound has estrogenic activity, and is useful as an intermediate for preparing the hormonal compounds of this invention.

EXAMPLE 268

13β,17α-di-n-propyl-3-methoxy-gona-1,3,5(10)-trien-17α-ol

Hydrogenate 13β-n-propyl - 3 - methoxy - 17α - allyl-gona-1,3,5(10)-trien-17β-ol (2.34 g.) in ethanol (50 cc.) at atmospheric pressure using a 5% palladised charcoal catalyst (1 g.). Recrystallize the product from methanol to obtain the title compound, m.p. 85–94°; ultraviolet absorption peak at 280 mμ (ε 1,700); infrared absorption peak at 2.90μ.

This compound has estrogeni cactivity, and is useful as an intermediate for preparing the hormonal compounds of this invention.

EXAMPLE 269

13β-n-butyl-3-methoxy-17α-ethyl-gona-1,3,5(10)-trien-17β-ol

Add lithium (1.5 g.) in small pieces, with stirring, to 13,β-n-butyl - 3 - methoxy - 17α-ethyl-gona-1,3,5(10),8-tetraen-17β-ol (2.2 g.) in a mixture of liquid ammonia (110 cc.) and aniline (70 cc.); after stirring for 2 hours, add an excess of ammonium chloride, followed by water. Work up the product to obtain a red gum and crystallize from methanol; boil the crystalline material with methanol (20 cc.) and then allow the mixture to stand at room temperature for 15 hours. Filter to obtain the crude title compound (1.57 g.), contaminated with a small amount of starting material, m.p. 70–85°; ultraviolet absorption peak at 278 mμ (ε 3,300); infrared absorption peak at 3.07μ.

This compound has estrogenic activity, and is useful as an intermediate for preparing the hormonal compounds of this invention.

EXAMPLE 270

13β-ethyl-3-methoxy-17α-ethynyl-17β-acetoxy-gona-1,3,5(10)-triene

Shake 13β-ethyl - 3 - methoxy-17α-ethynyl-gona-1,3,5 (10)-trien-17β-ol (1.1 g.) with acetic anhydride (10 cc.) for 5 minutes. Add toluene-p-sulphonic acid (0.3 g.) and shake the solution until homogeneous. After 12 hours, decompose the reaction mixture by stirring with water (30 cc.) containing a few drops of pyridine for 30 minutes. Extract the mixture with ether and wash the ethereal solution with water, 2N aqueous sodium hydroxide, water, dilute hydrochloric acid, brine, and dry. Evaporate the solvent and dissolve the crystalline product in benzene (ca. 5 cc.) and filter through a short column of alumina (ca. 10 g.). Evaporate the solvent and recrystallize the product from methanol-ethyl acetate to obtain the title compound, m.p. 178–182°; infrared absorpion peak at 3.03, 5.78μ.

This compound has estrogenic activity, and is useful as an intermediate for preparing the hormonal compounds of this invention.

EXAMPLE 271

13β-methyl-3-methoxy-8-iso-gona-1,3,5(10)-trien-17-one

Hydrogenate 13β-methyl - 3 - methoxy-gona-1,3,5(10), 8,14-pentaen-17-one (3 g.) dissolved in ethanol (150 cc.) at atmospheric pressure in the presence of a 4% palladium on barium sulphate catalyst (3 g.) until hydrogen uptake ceases. Filter the catalyst and evaporate the filtrate to obtain residue and crystallize from ethanol to obtain the title compound (1.1 g.).

This compound has estrogenic activity, lowers the lipid level, and is useful as an intermediate for preparing the hormonal compounds of this invention.

EXAMPLE 272

13β-methyl-3-methoxy-8-iso-gona-1,3,5(10)-trien-17-one

Dissolve 13β-methyl - 3 - methoxy-gona-1,3,5(10,8,14-pentaen-17-one (1 g.) in benzene (35 cc.) and shake with hydrogen at atmospheric pressure in the presence of a 10% palladium on charcoal catalyst (0.5 g.) until hydrogen uptake ceases. Remove the catalyst, evaporate the solvent and recrystallize the residue from ethanol to obtain the title compound (0.55 g., 54%), m.p. 151–3°.

This compound has estrogenic activity, lowers the lipid level, and is useful as an intermediate for preparing the hormonal compounds of this invention.

To obtain 13β-ethyl - 3 - methoxy-8-iso-gona-1,3,5(10)-trien-17-one hydrogenate 13β-ethyl-3-methoxy-gona-1,3,5 (10),8,14-pentaene-17-one according to the manipulative procedure described above.

To obtain 13β-isopropyl - 3 - methoxy-8-iso-gona-1,3,5 (10)-trien-17-one hydrogenate 13β-isopropyl-3-methoxy-gona-1,3,5(10),8,-14-pentaen - 17 - one according to the manipulative procedure described above.

These compounds have estrogenic activity, lower the blood lipid level, and are useful as intermediates in the preparation of the hormonal compounds of this invention.

EXAMPLE 273

13β-ethyl-3-methoxy-8-iso-gona-1,3,5(10)-trien-17-one

Shake 13β-ethyl - 3 - methoxy-gona-1,3,5(10),8-tetraen-17-one (0.1 g.) in methanol (20 cc.) with hydrogen at atmospheric pressure in the presence of a 10% palladium on charcoal catalyst (0.05 g.) until hydrogen uptake ceases. Remove the catalyst and evaporate the solvent to obtain a gum and crystallize from methanol to obtain the title compound, m.p. 93–6°.

This compound has estrogenic activity, lowers the lipid level, and is useful as an intermediate for preparing the hormonal compounds of this invention.

EXAMPLE 274

13β-ethyl-3-methoxy-17,17-ethylenedioxy-8-iso-gona-1,3,5(10)-triene

Shake 13β-ethyl-3-methoxy-17,17-ethylenedioxy-8-iso-gona-1,3,5(10),8,14-pentaene (0.7 g.) in ethanol (50 cc.) with hydrogen at atmospheric pressure in the presence of a 10% palladium on charcoal catalyst until 2 molecular equivalents of hydrogen have been absorbed. Crystallize the residue obtained after removal of catalyst and solvent from a mixture of methanol (25 cc.) and ethanol (25 cc.) to obtain the title compound (0.35 g.), m.p. 131-3°.

$C_{22}H_{30}O_3$ calculated: C, 77.1%; H, 8.8%. Found: C, 77.2%; H, 8.8%.

This compound has estrogenic activity, lowers the lipid level, and is useful as an intermediate for preparing the hormonal compounds of this invention.

EXAMPLE 275

13β-ethyl-3-methoxy-8-iso-gona-1,3,5(10)-trien-17-one

Pass hydrogen chloride through a solution of 13β-ethyl-3-methoxy - 17,17 - ethylenedioxy-8-iso-gona-1,3,5(10)-triene (0.2 g.) in chloroform (5 cc.) at room temperature for 1 hour. Wash the product to remove hydrogen chloride, dry, and evaporate the solvent to obtain an oil and crystallize from ethanol to obtain the title compound (0.07 g.), m.p. 90–2°, undepressed on admixture with a sample otherwise obtained.

This compound has estrogenic activity, lowers the lipid level, and is useful as an intermediate for preparing the hormonal compounds of this invention.

EXAMPLE 276

13β-n-propyl-3-methoxy-8-iso-gona-1,3,5(10)-trien-17-one

Hydrogenate 13β-n-propyl-3-methoxy-gona-1,3,5(10),8,14-pentaen-17-one (5 g.) in ethanol (500 cc.) over 10% palladized charcoal (2 g.) until two molar equivalents of hydrogen have been absorbed. Filter the catalyst, evaporate the solvent and recrystallize the residue from ethanol to obtain the title compound (2.8 g.), m.p. 133–134°; ultraviolet absorption peak at 280 mμ (ε 2,300), 287 mμ (ε 2,300); infrared absorption peak at 5.76μ.

This compound has estrogenic activity, lowers the lipid level, and is useful as an intermediate for preparing the hormonal compounds of this invention.

EXAMPLE 277

13β-isobutyl-3-methoxy-8-iso-gona-1,3,5(10)-trien-17-one

Hydrogenate 13β-isobutyl-3-methoxy-gona-1,3,5(10),8,14-pentaen-17-one (5 g.) in ethanol (400 cc.) over a 10% palladized charcoal catalyst (5 g.) until two molar equivalents of hydrogen have been absorbed. Filter the catalyst and evaporate the solvent to obtain a residue, and recrystallize from ethanol-water (19:1) to obtain the title compound (1,25 g.), m.p. 142°; ultraviolet absorption peak at 280 mμ (ε 2,200), 288 mμ (ε 2,150); infrared absorption peak at 5.77μ.

$C_{22}H_{30}O_2$ calculated: C, 80.9%; H, 9.2%. Found: C, 80.9%; H, 9.2%.

To obtain 13β-n-butyl-3-methoxy-8-iso-gona-1,3,5(10)-trien-17-one, hydrogenate 13β-n-butyl-3-methoxy-gona-1,3,5(10),8,14-pentaen-17-one according to the manipulative procedure described above.

To obtain 13β,6-dimethyl-3-methoxy-8-iso-gona-1,3,5(10)-trien-17-one, hydrogenate 13β,6-dimethyl-3-methoxy-gona-1,3,5(10),8,14-pentaen-17-one according to the manipulative procedure described above.

To obtain 13β,7-dimethyl-3-methoxy-8-iso-gona-1,3,5(10)-trien-17-one, hydrogenate 13β,7-dimethyl-3-methoxy-gona-1,3,5(10),8,14-pentaen-17-one according to the manipulative procedures described above.

To obtain 13β-n-propyl-3-hydroxy-8-iso-gona-1,3,5(10)-trien-17-one, hydrogenate 13β-n-propyl-3-hydroxy-gona-1,3,5(10),8,14-pentaen-17-one according to the manipulative procedure described above.

To obtain 13β-n-butyl-3-hydroxy-8-iso-gona-1,3,5(10)-trien-17-one, hydrogenate 13β-n-butyl-3-hydroxy-gona-1,3,5(10),8,14-pentaen-17-one according to the manipulative procedure described above.

To obtain 13β-ethyl - 2,3 - dimethoxy-8-iso-gona-1,3,5(10)-trien-17-one, hydrogenate 13β-ethyl-2,3-dimethoxy-gona-1,3,5(10),8,14-pentaen-17-one according to the manipulative procedure described above.

To obtain 13β-ethyl-1,3-dimethoxy-8-iso-gona-1,3,5(10)-trien-17-one, hydrogenate 13β-ethyl-1,3-dimethoxy-gona-1,3,5(10),8,14-pentaen-17-one according to the manipulative procedure described above.

To obtain 13β - (3-hydroxypropyl)-3-methoxy-8-iso-gona-1,3,5(10)-trien - 17 - one, hydrogenate 13β-(3-hydroxypropyl) - 3 methoxy-gona-1,3,5(10),8,14-pentaen-17-one according to the manipulative procedure described above.

To obtain 13β-isobutyl-3-pentyloxy-8-iso-gona-1,3,5(10)-trien-17-one, hydrogenate 13β-isobutyl-3-pentyloxy-gona-1,3,5(10),8,14-pentaen-17-one according to the manipulative procedure described above.

To obtain 13β-(3-hydroxypropyl)-3-cyclopentyloxy-8-iso-gona-1,3,5(10)-trien-17-one, hydrogenate 13β-(3-hydroxypropyl) - 3 - cyclopentyloxy-gona-1,3,5(10),8,14-pentaen-17-one according to the manipulative procedure described above.

To obtain 13β-phenethyl-3-hydroxy-8-iso-gona-1,3,5(10)-trien-17-one, hydrogenate 13β-phenethyl-3-hydroxy-gona-1,3,5(10),8,14-pentaen-17-one according to the manipulative procedure described above.

To obtain 13β-(2-diethylaminoethyl)-2,3-dimethoxy-8-iso-gona-1,3,5-(10)-trien-17-one, hydrogenate 13β-(2-diethylaminoethyl)-2,3 - dimethoxy - gona - 1,3,5(10),8,14-pentaen-17-one according to the manipulative procedure described above.

To obtain 13β-(3-dimethylaminopropyl)-6-methyl-1,3-dimethoxy-8-iso-gona-1,3,5(10)-trien-17-one, hydrogenate 13β-(3-dimethylaminopropyl)-6-methyl - 1,3 - dimethoxy-gona-1,3,5(10),8,14-pentaen-17-one according to the manipulative procedure described above.

To obtain 13β-n-butyl-1,3-diethoxy-6-ethyl-8-iso-gona-1,3,5(10)-trien-17-one, hydrogenate 13β-n-butyl-1,3-diethoxy-6-ethyl-gona-1,3,5(10),8,14-pentaen - 17 - one according to the manipulative procedure described above.

To obtain 13β-n-propyl-2-ethoxy-3-methoxy-8-iso-gona-1,3,5-(10)-trien-17-one, hydrogenate 13β-n-propyl-2-ethoxy-3-methoxy-gona-1,3,5(10),8,14-pentaen - 17 - one according to the manipulative procedure described above.

These compounds have estrogenic activity, lower the blood lipid level, and are useful as intermediates in the preparation of the hormonal compounds of this invention.

EXAMPLE 278

13β-cetyl-3-methoxy-8-iso-gona-1,3,5(10)-trien-17-one

Shake 13β - cetyl - 3-methoxy-gona-1,3,5(10),8,14-pentaen-3-one (1.9 g.) in ethanol (250 cc.) with hydrogen at atmospheric pressure in the presence of a 10% palladium on charcoal catalyst (1 g.) until uptake of hydrogen ceases. Remove the catalyst and evaporate to obtain a colorless oil, and distil at 245–55° (bath temperature)/0.0002 mm., to obtain the title compound; ultraviolet absorption peak at 280 mμ (ε 1,560).

$C_{34}H_{54}O_2$ calculated: C, 82.5%; H, 11.0%. Found: C, 82.4%; H, 10.7%.

This compound has estrogenic activity, lowers the lipid level, and is useful as an intermediate for preparing the hormonal compounds of this invention.

EXAMPLE 279

13β-methyl-3-hydroxy-8-iso-gona-1,3,5(10)-trien-17-one

Hydrogenate 13β-methyl-3-hydroxy-gona-1,3,5(10),8,14-pentaen-17-one (0.16 g.) in ethanol (20 cc.) at atmospheric pressure in the presence of a 30% palladized charcoal catalyst (0.075 g.). When 2.2 molar equivalents of hydrogen have been absorbed, (4 hours), filter the catalyst and evaporate the filtrate. Recrystallize the residue from methanol to obtain the title compound as colorless plates, m.p. 246–9° with sublimation; ultraviolet absorption peak at 281 mμ (ε 2,150).

This compound has estrogenic activity, lowers the lipid level, and is useful as an intermediate for preparing the hormonal compounds of this invention.

EXAMPLE 280

13β-methyl-3-hydroxy-8-iso-gona-1,3,5(10)-trien-17-one

Hydrogenate 13β-methyl-3-hydroxy-gona-1,3,5(10),8,14-pentaen-17-one (0.14 g.) in a mixture of benzene (37.5 cc.) and tetrahydrofuran (12.5 cc.) at atmospheric pressure using a 10% palladium on charcoal catalyst (0.075 g.) until hydrogen uptake is complete (6 hours). Remove the catalyst and the solvent to obtain a residue and crystallize from ethanol to obtain the title compound, m.p. 246–7.5°; ultraviolet absorption peak at 281 mμ (ε 1,900), confirming complete hydrogenation of the ethylenic bonds.

This compound has estrogenic activity, lowers the lipid level, and is useful as an intermediate for preparing the hormonal compounds of this invention.

EXAMPLE 281

13β-methyl-3-hydroxy-8-iso-gona-1,3,5(10)-trien-17-one

Hydrogenate 13β-methyl-3-acetoxy-gona-1,3,5(10),8,14-pentaen-17-one (0.38 g., obtained by the acetylation of bisdehydroestrone with pyridine and acetic anhydride) in ethanol (20 cc.) at atmospheric pressure with a 10% palladium on charcoal catalyst (0.02 g.) until hydrogenation ceases. Filter the catalyst and evaporate the solvent to obtain colorless crystals of 13β-methyl-3-acetoxy-8-iso-gona-1,3,5(10)-trien-17-one. Take up the product in methanol (3 cc.), and add 3N sodium hydroxide solution (1 cc.). After 15 minutes, acidify the solution and filter the precipitate obtained, and recrystallize from methanol to obtain the title compound, m.p. 253–5° with previous sublimation and softening at 247°; ultraviolet absorption peak at 281 mμ (ε 2,200).

This compound has estrogenic activity, lowers the lipid level, and is useful as an intermediate for preparing the hormonal compounds of this invention.

EXAMPLE 282

13β-ethyl-3-hydroxy-8-iso-gona-1,3,5(10)-trien-17-one

Fuse 13β-ethyl-3-methoxy-8-iso-gona-1,3,5(10)-trien-17-one (0.5 g.) with pyridine hydrochloride (5 g.) at 218° for 40 minutes. Dissolve the cooled melt in methanol (25 cc.), pour into water, and extract thoroughly with ether. Dissolve the gummy product in benzene (5 cc.) and absorb on a column of ion exchange resin (prepared by mixing a synthetic hydrated acid magnesium silicate and Celite resin in the proportion 4:1 by weight, and then washing with hydrochloric acid and water and drying at 100° ). Elute the absorbed material with benzene to remove a by-product, and subsequently elute with ether to obtain the title compound (0.22 g.), m.p. 170–82° after recrystallization from ethanol; infrared absorption peak at 3.01, 5.84μ.

This compound has estrogenic activity, lowers the blood lipid level, and is useful as an intermediate for preparing the hormonal compounds of this invention.

EXAMPLE 283

13β-ethyl-3-hydroxy-8-iso-gona-1,3,5(10)-trien-17-one

Hydrogenate 13β-ethyl-3-hydroxy-gona-1,3,5(10),8,14-pentaen-17-one (0.4 g.) in ethanol (25 cc.) at atmospheric pressure using a 10% palladized charcoal catalyst (0.2 g.) until 2.2 molar equivalents of hydrogen are taken up (3 hours); filter and evaporate to obtain a crude product and recrystallize from methanol to obtain colorless crystals of the title compound (0.215 g.), m.p. 189–193° C. with sublimation to needles, m.p. 205–206° C. Further recrystallization of the material of m.p. 189–193° C. raises its melting point to 191–193° C.; ultraviolet absorption peak at 280.5 mμ (ε 2,280).

$C_{19}H_{24}O_2$ calculated: C, 80.25%; H, 8.5%. Found: C, 80.2%; H, 8.4%.

This compound has estrogenic and blood lipid lowering activity and is useful as an intermediate for preparing the hormonal compounds of this invention.

EXAMPLE 284

13β-methyl-3-methoxy-8-iso-gona-1,3,5(10)-trien-17β-ol

Shake 13β-methyl-3-methoxy-gona-1,3,5(10),8,14-pentaen-17β-ol (2.3 g.) in ethanol (100 cc.) with hydrogen at atmospheric pressure in the presence of a 10% palladium on charcoal catalyst (1.2 g.). Remove the catalyst and solvent and crystallize the residue from methanol and then from a mixture of benzene and light petroleum to obtain the title compound, m.p. 103–104° C. on admixture with authentic material obtained by another route, m.p. 101–102° C.

This compound has estrogenic and blood lipid lowering activity and is useful as an intermediate for preparing the hormonal compounds of this invention.

EXAMPLE 285

13β-ethyl-3-methoxy-8-iso-gona-1,3,5(10)-trien-17β-ol

Shake 13β-ethyl-3-methoxy-gona-1,3,5(10),8,14-pentaen-17β-ol (3.4 g.) in ethanol (150 cc.) with hydrogen at atmospheric pressure in the presence of a 10% palladium on charcoal catalyst (3.4 g.). Remove the catalyst and solvent and crystallize the product from a mixture of ether and light petroleum to obtain the title product, m.p. 130–131° C.; infrared absorption included a band due to hydroxyl (3.48μ).

$C_{20}H_{28}O_2$ calculated: C, 79.9%; H, 9.4%. Found: C, 79.9%; H, 9.2%.

This compound has estrogenic and blood lipid lowering activity and is useful as an intermediate for preparing the hormonal compounds of this invention.

EXAMPLE 286

13β-n-propyl-3-methoxy-8-iso-gona-1,3,5(10)-trien-17β-ol

Add sodium borohydride (2 g.) to 13β-n-propyl-3-methoxy-8-iso-gona-1,3,5(10)-trien-17-one (3 g.) in ethanol (100 cc.), and reflux the mixture for one hour. On cooling, work up the product in the usual manner and recrystallize from ethanol-water (9:1) to obtain the title compound (2.1 g.), m.p. 116–119° C. The analytical sample obtained by a further recrystallization from ether-hexane has m.p. 120–121° C.; infrared absorption peak at 2.89μ; no absorption in 5.71–5.88μ region.

$C_{21}H_{30}O_2$ calculated: C, 80.2%; H, 9.6%. Found: C, 80.3%; H, 9.6%.

This compound has estrogenic and blood lipid lowering activity and is useful as an intermediate for preparing the hormonal compounds of this invention.

EXAMPLE 287

13β-isopropyl-3-methoxy-8-isogona-1,3,5(10)-trien-17β-ol

Add 13β-isopropyl-3-methoxy-8-isogona-1,3,5(10)-trien-17β-one (1 g.) to sodium borohydride (0.5 g.) in methanol (100 cc.). Stir the mixture for 1 hour at 50° (bath temp.), and on cooling acidify with aqueous acetic acid and pour into brine. Extract the product with ether and work up in the usual manner to obtain a crystalline residue. Recrystallize from methanol and then from acetonitrile-water to obtain the title product (500 mg.), m.p. (after drying for 5 hours over phosphorus pentoxide at 0.05 mm.) 64–69°.

Infrared absorption peaks at 2.96, 6.21, 7.97μ; no absorption in 5.71–5.88μ region.

This compound has estrogenic activity, lower the lipid level, and is useful as an intermediate for preparing the hormonal compounds of this invention.

EXAMPLE 288

13β-isobutyl-3-methoxy-8-isogona-1,3,5(10)-trien-17β-ol

Add sodium borohydride (.7 g.) to 13β - isobutyl-3-methoxy-8-isogona-1,3,5(10)-trien-17-one (2 g.) in ethanol (80 cc.) and reflux the mixture for 1 hour. On cooling, acidify the mixture with aqueous acetic acid and evaporate to dryness under reduced pressure. Add water and collect the product with ether. Recrystallize from methanol and then from ether-hexane to obtain the title product (.2 g.), m.p. 137°; ultraviolet absorption peaks at 280 mμ (ε 2,000), 287 mμ (ε 1,900); infrared absorption peak at 2.88μ; no absorption in 5.71–5.88μ region.

$C_{22}H_{32}O_3$ calculated: C, 80.4%; H, 9.8%. Found: C, 80.4%; H, 9.7%.

This compound has estrogenic and blood lipid lowering activity, and is useful as an intermediate for preparing the hormonal compounds of this invention.

EXAMPLE 289

13β-Ethyl-8-isogona-1,3,5(10)-trien-3,17β-diol

Keep 13β-ethyl-3-hydroxy-8-isogona-1,3,5(10)-trien-17-one (1.04 g.) for 3 hours at room temperature in methanol (50 cc.) containing sodium borohydride (1 g.). Acidify the mixture with acetic acid and concentrate to a thick slurry. Add water and collect the product with ether. Work up in the usual manner to obtain residue and twice recrystallize from methanol to obtain the title product (.64 g.), m.p. 189.5–192.5°; ultraviolet peak at 280 mμ (ε 2,000); infrared absorption peaks at 2.99, 3.08μ.

$C_{19}H_{26}O_2$ calculated: C, 79.7%; H, 9.15%. Found: C, 79.4%; H, 9.30%.

This compound has estrogenic and blood lipid lowering activity, and is useful as an intermediate for preparing the hormonal compounds of this invention.

EXAMPLE 290

13β-methyl-3,17β-dimethoxy-8-isogona-1,3,5(10)-triene

Add 13β-methyl-2-methoxy-8-isogona-1,3,5(10) - trien-17β-ol (.75 g.) in methylene chloride (50 cc.) containing 1 drop of boron trifluoride etherate to diazomethane (from N-nitrosomethylurea, 2.05 g.) in methylene chloride (40 cc.). Work up and recrystallize the product from ethyl acetate-hexane and then from methanol to obtain the title compound (.3 g.), m.p. 106–108°.

$C_{20}H_{28}O_2$ calculated: C, 80.0%; H, 9.4%. Found: C, 79.8%; H, 9.3%.

This compound has estrogenic and blood lipid lowering activity and is useful as an intermediate for preparing the hormonal compounds of this invention.

EXAMPLE 291

13β-ethyl-3,17β-dimethoxy-8-iso-gona-1,3,5(10)-triene

Add 13β-ethyl-3-methoxy-8-iso-gona-1,3,5(10) - trien-17β-ol in methylene chloride (25 cc.) to diazomethane as previously described. Crystallize the product from hexane, dissolve in hexane-benzene (4:1) and chromatograph on neutral alumina. Elute with benzene; crystallize from n-hexane to obtain the title compound, m.p. 113°; ultraviolet absorption peaks at 279 mμ (ε 2,200), 288 mμ (ε 2,100).

$C_{21}H_{30}O_2$ calculated: C, 80.2%; H, 9.1%. Found: C, 80.1%; H, 8.9%.

This compound has estrogenic and blood lipid lowering activity, and is useful as an intermediate for preparing the hormonal compounds of this invention.

EXAMPLE 292

13β-n-propyl-3,17β-dimethoxy-8-iso-gona-1,3,5(10)-triene

Add excess diazomethane in ether (60 cc.) to 13β-propyl-3-methoxy-8-iso-gona-1,3,5(10)-trien-17β - ol (1 g.) in methylene chloride (50 cc.) containing 1 drop of boron trifluoride etherate. Filter the solution, wash with aqueous sodium hydroxide and then with water, and dry. Remove the solvent and chromatograph the residue in hexane-benzene (9:1) through a column of neutral alumina (50 g.). Crystallize from ethanol, then from hexane, to obtain the title compound (0.35 g.), m.p. 92.5–93.5°; no infrared absorption in the 2.86-3.33μ region.

$C_{22}H_{32}O_2$ calculated: C, 80.4%; H, 9.8%. Found: C, 80.5%; H, 10.1%.

This compound has estrogenic and lipid lowering activity, and is useful as an intermediate for preparing the hormonal compounds of this invention.

EXAMPLE 293

13β-ethyl-3-methoxy-17β-acetoxy-8-iso-gona-1,3,5(10)-triene

Dissolve 13β-ethyl-3-methoxy-8-iso - gona - 1,3,5(10)-trien-17β-ol (1 g.) in pyridine (5 cc.) and acetic anhydride (5 cc.) and allow the mixture to stand at room temperature for 18 hours. Remove the solvent in vacuo and crystallize the residue to obtain the title compound; ultraviolet absorption peak at 286 mμ (ε 2,000).

This compound has estrogenic and lipid lowering activity and is useful as an intermediate for preparing the hormonal compounds of this invention.

EXAMPLE 294

13β-n-Propyl-3-methoxy-17β-acetoxy-8-iso-gona-1,3,5(10)-triene

Prepare the starting material, 13β-propyl-3-methoxy-8-iso-gona-1,3,5(10)-trien-17β-ol, by shaking 13β-propyl-3-methoxy-gona-1,3,5(10),8,14-pentaen-17-one (5 g.) in ethanol (100 cc.) containing 10% palladized charcoal (2 g.) until hydrogen uptake ceases. Obtain the product by filtration of the catalyst, evaporation of the solvent and crystallization from ethanol; then reflux with ethanol (100 cc.) and sodium borohydride (0.2 g.) for 30 minutes. Acidify the reaction mixture with acetic acid, evaporate almost to dryness, add water, and collect the product in ether. Wash, dry, and evaporate the ethereal solution and crystallize the residue from methanol. Dissolve this product (1 g.) in pyridine (5 cc.) and acetic anhydride (5 cc.) and allow to stand at room temperature for 18 hours. Remove the solvents and obtain the title compound by crystallizing from methanol; ultraviolet absorption peak at 286 mμ (ε 1,900; 1,700).

This compound has estrogenic and lipid lowering activity, and is useful as an intermediate for preparing the hormonal compounds of this invention.

EXAMPLE 295

13β-n-propyl-3-methoxy-17β-benzoyloxy-8-isogona-1,3,5(10)-triene

Prepare 13β - propyl - 3 - methoxy - 8 -iso-gona-1,3,5-(10) - trien - 17β - ol (1 g.) as described in the previous example. Treat with benzoyl chloride (1.5 cc.) in pyridine (10 cc.) and keep at room temperature for 18 hours. Add water, and take the product up in ether. Wash the ethereal solution with water, 10% aqueous potassium hydroxide, water, 10% hydrochloric acid, and dry with brine. Evaporate the solvent and crystallize from ethanol to obtain the title compound; ultraviolet absorption peak at 286 mμ (ε 1,900).

This compound has estrogenic and lipid lowering activity, and is useful as an intermediate for preparing the hormonal compounds of this invention.

To obtain 13β - ethyl - 3 - methoxy - 17β-benzoyloxy-8-iso-gona-1,3,5(10) - triene, treat 13β - ethyl - 3 - methoxy - 8 - iso - gona - 1,3,5(10)-trien-17β-ol with benzoyl chloride in pyridine according to the manipulative procedure described above.

This compound has estrogenic activity, lowers the blood lipid level, and is useful as an intermediates in the preparation of the hormonal compounds of this invention.

EXAMPLE 296

13β-methyl-3-methoxy-17,17-propylenedioxy-8-iso-gona-1,3,5(10)-triene

Shake 13β - methyl - 3 - methoxy - 17,17-propylenedioxy - gona - 1,3,5(10),8,14 - pentaene (1 g.) in ethanol (45 cc.) with 10% palladized charcoal (0.4 g.) in an atmosphere of hydrogen until uptake ceases (ca. 25 cc.). Remove solvent by filtration, evaporate the solvent under reduced pressure, and crystallize the residue from methanol to obtain the title compound; ultraviolet absorption peaks at 278, 286 mμ (ε 2,000; 1,800).

This compound has estrogenic and lipid lowering activity, and is useful as an intermediate for preparing the hormonal compounds of this invention.

EXAMPLE 297

13β-ethyl-3-methoxy-17,17-(2,2-dimethylpropylenedioxy)-8-iso-gona-1,3,5(10)-triene Shake 13β-ethyl-3-methoxy-17,17-(2,2-dimethylpropylenedioxy)-gona-1,3,5(10),8,14-pentaene (1 g.) in ethanol (75 cc.) containing 10% palladized charcoal (1 g.) in an atmosphere of hydrogen until uptake ceases. Remove the catalyst by filtration and evaporate. Crystallize the residue from ethanol to obtain the title compound, m.p. 173–8°; ultraviolet absorption peaks at 280, 287 mμ (ε2,500; 2,200).

$C_{25}H_{36}O_3$ calculated: C, 78.1%; H, 9.4%. Found: C, 77.8%; H, 9.2%.

This compound has estrogenic activity, and is useful as an intermediate for preparing the hormonal compounds of this invention.

EXAMPLE 298

13β-ethyl-3-methoxy-17,17-diethoxy-8-iso-gona-1,3,5(10)-triene

Treat 13β-ethyl-3-methoxy-8-iso-gona-1,3,5(10)-trien-17-one (1 g.) in ethanol (4 cc.) and ethyl orthoformate (1 cc.) with 1 drop of sulfuric acid, and heat for 30 minutes at 40°. Add ethyl orthoformate (0.5 cc.) and heat at 55° for a further 30 minutes. Cool the solution and tip it into a saturated sodium bicarbonate solution, and take the product up in ether. Wash, dry, and evaporate the ethereal solution. Filter the residue in hexane-benzene (4:1) through alumina (50 g.). Evaporate the solvent to obtain the title compound; ultraviolet absorption peaks at 278, 286 mμ (ε2,000; 1,800).

This compound has estrogenic and lipid lowering activity, and is useful as an intermediate for preparing the hormonal compounds of this invention.

To obtain 13β-n-propyl-3-methoxy-17,17-diethoxy-8-iso-gona-1,3,5(10)-triene, treat 13β-n-propyl-3-methoxy-8-iso-gona-1,3,5(10)-trien-17-one with ethanol, ethyl orthoformate, and sulfuric acid according to the manipulative procedure described above.

This compound has an estrogenic and lipid lowering activity, and is useful as intermediate in the preparation of the hormonal compounds of this invention.

EXAMPLE 299

13β-methyl-3-methoxy-D-homo-gona-2,5(10)-dien-17aβ-ol

Add 13β - methyl-3-methoxy-D-homo-gona-1,3,5(10)-trien-17aβ-ol (13 g.) in tetrahydrofuran (300 cc.) to liquid ammonia (650 cc.) followed by the addition of lithium (4.3 g.). After stirring for 30 minutes add absolute ethanol dropwise over a period of 1 hour to discharge the blue color. Precipitate the product with water, filter and dry to give 13β-methyl-3-methoxy-D-homo-gona-2,5(10)-dien-16aβ-ol; m.p. 148–155°; infrared absorption peaks at 2.98μ, 5.88μ and 5.98μ.

This compound has estrogenic activity, lowers the blood lipid level, and is useful as an intermediate for preparing the hormonal compounds of this invention.

EXAMPLE 300

13β-ethyl-3-methoxy-D-homo-gona-2,5(10)-dien-17aβ-ol

Substitute 13β - ethyl-3-methoxy - D - homo-gona-1,3,5(10)-trien-17aβ-ol for 13β-methyl-3-methoxy-D-homo-gona-1,3,5(10)-trien-17aβ-ol to give 13β-ethyl-3-methoxy-D-homo-gona-2,5(10)-dien-17aβ-ol; m.p. 135–138°; infrared absorption peaks at 3.03, 5.92, 6.01μ.

This compound has estrogenic activity, lowers the blood lipid level, and is useful as an intermediate for preparing the hormonal compounds of this invention.

EXAMPLE 301

13β-ethyl-3-methoxy-gona-2,5(10)-dien-17β-ol

Add 13β - ethyl-3-methoxy-gona-1,3,5(10)-trien-17β-ol (0.5 g.) in tetrahydrofuran (50 cc.) to stirred liquid ammonia (150 cc.), followed by lithium foil (0.5 g.) and then add ethanol (6 cc.) during 20 minutes. When the blue color is discharged, add water and work up the product with ether, to yield 13β-ethyl-3-methoxy-gona-2,5(10)-dien-17β-ol as a solid (0.47 g.).

To prepare 13β-ethyl-2,3-dimethoxy-gona-2,5(10)-dien-17β-ol react 13β-ethyl - 2,3 - dimethoxy-gona-1,3,5(10)-trien-17β-ol in tetrahydrofuran with lithium in liquid ammonia according to the manipulative procedure described above.

To prepare 13β-ethyl - 1,3 - dimethoxy-gona-1(10),3-dien-17β-ol react 13β - ethyl - 1,3 - dimethoxy-gona-1,3,5(10)-trien-17β-ol in tetrahydrofuran with lithium in liquid ammonia according to the manipulative procedure described above.

To prepare 13β-ethyl - 3 - ethoxy-gona-2,5(10)-dien-17β-ol react 13β - ethyl - 3 - ethoxy-gona - 1,3,5(10)-trien-17β-ol in tetrahydrofuran with lithium in liquid ammonia according to the manipulative procedure described above.

To prepare 13β - phenethyl-3-n-propoxy-gona - 2,5(10)-dien - 17β - ol react 13β-phenethyl-3-n-propoxy-gona-1,3,5(10)-trien - 17β - ol in tetrahydrofuran with lithium in liquid ammonia according to the manipulative procedure described above.

To prepare 13β - isobutyl-3-n-pentoxy-gona - 2,5(10)-dien - 17β - ol react 13β - isobutyl-3-n-pentoxy-gona-1,3,5(10) - trien - 17β - ol in tetrahydrofuran with lithium in liquid ammonia according to the manipulative procedure described above.

To prepare 13β - (3 - hydroxypropyl) - 3 - cyclopentoxy-gona - 2,5(10) - dien - 17β - ol react 13β-(3-hydroxypropyl) - 3 - cyclopentoxy-gona-1,3,5(10)-trien-17β-ol in tetrahydrofuran with lithium in liquid ammonia according to the manipulative procedure described above.

To prepare 13β-(3 - dimethylaminopropyl) - 1,3 - dimethoxy-gona-1(10),3-dien - 17β - ol react 13β-(3-dimethylaminopropyl) - 1,3 - dimethoxy-gona - 1,3,5(10)-trien-17β-ol in tetrahydrofuran with lithium in liquid ammonia according to the manipulative procedure described above.

EXAMPLE 302

13β-ethyl-3-methoxy-gona-2,5(10)-dien-17β-ol

To 13β-ethyl - 3 - methoxy-gona - 1,3,5(10) - trien-17β-ol (1.0 g.) in 1-methoxypropan-2-ol (100 cc.) add liquid ammonia (200 cc.), followed by lithium metal (1.2 g.) in small pieces with stirring. After discharge of the blue color add an excess of ammonium chloride, followed by water; filter off the crude 13β-ethyl-3-methoxy-gona-2,5(10)-dien-17β-ol and dry, m.p. 98–104°. No selective ultraviolet absorption beyond 220 mμ; infrared absorption peaks at 3.03, 5.92, 6.01μ.

This compound has estrogenic activity, lowers the blood lipid level, and is useful as an intermediate for preparing the hormonal compounds of this invention.

EXAMPLE 303

13β-ethyl-3-methoxy-gona-2,5(10)-dien-17β-ol

Add 13β-ethyl - 3 - methoxy-gona-1,3,5(10),8-tetraen-17β-ol (1.0 g.) in 1-methoxypropan-2-ol (100 cc.) to liquid ammonia (150 cc.), followed by lithium metal (2.0 g.) in small pieces during 20 minutes with stirring. Discharge the blue color immediately after completion of the metal addition; then add water, filter off the solid and recrystallize from methanol to give 13β-ethyl-3-methoxy-gona-2,5(10)-dien - 17β - ol (0.3 g.). No selective ultraviolet absorption beyond 220 mμ; infrared absorption peaks at 3.08, 5.92, 6.01μ.

This compound has estrogenic activity, lowers the blood lipid level, and is useful as an intermediate for preparing the hormonal compounds of this invention.

EXAMPLE 304

13β-n-propyl-3-methoxy-gona-2,5(10)-dien-17β-ol

Dissolve 13β-n-propyl - 3 - methoxy-gona - 1,3,5(10)-gona-trien-17β-ol in a mixture of freshly distilled pyrrole (50 cc.) and liquid ammonia (100 cc.) and then add lithium (1.0 g.) in small pieces as quickly as the production of foam permits. When the blue color is discharged, add excess ammonium chloride, followed by water (100 cc.). Extract the product into ether, wash, dry and evaporate. Recrystallize the residue (0.9 g.), from methanol, to give 13β-n-propyl - 3 - methoxy-gona-2,5(10)-dien-17β-ol (0.65 g.), m.p. 153–6°; no selective ultraviolet absorption beyond 220 mμ; infrared absorption peaks at 2.91, 5.90, 6.04μ.

This compound has estrogenic activity, lowers the blood lipid level, and is useful as an intermediate for preparing the hormonal compounds of this invention.

EXAMPLE 305

13β-isopropyl-3-methoxy-gona-2,5(10)-dien-17β-ol

Add liquid ammonia (100 cc.) to 13β - isopropyl-3-methoxy-gona-1,3,5(10) - trien - 17β - ol (0.5 g.) in tetrahydrofuran (50 cc.) followed by lithium metal (0.5 g.), and stir the solution for 10 minutes. Then add ethanol (6 cc.) dropwise. When the blue color is discharged, add water and extract the product with ether. Evaporate the washed and dried extracts to give crude 13β-isopropyl-3-methoxy-gona-2,5(10)-dien-17β-ol (0.5 g.) as colorless gum.

This compound has estrogenic activity, lowers the blood lipid level, and is useful as an intermediate for preparing the hormonal compounds of this invention.

EXAMPLE 306

13β-isopropyl-3-methoxy-gona-2,5(10)-dien-17β-ol

Add a solution of 13β-isopropyl - 3 - methoxy-gona-1,3,5(10),8-tetraen-17β-ol (0.25 g.) in a mixture of dry ether (10 cc.) and dry tetrahydrofuran (10 cc.) to liquid ammonia (50 cc.) containing dissolved lithium metal (0.125 g.). Then add further lithium (0.125 g.), followed after 5 minutes by dropwise addition of ethanol (5 cc.) over 10 minutes. When the blue color is discharged, add water and extract the product with ether. Evaporate the washed and dried extracts and recrystallize the partially crystalline residue from ethanol to give 13β-isopropyl-3-methoxy-gona - 2,5(10) - dien - 17β - ol (0.01 g.), m.p. 87–94°; infrared absorption peaks at 2.94, 5.92, 5.99μ.

This compound has estrogenic activity, lowers the blood lipid level, and is useful as an intermediate for preparing the hormonal compounds of this invention.

EXAMPLE 307

13β-n-butyl-3-methoxy-gona-2,5(10)-dien-17β-ol

Add 13β-n-butyl-3-methoxy-gona-1,3,5(10)-trien-17β-ol (0.5 g.) in a mixture of tetrahydrofuran (5 cc.) and ether (15 cc.) dropwise to a stirred solution of lithium (0.5 g.) in liquid ammonia (60 cc.). After 5 minutes beyond completion of addition, add ethanol (8 cc.) dropwise and when the blue color is discharged, add water and extract the mixture with ether. Work up in the usual way to give 13β-n-butyl-3-methoxy-gona-2,5(10)-dien-17β-ol as a crystalline solid, m.p. 135–9°; infrared absorption peaks at 2.97, 6.25, 6.38, and 8.16μ.

This compound has estrogenic activity, lowers the blood lipid level, and is useful as an intermediate for preparing the hormonal compounds of this invention.

EXAMPLE 308

13β-isobutyl-3-methoxy-gona-2,5(10)-dien-17β-ol

To a mixture of distilled liquid ammonia (900 cc.), 1-methoxy-2-propanol (430 cc.), and 13β-isobutyl-3-methoxy-gona-1,3,5(10),8-tetraen-17β-ol add lithium (5.7 g.) in small pieces, little by little, with vigorous stirring; a blue color develops which disappears when the addition of lithium is complete. Continue stirring for an additional 30 minutes. Thereafter, add water (145 cc.) followed by a mixture of glacial acetic acid (145 cc.) and water (145 cc.). Collect the precipitate, wash with water and dry, thus giving 13β-isobutyl-3-methoxy-gona-2,5(10)-dien-17β-ol (4.0 g.; 80%), m.p. 124–127° C.; infrared absorption peaks at 5.89, 6.03μ.

This compound has estrogenic activity, lowers the blood lipid level, and is useful as an intermediate for preparing the hormonal compounds of this invention.

EXAMPLE 309

13β-ethyl-3-ethoxy-gona-2,5(10)-dien-17β-ol

Heat under reflux 13β-ethyl-3-hydroxy-gona-1,3,5(10)-trien-17β-ol (1.75 g.) and potassium carbonate (3 g.) for six hours with ethanol (40 cc.) and ethyl iodide (20 cc.) in a nitrogen atmosphere. Then concentrate the solution to half its original volume, add water and take the product up in ether. Wash, dry and evaporate the ethereal solution and recrystallize the residue from hexane to give 13β-ethyl-3-ethoxy-gona-1,3,5(10)-trien-17β-ol. Add this product (0.5 g.) tetrahydrofuran (50 cc.) to liquid ammonia (100 cc.) and add lithium (0.5 g.). After stirring for 10 minutes add a mixture of ethanol (6 cc.) and tetrahydrofuran (10 cc.) over a period of 20 minutes, and when the blue color is discharged add water and extract the mixture with ether. Wash, dry and evaporate the ethereal solution and recrystallize the residue from ethanol to give 13β-ethyl-3-ethoxy-gona-2,5-(10)-dien-17β-ol. No selective ultraviolet absorption beyond 220 mμ.

This compound has estrogenic activity, lowers the blood lipid level, and is useful as an intermediate for preparing the hormonal compounds of this invention.

EXAMPLE 310

13β-ethyl-3,17β-dimethoxygona-2,5(10)-diene

Add 13β-ethyl-3,17β - dimethoxygona-1,3,5(10)-triene (1 g.) in tetrahydrofuran (10 cc.) to a stirred solution of liquid ammonia (35 cc.) and tetrahydrofuran (10 cc.), followed by the addition of lithium (0.7 g.) in pieces. After stirring vigorously for 2 hours add ethanol dropwise until the blue color is discharged. Add water and extract the mixture with ether-benzene. Wash the organic solution with water, aqueous sodium bicarbonate, water and brine and dry ($Na_2SO_4$). Remove the solvent under reduced pressure and triturate the residue with methanol. Filter to obtain crude title product contaminated with some starting material (0.8 g.), m.p. 144–150°; infrared absorption peaks at 5.9 6$\mu$.

This compound has estrogenic activity, lowers the blood lipid level, and is useful as an intermediate for preparing the hormontal compounds of this invention.

EXAMPLE 311

13$\beta$-ethyl-3-n-propoxy-gona-2,5(10)-dien-17$\beta$-ol

Use n-propyl iodide (20 cc.) instead of ethyl iodide and proceed exactly as described for the 3-ethoxy compound to give 13$\beta$-ethyl-3-n-propoxy-gona-2,5(10)-dien-17$\beta$-ol; no selective ultraviolet absorption beyond 220 m$\mu$.

This compound has estrogenic activity, lowers the blood lipid level, and is useful as an intermediate for preparing the hormonal compounds of this invention.

EXAMPLE 312

13$\beta$-methyl-3-methoxy-D-homo-gona-2,5(10)-dien-17a-one

Reflux 13$\beta$ - methyl - 3 - methoxy - D - homo - gona-2,5(10) - dien - 17a$\beta$-ol (4 g.) under nitrogen in toluene (130 cc.) containing cyclohexanone (40 cc.) and aluminum isopropylate (1.8 g.) for 3 hours. Cool, add water (40 cc.) followed by anhydrous sodium sulphate (40 g.) and filter the mixture. Evaporate the filtrate to dryness, first at 30°/20 mm. then at 50°/0.1 mm. to afford 13$\beta$-methyl-3-methoxy-D-homo-gona-2,5(10)-dien-17a-one. Infrared absorpion peaks at 5.85, 5.92, 6.01$\mu$.

This compound has estrogenic activity, lowers the blood lipid level, and is useful as an intermediate for preparing the hormonal compounds of this invention.

EXAMPLE 313

13$\beta$-ethyl-3-methoxy-D-homo-gona-2,5(10)-dien-17a-one

Reflux 13$\beta$-ethyl - 3 - methoxy-D-homo-gona-2,5(10)-dien-17a$\beta$-ol (10 g.) with aluminium isopropylate (8 g.) in dry toluene (450 cc.) and dry cyclohexanone (140 cc.) for 4 hours in an atmosphere of nitrogen. Decompose the cooled solution with water (ca. 25 cc.) and dry by the addition of sodium sulphate. Filter the mixture and remove the solvents first at 20 mm. Hg and then at 90° 0.2 mm. Hg. Dry the residue over phosphorus pentoxide in a desiccator to give 13$\beta$ - ethyl-3-methoxy-D-homo-gona-2,5(10)-dien-17a-one (11.1 g.), m.p. 138–145° C.; infrared absorption peaks at 5.88, 6$\mu$.

This compound has estrogenic activity, lowers the blood lipid level, and is useful as an intermediate for preparing the hormonal compounds of this invention.

EXAMPLE 314

13$\beta$-ethyl-3-methoxy-gona-2,5(10)-dien-17-one

Reflux a mixture of 13$\beta$-ethyl-3-methoxy-gona-2,5(10)-dien-17$\beta$-ol (0.8 g.) aluminium isopropoxide (0.36 g.), toluene (26 cc.) and cyclohexanone (8 cc.) under nitrogen for 3 hours. Allow the solution to cool under nitrogen, add water (5 cc.) and shake the mixture vigorously. Add anhydrous sodium sulphate (5 g.), shake the mixture again, and then allow to stand for 30 minutes. Filter the solution, combine the filtrate with ether-washings of the residue, and evaporate, first at 30°/20 mm., then at 50°/0.1 mm. to leave as a crystalline solid 13$\beta$-ethyl-3-methoxy-gona-2,5(10)-dien-17-one; infrared absorption peaks at 5.78, 5.92, 6.01$\mu$, with no absorption due to hydroxyl.

To prepare 13$\beta$-n-propyl-3-methoxy-gona-2,5(10)-dien-17-one react 13$\beta$-n-propyl-3-methoxy-gona-2,5(10)-dien-17$\beta$-ol in toluene with cyclohexanone and aluminium isopropoxide according to the manipulative procedure described above.

To prepare 13$\beta$ - isopropyl-3-methoxy-gona-2,5(10)-dien-17-one react 13$\beta$-isopropyl-3-methoxy-gona-2,5(10)-dien-17$\beta$-ol in toluene with cyclohexanone and aluminium isopropoxide according to the manipulative procedure described above.

To prepare 13$\beta$-isobutyl-3-methoxy-gona-2,5(10)-dien-17-one react 13$\beta$ - isobutyl-3-methoxy-gona-2,5(10)-dien-17$\beta$-ol in toluene with cyclohexanone and aluminium isopropoxide according to the manipulative procedure described above.

To prepare 13$\beta$ - ethyl-3-ethoxy-gona-2,5(10)-dien-17-one react 13$\beta$ - ethyl-3-methoxy-gona-2,5(10)-dien-17$\beta$-ol in toluene with cyclohexanone and aluminium isopropoxide according to the manipulative procedure described above.

To prepare 13$\beta$ - ethyl-3-n-propoxy-gona-2,5(10)-dien-17-one react 13$\beta$ - ethyl-3-n-propoxy-gona-2,5(10)-dien-17$\beta$-ol in toluene with cyclohexanone and aluminium isopropoxide according to the manipulative procedure described above.

To prepare 13$\beta$-ethyl - 2,3 - dimethoxy-gona-2,5(10)-dien-17-one react 13$\beta$-ethyl-2,3-dimethoxy-gona-2,5(10)-dien-17$\beta$-ol in toluene with cyclohexanone and aluminium isopropoxide according to the manipulative procedure described above.

To prepare 13$\beta$-ethyl-1,3-dimethoxy-gona-1(10),3-dien-17-one react 13$\beta$-ethyl-1,3-dimethoxy-gona-1(10),3-dien-17$\beta$-ol in toluene with cyclohexanone and aluminium isopropoxide according to the manipulative procedure described above.

To prepare 13$\beta$ - phenethyl-3-n-propoxy-gona-2,5(10)-dien-17-one react 13$\beta$-phenethyl - 3 - n - propoxy-gona-2,5(10)-dien-17$\beta$-ol in toluene with cyclohexanone and aluminium isopropoxide according to the manipulative procedure described above.

To prepare 13$\beta$ - isobutyl-3-n-pentoxy-gona-2,5(10)-dien-17-one react 13$\beta$-isobutyl-3-n-pentoxy-gona-2,5(10)-dien-17$\beta$-ol in toluene with cyclohexanone and aluminium isopropoxide according to the manipulative procedure described above.

To prepare 13$\beta$ - (3-hydroxypropyl)-3-cyclopentoxy-gona-2,5(10)-dien-17-one react 13$\beta$-(3 - hydroxypropyl)-3-cyclopentoxy-gona-2,5(10)-dien-17$\beta$-ol in toluene with cyclohexanone and aluminium isopropoxide according to the manipulative procedure described above.

To prepare 13$\beta$ - (3 - dimethylaminopropyl)-1,3-dimethoxy-gona-1(10),3-dien-17-one react 13$\beta$ - (3-dimethylaminopropyl) - 1,3 - dimethoxy-gona-1(10),3-dien-17$\beta$-ol in toluene with cyclohexanone and aluminium isopropoxide according to the manipulative procedure described above.

These compounds have estrogenic activity and are useful as intermediates in the preparation of the hormonal compounds of the invention.

EXAMPLE 315

13$\beta$-n-propyl-3-methoxy-gona-2,5(10)-dien-17-one

Reflux 13$\beta$-n-propyl-3-methoxy-gona-2,5(10)-dien-17$\beta$-ol (3.0 g.) with aluminium isopropoxide in toluene and cyclohexanone according to the conditions of Oppenauer oxidation. Isolate and recrystallize the product from methanol to give 13$\beta$-n-propyl-3-methoxy-gona-2,5(10)-dien-17-one (2.0 g.), m.p. 128–31° C. with softening at 125°.

$C_{21}H_{30}O_2$ calculated: C, 80.2%; H, 9.6%. Found: C, 80.0%; H, 9.55%.

This compound has estrogenic activity and is useful as an intermediate for preparing the hormonal compounds of this invention.

EXAMPLE 316

13β-n-butyl-3-methoxy-gona-2,5(10)-dien-17-one

Reflux 13β-n-butyl - 3 - methoxy - gona - 2,5(10) - dien-17β-ol (8 g.) in toluene (450 cc.) containing cyclohexane (120 cc.) and aluminium isopropoxide (5 g.) under nitrogen for 4 hours. Cool, and add water (15 cc.) dropwise, followed by anhydrous sodium sulphate. Filter the mixture, wash the residue with ether and combine the filtrate and washings, dry and evaporate finally at 90°/1.05 mm. to give 13β-n-butyl-3-methoxy-gona-2,5(10)-dien-17-one (6.0 g.), m.p. 124–128° (from methanol); infrared absorption peaks at 5.80, 6.02μ.

This compound has estrogenic activity, and is useful as an intermediate for preparing the hormonal compounds of this invention.

EXAMPLE 317

13β-ethyl-3-methoxy-17,17-ethylenedioxy-gona-2,5(10) diene

Add lithium (0.5 g.) in small pieces to 13β-ethyl-3-methoxy - 17,17 - ethylenedioxy-gona-1,3,5(10),8-tetraene (0.5 g.) in a mixture of 1-methoxy propan-2-ol (70 cc.), anhydrous liquid ammonia (120 cc.) and tetrahydrofuran (25 cc.) with continuous stirring. On completion of the reaction allow the ammonia to evaporate; then add water and extract the mixture with benzene. Wash the benzene extracts, dry and evaporate the solvent and crystallize the oily residue from methanol to give 13β-ethyl-3-methoxy-17,17-ethylenedioxy-gona-2,5(10) diene (.2 g.); no selective ultraviolet absorption beyond 220 mμ; infrared absorption peaks at 5.90, 6.01μ.

$C_{22}H_{32}O_3$ calculated: C, 76.8%; H, 9.3%. Found: C, 7.68%; H, 9.4%.

This compound has estrogenic and blood lipid lowering activity and is useful as an intermediate for preparing the hormonal compounds of this invention.

To prepare 13β-ethyl - 3 - methoxy - 17,17 - ethylenedioxy-gona - 2,5(10) - diene reduce 13β-ethyl - 3 - methoxy-17,17-ethylenedioxy-gona - 1,3,5(10) - triene according to the manipulative procedure described above.

To prepare 13β-n-propyl - 3 - methoxy - 17,17 - ethylenedioxy-gona-2,5(10) - diene reduce 13β-n-propyl-3-methoxy-17,17-ethylenedioxy-gona-1,3,5(10) - triene according to the manipulative procedure described above.

To prepare 13β-isopropyl - 3 - methoxy - 17,17 - ethylenedioxy-gona-2,5(10) - diene reduce 13β-isopropyl-3-methoxy-17,17-ethylenedioxy-gona-1,3,5(10) - triene according to the manipulative procedure described above.

To prepare 13β-n-butyl - 3 - methoxy-17,17-ethylenedioxy-gona-2,5(10)-diene reduce 13β-n-butyl - 3 - methoxy-17,17-ethylenedioxy-gona - 1,3,5(10) - triene according to the manipulative procedure described above.

To prepare 13β - isobutyl - 3 - methoxy-17,17-ethylenedioxy-gona-2,5(10)-diene reduce 13β - isobutyl - 3 - methoxy-17,17-ethylenedioxy-gona-1,3,5(10) - triene according to the manipulative procedure described above.

To prepare 13β - ethyl-3-ethoxy - 17,17 - ethylenedioxy-gona-2,5(10)-diene reduce 13β-ethyl - 3 - ethoxy-17,17-ethylenedioxy-gona-1,3,5(10)-triene according to the manipulative procedure described above.

To prepare 13β-ethyl-3-n-propoxy - 17,17 - ethylenedioxy-gona - 2,5(10) - diene reduce 13β-ethyl-3-n-propoxy-17,17-ethylenedioxy-gona - 1,3,5(10) - triene according to the manipulative procedure described above.

To prepare 13β - ethyl - 2,3 - dimethoxy-17,17-ethylenedioxy-gona-2,5(10)-diene reduce 13β-ethyl-2,3-dimethoxy-17,17-ethylenedioxy-gona - 1,3,5(10) - triene according to the manipulative procedure described above.

To prepare 13β - ethyl - 1,3 - dimethoxy-17,17-ethylene-dioxy-gona-1(10),3-diene reduce 13β-ethyl-1,3-dimethoxy-17,17-ethylenedioxy-gona - 1,3,5(10) - triene according to the manipulative procedure described above.

To prepare 13β-phenethyl - 3 - n - propoxy-17,17-ethylenedioxy-gona - 2,5(10) - diene reduce 13β-phenethyl-3-n-propoxy - 17,17 - ethylenedioxy - gona - 1,3,5(10) - triene according to the manipulative procedure described above.

To prepare 13β-(3-hydroxypropyl) - 3 - cyclopentoxy-17,17-ethylenedioxy-gona-2,5(10)-diene reduce 13β-(3-hydroxypropyl)-3-cyclopentoxy - 17,17 - ethylenedioxy-gona-1,3,5(10)-triene according to the manipulative procedure described above.

To prepare 13β-(3-dimethylaminopropyl) - 3 - methoxy-17,17-ethylenedioxy-gona-2,5(10)-diene reduce 13β-(3-dimethylaminopropyl) - 3 - methoxy - 17,17 - ethylenedioxy-gona-1,3,5(10)-triene according to the manipulative procedure described above.

These compounds have estrogenic activity and are useful as intermediates in the preparation of the hormonal compounds of the invention.

EXAMPLE 318

13β-methyl-3-methoxy-17aα-ethyl-D-homo-gona-2,5(10)-dien-17aβ-ol

Add ethanol (6 cc.) dropwise with stirring to a solution of 13β-methyl - 3 - methoxy-17aα-ethyl - D - homo-gona-1,3,5(10)-trien-17aβ-ol (0.4 g.) in liquid ammonia (60 cc.), and tetrahydrofuran (15 cc.) containing lithium (0.4 g.). On completion of the reaction add water and extract the mixture with ether. Wash, dry and evaporate the extracts to give 13β-methyl-3-methoxy-17aα-ethyl-D-homo-gona-2,5(10)-dien-17aβ-ol; infrared absorption peaks at 2.99, 5.90, 6.02μ.

This compound has estrogenic activity and is useful as an intermediate for preparing the hormonal compounds of this invention.

EXAMPLE 319

13β-methyl-3-methoxy-17aα-ethynyl-D-homo-gona-2,5(10)-dien-17aβ-ol

Add a solution of 13β-methyl - 3 - methoxy-D-homo-gona-2,5(10)-diene-17a-one (6.5 g.) in dimethylacetamide (50 cc.) to a stirred suspension of lithium acetylide (4.25 g.) in dioxane (25 cc.), ethylene diamine (1 cc.), and dimethylacetamide (25 cc.) in an atmosphere of acetylene. After stirring for 20 hours pour the mixture onto crushed ice (150 g.) and extract with benzene. Wash, dry and evaporate the extracts and recrystallize the residue from ethanol to give 13β-methyl - 3 - methoxy-17aα-ethynyl-D-homo-gona - 2,5(10) - dien - 17aβ - ol; infrared absorption peaks at 2.88, 3.05, 5.90, 6.01μ.

This compound is useful as an intermediate for preparing the novel compositions of this invention which have hormonal activity.

EXAMPLE 320

13β-ethyl-3-methoxy-17aα-ethynyl-D-homo-gona-2,5(10)-dien-17aβ-ol

Dissolve 13β-ethyl-3-methoxy-D-homo-gona - 2,5(10)-dien-17-one (8.8 g.) in dimethylacetamide (70 cc.) and add a suspension of lithium acetylide (10 g.) in ethylenediamine-dioxan (1:1; 60 cc.). Then pass acetylene over the surface of the stirred mixture for 15 hours. Decompose the reaction mixture by pouring onto ice, collect the product in ether and evaporate the washed, dried ether solution to give 13β-ethyl-3-methoxy-17aα-ethynyl-D-homo-gona-2,5(10)-dien-17aβ-ol; m.p. 118–124° (7 g.), 74%. Infrared absorption peaks at 2.85, 3.06 5.90, 6.0μ.

This compound is useful as an intermediate for preparing the novel compositions of this invention which have hormonal activity.

EXAMPLE 321

13β-ethyl-3-methoxy-17aα-ethyl-D-homo-gona-2,5(10)-dien-17aβ-ol

Add a solution of 13β-ethyl-3-methoxy-17aα-ethyl-D-homo-gona-1,3,5(10)-trien-17aβ-ol (9 g.) in tetrahydrofuran (240 cc.) to a stirred solution of liquid ammonia (500 cc.) and then add lithium (3 g.) in portions. After 30 minutes discharge the blue color by the dropwise addition of ethanol, add water and filter off the precipitated product to give 13β-ethyl-3-methoxy-17aα-ethyl-D-homogona-2,5(10)-dien-17aβ-ol (8.7 g.); m.p. 161–166°. Infrared absorption peaks at 2.90, 5.90, 5.99μ.

This compound is useful as an intermediate for preparing the novel compositions of this invention which have hormonal activity.

EXAMPLE 322

13β-ethyl-3-methoxy-17α-methyl-gona-2,5(10)-dien-17β-ol

Add lithium (1.2 g.) in small pieces during 20 minutes, with stirring to 13β-ethyl-3-methoxy-17α-methyl-gona-1,3,5(10)-trien-17β-ol in a mixture of liquid ammonia (200 cc.), 1-methoxy-propan-2-ol (100 cc.) and tetrahydrofuran (250 cc.). On discharge of the blue color, allow the ammonia to evaporate, add excess ammonium sulphate, followed by water, and extract the mixture with benzene. Wash, dry and evaporate the extracts and crystallize the residue from methanol to yield 13β-ethyl-3-methoxy-17α-methyl-gona-2,5(10)-dien-17β - ol (0.59 g.), m.p. 151–5°; no selective ultraviolet absorption beyond 200 mμ; infrared absorption peaks at 2.99, 5.90, 6.04μ.

This compound is useful as an intermediate for preparing the novel compositions of this invention which have hormonal activity.

EXAMPLE 323

13β-ethyl-3-methoxy-17α-ethynyl-gona-2,5(10)-dien-17β-ol

Add a suspension of lithium aluminium acetylide obtained by passing excess acetylene through a solution of lithium aluminium hydride (2.0 g.) in tetrahydrofuran (25 cc.) with stirring to 13β-ethyl-3-methoxy-gona-2,5(10)-dien-17-one (0.6 g.) in tetrahydrofuran (5 cc.). After standing for 18 hours, add ether (40 cc.), followed by the careful dropwise addition of water until effervescence ceases. Add anhydrous magnesium sulphate (10 g.) and filter the solution and evaporate the filtrate under reduced pressure to give 13β-ethyl-3-methoxy-17α-ethynyl-gona-2,5(10)-dien-17β-ol (90.6 g.). Infrared absorption peaks at 2.80, 3.05, 4.59, 6.00μ.

This compound is useful as an intermediate for preparing the novel compositions of this invention which have hormonal activity.

EXAMPLE 324

13β,17α-diethyl-3-methoxy-gona-2,5(10)-dien-17β-ol

Add a solution of 13β,17α-diethyl-3-methoxy-gona-1,3,5(10)-trien-17β-ol (0.40 g.) in a mixture of ether (10 cc.) and tetrahydrofuran (5 cc.) dropwise during 5 minutes to a stirred solution of lithium (0.40 g.) in liquid ammonia (60 cc.). After a further five minutes, add ethanol (6 cc.) dropwise and when the blue color is discharged add water and extract the mixture with ether. Wash, dry and evaporate the extracts and recrystallize the residue from ethanol to give 13β,17α-diethyl-3-methoxy-gona-2,5(10)-dien-17β-ol (0.29 g.), m.p. 168–71°.

This compound is useful as an intermediate for preparing the novel compositions of this invention which have hormonal activity.

EXAMPLE 325

13β,17α-diethyl-3-methoxy-gona-2,5(10)-dien-17β-ol

Add 13β,17α-diethyl-3 - methoxy - gona - 1,3,5(10),8-tetraen-17β-ol (2.0 g.) in 1-methoxypropan-2-ol (200 cc.) to liquid ammonia (400 cc.), and then add lithium (2.0 g.) in small pieces during 45 minutes with stirring. After discharge of the blue color, allow the ammonia to evaporate, add water (500 cc.) and ether (500 cc.), and separate the organic phase. Combine the organic phase with the ether extracts of the aqueous phase, wash, dry and evaporate and crystallize the residue from methanol to give 13β,17α-diethyl-3-methoxy-gona-2,5(10) - dien-17β-ol (1.0 g.); no selective ultraviolet absorption beyond 220 mμ; infrared absorption peaks at 5.88, 5.99μ.

This compound is useful as an intermediate for preparing the novel compositions of this invention which have hormonal activity.

EXAMPLE 326

13β,17α-diethyl-3-methoxy-gona-2,5(10)-dien-17β-ol

Add lithium (0.5 g.) in small pieces, with stirring, to 13β,17α-diethyl-3-methoxy-gona-1,3,5(10)-trien - 17β - ol (0.5 g.) in a mixture of liquid ammonia (100 cc.) and pyrrole (50 cc.). After discharge of the blue color, add water and extract the mixture with ether. Wash the extracts with water, brine and dry over anhydrous magnesium sulphate. Evaporate the solution under reduced pressure and recrystallize the residue from methanol to give 13β-17α-diethyl-3-methoxy-gona-2,5(10)-dien - 17β-ol (0.35 g.), m.p. 175–7° (samples of this substance appear to melt within the range 165–77°, it being rather unstable). No selective ultraviolet absorption beyond 220 mμ; infrared absorption peaks at 2.90, 5.90, 6.00μ.

This compound is useful as an intermediate for preparing the novel compositions of this invention which have hormonal activity.

EXAMPLE 327

13β-ethyl-3-methoxy-17α-propynyl-gona-2,5(10)-dien-17β-ol

Add 13β-ethyl - 3 - methoxy-gona-2,5(10)-dien-17-one (10 g.) to a solution of propynyl magnesium bromide (prepared from magnesium (6 g.) and ethyl bromide (25 g.) in tetrahydrofuran (500 cc.) and propyne). Stir the mixture for 6 hours under reflux, cool and decompose with water (100 cc.). Add "Celite," filter the resultant sludge and wash the residue thoroughly with ether. Separate the organic phase in the filtrate, wash, dry and evaporate. Reflux the product in methanol for 20 minutes, cool and filter to give 13β-ethyl-3-methoxy-17α-propynyl-gona-2,5(10)-dien-17β-ol (9.5 g.), m.p. 158–61° after softening at 144°; infrared absorption peaks at 2.90, 3.08, 4.50, 5.88, 6.00μ; no selective ultraviolet absorption beyond 220 mμ.

This compound is useful as an intermediate for preparing the novel compositions of this invention which have hormonal activity.

EXAMPLE 328

13β-ethyl-3-methoxy-17α-allyl-gona-2,5(10)-dien-17β-ol

Dissolve 13β - ethyl-3-methoxy-gona-2,5(10)-dien-17-one in tetrahydrofuran (100 cc.) and allyl bromide (11.5 g.), and add the solution dropwise to a refluxing suspension of magnesium (1 g.) in allyl bromide (0.6 g.) and tetrahydrofuran (50 cc.). Allow the mixture to reflux for 6 hours, and then add water (100 cc.) to the cooled solution followed by enough "Celite" to make a thick paste. Filter the mixture, wash the residue thoroughly with ether and separate the organic phase from the filtrate, wash, dry and evaporate the ether solution and crystallize the residue from methanol to give 13β-ethyl-3-methoxy-17α-allyl-gona-2,5(10)-dien-17β-ol (3.8 g.); infrared absorption peaks at 3.03, 5.88, 6.01, 6.10μ; no selective ultraviolet absorption beyond 220 mμ.

This compound is useful as an intermediate for preparing the novel compositions of this invention which have hormonal activity.

EXAMPLE 329

13β-ethyl-3-methoxy-17α-n-propyl-gona-2,5(10)-dien-17β-ol

Add lithium (0.75 g.) in small pieces during 10 minutes, with stirring, to 13β-ethyl-3-methoxy-17α-n-propylgona-1,3,5(10)-trien-17β-ol (0.74 g.) in a mixture of liquid ammonia (100 cc.) and ether (50 cc.). After stirring for 1 hour, add a further quantity of ether (50 cc.), followed by the dropwise addition of a mixture of ether (25 cc.) and ethanol (20 cc.) during 30 minutes. Allow the ammonia to evaporate, add water and extract the mixture with ether. Wash, dry and evaporate the ethereal extracts and crystallize the brown residue from methanol to yield 13β-ethyl-3-methoxy-17α-n-propyl-gona-2,5(10)-dien-17β-ol (0.575 g.), m.p. 127–33°. No selective ultraviolet absorption beyond 220 mμ; infrared absorption peaks at 3.00, 5.89, 6.01μ.

This compound is useful as an intermediate for preparing the novel compositions of this invention which have hormonal activity.

EXAMPLE 330

13β-ethyl-3-methoxy-17α-(2-isobutenyl)-gona-2,5(10)-dien-17β-ol

Add a suspension of 13β-ethyl-3-methoxy-gona-2,5(10)-trien-17-one (4 g.) in ether (500 cc.) and methallyl chloride (8 g.) to a Grignard solution, prepared from methallyl chloride (8 g.) and magnesium (20 g.) in ether (100 cc.), at such a rate that gentle reflux is maintained. Reflux the mixture for 4 hours and then decompose the cooled solution with water (ca. 100 cc.). Add "Celite," filter the resultant pasty mass and wash the residue thoroughly with ether. Separate the organic phase from the filtrate, wash, dry and evaporate, and recrystallize the residue from methanol to give 13β-ethyl-3-methoxy-17α-(2-isobutenyl)-gona-2,5(10)-dien-17β-ol (4 g.). Infrared absorption peaks at 2.86, 5.88, 6.01, 6.10μ; no selective ultraviolet absorption beyond 220 mμ.

This compound is useful as an intermediate for preparing the novel compositions of this invention which have hormonal activity.

EXAMPLE 331

13β-n-propyl-3-methoxy-17α-methyl-gona-2,5(10)-dien-17-β-ol

Add lithium (1.5 g.) in small pieces, with stirring, to 13β-n-propyl - 3 - methoxy-17α-methyl-gona-1,3,5(10)-trien-17β-ol (1.76 g.) in a mixture of liquid ammonia (170 cc.) and pyrrole (85 cc.). After 1 hour add an excess of ammonium chloride, followed by water, work up the mixture with ether, and recrystallize the product from methanol to give 13β-n-propyl-3-methoxy-17α-methyl-gona-2,5(10)-dien-17β-ol (1.36 g.), m.p. 157–60°. No aromatic ultraviolet absorption.

This compound is useful as an intermediate for preparing the novel compositions of this invention which have hormonal activity.

EXAMPLE 332

13β-n-propyl-3-methoxy-17α-ethynyl-gona-2,5(10)-dien-17β-ol

Add a solution of 13β-n-propyl-3-methoxy-gona-2,5(10)-dien-17-one (1.74 g.) in dry tetrahydrofuran (25 cc.) slowly to a stirred suspension of acetylene dimagnesium bromide (from magnesium, 0.36 g.) in tetrahydrofuran. After completion of the reaction decompose the Grignard complex with saturated ammonium chloride solution (100 cc.), and work up the product by means of ethyl acetate, purify by chromatography on neutral alumina, and recrystallize from methanol to give 13β-n-propyl-3-methoxy-17α - ethynyl-gona-2,5(10)-dien-17β-ol (0.33 g.), m.p. 91–6° (decomp.); infrared absorption peaks at 3.77, 3.03, 5.88, 5.99μ (a hydroxyl, a methine group and a dihydro-anisole system).

This compound is useful as an intermediate for preparing the novel compositions of this invention which have hormonal activity.

EXAMPLE 333

13β-n-propyl-3-methoxy-17α-ethyl-gona-2,5(10)-dien-17β-ol

Add lithium (1.0 g.) in small pieces, with stirring to 13β-n-propyl-3-methoxy-17α-ethyl-gona-1,3,5(10) - trien-17β-ol (0.90 g.) in a mixture of liquid ammonia (100 cc.) and pyrrole (60 cc.). After 30 minutes, add an excess of ammonium chloride, followed by water (100 cc.), and extract the mixture with ether. Wash the ether extracts with water, then with brine to dry the solution and evaporate under reduced pressure to give a crystalline residue; infrared absorption peaks at 3.06–3.10, 5.91, 6.02μ. Boil this residue with methanol (50 cc.) to leach out impurities and keep at −10° overnight, filter off the product and dry in vacuo over phosphorus pentoxide, as 13β-n-propyl-3-methoxy-17α-ethyl-gona - 2,5(10) - dien - 17β-ol (0.875 g.), m.p. 114–25°; no selective ultraviolet absorption beyond 220 mμ.

This compound is useful as an intermediate for preparing the novel compositions of this invention which have hormonal activity.

EXAMPLE 334

13β-n-propyl-3-methoxy-17α-allyl-gona-2,5(10)-dien-17β-ol

Warm allyl bromide (4.5 cc.) with magnesium turnings (107 g.) in ether (40 cc.) and then add 13β-n-propyl-3-methoxy-gona-2,5(10)-dien-17-one (2 g.) in ether (70 cc.) containing allyl bromide (2.5 cc.) slowly with stirring. Reflux the mixture with stirring for 3 hours, and to the cooled mixture add aqueous sodium potassium tartrate and extract the product with ether. Wash, dry and evaporate the extracts to give a residue which is mainly 13β-n-propyl-3-methoxy-17α-allyl-gona - 2,5(10)-dien-17β-ol.

This compound is useful as an intermediate for preparing the novel compositions of this invention which have hormonal activity.

EXAMPLE 335

13β-n-propyl-3-methoxy-17α-propynyl-gona-2,5(10-dien-17β-ol

Add a solution of 13β-n-propyl - 3 - methoxy - gona-2,5(10)-dien-17-one (7.5 g.) in tetrahydrofuran (250 cc.) with stirring under nitrogen to propynyl magnesium bromide from ethyl magnesium bromide 39 g., and propyne in tetrahydrofuran (500 cc.). Reflux the mixture with stirring for 3 hours, and on cooling add saturated aqueous ammonium chloride (120 cc.) and extract the product obtained from the washed, dry extracts with ether. Dissolve the residue in boiling methanol and store for 18 hours at −10°. Fliter off the crystalline deposit to yield 13β-n-propyl-3-methoxy - 17α - propynyl - gona-2,5(10)-dien-17-β-ol (6.9 g.), m.p. 104–111°.

To prepare 13β-n-propyl-3-methoxy-17α-methyl-gona-2,5(10)-dien-17β-ol treat 13β-n-propyl-3-methoxy-gona-2,5(10)-dien-17-one with methyl magnesium bromide according to the manipulative procedure described above.

To prepare 13β-isobutyl-3-methoxy-17α-ethyl-gona-2,5(10)-dien-17β-ol treat 13β - isobutyl-3-methoxy-gona-2,5(10)-dien-17-one with ethyl magnesium bromide according to the manipulative procedure described above.

To prepare 13β-isobutyl-3-methoxy-17α-methyl-gona-2,5(10)-dien-17β-ol treat 13β-isobutyl-3-methoxy-gona-2,5(10)-dien-17-one with methyl magnesium bromide according to the manipulative procedure described above.

To prepare 13β,17α-di-ethyl-3-ethoxy-gona-2,5(10)-dien-17β-ol treat 13β-ethyl-3-ethoxy-gona-2,5(10)-dien-17-one with ethyl magnesium bromide according to the manipulative procedure described above.

To prepare 13β-ethyl-3-n-propoxy-17α-methyl-gona-2, 5(10)-dien-17β-ol treat 13β-ethyl-3 - n - propoxy-gona-2, 5(10)-dien-17-one with methyl magnesium bromide according to the manipulative procedure described above.

To prepare 13β,17α - diethyl-2,3-dimethoxy - gona - 2,5(10)-dien-17β-ol treat 13β-ethyl-2,3-dimethoxy-gona-2,5(10)-dien-17-one with ethyl magnesium bromide according to the manipulative procedure described above.

To prepare 13β-ethyl-1,3-dimethoxy-17α-methyl-gona-1(10),3-dien-17β-ol treat 13β-ethyl-1,3-dimethoxy-gona-1(10),3-dien-17-one with methyl magnesium bromide according to the manipulative procedure described above.

To prepare 13β-phenethyl-3-n-propoxy-17α-ethyl-gona-2,5(10)-dien-17β-ol treat 13β-phenethyl - 3 - n - propoxy-gona-2,5(10)-dien-17-one with ethyl magnesium bromide according to the manipulative procedure described above.

To prepare 13β-isobutyl-3-n-pentoxy-17α-methyl-gona-2,5(10)-dien-17β-ol treat 13β-isobutyl-3-n-pentoxy-gona-2,5(10)-dien-17-one with methyl magnesium bromide according to the manipulative procedure described above.

To prepare 13β-(3-hydroxypropyl) - 3 - cyclopentoxy-17α-ethyl-gona-2,5(10)-dien-17β-ol treat 13β-(3-hydroxypropyl)-3-cyclopentoxy - gona - 2,5(10)-dien-17-one with ethyl magnesium bromide according to the manipulative procedure described above.

To prepare 13β - (3 - dimethylaminopropyl)-1,3-dimethoxy-17α-methyl-gona-1(10),3-dien-17β-ol treat 13β-(3-dimethylaminopropyl) - 1,3 - dimethoxy - gona - 1(10),3-dien-17-one with methyl magnesium bromide according to the manipulative procedure described above.

These compounds are useful as intermediates for preparing the novel compositions of this invention which have hormonal activity.

EXAMPLE 336

13β,17α-di-n-propyl-3-methoxy-gona-2,5(10)-dien-17β-ol

Add a solution of 13β,17α-di-n-propyl-3-methoxygona-1,3,5(10)-rien-17β-ol in ether (100 cc.) to liquid ammonia (200 cc.) followed, portionwise, by lithium (1.5 g.). Stir the mixture for 1.5 hours and then add ethanol (35 cc.)-ether (35 cc.) dropwise to discharge the blue color. Allow the ammonia to evaporate under nitrogen and then add water and extract the product with ether. Evaporate the washed, dried extracts and recrystallize the residue from ethanol to give 13β,17α - di - n - propyl-3-methoxy-gona-2,5(10)-dien-17β-ol (1.09 g.), m.p. 150–157°; infrared absorption peaks at 2.85, 5.90, 6.00μ.

This compound is useful as an intermediate for preparing the novel compositions of this invention which have hormonal activity.

EXAMPLE 337

13β-n-propyl-3-methoxy-17α-(1-methallyl)-gona-2,5(10)-dien-17β-ol

Add a solution of 13β-n - propyl - 3 - methoxy-gona-2,5(10)-dien-17-one (3.1 g.) in ether (130 cc.) with stirring under nitrogen to crotyl magnesium bromide (from crotyl bromide, 13.5 g., and magnesium, 9.7 g.) in ether. Reflux the mixture for 4 hours, and leave at room temperature overnight. Add saturated aqueous —amonium chloride (70 cc.) and extract the product with ether. Wash, dry and evaporate the extracts to yield 13β-n-propyl-3-methoxy-17α-(1-methallyl) - gona - 2,5(10) - dien-17β-ol; infrared absorption peak at 11.0μ.

This compound is useful as an intermediate for preparing the novel compositions of this invention which have hormonal activity.

EXAMPLE 338

13β-n-propyl-3-methoxy-17α-(2-methallyl)-gona-2,5(10)-dien-17β-ol

Employ the method of the previous example but react 13β-n-propyl-3-methoxy - gona-2,5(10)-dien-17-one (3.06 g.) with 2-methallyl magnesium chloride (from the metal, 8.76 g. and 2-methallyl chloride, 10.9 g.). Puritfy the crude product by extraction with boiling methanol to afford a residue of 13β-n-propyl-3-methoxy-17α-(2-methallyl)-gona-2,5(10)-dien-17β-ol (3.87 g.), m.p. 135–140°; infrared absorption peaks at 2.87, 5.90, 6.00, 6.09μ.

This compound is useful as an intermediate for preparing the novel compositions of this invention which have hormonal activity.

EXAMPLE 339

13β-n-butyl-3-methoxy-17α-ethynyl-gona-2,5(10)-dien 17β-ol

Add a solution of 13β-n-butyl-3-methoxy-gona-2,5(10)-dien-17-one (2 g.) in dimethylacetamide (200 cc.) slowly to a suspension of lithium carbide (2.5 g.) in dimethylacetamide (50 cc.) at 0° in an atmosphere of nitrogen. Stir the mixture at room temperature for 48 hours, cool to 0° and decomposes by the dropwise addition of water (100 cc.). Add water and extract with ether to give after removal of the solvent, 13β-n-butyl-3-methoxy-17α-ethynyl-gona-2,5(10)-dien-17β-ol (1.8 g.) as a gum; infrared absorption peaks at 2.95, 3.05, 5.90, 5.99μ.

This compound is useful as an intermediate for preparing the novel compositions of this invention which have hormonal activity.

EXAMPLE 340

13β-n-butyl-3-methoxy-17α-ethyl-gona-2,5(10)-dien-17β-ol

Add lithium (1.5 g.) in small pieces, with stirring to 13β-n-butyl-3-methoxy-17α-ethyl-gona - 1,3,5(10) - trien-17β-ol (1.57 g.) in a mixture of liquid ammonia (250 cc.) and pyrrole (100 cc.). After 2 hours add an excess of ammonium chloride, followed by water, and work up the product by means of ether. Dissolve the crystalline residue so obtained in a boiling mixture of ethanol and ether, charcoal, concentrate the filtrate and cool to give 13β-n-butyl-3-methoxy-17α-ethyl-gona-2,5(10)-dien - 17β-ol (1.05 g.), m.p. 121–4° C.; no selective ultraviolet absorption beyond 220 mμ; infrared absorption peaks at 3.08, 5.88, 5.99μ.

This compound is useful as an intermediate for preparing the novel compositions of this invention which have hormonal activity.

EXAMPLE 341

13β-methyl-17aβ-hydroxy-D-homo-gon-5(10)-en-3-one

Add 13β-methyl-3-methoxy-D-homo - gona - 2,5(10)-dien-17aβ-ol (4 g.) to a solution of oxalic acid dihydrate (5 g.) in water (70 cc.) and methanol (200 cc.) in an atmosphere of nitrogen. Add isopropanol (40 cc.) and stir the mixture of 1½ hours. Filter the reaction mixture, pour the filtrate into brine and extract with ether. Wash, dry and evaporate the ethereal solution and recrystallize the residue from ethyl acetate to give 13β-methyl-17aβ-hydroxy-D-homo-gon-5(10)-en-3-one (1.85 g.), m.p. 105–110°. Infrared absorption peaks at 2.98, 5.85μ.

This compound has estrogenic activity and is useful as an intermediate for preparing the hormonal compounds of this invention.

To prepare 13β-ethyl-2-methoxy-17β-hydroxy-gon - 5 (10)-en-3-one treat 13β-ethyl-2,3-dimethoxy-gona - 2,5 (10)-dien-17β-ol with oxalic acid dihydrate according to the manipulative procedure described above.

To prepare 13β-ethyl-1-oxo-17β-hydroxy-gonan-3 - one treat 13β-ethyl-1,3 - dimethoxy - gona - 1(10),3 - dien-17β-ol with oxalic acid dihydrate according to the manipulative procedure described above.

To prepare 13β-phenethyl-17β-hydroxy-gona-5(10)-en-3-one treat 13β-phenethyl-3-methoxy-gona-2,5(10)-dien-17β-ol with oxalic acid dihydrate according to the manipulative procedure described above.

To prepare 13β-(3-hydroxypropyl)-17β-hydroxy-gon-5 (10)-en-3-one treat 13β-(3-hydroxypropyl)-3-methoxy-gona-2,5(10)-dien-17β-ol with oxalic acid dihydrate according to the manipulative procedure described above.

To prepare 13β-(3-dimethylaminopropyl)-1-oxo-17β-hydroxy-gonan-3-one treat 13β-(3-dimethylaminopropyl)-1,3-dimethoxy-gona-1(10),3-dien-17β-ol with oxalic acid dihydrate according to the manipulative procedure described above.

These compounds have estrogenic activity and are useful as intermediates in the preparation of the hormonal compounds of the invention.

EXAMPLE 342

13β-ethyl-17aβ-hydroxy-D-homo-gon-5(10)-en-3-one

Hydrolyse 13β-ethyl-3-methoxy-D-homo-gona-2,5(10)-dien-17aβ-ol (5 g.) by the method of the preceding example to 13β-ethyl-17aβ-hydroxy-D-homo-gon-5(10)-en-3-one (3.3 g.), m.p. 110–115° C.; infrared absorption peaks at 2.85, 5.82μ.

This compound has estrogenic activity and is useful as an intermediate for preparing the hormonal compounds of this invention.

EXAMPLE 343

13β-methyl-17β-hydroxy-gon-5(10)-en-3-one

Add a slurry of 13β-methyl-3-methoxy-gona-2,5(10)-dien-17β-ol (27.9 g.) in dioxane (50 cc.) with stirring to a mixture of methanol (2000 cc.) and water (390 cc.) containing oxalic acid dihydrate (37 g.) at room temperature and continue stirring until 10 minutes after a clear solution had been obtained. Add water (5000 cc.) and extract the product with benzene (1 vol.)-ether (1 vol.). Work up in the usual manner and recrystallize the residue from ethyl acetate to give 13β-methyl-17β-hydroxy-gon-5(10)-en-3-one (18.8 g.), m.p. 144–148° C.

$C_{19}H_{28}O_2$ calculated: C, 79.1%; H, 9.8%. Found: C, 79.6%; H, 9.6%.

Infrared absorption peaks at 2.93, 5.86μ; no ultraviolet absorption in the 200–300 mμ region.

This compound has estrogenic activity and is useful as an intermediate for preparing the hormonal compounds of this invention.

EXAMPLE 344

13β-ethyl-17β-hydroxy-gon-5(10)-en-3-one

Stir 13β-ethyl - 3 - methoxy-gona-2,5(10)-dien-17β-ol (0.35 g.) with a mixture of methanol (30 cc.), water (6 cc.) and oxalic acid dihydrate (0.46 g.) at room temperature for 45 minutes. Add water and extract the solution with ether. Wash the ethereal solution with water, saturated aqueous sodium bicarbonate and brine, dry and evaporate. Recrystallize the residue from ethyl acetate to give 13β-ethyl-17β-hydroxy-gon-5(10)-en - 3 - one, m.p. 147–9°; infrared absorption peaks at 2.93, 5.86μ.

This compound has estrogenic activity and is useful as an intermediate for preparing the hormonal compounds of this invention.

EXAMPLE 345

13β-ethyl-17β-hydroxy-gon-5(10)-en-3-one

Hydrolyse 13β-ethyl - 3 - n-propoxy-gona-2,5(10)-dien-17β-ol (0.35 g.) exactly as described in the previous example to give 13β-ethyl-17β-hydroxy-gon-5(10)-en-3-one, m.p. 147–9°.

This compound has estrogenic activity and is useful as an intermediate for preparing the hormonal compounds of this invention.

EXAMPLE 346

13β-n-propyl-17β-hydroxy-gon-5(10)-en-3-one

Stir 13β-n-propyl - 3 - methoxy-gona-2,5(10)-dien-17β-ol (0.350 g.) with a mixture of methanol (30 cc.), water (6 cc.) and oxalic acid dihydrate (0.46 g.) at room temperature and under nitrogen for 50 minutes. A clear solution forms after 30 minutes stirring. Work up the product by means of ether and repeatedly crystallize from ethyl acetate to yield 13β-n-propyl-17β-hydroxy-gon-5(10)-en-3-one; m.p. 127–30°; infrared absorption peaks at 2.89, 5.85μ.

$C_{20}H_{30}O_2$ calculated: C, 79.4%; H, 10.0%. Found: C, 79.3%; H, 10.0%.

This compound has estrogenic activity and is useful as an intermediate for preparing the hormonal compounds of this invention.

EXAMPLE 347

13β-n-butyl-17β-hydroxy-gon-5(10)-en-3-one

Stir 13β-n-butyl - 3 - methoxy-gona-2,5(10)-dien-17β-ol (4.6 g.) under nitrogen in methanol (354 cc.) containing water (59 cc.) and oxalic acid dihydrate (5.85 g.) for 45 minutes at room temperature. Filter, add water (885 cc.) and extract the mixture with ether-benzene. Evaporate the washed and dried extracts and recrystallize the residue from ether to give 13β-n-butyl-17β-hydroxy-gon-5(10)-en-3-one, m.p. 104–107°; infrared absorption peak at 5.86μ.

This compound has estrogenic activity and is useful as an intermediate for preparing the hormonal compounds of this invention.

EXAMPLE 348

13β-isopropyl-17β-hydroxy-gon-5(10)-en-3-one

Add 13β-isopropyl - 3 - methoxy-gona-2,5(10)-dien-17β-ol (0.09 g.) in ethanol (10 cc.) to a solution of oxalic acid dihydrate (0.2 g.) in water (3 cc.). Keep the mixture at 25° for 40 minutes and then add an excess of saturated aqueous sodium bicarbonate solution. Isolate the product with ether and crystallize by cooling and rubbing with ether to give 13β-isopropyl-17β-hydroxy-gon-5(10)-en-3-one (0.064 g.), m.p. 60–5°; infrared absorption peak at 5.85μ.

This compound has estrogenic activity and is useful as an intermediate for preparing the hormonal compounds of this invention.

EXAMPLE 349

13β-isobutyl-17β-hydroxy-gon-5(10)-en-3-one

To a solution of 13β-isobutyl - 3 - methoxy-gona-2,5(10)-dien-17β-ol (1.0 g.) in methanol (91 cc.) add oxalic acid dihydrate (1.39 g.) in water (18.1 cc.). Stir the mixture for 2 hours at room temperature, add water and extract with ether. Wash the ethereal extracts with sodium bicarbonate solution and water, dry and evaporate to dryness under reduced pressure to give a gum (0.6 g.). Crystallize the gum from ethyl acetate and thereafter from cyclohexane to furnish analytically pure 13β-isobutyl-17β-hydroxy-gon-5(10)-en-3-one, m.p. 133–135°; infrared absorption peaks at 2.92, 5.85μ.

$C_{21}H_{32}O_2$ calculated: C, 79.7%; H, 10.1%. Found: C, 80.0%; H, 10.2%.

This compound has estrogenic activity and is useful as an intermediate for preparing the hormonal compounds of this invention.

EXAMPLE 350

13β-ethyl-gon-5(10)-en-3,17-dione

Add 13β-ethyl-3-methoxy-gona-2,5(10)-dien - 17-one (1.3 g.) with stirring in a slurry in dioxane (6 cc.) to methanol (100 cc.) containing oxalic acid dihydrate (1.9 g.) and water (20 cc.). Continue for 10 minutes after a clear solution is obtained. Add water (500 cc.) and collect the product with ether.

Recrystallize the product from ethyl acetate-ether to obtain 13β-ethyl - gon - 5(10)-en-3,17-dione (.9 g.), m.p. 120–126° C. To obtain an analytical specimen recrystallize from the same solvent mixture to m.p. 127–128° C.; infrared absorption peaks at 5.76, 5.85μ; no selective ultraviolet absorption in the 200–300μ region.

$C_{19}H_{26}O_2$ calculated: C, 79.7%; H, 9.15%. Found: C, 79.9%; H, 9.15%.

This compound has estrogenic activity and is useful as an intermediate for preparing the hormonal compounds of this invention.

EXAMPLE 351

13β-methyl-17aα-ethynyl-17aβ-hydroxy-D-homo-gon-5(10)-en-3-one

Add 13β-methyl-17aα - ethynyl-17aβ-hydroxy-D-homo-gona-2,5(10)-dien-17aβ-ol (0.3 g.) in dioxane (10 cc.) with stirring in methanol (20 cc.) containing oxalic acid dihydrate (0.46 g.) and water (6 cc.). Continue stirring for 2 hours, add water and extract the mixture with ether. Dissolve the product in benzene and chromatograph on Florex to give the title compound; infrared absorption peaks at 2.99, 3.09, 5.86μ.

This compound has estrogenic activity and is useful as an intermediate for preparing the hormonal compounds of this invention.

To prepare 13β-isopropyl-17α - ethyl-17β-hydroxy-gon-5(10)-en-3-one treat 13β - isopropyl -17α-ethyl-3-methoxy-gona-2,5(10)-dien-17β-ol with oxalic acid dihydrate according to the manipulative procedure described above To prepare 13β-isobutyl - 17α - methyl-17β-hydroxy-gon-5(10)-en-3-one treat 13β-isobutyl - 13α - methyl-3-methoxy-gona-2,5(10)-dien-17β-ol with oxalic acid dihydrate according to the manipulative procedure described above.

To prepare 13β,17α - dimethyl-17β-hydroxy-gon-5(10)-en-3-one treat 13β,17α - dimethyl - 3 - methoxy-gona-2,5(10)-dien-17β-ol with oxalic acid dihydrate according to the manipulative procedure described above.

To prepare 13β,17α - diethyl-2-methoxy-17β-hydroxy-gon-5(10)-en-3-one treat 13β,17α - diethyl-2,3-dimethoxy-gona-2,5(10)-dien-17β-ol with oxalic acid dihydrate according to the manipulative procedure described above.

To prepare 13β,17α-diethyl - 1 - oxo-17β-hydroxy-gon-3-one treat 13β,17α-diethyl - 1,3 - dimethoxy-gona-1(10),3-dien-17β-ol with oxalic acid dihydrate according to the manipulative procedure described above.

To prepare 13β-phenethyl-17α - ethyl - 17β-hydroxy-gon-5(10)-en-3-one treat 13β - phenethyl - 17α-ethyl-3-methoxy-gona-2,5(10)-dien-17β-ol with oxalic acid dihydrate according to the manipulative procedure described above.

To prepare 13β - (3-hydroxypropyl) - 17α-methyl-17β-hydroxy-gon-5(10)-en-3-one treat 13β-(3 - hydroxypropyl)-17α - methyl - 3 - methoxy-gona-2,5(10)-dien-17β-ol with oxalic acid dihydrate according to the manipulative procedure described above.

To prepare 13β-(3-dimethylaminopropyl) - 17α - ethyl-17β-hydroxy-1-methoxy-gon-5(10) - en - 3 - one treat 13β-(3-dimethylaminopropyl) - 17α - ethyl-3-methoxy-gona-2,5(10) - dien - 17β-ol with oxalic acid dihydrate according to the manipulative procedure described above.

These compounds have estrogenic activity and are useful as intermediates for preparing the hormonal compounds of this invention.

EXAMPLE 352

13β-methyl-17aα-ethynyl-17aβ-hydroxy-D-homo-gon-5(10)-en-3-one

Add 13β-methyl-3-methoxy-17aα-ethynyl - D - homo-gona-2,5(10)-dien-17aβ-ol (.3 g.) in dioxane (10 cc.) with stirring to methanol (20 cc.) containing oxalic acid dihydrate (0.45 g.) and water (6 cc.). After stirring for 2 hours, add water and extract the mixture with ether. Evaporate the washed and dried extracts to obtain the title compound; infrared absorption peaks at 2.93, 5.90μ.

This compound has estrogenic and progestational activity and is useful as an intermediate for preparing the hormonal compounds of this invention.

EXAMPLE 353

13β-ethyl-17aα-ethynyl-17aβ-hydroxy-D-homo-gon-5(10)-en-3-one

Stir 13β-ethyl-3-methoxy - 17aα-ethynyl-D-homo-gona-2,5(10)-dien-17aβ-ol (4 g.) with oxalic acid dihydrate (4.5 g.) in water (35 cc.) and methanol (250 cc.) for 30 minutes. Pour the mixture into brine and extract with ether. Evaporate the washed and dried ether extract to dryness and recrystallize the residue from ethyl acetate to obtain the title compound (1.75 g.), m.p. 164–168° C.; infrared absorption peaks at 2.92, 3.06, 5.84μ.

This compound has estrogenic activity and is useful as an intermediate for preparing the hormonal compounds of this invention.

EXAMPLE 354

13β,17aα-diethyl-17aβ-hydroxy-D-homo-gon-5(10)-3-one

Stir 13β,17aα - diethyl-3-methoxy - D - homo-gona-2,5(10)-dien-17aβ-ol (4 g.) with oxalic acid dihydrate (4.5 g.) in water (35 cc.) and methanol (250 cc.) for 2 hours. Pour the filtered solution into brine and extract with ether. Evaporate the washed and dried extracts and recrystallize the residue from ether to obtain the title compound (2.5 g.), m.p. 116–123° C.

This compound has estrogenic activity and is useful as an intermediate for preparing the hormonal compounds of this invention.

EXAMPLE 355

13β-ethyl-17α-ethynyl-17β-hydroxy-gon-5(10)-en-3-one

Add 13β-ethyl-3-methoxy-17α - ethynyl - gona-2,5(10)-dien-17β-ol (9.6 g.) in methanol (30 cc.) to a solution of oxalic acid dihydrate (0.46 g.) in water (6 cc.). After standing at room temperature for 45 minutes, add ether (60 cc.) and wash, dry, and evaporate the ether solution. Dissolve the residual gum in benzene (5 cc.) and chromatograph on an activated fuller's earth (50 g.); elute with light petroleum containing first a small and then a gradually increasing proportion of benzene to obtain first a crystalline byproduct, followed by the desired title compound. Recrystallize from a mixture of light petroleum and ethyl acetate, to yield the pure compound (0.15 g.), m.p. 169–173° C.; infrared absorption peaks at 2.99, 5.86μ.

This compound is useful as an intermediate for preparing the hormonal compounds of this invention.

EXAMPLE 356

13β-17α-diethyl-17β-hydroxy-gon-5(10)-en-3-one

Stir 13β,17α-diethyl-3-methoxy-gona - 2,5(10) - dien-17β-ol (5 g.) in methanol (430 cc.) containing water (87 cc.) and oxalic acid dihydrate (6.6 g.) until the solid has completely dissolved. Isolate the product (4.55 g.), m.p. 126–134° C. by means of ether and recrystallize repeatedly from ethyl acetate to obtain the title compound; m.p. 142–143° C.; infrared absorption peaks at 2.90, 5.85μ.

$C_{21}H_{32}O_2$ calculated: C, 79.9%; H, 10.2%. Found: C, 79.6%; H, 10.1%.

This compound has progestational activity and is useful as an intermediate for preparing the hormonal compounds of this invention.

EXAMPLE 357

13β-ethyl-17α-propynyl-17β-hydroxy-gon-5(10)-en-3-one

Suspend 13β-ethyl-3-methoxy - 17α - propynyl-gona-2,5(10)-dien-17β-ol (4 g.) in methanol (200 cc.) and water (20 cc.). Add oxalic acid (4 g.) followed by dioxane (100 cc.) and stir the mixture until dissolution is complete and then for a further 20 minutes. Add water and filter the precipitated product, wash with water and dry. Crystallize from an ethyl acetate-hexane mixture to obtain the title compound, m.p 156–159° C.; infrared absorption peaks at 4.55, 5.83μ; no selective ultraviolet absorption beyond 220 mμ.

This compound has estrogenic activity and is useful as an intermediate for preparing the hormonal compounds of this invention.

EXAMPLE 358

13β-ethyl-17α-(2-propenyl)-17β-hydroxy-gon-5(10)-en-3-one

Suspend 13β - ethyl - 3 - methoxy-17α-(2-propenyl)-gona-2,5(10)-dien-17β-ol (1.5 g.) in methanol (50 cc.) and water (5 cc.). Add oxalic acid (1 g.) followed by dioxane (20 cc.), and stir the mixture until dissolution is complete and then for a further 20 minutes. Add water gradually and filter the precipitated material, wash with water and dry. Recrystallize from an ethyl acetate-hexane mixture to obtain the title compound (1 g.); infrared absorption peaks at 2.94, 6.21, 6.10μ; no selective ultraviolet absorption beyond 220 mμ.

This compound has estrogenic activity and is useful as an intermediate for preparing the hormonal compounds of this invention.

EXAMPLE 359

13β-ethyl-17α-(2-isobutenyl)-17β-hydroxy-gon-5(10)-en-3-one

Suspend 13β-ethyl-3-methoxy-17α - (2 - isobutenyl)-gona-2,5(10)-dien-17β-ol in methanol (50 cc.) and water (5 cc.). Add oxalic acid (1 g.) followed by dioxane (20 cc.), and stir the mixture until dissolution is complete and then for a further 30 minutes. Add water and extract the product with ether. Wash, dry, and evaporate the ethereal solution and recrystallize the residue from ethyl acetate-hexane to obtain the title compound; infrared absorption peaks at 2.90, 5.85, 6.10, 11.5μ; no selective ultraviolet absorption beyond 220 mμ.

This compound has estrogenic activity and is useful as an intermediate for preparing the hormonal compounds of this invention.

EXAMPLE 360

13β-n-propyl-17α-methyl-17β-hydroxy-gon-5(10)-en-3-one

To 13β-n-propyl - 3 - methoxy-17α-methyl-gona-2,5-(10)-dien-17β-ol (0.3 g.) in methanol (30 cc.) add a solution of oxalic acid dihydrate (0.46 g.) in water (6 cc.). After stirring at room temperature for 20 minutes, add isopropanol (30 cc.) and continue stirring for 80 minutes; work up the product with ether and recrystallize from a mixture of ether and hexane to obtain the title compound (0.2 g.), m.p. 158–163° C.; infrared absorption peak at 5.90μ; no selective ultraviolet absorption beyond 220 mμ.

This compound has estrogenic activity and is useful as an intermediate for preparing the hormonal compounds of this invention.

EXAMPLE 361

13β-n-propyl-17α-ethynyl-17β-hydroxy-gon-5(10)-en-3-one

To 13β-n-propyl-3-methoxy - 17α - ethynyl-gona-2,5-(10)-dien-17β-ol (0.24 g.) in methanol (40 cc.) add a solution of oxalic acid dihydrate (0.58 g.) in water (7.6 cc.) and stir the mixture for 90 minutes at room temperature under nitrogen. Add water, work up the product with ether and purify the residue obtained by chromatography on fuller's earth. Crystallize from cyclohexane and then from ethyl acetate to obtain the title compound (0.037), m.p. 182–190° C.; infrared absorption peaks at 2.90, 3.08, 5.84μ.

$C_{22}H_{30}O_2$ calculated: C, 80.9%; H, 9.3%. Found: C, 80.5%; H, 8.6%.

This compound has estrogenic activity and is useful as an intermediate for preparing the hormonal compounds of this invention.

EXAMPLE 362

13β-n-propyl-17β-hydroxy-17α-propynyl-gon-5(10)-en-3-one

Stir 13β-n-propyl-3 - methoxy - 17α - propynyl-gona-2,5 (10)-diene-17β-ol (2.5 g.) for 2 hours in methanol (80 cc.) containing water (10 cc.) oxalic acid dihydrate (1.75 g.) and tetrahydrofuran (60 cc.). Add the mixture to brine and extract the product with ether. Evaporate the washed and dried extracts and recrystallize the residue from ethyl acetatehexane to afford the title compound, m.p. 147–150° C.

$C_{23}H_{32}O_2$ calculated: C, 81.1%; H, 9.5%. Found: C, 80.8%; H, 9.4%.

This compound has estrogenic activity and is useful as an intermediate for preparing the hormonal compounds of this invention.

EXAMPLE 363

13β-n-butyl-17α-ethynyl-17β-hydroxy-gon-5(10)-en-3-one

Stir 13β-n-butyl-17α-ethynyl-3-methoxy-gona-2,5(10)-diene-17β-ol (2 g.) in methanol (50 cc.) containing oxalic acid dihydrate (0.9 g.) and water (12 cc.) under nitrogen for 2 hours. Pour the mixture into water and extract with ether. Evaporate the washed and dried extracts to a residue, purify by chromatography on Florex and recrystallize from ethyl acetate-hexane to give 13β-n-butyl-17α-ethynyl-17β-hydroxy-gon-5(10)-en-3-one (750 mg.), m.p. 160–164° C.; infrared absorption peaks at 2.87, 3.08, 5.82μ.

This compound has estrogenic activity and is useful as an intermediate for preparing the hormonal compounds of this invention.

EXAMPLE 364

13β-ethyl-3,3-ethylenedioxy-gon-5-en-17β-ol and 13β-ethyl-3,3-ethylenedioxy-gon-5(10)-en-17β-ol Reflux 13β-ethyl-5-methoxy-gona-2,5(10)-diene-17β-ol (13 g.) in benzene (220 cc.) with ethylene glycol (50 cc.) and toluene-p-sulphonic acid (0.4 g.) for 36 hours, and then add 5% aqueous sodium bicarbonate (100 cc.) to the cooled solution. Separate, wash, and dry the organic layer and evaporate to give a gum which crystallizes on standing. Crystallize the product from ether-hexane to give an equilibrium mixture of the title products, m.p. 130–139° C.

$C_{21}H_{32}O_3$ calculated: C, 75.86%; H, 9.7%. Found: C, 75.95%; H, 9.48%.

The mixture possesses androgenic activity and is useful as an intermediate for preparing the hormonal compounds of this invention.

EXAMPLE 365

13β-ethyl-17,17-ethylenedioxy-gon-5(10)-en-3-one

Add 13β-ethyl-3-methoxy-17,17-ethylenedioxy-gona-2,5 (10)-diene (11 g.) in dioxane (45 cc.) with stirring to oxalic acid dihydrate (12 g.) in methanol (800 cc.) containing water (150 cc.). Stir the mixture for 1 hour and work up. Purify the resulting gum by chromatography on Florex and recrystallize from ethyl acetate-hexane to yield 13β-ethyl-17,17-ethylenedioxy-gon-5(10)-en-3-one (2 g.), m.p. 117–123° C.; infrared absorption peaks at 5.80, 9.22, 9.57, 10.8μ.

This compound is useful as an intermediate for preparing the hormonal compounds of this invention.

EXAMPLE 366

13β-ethyl-3,3-ethylenedioxy-gon-5-en-17-one and 13β-ethyl-3,3-ethylenedioxy-gon-5(10)-en-17one Add chromium trioxide (4.9 g.) portionwise with stirring over 20 minutes to a mixture (4.9 g.) of 13β-ethyl-3,3-ethylenedioxy-gon-5-ene-17β-ol and 13β-ethyl-3,3-ethylenedioxy-gon-5(10)-en-17β-ol in pyridine (70 cc.) at 0° C. under nitrogen. Keep the mixture at room temperature for 17 hours, then dilute with ethyl acetate (300 cc.) and filter through a column of neutral alumina. Dissolve the gum eluted by ethyl acetate in ether and filter. Add hexane to the filtrate and concentrate the solution an equilibrium mixture of the title products (total 3.6 g.); infrared absorption peaks at 5.78, 9.03, 9.24, 9.55, 10.6μ.

$C_{21}H_{30}O_2$ calculated: C, 76.3%; H, 9.15%. Found: C, 76.4%; H, 9.15%.

This mixture is useful as an intermediate for preparing the hormonal compounds of this invention.

EXAMPLE 367

13β - ethyl - 3,3 - ethylenedioxy - 17α - ethynyl - gon - 5-en-17β-ol and 13β-ethyl-3,3-ethylenedioxy-17α-ethynyl-gon-5(10)-en-17β-ol Add 13β-ethyl-3,3-ethylenedioxy-gon-5-en-17-one and 13β-ethyl-3,3-ethylenedioxy-gon-5(10)-en-17-one (3.5 g.) (the mixture of the preceding example) in dimethyl-acetamide (100 cc.) with stirring under nitrogen to lithium acetylide (about 3.5 g.) in ethylenediamine (about 10 cc.)-dioxane (about 10 cc.). Stir the mixture for 5 hours and replace the nitrogen atmosphere by one of acetylene, and then add lithium acetylide (about 3.5 g.) in ethylene diamine (about 10 cc.)-dioxane (about 10 cc.). After 20 hours, pour the mixture onto crushed ice and extract the product with ether. Evaporate the washed and dried extracts and purify the resulting gum by chromatography on a Florex column. Dissolve the product in ethyl acetate and add hexane to precipitate 13β-ethyl-1,3-ethylenedioxy-17α-ethynyl-gon-5-en-17β-ol and 13β-ethyl-3,3-ethylene-dioxy-17α-ethyl-gon-5(10)-en-17β-ol (1.3 g.), m.p. 150–161° C.; infrared absorption peaks at 2.80, 3.05μ.

The mixture has progestational activity and is useful as an intermediate for preparing the hormonal compounds of this invention.

EXAMPLE 368

13β-ethyl-17β-acetoxy-gon-5-en-3β-ol

Add 13β-ethyl-3,17β-di-acetoxy-gona-3,5-diene (1.5 g.) in tetrahydrofuran (15 cc.) dropwise over 1 hour to a solution of potassium borohydride (1.5 g.) in water (5 cc.) and methanol (5 cc.) at 40° C. Stir the mixture for 4 hours at 40° C. Acidify the cooled solution with acetic acid, add water and extract the mixture with ether. Wash and dry the ethereal solution and evaporate the solvent to give 13β-ethyl-17β-acetoxy-gon-5-en-3β-ol; infrared absorption peaks at 2.94, 5.81μ.

The compound has estrogenic activity and is useful as an intermediate for preparing the hormonal compounds of this invention.

EXAMPLE 369

13β,17α-di-ethyl-gon-5-en-3,17β-diol

Dissolve 13β,17α-di-ethyl-3-acetoxy-gona-3,5-diene-17β-ol (0.45 g.) in methanol (28 cc.) and tetrahydrofuran (13 cc.) and add a solution of sodium borohydride (0.535 g.) in water (1 cc.). After 20 hours at room temperature, add water (70 cc.), filter the precipitate and recrystallize the residue from aqueous methanol to give 13β,17α-di-ethyl-gon-5-en-3,17β-diol. (0.25 g.), m.p. 178–182° C.; ultraviolet absorption—no selective absorption beyond 220 mμ; infrared absorption peaks at 3.0, 6.1, 12.05μ.

The compound possesses progestational activity and is useful for preparing the hormonal compounds of this invention.

EXAMPLE 370

13β,17α - diethyl - 3,3 - ethylenedioxy - gon - 5 - en - 17β-ol and 13β,17α-diethyl-3,3-ethylenedioxy-gon-5-(10)-en-17β-ol Add 13β-ethyl-3,3-ethylenedioxy-17α-ethynyl-gon-5-en-17β-ol and 13β-ethyl-3,3-ethylenedioxy-17α-ethynyl-gon-5(10)-en-17β-ol (an equilibrium mixture, 1 g.) in benzene (15 cc.) to a prehydrogenated suspension of palladised calcium carbonate (0.3 g.) in benzene (10 cc.) and shake the mixture in an atmosphere of hydrogen until two molecular equivalents of hydrogen have been absorbed (137 cc.) when uptake practically ceases. Filter the catalyst, evaporate the solvent and recrystallize the residue from methanol to give an equilibrium mixture of 13β,17α-diethyl-3,3-ethylenedioxy-gon-5-en-17β-ol and 13β,17α-diethyl-3,3-ethylenedioxy-gon-5(10)-17β-ol (0.35 g.); m.p. 91–97°.

$C_{23}H_{36}O_3$ calculated: C, 76.62; H, 10.07%. Found: C, 76.96; H, 9.8%.

This mixture possesses progestational activity and is useful as an intermediate for preparing the hormonal compounds of this invention.

EXAMPLE 371

13β-methyl-D-homo-17a-hydroxy-gon-4-en-3-one

Add 13β-methyl-D-homo-3 methoxy-gona-2,5(10)-dien-17a-ol (0.5 g.) in dioxane (20 cc.) with stirring to methanol (20 cc.) containing 11N hydrochloric acid (2.7 cc.) and water (1 cc.). Continue stirring for 2 hours, add water and extract the mixture with ether. Evaporate the washed and dried extracts, dissolve the residue in benzene and chromatograph on Florex to give 13β-methyl-D-homo-17α-hydroxy-gon-4-en-3-one; ultraviolet absorption peak at 242μ (ε 17,000); infrared absorption peaks at 3.03, 5.92, 6.1μ.

This compound has androgenic and anabolic activity and is useful as an intermediate for preparing the hormonal compounds of this invention.

EXAMPLE 372

13β-ethyl-D-homo-17α-hydroxy-gon-4-en-3-one

Substitute 13β-ethyl-D-homo-3-methoxy-gona-2,5(10)-dien-17a-ol for 13β-methyl-D-homo-3-methoxy-gona-2,5(10)-dien-17a-ol to give 13β-ethyl-D-homo-17a-hydroxy-gon-4-en-3-one; ultraviolet absorption peak at 242μ (ε 17,000); infrared absorption peaks at 3.03, 5.92, 6.01μ.

This compound has androgenic and anabolic activity and is useful as an intermediate for preparing the hormonal compounds of this invention.

EXAMPLE 373

13β-ethyl-17β-hydroxy-gon-4-en-3-one

Add 13β - ethyl-3-methoxy-gona-1,3,5(10)-trien-17β-ol (0.5 g.) in 100 ml. of tetrahydrofuran to 150 ml. of liquid ammonia, followed by 0.5 g. of lithium foil, and stir the mixture for 10 minutes. Add ethanol (6 ml.) and tetrahydrofuran (10 ml.) over a period of 20 minutes. After disappearance of the blue color add water, extract the mixture well with ether and evaporate the washed and dried ether extract. Dissolve the crystalline residue in 50 ml. of methanol and reflux for 30 minutes with 30 ml. of 3N HCl. Remove most of the methanol under reduced pressure, and extract the residue with ether. Chromatograph the ether extract on alumina. Use benzene-ether (1:1) to elute 13β-ethyl-17β-hydroxy-gon-4-en-3-one; m.p. 152–55° C.

$C_{19}H_{28}O_2$ calculated: C, 79.1%; H, 9.8%. Found: C, 79.25%; H, 9.65%.

This compound has androgenic and anabolic activity and is useful as an intermediate for preparing the hormonal compounds of this invention.

EXAMPLE 374

13β-ethyl-17β-hydroxy-gon-4-en-3-one

Dissolve 13β-ethyl - 3 - methoxy-gona-2,5(10)-dien-17β-ol (0.47 g.) in hot methanol (25 cc.). Add 3N hydrochloric acid (15 cc.) and keep the mixture at 70° C. under nitrogen for 1 hour. Add water and work up with ether and chromatograph the resulting gum on activated alumina (40 g.). Elute with ether to give a fraction (0.2 g.) which on recrystallization from light petroleum gives 13β-ethyl-17β-hydroxy-gon-4-en-3-one; m.p. 153–5° C.; ultraviolet absorption peak at 240 mμ (ε 16,300).

$C_{19}H_{26}O_2$ calculated: C, 79.1%; H, 9.8%. Found: C, 79.2%; H, 9.7%.

This compound has anabolic and androgenic activity and is useful as an intermediate for preparing the hormonal compounds of this invention.

EXAMPLE 375

13β-ethyl-17β-hydroxy-gon-4-en-3-one

Add to 13β-ethyl-3-methoxy-gona-2,5(10)-dien-17β-ol (1.0 g.) in methanol (50 cc.) 3N hydrochloric acid (20 cc.); shake the mixture for 2 hours, pour into water, and extract the product with ether. Work up in the usual way and take up the resulting gum in benzene and chromatograph on neutral alumina. Elute with ether to give a crystalline material and recrystallize from a mixture of ether and pentane to yield 13β-ethyl-17β-hydroxy-gon-4-en-3-one (0.5 g.), m.p. 144–7° (apparently another polymorphic form of the product of Example 373); ultraviolet absorption peak at 240 mμ (ε 15,500); infrared absorption peaks at 2.94, 6.06, 6.23μ.

This compound has anabolic and androgenic activity and is useful as an intermediate for preparing the hormonal compounds of this invention.

To prepare 13β-cetyl-17β-hydroxy-gon-4-en-3-one treat 13β-cetyl - 3 - methoxy-gona-2,5(10)-diene-17β-ol with methanolic hydrochloric acid according to the manipulative procedure described above.

To prepare 13β-ethyl-2-methoxy-17β-hydroxy-gon-4-en-3-one treat 13β-ethyl-2,3-dimethoxy-gona-2,5(10)-diene-17β-ol with methanolic hydrochloric acid according to the manipulative procedure described above.

To prepare 13β-phenethyl-17β-hydroxy-gon-4-en-3-one treat 13β-phenethyl-3-methoxy-gona-2,5(10)-diene-17β-ol with methanolic hydrochloric acid according to the manipulative procedure described above.

To prepare 13β-(3-hydroxypropyl)-17β-hydroxy-gon-4-en-3-one treat 13β-(3-hydroxypropyl)-3-methoxy-gona-2,5(10)-diene-17β-ol with methanolic hydrochloric acid according to the manipulative procedure described above.

To prepare 13β-(3-dimethylaminopropyl)-1-oxo-17β-hydroxy-gonan-3-one treat 13β-(3-dimethylaminopropyl)-1,3-dimethoxy-gona-1,(10),β-diene-17β-ol with methanolic hydrochloric acid according to the manipulative procedure described above.

These compounds possess androgenic and anabolic activity and are useful as an intermediate for preparing the hormonal compounds of this invention.

EXAMPLE 376

13β-ethyl-17β-hydroxy-gon-4-en-3-one

Stir 13β-ethyl-17β-hydroxy-gon-5(10)-en-3-one (300 mg.) for 2 hours under nitrogen at room temperature with methanol (10 cc.)-11N hydrochloric acid (0.5 cc.)-water (0.3 cc.). Add sodium bicarbonate (2 g.) and ether (50 cc.), filter the mixture, evaporate the ether and recrystallize the residue from ethyl acetate-ether to give 13β-ethyl-17β-hydroxy-gon-4-en-3-one (0.2 g.), m.p. 147–149°; ultraviolet absorption peak at 242 mμ (ε 17,600); infrared absorption peaks at 2.78, 2.90, 6.02, 6.17.

This compound has androgenic and anabolic activity and is useful as an intermediate for preparing the hormonal compounds of this invention.

EXAMPLE 377

13β-ethyl-17β-hydroxy-gon-4-en-3-one

Add sodium borohydride (200 mg.) in ethanol (25 cc.) to 13β-ethyl-gon-4-en-3,17-dione (1 g.) in ethanol (50 cc.) at 8°. After 15 minutes add an excess of acetic acid and evaporate the solution to dryness under reduced pressure. Add water, collect the product in ether, and after this work up in the usual manner, recrystallize from a mixture of ether and pentane to obtain 13β-ethyl-17β-hydroxy-gon-4-en-3-one; ultraviolet absorption peak at 240 mμ (ε 15,500); infrared absorption peaks at 2.94, 6.06, 6.23.

This compound has androgenic and anabolic activity and is useful as an intermediate for preparing the hormonal compounds of this invention.

EXAMPLE 378

13β-n-propyl-17β-hydroxy-gon-4-en-3-one

Add 3N hydrochloric acid (1 cc.) to a solution of 13β-n-propyl-3-methoxy-gona-2,5(10)-dien-17β-ol (0.61 g.) in boiling methanol (70 cc.) and cool the mixture immediately and allow to stand for 4½ hours. Pour the product into water (300 cc.) and extract the mixture with ether; work up in the usual way to give as residue an amorphous solid (0.6 g.). Crystallize this solid from a mixture of ether and hexane. Take up the resulting solid in benzene (20 cc.) and chromatograph on a column of neutral alumina. Elute the product with ether and recrystallize from a mixture of ether and hexane to obtain 13β-n-propyl-17β-hydroxy-gon-4-en-3-one (0.08 g.), m.p. 126–7°; ultraviolet absorption peak at 240 mμ (ε 15,000); infrared absorption peaks at 2.92, 6.01, 6.20μ. Evaporation of the mother liquors gives a second, polymorphic, form of the same substance (0.17 g.), m.p. 144–5°, having ultraviolet and infrared spectra identical with the first material; a mixture of the two forms have m.p. 144–5°.

This compound has androgenic and anabolic activity and is useful as an intermediate for preparing the hormonal compounds of this invention.

EXAMPLE 379

13β-n-propyl-17β-hydroxy-gon-4-en-3-one

By substituting an equivalent amount of 13β-n-propyl-17β-hydroxy-gon-5(10)-en-3-one for 13β - ethyl - 17β-hydroxy-gon-5(10)-en-3-one in Example 376, there is obtained 13β-n-propyl-17β-hydroxy-gon-4-en-3-one; infrared absorption peaks at 2.92, 6.01, 6.20μ; ultraviolet peak at 240 mμ (ε 15,000).

This compound has androgenic and anabolic activity and is useful as an intermediate for preparing the hormonal compounds of this invention.

EXAMPLE 380

13β-isopropyl-17β-hydroxy-gon-4-en-3-one

Dissolve 13β - isopropyl-3-methoxy-gona-2,5(10)-dien-17β-ol in methanol (36 cc.), concentrated hydrochloric acid (2.4 cc.) and water (1.6 cc.) and allow the mixture to stand at room temperature for 2 hours. Add water and collect the product in ether. Wash, dry and evaporate the ethereal solution and chromatograph the residue on alumina (30 g.). Elute with benzene containing 30% ether and evaporate the solvent to obtain 13β-isopropyl-17β-hydroxy-gon-4-en-3-one as a gum; infrared absorption peak at 5.99μ; ultraviolet absorption peak at 240 mμ (ε 12,000).

This compound has progestational activity and is useful as an intermediate for preparing the hormonal compounds of this invention.

EXAMPLE 381

13β-n-butyl-17β-hydroxy-gon-4-en-3-one

Shake 13β-n-butyl - 3 - methoxy-gona - 2,5(10)-diene-17β-ol (0.49 g.) with concentrated hydrochloric acid (1.2 cc.) in water (0.8 cc.) and methanol (18 cc.) until solution is complete. Allow to stand 2 hours at room temperature, pour the mixture into water and extract the product with ether. Evaporate the washed and dried ether extracts and recrystallize the solid from a mixture of ethyl acetate and ether to obtain the title compound (0.32 g.), m.p. 168–70°; ultraviolet absorption peak at 240 mμ (ε 17,000); infrared absorption peaks at 2.92, 6.01μ.

This compound has androgenic and anabolic activity and is useful as an intermediate for preparing the hormonal compounds of this invention.

EXAMPLE 382

13β-isobutyl-17β-hydroxy-gon-4-en-3-one

Add to a mixture of concentrated hydrochloric acid (4.8 cc.), water (3.2 cc.) and methanol (72 cc.) 13β-isobutyl-3-methoxy-gona-2,5(10)-dien-17β-ol (2.0 g.). Heat the resulting solution on a steambath for 30 minutes with stirring. Cool to room temperature, dilute the solution with water (160 cc.) and extract with ether. Wash the ethereal solution with water, sodium bicarbonate, and water, dry over anhydrous sodium sulfate. Filter and remove the solvent under reduced pressure to give a gum. Recrystallize from ethyl acetate to obtain the title compound (0.8 g.), 43%, m.p. 124.0–125.5°; ultraviolet absorption peak at 240 m$\mu$ ($\epsilon$ 18,200).

$C_{21}H_{32}O_2$ calculated: C, 79.7%; H, 10.2%. Found: C, 79.5%; H, 10.0%.

This compound has estrogen antagonistic activity and is useful as an intermediate for preparing the hormonal compounds of this invention.

EXAMPLE 383

13$\beta$,17$\alpha$-diethyl-17$\beta$-hydroxy-gon-4-en-3-one

Dissolve 13$\beta$,17$\alpha$-diethyl-gon-5-en-3,17$\beta$-diol (0.1 g.) in acetone (30 cc.) and add a few pieces of solid carbon dioxide. Add 8N-chromic acid dropwise until the color of the solution remains reddish orange (3 drops) and then add isopropanol (1 cc.). Shake the mixture for 5 minutes with 10% aqueous sodium hydroxide (50 cc.) and then add benzene (30 cc.) and remove the organic layer. Wash the organic layer thoroughly with brine and dry over ($Na_2SO_4$). Remove the solvent and triturate the residue with ether to give a crystalline precipitate. Recrystallize from ether to obtain the title compound, m.p. 138–142° undepressed on admixture with authentic material.

This compound has anabolic and androgenic activity and is useful as an intermediate for preparing the hormonal compounds of this invention.

EXAMPLE 384

13$\beta$-ethyl-17$\beta$-methoxy-gon-4-en-3-one

Add 13$\beta$-ethyl-3,17$\beta$-dimethoxy-gona-2,5(10)-dien (0.8 g.) in tetrahydrofuran (5 cc.) to methanol (72 cc.) in an atmosphere of nitrogen and add a mixture of hydrochloric acid (4.8 cc.) and water (3.2 cc.). Add a further 10 cc. of tetrahydrofuran and after 1 hour dilute the solution with water and extract with ether. Wash, dry and evaporate the ethereal extracts and chromatograph the residue on neutral alumina. Remove impurities by elution with benzene. Wash the column with ether, evaporate the eluate and recrystallize the residue from hexane to obtain the title compound (0.2 g.), m.p. 117–119°; ultraviolet absorption $\lambda_{max}$. 240 m$\mu$ ($\epsilon$ 15,800); infrared spectrum (kBr disc) 6.0, 6.2, 8.8, 9.05$\mu$.

This compound has anabolic and androgenic activity and is useful as an intermediate for preparing the hormonal compounds of this invention.

EXAMPLE 385

13$\beta$-ethyl-gon-4-en-3,17-dione

Add 13$\beta$-ethyl-3-methoxy-gona-2,5(10)-dien - 17 - one (12.9 g.) with stirring under nitrogen to methanol (300 cc.) containing 11N hydrochloric acid (20 cc.) and water (13 cc.). Stir two hours and add sodium bicarbonate (21 g.) portionwise. Filter the mixture and evaporate the filtrate to dryness. Recrystallize the residue from ethyl acetate (75 cc.) to obtain the title compound (10 g.), m.p. 158–161° C.; ultraviolet absorption peak at 240 m$\mu$ ($\epsilon$ 17,800); infrared absorption peaks at 5.78, 6.00, 6.17$\mu$.

$C_{19}H_{26}O_2$ calculated: C, 79.76%; H, 9.15%. Found: C, 80.0%; H, 9.0%.

This compound is useful as an intermediate for preparing the hormonal compounds of this invention.

EXAMPLE 386

13$\beta$-ethyl-gon-4-en-3,17-dione

Add 13$\beta$-ethyl-gon-5(10)-en-3,17-dione (1 g.) with stirring under nitrogen to methanol (25 cc.) containing 11N hydrochloric acid (1.75 cc.) and water (1.1 cc.). Stir for 2 hours, add sodium bicarbonate (1.75 g.) and filter the mixture. Evaporate the filtrate to dryness and recrystallize the residue from ethyl acetate to obtain the title compound; ultraviolet absorption peak at 240 m$\mu$ ($\epsilon$ 17,800); infrared absorption peaks at 5.78, 6.00, 6.17$\mu$.

This compound is useful as an intermediate for preparing the hormonal compounds of this invention.

EXAMPLE 387

13$\beta$-ethyl-gon-4-en-3,17-dione

Heat 13$\beta$ - ethyl-3-methoxy-17,17-ethylenedioxy-gona-2,5(10)-diene (0.1 g.) in glacial acetic acid (2.5 cc.) and water (1 cc.) on a steam bath for 20 minutes, bring finally to boiling and allow to cool. Add aqueous sodium bicarbonate to neutralize the solution and ether extract the product. Wash, dry and evaporate the ether extracts to furnish a residue (0.065 g.); crystallize from a mixture of acetone and light petroleum to obtain the title compound (0.01 g.), m.p. 154–5°; ultraviolet absorption peak at 239 m$\mu$ ($\epsilon$ 15,000); infrared absorption peaks at 5.75, 5.96$\mu$.

This compound is useful as an intermediate for preparing the hormonal compounds of this invention.

EXAMPLE 388

13$\beta$-methyl-D-homo-17a$\beta$-(3-phenylpropionoxy)-gon-4-en-3-one

Add 3-phenylpropionyl chloride (1 cc.) in benzene (3 cc.) to 13$\beta$-methyl-D-homo-17a$\beta$-hydroxy-gon-4-en-3-one (1 g.) in pyridine (3.5 cc.) at −20°. Keep the mixture overnight at −10°, add crushed ice and extract the mixture with ether-benzene (1:1). Wash the extracts in turn with 2N aqueous potassium hydroxide, water, 2N hydrochloric acid, and brine, and dry. Evaporate the solvent to give a residue. Dissolve the residue in benzene and chromatograph on silica gel to obtain the title compound; infrared absorption peaks at 5.80, 5.99$\mu$.

This compound has androgenic and anabolic activity and is useful as an intermediate for preparing the hormonal compounds of this invention.

EXAMPLE 389

13$\beta$-ethyl-D-homo-17a$\beta$-(3-phenylpropionoxy)-gon-4-en-3-one

Substitution of 13$\beta$-ethyl-D-homo-17a$\beta$-hydroxy-gon-4-en-3-one for 13$\beta$-methyl-D-homo-17a$\beta$-hydroxy-gon-4-en-3-one in the preceding example gives the title compound; infrared absorption peaks at 5.78, 5.99$\mu$.

This compound has anabolic and androgenic activity and is useful as an intermediate for preparing the hormonal compounds of this invention.

EXAMPLE 390

13$\beta$-ethyl-17$\beta$-acetoxy-gon-4-en-3-one

Add acetyl chloride (1 cc.) in benzene (5 cc.) to 13$\beta$-ethyl-17$\beta$-hydroxy-gon-4-en-3-one (1.5 g.) in pyridine (5 cc.) at −20°. Keep the mixture at −10° for 18 hours, work up and recrystallize the product from methanol to obtain the title compound (0.9 g.); ultraviolet absorption peak at 240 m$\mu$ ($\epsilon$ 16,700); infrared absorption peaks at 5.75, 5.99$\mu$.

This compound has anabolic and androgenic activity and is useful as an intermediate for preparing the hormonal compounds of this invention.

To prepare 13$\beta$-ethyl-17$\beta$-propionoxy-gon-4-en-3-one treat 13$\beta$-ethyl-17$\beta$-hydroxy-gon-4-en-3-one with propionyl chloride according to the manipulative procedure described above.

To prepare 13$\beta$-ethyl-17$\beta$-hexanoyloxy-gon-4-en-3-one treat 13$\beta$-ethyl-17$\beta$-hydroxy-gon-4-en-3-one with hexanoyl chloride according to the manipulative procedure described above.

To prepare 13$\beta$-ethyl-17$\beta$-heptanoyloxy-gon-4-en-3-one treat 13$\beta$-ethyl-17$\beta$-hydroxy-gon-4-en-3-one with heptanoyl chloride according to the manipulative procedure described above.

To prepare 13β-ethyl-17β-octanoyloxy-gon-4-en-3-one treat 13β-ethyl-17β-hydroxy-gon-4-en-3-one with octanoyl chloride according to the manipulative procedure described above.

To prepare 13β-ethyl-17β-lauryloxy-gon-4-en-3-one treat 13β-ethyl-17β-hydroxy-gon-4-en-3-one with lauroyl chloride according to the manipulative procedure described above.

To prepare 13β-ethyl-17β-myristoyloxy-gon-4-en-3-one treat 13β-ethyl-17β-hydroxy-gon-4-en-3-one with myristoyl chloride according to the manipulative procedure described above.

To prepare 13β-ethyl-17β-palmitoyloxy-gon-4-en-3-one treat 13β-ethyl-17β-hydroxy-gon-4-en-3-one with palmitoyl chloride according to the manipulative procedure described above.

To prepare 13β-ethyl-17β-oleoyloxy-gon-4-en-3-one treat 13β-ethyl-17β-hydroxy-gon-4-en-3-one with oleoyl chloride according to the manipulative procedure described above.

To prepare 13β-ethyl-17β-cyclohexylacetoxy-gon-4-en-3-one treat 13β-ethyl-17β-hydroxy-gon-4-en-3-one with cyclohexylacetyl chloride according to the manipulative procedure described above.

To prepare 13β-ethyl-17β-2-phenylpropionoxy-gon-4-en-3-one treat 13β-ethyl-17β-hydroxy-gon-4-en-3-one with 2-phenylpropionyl chloride according to the manipulative procedure described above.

These compounds have anabolic and androgenic activity and are useful as an intermediate for preparing the hormonal compounds of this invention.

EXAMPLE 391

13β-ethyl-17β-isovaleroyloxy-gon-4-en-3-one

Keep 13β-ethyl-17β-hydroxy-gon-4-en-3-one (6 g.) with isovaleroyl chloride (7.2 g.) in pyridine at room temperature for 20 hours. Add aqueous sodium bicarbonate and extract the product with ether. Wash, dry and evaporate the extracts and purify the residue by chromatography upon neutral alumina. Distill at 200–230°/.01 mm. and crystallize from hexane to obtain the title compound, m.p. 82–89°; ultraviolet absorption peak at 240 mμ (ε 15,650); infrared absorption peaks at 5.76, 5.99, 6.18μ.

$C_{24}H_{36}O_3$ calculated: C, 77.4%; H, 9.7%. Found: C, 77.1%; H, 9.7%.

This compound has androgenic and anabolic activity and is useful as an intermediate for preparing the hormonal compounds of this invention.

EXAMPLE 392

13β-ethyl-17β-decanoyloxy-gon-4-en-3-one

Add decanoyl chloride (1.9 g.) to 13β-ethyl-17β-hydroxy-gon-4-en-3-one (1.3 g.) in pyridine (12.5 cc.) and allow the mixture to stand at room temperature overnight. Pour the mixture in 2N hydrochloric acid and extract with ether. Wash, dry and evaporate the extracts and recrystallize the residue from benzene-hexane to give the title compound (1.0 g.), m.p. 97–97.5°; ultraviolet absorption peak at 239 mμ (ε 16,500); infrared absorption peaks at 5.74, 5.99, 6.17μ.

$C_{29}H_{46}O_3$ calculated: C, 78.7%; H, 10.5%. Found: C, 78.7%; H, 10.5%.

This compound has anabolic and androgenic activity and is useful as an intermediate for preparing the hormonal compounds of this invention.

EXAMPLE 393

13β-ethyl-17β-(undec-10-enoyloxy)-gon-4-en-3-one

Add undec-10-enoyl chloride (2 g.) in benzene (6 cc.) to 13β-ethyl-17β-hydroxy-gon-4-en-3-one (2 g.) in pyridine (6 cc.) at —15°. Keep the mixture at —10° for 17 hours, add to water and extract with benzene. Wash, dry and evaporate the extracts and recrystallize the residue from methanol to obtain the title compound, m.p. 87–88°; ultraviolet absorption peak at 240 mμ (ε 17,000); infrared absorption peaks at 5.79, 6.00, 6.20μ.

$C_{30}H_{46}O_3$ calculated: C, 79.2%; H, 10.2%. Found: C, 79.0%; H, 10.0%.

This compound has anabolic and androgenic activity and is useful as an intermediate for preparing the hormonal compounds of this invention.

EXAMPLE 394

13β-ethyl-17β-(3-cyclopentylpropionoxy)-gon-4-en-3-one

Add 3-cyclopentylpropionyl chloride (2 g.) in benzene (6 cc.) to 13β-ethyl-17β-hydroxy-gon-4-en-3-one (2 g.) in pyridine (6 cc.) at —15°. Keep the mixture at —10° for 17 hours, work up and recrystallize the product from methanol to give the title compound, m.p. 88–89°; ultraviolet absorption peak at 241 mμ (ε 17,000); infrared absorption peaks at 5.80, 6.00, 6.18μ.

$C_{27}H_{39}O_3$ calculated: C, 78.8%; H, 9.55%. Found: C, 78.5%; H, 9.65%.

This compound has anabolic and androgenic activity and is useful as an intermediate for preparing the hormonal compounds of this invention.

EXAMPLE 395

13β-ethyl-17β-hemisuccinoyl-gon-4-en-3-one

Reflux 13β-ethyl-17β-hydroxy-gon-4-en-3-one (1.5 g.) with succinic anhydride (1.0 g.) in pyridine (10 cc.) for 2 hours. Cool the mixture and pour into an excess of 4N hydrochloric acid and extract the mixture with ether-chloroform. Wash the extract with 2N HCl, dilute with ether and exhaustively extract with aqueous sodium bicarbonate. Acidify the bicarbonate extracts and extract the product with chloroform. Recrystallize it twice from chloroform-ether to obtain the title compound (0.8 g.), m.p. 179–182°; ultraviolet absorption peak at 239 mμ (ε 15,600); infrared absorption peaks at 5.81, 6.02, 8.13μ.

$C_{23}H_{32}O_5$ calculated: C, 71.1%; H, 8.3%. Found: C, 71.0%; H, 8.2%.

This compound has anabolic and androgenic activity and is useful as an intermediate for preparing the hormonal compounds of this invention.

EXAMPLE 396

13β-ethyl-17β-benzoyloxy-gon-4-en-3-one

Treat 13β-ethyl-17β-hydroxy-gon-4-en-3-one (2 g.) in pyridine (20 cc.) with benzoyl chloride (3 cc.) in benzene (10 cc.) at —10°. Keep the mixture at that temperature for 18 hours and then pour into 2N hydrochloric acid (200 cc.). Extract the product with ether and wash, dry and evaporate the extracts. Triturate the residue with a mixture of ether and hexane. Filter the crystalline material obtained and dissolve in benzene and purify by chromatography on neutral alumina. Recrystallize from a mixture of ethyl acetate and hexane to give the title compound, m.p. 141–9°; ultraviolet light absorption peak at 237 mμ (ε 27,300).

$C_{26}H_{32}O_3$ calculated: C, 79.55%; H, 8.2%. Found: C, 79.3%; H, 8.0%.

This compound has anabolic and androgenic activity and is useful as an intermediate for preparing the hormonal compounds of this invention.

EXAMPLE 397

13β-ethyl-17β-phenylacetoxy-gon-4-en-3-one

Add phenylacetyl chloride (1.5 cc.) in benzene (4.5 cc.) to 13β-ethyl-17β-hydroxy-gon-4-en-3-one (1.5 g.) in pyridine (5 cc.) at —18°. Keep the mixture at —10° for 16 hours, add ice-water and extract the product with ether. Wash, dry and evaporate the extracts to a residue and chromatograph on neutral alumina to obtain a crystalline produce and recrystallize from methanol to obtain the title compound, m.p. 143–145°; ultraviolet absorption peak at 240 mμ (ε 16,300); infrared absorption peaks at 5.75, 6.00μ.

EXAMPLE 398

13β-ethyl-17β-(3-phenylpropionoxy)-gon-4-en-3-one

Add 13β-ethyl-17β-hydroxy-gon-4-en-3-one (0.11 g.) in dry pyridine (0.35 cc.) at −20° to 3-phenylpropionyl chloride (0.11 g.) in benzene (0.3 cc.). Keep this at −10° for 16 hours, add ice-cold water and extract with a mixture of equal volumes of ether and benzene. Wash the extracts in turn with 2N potassium hydroxide solution, water, 2N hydrochloric acid solution, and brine, and dry. Evaporate solvent to give a residue and recrystallize from a mixture of ether and ethyl acetate to obtain the title compound (0.10 g.), m.p. 135–40°; infrared absorption peaks at 5.81, 5.99, 8.51, 13.3, 14.3$\mu$, showing no absorption due to hydroxyl.

This compound has anabolic and androgenic activity and is useful as an intermediate for preparing the hormonal compounds of this invention.

EXAMPLE 399

13β-ethyl-17β-nicotinoyloxy-gon-4-en-3-one

Reflux 13β-ethyl-17β-hydroxy-gon-4-en-3-one (1 g.) with nicotinic anhydride (2 g.) in pyridine (20 cc.) for 3 hours. Cool, add water, evaporate the mixture to dryness and extract with benzene. Wash dry and evaporate the extracts to a residue and recrystallize from methanol to obtain the title compound; ultraviolet absorption peak at 239 m$\mu$ ($\epsilon$ 20,000); infrared absorption peaks at 5.81, 6.00, 6.28$\mu$.

$C_{25}H_{31}NO_3$ calculated: C, 76.3%; H, 7.9%; N, 3.6%. Found: C, 76.1%; H, 7.9%; N, 3.7%.

This compound has anabolic and androgenic activity and is useful as an intermediate for preparing the hormonal compounds of this invention.

EXAMPLE 400

13β-propyl-17β-benzoyloxy-gon-4-en-3-one

Esterify 13β-propyl-17β-hydroxy-gon-4-en-3-one (2.5 g.) with benzoyl chloride (2.0 g.). Purify the product by chromatography on Florex and recrystallize from ethyl acetate to obtain the title compound, m.p. 198–200°; ultraviolet absorption peak at 240 m$\mu$ ($\epsilon$ 25,000); infrared absorption peaks at 5.84, 6.00$\mu$.

This compound is useful as an intermediate for preparing the hormonal compounds of this invention.

EXAMPLE 401

13β-propyl-17β(3-phenylpropionoxy)-gon-4-en-3-one

Add 3-phenylpropionyl chloride (2.9 g.) in benzene (10 cc.) to 13β-propyl-17β-hydroxy-gon-4-en-3-one (2.5 g.) in pyridine at −10°. Pour the mixture into ice water and extract with benzene-ether. Wash, dry and evaporate the extracts to a gum and purify by chromatography upon Florex. Recrystallize from ethyl acetate-hexane to obtain the title compound, m.p. 104–108°.

Ultraviolet absorption peak at 240 m$\mu$ ($\epsilon$ 16,000); infrared absorption peaks at 5.76, 6.00$\mu$.

This compound has anabolic and androgenic activity and is useful as an intermediate for preparing the hormonal compounds of this invention.

EXAMPLE 402

13β-butyl-17β-(3-phenylpropionoxy)-gon-4-en-3-one

Cool 13β-butyl-17β-hydroxy-gon-4-en-3-one (0.10 g.) in pyridine (0.3 cc.) to −20° and add 3-phenylpropionyl chloride (0.10 g.) in benzene (0.3 cc.). Stir the mixture at −10° for 16 hours, add ice-cold water, ether (15 cc.) and benzene (15 cc.). Separate the organic layers and wash in turn with 2N sodium hydroxide solution, water and brine, and dry. Evaporate the solvent to an uncrystallizable gum, and take up in a little benzene and filter through neutral alumina (5 g.), then wash with more benzene. Evaporate the resulting benzene solution to obtain the title compound as a gum (0.85 g.); infrared absorption peaks at 5.78, 5.99, 13.3, 14.3$\mu$, with no absorption due to hydroxyl.

This compound has anabolic and androgenic activity and is useful as an intermediate for preparing the hormonal compounds of this invention.

EXAMPLE 403

13β-isobutyl-17β-(3-phenylpropionoxy)-gon-4-en-3-one

Add 3-phenylpropionyl chloride (.5 g.) in benzene (1.5 cc.) with swirling to 13β-isobutyl-17β-hydroxy-gon-4-en-3-one (.5 g.) in pyridine (2 cc.) at −20°. Store the mixture at −10° for 18 hours, add water and extract the product with ether. Wash, dry and evaporate the extracts to give a residue and recrystallize from methanol to give the title compound, m.p. 101–106°; ultraviolet absorption peak at 240 m$\mu$ ($\epsilon$ 15,300); infrared absorption peaks at 5.75, 5.95$\mu$.

This compound is useful as an intermediate for preparing the hormonal compounds of this invention.

EXAMPLE 404

13β-ethyl-3,3-ethylenedithio-gon-4-en-17β-ol

Treat 13β-ethyl-17β-hydroxy-gon-4-en-3-one (0.47 g.) in methanol (5 cc.) and ethanedithiol (0.25 cc.) with boron trifluoride etherate (0.25 cc.). Allow the mixture to stand at room temperature for 15 minutes, cool to 0°, filter the precipitate and wash with cold methanol to obtain the title compound (0.38 g.), m.p. 167–169°.

$C_{21}H_{32}OS_2$ calculated: C, 69.2%; H, 8.85%. Found: C, 69.1%; H, 8.9%.

This compound is useful as an intermediate for preparing the hormonal compounds of this invention.

EXAMPLE 405

13β-methyl-D-homo-17aα-ethynyl-17aβ-hydroxy-gon-4-en-3-one

Add 13β-methyl-D-homo-3-methoxy-17aα-ethynyl-gona-2,5(10)-diene-17aβ-ol (0.7 g.) in dioxane (20 cc.) with stirring to methanol (20 cc.) containing 11N hydrochloric acid (2.8 cc.) and water (1.6 cc.). Stir at room temperature for 2 hours, add water and extract the mixture with ether. Evaporate the washed and dried extracts to give a residue and dissolve in benzene and chromatograph on Florex to obtain the title compound; infrared absorption peaks at 2.97, 3.03, 6.02$\mu$.

This compound has progestational activity and is useful as an intermediate for preparing the hormonal compounds of this invention.

EXAMPLE 406

13β-methyl-D-homo-17aα-ethyl-17aβ-hydroxy-gon-4-en-3-one

Add 13β-methyl-D-homo-3-methoxy-17aα-ethyl-gona-2,5(10)-diene-17aβ-ol (0.6 g.) in dioxane (20 cc.) with stirring to methanol (20 cc.) containing 11N hydrochloric acid (2.4 cc.) and water (1.6 cc.). Stir for 2 hours at room temperature, add water and extract the mixture with ether. Wash, dry and evaporate the extracts to give a residue and recrystallize from ethyl acetate to obtain the title compound; ultraviolet absorption peak at 240 m$\mu$ ($\epsilon$ 15,000); infrared absorption peaks at 2.86, 6.01$\mu$.

This compound has anabolic and androgenic activity and is useful as an intermediate for preparing the hormonal compounds of this invention.

EXAMPLE 407

13β-ethyl-D-homo-17aα-ethynyl-17aβ-hydroxy-gon-4-en-3-one

Dissolve 13-β-ethyl-D-homo-3-methoxy-17aα-ethynyl-gona-2,5(10)diene-17aβ-ol (3.5 g.) in methanol (180 cc.) containing hydrochloric acid (12 cc.) and water (8 cc.). After 2 hours at room temperature add water and extract the mixture with ether. Wash, dry and evaporate the organic extract and recrystallize the residue from ethyl acetate to obtain the title compound 1.95 g., m.p. 171–4°. Ultraviolet absorption peak at 240 m$\mu$ ($\epsilon$ 17,400); infrared absorption peaks at 2.99, 3.1, 6.04$\mu$.

$C_{22}H_{30}O_2$ calculated: C, 80.94%; H, 9.26%. Found: C, 80.73%; H, 9.35%.

This compound has progestational activity and is useful as an intermediate for preparing the hormonal compounds of this invention.

EXAMPLE 408

13$\beta$,17$\alpha$-diethyl-17$\beta$-hydroxy-D-homo-gon-4-en-3-one

Dissolve 13$\beta$,17$\alpha$-diethyl-3-methoxy-D-homo-gona-2,5-(10)-dien-17$\beta$-ol (3.5 g.) in methanol (135 cc.) containing water (6 cc.) and hydrochloric acid (9 cc.). Stir the mixture for 1 hour and then pour into brine and extract with ether. Evaporate the washed and dried ether extracts and recrystallise the residue from acetone-hexane to obtain the title compound 2.225 g., m.p. 153–155°. Ultraviolet absorption peak at 240 m$\mu$ ($\epsilon$ 16,320); infrared absorption peaks at 2.92, 6.03$\mu$.

$C_{22}H_{34}O_2$ Calculated: C, 79.95%; H, 10.36%. Found: C, 79.93%; H, 10.34%.

This compound has anabolic and androgenic activity and is useful as an intermediate for preparing the hormonal compounds of this invention.

EXAMPLE 409

13$\beta$-ethyl-17$\alpha$-methyl-17$\beta$-hydroxy-gon-4-en-3-one

Heat a solution of 13$\beta$-ethyl-3-methoxy-17$\alpha$-methyl-gona-2,5(10)-dien-17$\beta$-ol (0.5 g.) in methanol (55 cc.) under nitrogen to boiling and add 3N hydrochloric acid (0.6 cc.). Allow the solution to cool to room temperature and keep under nitrogen for 3 hours; then add water and extract the mixture with ether. Evaporate the washed and dried extracts and recrystallise the residue from a mixure of ether and hexane, and subsequently from benzene, to yield the title compound as a benzene solvate. Remove the benzene by drying at 100° for 7 hours to obtain the free compound (0.2 g.), m.p. 128–9°. Ultraviolet absorption peak at 240 m$\mu$ ($\epsilon$ 16,200). Infrared absorption peaks at 2.95, 6.01$\mu$.

This compound has anabolic and androgenic activity and is useful as an intermediate for preparing the hormonal compounds of this invention.

EXAMPLE 410

13$\beta$-ethyl-17$\alpha$-ethynyl-17$\beta$-hydroxy-gon-4-en-3-one

To 13$\beta$-ethyl-3-methoxy-17$\alpha$-ethynyl-gona-2,5(10)-dien-17$\beta$-ol (0.7 g.) in methanol (36 cc.) add water (1.6 cc.) and concentrated hydrochloric acid (2.4 cc.). After standing at room temperature for 2 hours, add ether and evaporate the washed and dried ethereal solution to yield a gum. Dissolve the gum in benzene (5 cc.), and absorb the solution on an activated fuller's earth (50 g.). Elute with light petroleum containing increasing proportions of benzene to yield a crystalline by-product; then elute with benzene containing a small proportion of ether to yield a crystalline product. Recrystallise the latter from ethyl acetate, to obtain the title compound (0.11 g.), m.p. 203–6°; infrared absorption peaks at 2.97, 3.03, 6.02$\mu$.

This compound has progestational activity and is useful as an intermediate for preparing the hormonal compounds of this invention.

EXAMPLE 411

13$\beta$-ethyl-17$\alpha$-vinyl-17$\beta$-hydroxy-gon-4-en-3-one

Shake 13$\beta$-ethyl - 17$\alpha$-ethynyl-17$\beta$-hydroxy-gon-4-en-3-one (0.5 g.) in pyridine (20 cc.) containing a 2% palladium-calcium carbonate catalyst (150 mg.) with hydrogen at atmospheric pressure until one molecular equivalent of hydrogen has been absorbed. Recrystallise the product twice from ether-hexane and dry for 4 hours at 65°/.005 mm. to yield the title compound, m.p. 108–111°. (Found: C, 80.4%; H, 9.7%. $C_{21}H_{30}O_2$ requires C, 80.2%; H, 9.6%.) Ultraviolet absorption peak at 240 ($\epsilon$ 15,200); infrared absorption peak at 10.9$\mu$.

This compound has anabolic and androgenic activity and is useful as an intermediate for preparing the hormonal compounds of this invention.

EXAMPLE 412

13$\beta$,17$\alpha$-diethyl-17$\beta$-hydroxy-gon-4-en-3-one

Add 13$\beta$,17$\alpha$-diethyl-3-methoxy-gona-2,5(10)-dien-17$\beta$-ol (0.29 g.) to 15 cc. of a solution prepared by mixing concentrated hydrochloric acid (2.4 cc.), water (1.6 cc.) and methanol (36 cc.). Shake the mixture for 10 minutes, during which time the solid dissolves. After 2 hours pour the solution into water (50 cc.) and extract the mixture with ether. Wash, dry and evaporate the extracts and recrystallise the residue (0.255 g.) from a mixture of ethyl acetate and light petroleum, to yield the title compound (0.196 g.), m.p. 139–41°. Ultraviolet absorption peak at 240 m$\mu$ ($\epsilon$ 15,000). Infrared absorption peaks at 2.86, 6.01$\mu$.

This compound has anabolic and androgenic activity and is useful as an intermediate for preparing the hormonal compounds of this invention.

EXAMPLE 413

13$\beta$-ethyl-17$\alpha$-propynyl-17$\beta$-hydroxy-gon-4-en-3-one

Suspend 13$\beta$-ethyl - 3-methoxy-17$\alpha$-propynyl-gona-2,5-(10)-dien-17$\beta$-ol in methanol (36 cc.) and stir with concentrated hydrochloric acid (2.4 cc.), water (1.6 cc.) and dioxane (10 cc.) until dissolution is complete, and then for a further 20 minutes. Precipitate the product by the addition of water, filter, wash and dry. Recrystallise from ethyl acetate-hexane to yield the title compound, m.p. 124–5°; infrared absorption peaks at 3.03, 4.55, 6.02$\mu$. Ultraviolet absorption peak at 240 m$\mu$ ($\epsilon$ 15,600).

This compound has progestational activity and is useful as an intermediate for preparing the hormonal compounds of this invention.

EXAMPLE 414

13$\beta$-ethyl-17$\alpha$-(2-propenyl)-17$\beta$-hydroxy-gon-4-en-3-one

Suspend 13$\beta$ - ethyl-3-methoxy-17$\alpha$-(2-propenyl)-gona-2,5(10)-dien-17$\beta$-ol in methanol (72 cc.), concentrated hydrochloric acid (4.8 cc.) and water (3.2 cc.) in an atmosphere of nitrogen. Add dioxane (20 cc.) and stir the mixture until dissolution is complete, and then for a further 20 minutes. Add water and extract the mixture with ether. Wash the ethereal solution with saturated sodium bicarbonate solution and water, and dry. Evaporate the solvent to obtain the title compound; infrared absorption peaks at 2.94, 6.02, 6.19$\mu$. Ultraviolet absorption peak at 240$\mu$ ($\epsilon$ 15,600).

This compound has progestational activity and is useful as an intermediate for preparing the hormonal compounds of this invention.

EXAMPLE 415

13$\beta$-ethyl-17$\alpha$-n-propyl-17$\beta$-hydroxy-gon-4-en-3-one

Keep a solution of 13$\beta$-ethyl-3-methoxy-17$\alpha$-n-propyl-gona-2,5(10)-dien-17$\beta$-ol (0.53 g.) in a mixture of methanol (22.5 cc.), 12N hydrochloric acid (1.5 cc.), and water (1.5 cc.) under nitrogen for 2½ hours at room temperature. Then add ice-water (75 cc.), filter off the precipitated solid and dissolve in ether (50 cc.); wash, dry and evaporate the ether solution, to yield a solid residue. Recrystallise the residue repeatedly from ethyl acetate, to obtain the title compound (0.23 g.), m.p. 132–4.5°.

Ultraviolet absorption peak at 240 mμ (ε 15,900); infrared absorption peaks at 2.92, 6.02, 6.18μ. (Found: C, 79.8%; H, 10.2%. $C_{22}H_{34}O_2$ requires C, 79.5%; H, 10.4%.)

This compound has anabolic and androgenic activity and is useful as an intermediate for preparing the hormonal compounds of this invention.

EXAMPLE 416

13β-ethyl-17α-(2-isobutenyl)-17β-hydroxy-gon-4-en-3-one

Suspend 13β-ethyl-3-methoxy-17α-(2-isobutenyl)-gona-2,5(10)-dien-17β-ol (1.5 g.) in methanol (36 cc.), concentrated hydrochloric acid (2.4 cc.), water (1.6 cc.) and dioxane (10 cc.). When the material has dissolved, add water, filter the precipitate and again stir with methanol (36 cc.), concentrated hydrochloric acid (2.4 cc.) and water (1.6 cc.) for 20 minutes. Then gradually add water and filter the precipitate; wash with water, dry and crystallise from ethyl acetate-hexane and then from acetonitrile to yield the title compound (2 g.); infrared absorption peaks at 2.90, 6.01, 6.20, 11.3μ; ultraviolet absorption peak at 240μ (ε 16,800).

This compound has estrogen antagonistic activity and is useful as an intermediate for preparing the hormonal compounds of this invention.

EXAMPLE 417

13β-n-propyl-17α-methyl-17β-hydroxy-gon-4-en-3-one

Shake 13β - n - propyl-3-methoxy-17α-methyl-gona-2,5-(10)-dien-17β-ol (1.0 g.) with 44 cc. of an aqueous methanolic hydrochloric acid solution and stir for 2 hours; then pour the product into water and work up with ether. Purify by chromatography on silica gel (elute with ether), and recrystallise from a mixture of ethyl acetate and hexane to obtain the title compound (0.35 g.), m.p. 134–5.5°; ultraviolet absorption peak at 240 mμ (ε 18,100); infrared absorption peak at 6.02μ.

This compound has anabolic and androgenic activity and is useful as an intermediate for preparing the hormonal compounds of this invention.

EXAMPLE 418

13β-n-propyl-17α-ethynyl-17β-hydroxy-gon-4-en-3-one

Shake 13β - n-propyl-3-methoxy-17α-ethynyl-gona-2,5-(10)-dien-17β-ol (0.31 g.) with a solution prepared by mixing concentrated hydrochloric acid (0.81 cc.), water (0.54 cc.) and methanol (12.15 cc.), until the solid dissolves. After addition of water, work up with ether, purify by recrystallisation from cyclohexane to obtain the title compound (0.1 g.), m.p. 149–50.5°; ultraviolet absorption peak at 240 mμ (ε 15,700); infrared absorption peaks at 2.99, 3.06, 6.04, 6.16μ. (Found: C, 81.0%; H, 9.31%. $C_{22}H_{30}O_2$ requires C, 80.9%; H, 9.3%.)

This compound has progestational activity and is useful as an intermediate for preparing the hormonal compounds of this invention.

EXAMPLE 419

13β-n-propyl-17α-vinyl-17β-hydroxy-gon-4-en-3-one

Hydrogenate 13β - n - propyl-17α-ethynyl-17β-hydroxy-gon-4-en-3-one (0.5 g.) to yield the title compound (.425 g.), m.p. 94–97°. (Found: C, 81.1%; H, 9.9%. $C_{22}H_{32}O_2$ requires C, 80.4%; H, 9.8%.) Ultraviolet absorption peak at 240 mμ (ε 15,600); infrared absorption peak at 10.9μ.

This compound has anabolic and androgenic activity and is useful as an intermediate for preparing the hormonal compounds of this invention.

EXAMPLE 420

13β-n-propyl-17α-ethyl-17β-hydroxy-gon-4-en-3-one

Stir a mixture of 13β-n-propyl-3-methoxy-17α-ethyl-gona-2,5(10)-dien-17β-ol (0.8 g.) in tetrahydrofuran (20 cc.), methanol (50 cc.), 12N hydrochloric acid (3.3 cc.) and water (2.2 cc.) at room temperature for 2½ hours and then pour into sodium chloride solution; extract the mixture with ether and wash, dry and evaporate the extracts. Dissolve the crystalline residue obtained (0.8 g.) in a mixture (25 cc.) of equal volumes of benzene and hexane and chromatograph on silica gel; elute with a mixture of equal volumes of benzene and chloroform to yield a crystalline material. Recrystallise this product from a mixture of benzene and light petroleum, to give a benzene solvate, m.p. 93–5°; and then recrystallise this material from a mixture of hexane and ethyl acetate to obtain the solvent free product, 13β-n-propyl-17α-ethyl-17β-hydroxy-gon-4-en-3-one (0.2 g.), m.p. 98–100°; ultraviolet absorption peak at 240 mμ (ε 15,700); infrared absorption peaks at 2.92, 6.02, 6.18μ.

This compound has anabolic and androgenic activity and is useful as an intermediate for preparing the hormonal compounds of this invention.

EXAMPLE 421

13β-n-propyl-17α-propynyl-17β-hydroxy-gon-4-en-3-one

Stir 13β-n-propyl - 3 - methoxy - 17α - propynyl-gona-2,5(10)-dien-17β-ol (2.5 g.) under nitrogen with methanol (135 cc.) containing 11N hydrochloric acid (9 cc.) and water (6 cc.). After two hours add isopropyl alcohol (35 cc.) and continue stirring for a further 30 minutes. Add the mixture to brine and extract the product with ether. Evaporate the washed and dry extracts to a glass, dissolve in benzene and chromatograph on Florex. Elute with benzene containing 5% ether and recrystallise the product so obtained from ethyl acetate-hexane to yield the title compound, m.p. 182–184°.

$C_{23}H_{32}O_2$ calculated: C, 81.1%; H, 9.5%. Found: C, 80.95%; H, 9.4%.

Ultraviolet absorption peak at 240 mμ (ε 16,700).

This compound has progestational and estrogen antagonistic activity and is useful as an intermediate for preparing the hormonal compounds of this invention.

EXAMPLE 422

13β-n-propyl-17α-allyl-17β-hydroxy-gon-4-en-3-one

Stir 13β-n-propyl - 3 - methoxy-17α-allyl-gona-2,5(10)-dien-17β-ol (0.77 g.) under nitrogen in isopropyl alcohol (25 cc.) containing 11N hydrochloric acid (2.4 cc.) and water (1.6 cc.) for 2.5 hours. Filter the mixture, add to brine and extract the product with ether. Evaporate the washed and dry extracts and purify the residue by chromatography on Florex and by recrystallisation from ethyl acetate to obtain the title compound, m.p. 135–137°.

$C_{23}H_{34}O_2$ calculated: C, 80.65%; H, 10.0%. Found: C, 80.4%; H, 9.8%.

Ultra violet absorption peak at 241.5 mμ (ε 17,500); infrared absorption peaks at 2.95, 6.02, 6.18μ.

This compound has progestational anabolic and androgenic activity and is useful as an intermediate for preparing the hormonal compounds of this invention.

EXAMPLE 423

13β,17α-di-n-propyl-17β-hydroxy-gon-4-en-3-one

Stir 13β,17α-di-n-propyl - 3 - methoxy-gona-2,5(10)-dien-17β-ol (1.07 g.) under nitrogen in methanol (50 cc.) containing water (2.5 cc.) and 11N hydrochloric acid (3.8 cc.) at room temperature for 2 hours. Then add water and extract the product with ether. Evaporate the washed and dry extracts and purify the residue by chromatography on alumina, by repeated recrystallization from ethyl acetate, and by sublimation at 145°/.003 mm. to obtain the title compound (.34 g.), m.p. 147–49°. Ultraviolet absorption peak at 241.5 mμ (ε 16,600); infrared absorption peaks at 2.91, 6.02, 6.19μ.

This compound has anabolic and androgenic activity and is useful as an intermediate for preparing the hormonal compounds of this invention.

EXAMPLE 424

13β-n-propyl-17α-(1-methallyl)-17β-hydroxy-gon-4-en-3-one

Stir 13β-n-propyl - 3 - methoxy - 17α - (1-methallyl)-gona-2,5(10)-dien-17β-ol (1.5 g.) under nitrogen with methanol (90 cc.) containing 11N hydrochloric acid (9 cc.) and water (6 cc.). Add the mixture to brine and extract the product with ether. Evaporate the washed and dry extracts to yield the title compound; ultra violet absorption peak at 240 m$\mu$ ($\epsilon$ 13,500); infrared absorption peak at 11.0$\mu$.

This compound has progestational activity and is useful as an intermediate for preparing the hormonal compounds of this invention.

EXAMPLE 425

13β-n-propyl-17α-(2-methallyl)-17β-hydroxy-gon-4-en-3-one

Employ the method of Example 423 to hydrolyse 13β-n-propyl-3-methoxy-17α-(2-methallyl)-gona - 2,5(10)-ol. Purify the product by chromatography on Florex and recrystallisation from ethyl acetate to afford the title compound, m.p. 141.5–143.5°.

$C_{24}H_{36}O_2$ calculated: C, 80.85%; H, 10.2%. Found: C, 80.8%; H, 9.9%.

Ultraviolet absorption peak at 241 m$\mu$ ($\epsilon$ 16,700); infrared absorption peaks at 2.87, 6.01, 6.18$\mu$.

This compound has progestational activity and is useful as an intermediate for preparing the hormonal compounds of this invention.

EXAMPLE 426

13β-n-butyl-17α-ethynyl-17β-hydroxy-gon-4-en-3-one

Hydrolyse 13β-n-butyl - 3 - methoxy-17α-ethynyl-gona-2,5(10)-dien-17β-ol (2 g.) by the method of Example 424 and purify the product by chromatography on Florex and by recrystallisation from ether-hexane to afford the title compound (.71 g.), m.p. 159–163°.

$C_{23}H_{32}O_2$ calculated: C, 81.1%; H, 9.5%. Found: C, 80.8%; H, 9.3%.

Ultraviolet absorption peak at 240 m$\mu$ ($\epsilon$ 15,900); infrared absorption peaks at 6.00$\mu$.

The compound has progestational activity and is useful as an intermediate for preparing the hormonal compounds of this invention.

EXAMPLE 427

13β-n-butyl-17α-ethyl-17β-hydroxy-gon-4-en-3-one

Keep a solution of 13β-n-butyl-3-methoxy-17α-ethyl-gona-2,5(10)-dien-17β-ol (1.05 g.) in a mixture of tetrahydrofuran (15 cc.), methanol (54 cc.), 12N hydrochloric acid (3.6 cc.) and water (2.4 cc.) for 2 hours at room temperature and then pour into brine (350 cc.). Work up with ether and dissolve the product, a gum (1.0 g.), in a mixture of light petroleum and benzene (25 cc.) and chromatograph on silica gel. Elute with benzene containing a small proportion of ether to give a crystalline by-product (0.1 g.); subsequently elute with a mixture of ether, benzene and chloroform (in the proportions 5:4:1 by volume) to yield a crystalline product. Recrystallise the latter from hexane, and subsequently from hexane containing a little ethyl acetate to obtain the title compound (0.23 g.), m.p. 78–80°; ultraviolet absorption peak at 240 m$\mu$ ($\epsilon$ 14,700); infrared absorption peaks at 2.88, 6.00, 6.18$\mu$.

This compound has anabolic, androgenic and estrogen antagonistic activity and is useful as an intermediate for preparing the hormonal compounds of this invention.

EXAMPLE 428

13β,17α-diethyl-17β-hydroxy-gon-4-en-3-one

Treat 13β,17α-diethyl-17β-hydroxy-gon-5(10)-en-3-one (12.2 g.) with a solution of methanol (442 cc.), water (22 cc.) and concentrated hydrochloric acid (30 cc.) and allow the mixture to stand at room temperature for 2 hours. Precipitate the product by the addition of water, extract the reaction mixture with ether and wash the ethereal solution with 10% aqueous sodium carbonate, brine and dry (MgSO$_4$). Evaporate the solvent and recrystallise the residue from acetonitrile to give the title compound 7.9 g. (64.8%), m.p. 144–5°; infrared absorption 2.92, 6.0, 6.2$\mu$; ultraviolet absorption $\lambda_{max.}$ 240 m$\mu$ ($\epsilon$ 15,680).

Found: C, 79.86%; H, 10.04%. $C_{21}H_{32}O_3$ requires C, 79.70%; H, 10.19%.

This compound has anabolic and androgenic actiivty and is useful as an intermediate for preparing the hormonal compounds of this invention.

EXAMPLE 429

13β-ethyl-17α-ethynyl-17β-hydroxy-gon-4-en-3-one

Stir 13β - ethyl-17α-ethynyl-17β-hydroxy-gon-5(10)-en-3-one (0.1 g.) with a mixture of methanol (36 cc.), water (1.6 cc.) and concentrated hydrochloric acid (2.4 cc.) for 1 hour. Add water and extract the mixture with ether. Wash, dry and evaporate the ethereal solution and recrystallise the residue from ether-hexane to obtain the title compound, m.p. 203–6° undepressed on admixture with authentic material. Infrared spectrum 3.05, 3.5, 6.05, 9.4$\mu$.

This compound has progestational activity and is useful as an intermediate for preparing the hormanol compounds of this invention.

EXAMPLE 430

13β,17α-diethyl-17β-hydroxy-gon-4-en-3-one

Add 13β-ethyl-17α-ethynyl-17β-hydroxy-gon-4-en-3-one (1 g.) in benzene (15 cc.) and ethanol (5 cc.) to a prereduced suspension of 2% palladium on calcium carbonate (0.3 g.) in benzene (10 cc.) and shake the mixture in an atmosphere of hydrogen until 163 cc. (2.1 moles) of hydrogen has been absorbed. Filter off the catalyst, evaporate the solvent and shake the product (0.55 g.) in methanol (10 cc.) with a solution of sodium metabisulphite (1.7 g.) in water (8 cc.) for 5 minutes. Add water, extract the mixture with ether; wash, dry and evaporate the ethereal solution and recrystallize the product from acetone to obtain the title compound (0.4 g.) m.p. 144° undepressed on admixture with authentic material.

Infrared spectrum: 2.9, 6.0, 6.18; ultraviolet spectrum: max. 241 m$\mu$ ($\epsilon$ 17,250).

This compound has anabolic and androgenic activity and is useful as an intermediate for preparing the hormonal compounds of this invention.

EXAMPLE 431

13β-ethyl-17α-ethynyl-17β-hydroxy-gon-4-en-3-one

Treat 13β-ethyl - 3 - ethoxy-17α-ethynyl-gona-3,5-dien-17β-ol (0.1 g.) with a mixture of methanol (10 cc.) and 50% hydrochloric acid (1 cc.) and allow the mixture to stand at room temperature for 1 hour. Add water, filter off the precipitated product and recrystallize from ethyl acetate-hexane to yield the title compound, identical with authentic material by mixed melting point determination and comparison of infrared spectra.

This compound has progestational activity and is useful as an intermediate for preparing the hormonal compounds of this invention.

EXAMPLE 432

13β-n-propyl-3-ethoxy-17β-ethynyl-gona-3,5-dien-17β-ol

Dissolve 13β-n-propyl-17α-ethynyl-17β-hydroxy-gon-4-en-3-one (2.5 g.) in dioxane (125 cc.) and treat the solution with ethyl orthoformate (5 cc.) and toluene-p-sulphonic acid (0.15 g.). Stir the mixture for 3 hours and then add pyridine (5 cc.), followed by water (200 cc.) Extract the mixture with ether. Wash, dry and evaporate the ethereal solution and crystallize the residue by trituration with ether. Recrystallize from ether-hexane to obtain the title compound (1.4 g.), m.p. 113–123°; ultraviolet absorption peak at 242 mμ (ε 15,860); infrared absorption peaks at 2.93, 3.08, 5.75, 6.06, 6.17μ.

This compound has progestational activity and is useful as an intermediate for preparing the hormonal compounds of this invention.

EXAMPLE 433

13β-ethyl-3,17β-diacetoxy-gona-3,5-diene

Reflux 13β-ethyl-17β-hydroxy-gon-4-en-3-one with pyridine (1.6 cc.) and acetyl chloride (16 cc.) in acetic anhydride (40 cc.) for 2½ hours under nitrogen. Evaporate the solvents under reduced pressure and recrystallize the residue thrice from chloroform-methanol to obtain the title compound, m.p. 151–157°.

$C_{23}H_{32}O_4$ calculated: C, 74.2%; H, 8.7%. Found: C, 74.2%; H, 8.4%.

Ultraviolet absorption peak at 236 mμ (ε 18,800); infrared absorption peaks at 5.75, 5.99, 6.10μ.

This compound has anabolic and androgenic activity and is useful as an intermediate for preparing the hormonal compounds of this invention.

EXAMPLE 434

13β-ethyl-3-(1-pyrrolidinyl)-gona-3,5-dien-17β-ol

Reflux 13β-ethyl-17β-hydroxy-gon-4-en-3-one (1.9 g.) in benzene (25 cc.) and pyrrolidine (9 g.) for 4 hours under a Dean-Stark trap. Evaporate the solvent under reduced pressure to give as residue the title compound; ultraviolet absorption peak at 280 mμ.

This compound has anabolic and androgenic activity and is useful as an intermediate for preparing the hormonal compounds of this invention.

EXAMPLE 435

13β,17α-diethyl-3-acetoxy-gona-3,5-dien-17β-ol

Dissolve potassium (0.3 g.) in tertiary butanol (40 cc.) in an atomsphere of nitrogen and add to the refluxing solution 13β,17α-diethyl-17β-hydroxy-gon-4-en-3-one (1 g.) in benzene (30 cc.) Distill off the azeotrope, add more benzene to maintain a constant volume until the temperature of the distilling vapour reaches 80° and then maintain there for 45 minutes. Cool the mixture in ice, and add acetic anhydride (1 cc.), and reflux for 15 minutes. Add saturated aqueous sodium bicarbonate to the cooled reaction mixture, remove the organic layer, wash with water and dry ($Na_2SO_4$). Evaporate the solvent and recrystallize the residue from methanol to obtain the title compound (0.45 g.), m.p. 105–111°; ultraviolet absorption max. 235 mμ. (ε 17,850); infrared spectrum 3.1, 5.75, 6.0, 6.1μ.

This compound has anabolic and androgenic activity and is useful as an intermediate for preparing the hormonal compounds of this invention.

EXAMPLE 436

13β-ethyl-3-ethoxy-17α-ethynyl-gona-3,5-dien-17β-ol

Treat 13β-ethyl-17α-ethynyl-17β-hydroxy-gon - 4 - en-3-one (2.5 g.) with ethyl orthoformate (5 cc.) and toluene-p-sulphonic acid (0.15 g.) in dioxan at room temperature for 3 hours. Add pyridine and water extract the mixture with ether and wash, dry and evaporate the ethereal solution and recrystallize the residue from ether-hexane to obtain the title compound (1.4 g.); m.p. 113–123°; ultraviolet absorption max. 242 mμ (ε 15,860); infrared absorption (KBr disc.) 2.93, 3.08, 5.75, 6.06, 6.17μ.

This compound has progestational activity and is useful as an intermediate for preparing the hormonal compounds of this invention.

EXAMPLE 437

13β,17α-diethyl-17β-hydroxy-gonan-3-one

Dissolve 13β - ethyl-17α-ethynyl-17β-hydroxy-gon-4-en-3-one (1.5 g.) in ethanol (50 cc.) and shake with 10% palladium on charcoal (0.9 g.) in an atmosphere of hydrogen until uptake of hydrogen ceases. Filter off the catalyst, evaporate the solvent and recrystallize the residue from ether-hexane to afford title compound, m.p. 192–196°.

$C_{21}H_{34}O_2$ calculated: C, 79.19%; H, 10.76%. Found: C, 79.4%; H, 10.43%.

This compound has estrogen antagonistic activity and is useful as an intermediate for preparing the hormonal compounds of this invention.

EXAMPLE 438

13β-ethyl-3-methoxy-8-iso-gona-2,5(10)-dien-17β-ol

Dissolve 13β-ethyl-3-methoxy - 8 - iso-gona-1,3,5(10)-trien-17β-ol (1 g.) in 1-methoxy-2-propanol (100 cc.) and ammonia (200 cc.). Add lithium (1 g.) over 20 minutes, stir for 2 hours and allow the ammonia to evaporate. Add water (500 cc.) extract the reaction mixture with benzene and wash the organic solution with water and dry ($MgSO_4$). Evaporate the solvent and crystallize the residue from methanol-ethanol to obtain the title product (800 mg.), m.p. 105–9°. Recrystallize a sample from benzene-petroleum ether to obtain the pure compound, m.p. 112.5–113°.

Infrared spectra: 2.87, 5.8, 6.0μ.

Found: C, 79.35%; H, 9.75%. $C_{20}H_{30}O_2$ requires C, 79.42%; H, 9.99%.

This compound is useful as an intermediate for preparing the hormonal compounds of this invention.

EXAMPLE 439

13β-ethyl-17β-hydroxy-8-iso-gon-5(10)-en-3-one

Dissolve 13β-ethyl-3-methoxy-8-iso-gona-2,5(10)-dien-17β-ol (1 g.) in ethanol (75 cc.). Add a solution of oxalic acid (1.15 g.) in water (21 cc.) and allow to stand for 45 minutes. Dilute the reaction mixture with water and extract with ether. Wash the ethereal solution with aqueous sodium hydrogen carbonate, brine and dry and evaporate to obtain the title compound as a gum (0.9 g.).

Infrared spectrum: 2.95, 5.85μ.

Found: C, 79.12%; H, 9.8. $C_{19}H_{28}O_2$ requires C, 79.12%, 9.78%.

This compound has progestational activity and is useful as an intermediate for preparing the hormonal compounds of this invention.

EXAMPLE 440

13β-ethyl-17β-hydroxy-8-iso-gon-5(10)-en-3-one and
13β-ethyl-17β-hydroxy-8-iso-gon-4-en-3-one Dissolve 13β-ethyl-3-methoxy-8-iso-gona-2,5(10)-dien-17β-ol (0.5 g.) in ethanol (25 cc.) and methanol (25 cc.). Add 3N hydrochloric acid (30 cc.) and allow the mixture to stand for 16 hours. Dilute with water, extract with ether and wash the organic solution with aqueous sodium hydrogen carbonate and brine. Dry the solution and evaporate to obtain a mixture of the title products as a gum (0.4 g.). Infrared absorption 2.95, 5.8, 6.05μ.

This mixture is useful as an intermediate for preparing the hormonal compounds of this invention.

EXAMPLE 441

13β-ethyl-3-methoxy-8-iso-gona-2,5(10)-dien-17-one

Dissolve 13β-ethyl-3-methoxy-8-iso-gona-2,5(10)-dien-17β-ol (1 g.) in cyclohexanone (10 cc.) and toluene (30 cc.). Add under an atmosphere of nitrogen a solution toluene (20 cc.) and aluminium isopropoxide (0.2 g.) and reflux for 1 hour. Treat with water (20 cc.) and extract with ether. Wash the organic solution with water, dry and evaporate to obtain the title product (1 g.) as a solid; infrared spectrum 5.78, 5.9, 6.0μ.

This compound is useful as an intermediate for preparing the hormonal compounds of this invention.

EXAMPLE 442

13β-ethyl-17α-ethynyl-17β-hydroxy-8-iso-gon-5(10)-en-3-one

Treat a solution of 13β-ethyl-17α-ethynyl-3-methoxy-8-iso-gona-2,5-dien-17β-ol in alcohol (75 cc.) with oxalic acid (1.15 g.) in water (21 cc.) and allow to stand at room temperature for 45 minutes. Add water, extract with ether and wash, dry and evaporate the organic solution. Chromatograph the product on neutral alumina and elute the product with benezene-petroleum ether to obtain the title compound, m.p. 145–155°.

Infrared absorption 2.98, 3.12, 5.85μ.

Found: C, 80.66%; H, 9.02%. $C_{21}H_{28}O_2$ requires C, 80.73%; H, 9.03%.

This compound has estrogenic activity and is useful as an intermediate for preparing the hormonal compounds of this invention.

EXAMPLE 443

13β-ethyl-3-methoxy-8,14-seco-D-homo-gona-1,3,5(10),9-tetraene-14,17a-dione

Heat 1-vinyl-6-methoxy-1-tetralol (5 g.), 2-ethylcyclohexane-1,3-dione (3 g.), a solution of Triton B (0.65 g.) in ethanol (1.5 cc.) and xylene (5 cc.) at 125° for 1 hour in an atmosphere of nitrogen. Cool the solution, dilute with ether (25 cc.), filter and wash with 5% aqueous potassium hydroxide and then dry. Remove the solvent to obtain the title product as a gummy residue; infrared absorption peaks at 5.8, 6.2μ; ultraviolet absorption peak at 267 mμ (ε 16,000).

To obtain 13β-propyl-3-methoxy-8,14-seco-D-homo-gona-1,3,5(10),9-tetraene-14,17a-dione, treat 1-vinyl-6-methoxy-1-tetralol with 2n-propylcyclohexane-1,3-dione and Triton B according to the manipulative procedure described above.

To obtain 13β-n-butyl-3-methoxy-8,14-sec-D-homo-gona-1,3,5(10),9-tetraene-14,17a-dione, treat 1-vinyl-6-methoxy-1-tetralol with 2-n-butylcyclohexane-1,3-dione and Triton B according to the manipulative procedure described above.

To obtain 13β-ethyl-3-methoxy-6-methyl-8,14-seco-D-homo-gona-1,3,5(10),9-tetraene-14,17a-dione, treat 1-vinyl-4-methyl-6-methoxy-1-tetralol with 2-ethylcyclohexane-1,3-dione and Triton B according to manipulative procedure described above.

To obtain 13β-ethyl-3-hydroxy-8,14-seco-D-homo-gona-1,3,5(10),9-tetraene-14,17a-dione, treat 1-vinyl-6-hydroxy-1-tetralol with 2-ethylcyclohexane-1,3-dione and Triton B according to the manipulative procedure described above.

To obtain 13β-ethyl-3-methoxy-7-methyl-8,14-seco-D-homo-gona-1,3,5(10),9-tetraene-14,17a-dione, treat 1-vinyl-3-methyl-6-methoxy-1-tetralol with 2-ethylcyclohexane-1,3-dione and Triton B according to the manipulative procedure described above.

This compound is useful as an intermediate for preparing the hormonal compounds of this invention.

EXAMPLE 444

13β-ethyl-3-ethoxy-8,14-seco-D-homo-gona-1,3,5(10),9-tetraene-14,17a-dione

Prepare 1-vinyl-6-ethoxy-1-tetralol by adding vinyl magnesium bromide to 6-ethoxy-1-tetralone by the method of Nazorov, Chemical Abstracts, 51, 14647d (1957), and heat this compound (5 g.) with 2-ethyl-cyclohexane-1,3-dione (3.2 g.) in xylene (6 cc.) containing a solution of Triton B (0.65 g. in ethanol (1.5 cc.) at 125° C. for 1 hour. Dilute the cooled solution with ether (25 cc.), filter, wash with 5% aqueous potassium hydroxide, water and dry. Evaporate the solvent to obtain the title product as a gum.

To obtain 13n-propyl-3-ethoxy-8,14-seco-D-homo-gona-1,3,5(10),9-tetraene-14,17a-dione, treat 1-vinyl-6-ethoxy-1-tetralol with 2-n-propylcyclohexane-1,3-dione and Triton B according to the manipulative procedure described above.

To obtain 13β-n-butyl-3-ethoxy-8,14-seco-D-homo-gona-1,3,5(10),9-tetraene-14,17a-dione, treat 1-vinyl-6-ethoxy-1-tetralol with 2-n-butylcyclohexane-1,3-dione and Triton B according to the manipulative procedure described above.

These compounds are useful as intermediates for preparing the hormonal compounds of this invention.

EXAMPLE 445

13β-methyl-8,14-seco-gona-1,3,5(10),9-tetraene-14,17-dione

Add 1-vinyl-6-methoxy-1-tetralol (14 g.) to 2-methyl-cyclopentane-1,3-dione (10 g.) in methanol (40 cc.) containing potassium hydroxide(50 mg.) and reflux the mixture for 5 hours. Evaporate the reaction mixture to a small bulk and add ether (200 cc.). Wash the ethereal solution with water, aqueous sodium carbonate, brine and dry. Evaporate the solvent to obtain the title product and crystallize from ethanol.

To obtain 13β-ethyl-3-methoxy-8,14-seco-gona-1,3,5(10),9-tetraene-14,17-dione, treat 1-vinyl-6-methoxy-1-tetralol with 2-ethylcyclopentane-1,3-dione and methanolic potassium hydroxide according to the manipulative procedure described above.

To obtain 13β-n-propyl-3-methoxy-8,14-seco-gona-1,3,5(10),9-tetraene-14,17-dione, treat 1-vinyl-6-methoxy-1-tetralol with 2-n-propylcyclopentane-1,3-dione and methanolic potassium hydroxide according to the manipulative procedure described above.

To obtain 13β-n-butyl-3-methoxy-8,14-seco-gona-1,3,5(10),9-tetraene-14,17-dione, treat 1-vinyl-6-methoxy-1-tetralol with 2-n-butylcyclopentane-1,3-dione and methanolic potassium hydroxide according to the manipulative procedure described above.

To obtain 13β-methyl-3-ethoxy-8,14-seco-gona-1,3,5(10),9-tetraene-14,17-dione, treat 1-vinyl-6-ethoxy-1-tetralol with 2-methylcyclopentane-1,3-dione and methanolic potassium hydroxide according to the manipulative procedure described above.

To obtain 13β-ethyl-3-ethoxy-8,14-seco-gona-1,3,5(10),9-tetraene-14,17-dione, treat 1-vinyl-6-ethoxy-tetralol with 2-ethylcyclopentane-1,3-dione and methanolic potassium hydroxide according to the manipulative procedure described above.

To obtain 13β-n-propyl-3-ethoxy-8,14-seco-gona-1,3,5(10),9-tetraene-14,17-dione treat 1-vinyl-6-ethoxy-1-tetralol with 2-*n*-propylcyclopentane-1,3-dione and methanolic potassium hydroxide according to the manipulative procedure described above.

To obtain 13β-n-butyl-3-ethoxy-8,14-seco-gona-1,3,5(10),9-tetraene-14,17-dione, treat 1-vinyl-6-ethoxy-1-tetralol with 2-n-butylcyclopentane-1,3-dione and methanolic potassium hydroxide according to the manipulative procedure described above.

To obtain 13β-ethyl-8,14-seco-gona-1,3,5(10),9-tetraene-14,17-dione, treat 1-vinyl-1-tetralol with 2-ethylcyclopetane-1,3-dione and methanolic potassium hydroxide according to the manipulative procedure described above.

To obtain 13β-*n*-propyl-8,14-seco-gona-1,3,5(10),9-tetraene-14,17-dione, treat 1-vinyl-1-tetralol with 2-*n*-propyl-cyclopentane-1,3-dione and methanolic potassium hydroxide according to the manipulative procedure described above.

To obtain 13β-ethyl-3-hydroxy-8,14-seco-gona-1,3,5(10),9-tetraene-14,17-dione, treat 1-vinyl-6-hydroxy-1-tetralol with 2-ethylcyclopentane-1,3-dione and methanolic potassium hydroxide according to the manipulative procedure described above.

To obtain 13β-ethyl-3-methoxy-6 - methyl-8,14-seco-gona-1,3,5(10),9-tetraene-14,17-dione, treat 1-vinyl-6-methoxy-4-methyl-1-tetralol with 2-ethylcyclopentane-1,3-dione and methanolic potassium hydroxide according to the manipulative procedure described above.

To obtain 13β-ethyl-3-methoxy-7-methyl-8,14-seco-gona-1,3,5(10),9-tetraene-14,17-dione, treat 1-vinyl-6-methoxy-3-methyl-1-tetralol with 2-ethylcyclopentane-1,3-dione and methanolic potassium hydroxide according to the manipulative procedure described above.

These compounds are useful as intermediates for preparing the hormonal compounds of this invention.

EXAMPLE 446

13β-ethyl-3-methoxy-D-homo-gona-1,3,5(10),8,14-pentaen-17a-one

Cyclize 13β-ethyl-3-methoxy - 8,14-seco-D-homo-gona-1,3,5(10),9-tetraene-14,17a-dione (13 g.) by heating with phosphorus pentoxide (1.2 g.) at 10 Mm. Hg for 7 minutes at 120°. Treat the cooled reaction mixture with water and extract with ether. Wash and dry the ethereal solution and evaporate the solvent to obtain the title product; ultraviolet absorption peak at 310 mμ. (ε 27,000).

To obtain 13β-n-propyl-3-methoxy-D-homo-gona-1,3,5(10),8,14-pentaen-17-one, cyclize 13β-n-propyl-3-methoxy-8,14-seco-gona - D-homo - gona-1,3,5(10),9-tetraene-14,17α-dione with phosphorus pentoxide according to the manipulative procedure described above.

To obtain 13β-n-butyl-3-methoxy-D-homo-gona-1,3,5(10),8,14 - pentaen-17a-one cyclize 13β-n-butyl-3-methoxy-8,14-seco-D-homo-gona - 1,3,5(10),9-tetraene-14,17a-dione with phosphorus pentoxide according to the manipulative procedure described above.

To obtain 13β-ethyl-3-ethoxy-D-homo-gona-1,3,5(10),8,14-pentaen-17a-one, cyclize 13β-ethyl-3-ethoxy-8,14-seco-D-homo-gona - 1,3,5(10),9 - tetraene-14,17a-dione with phosphorus pentoxide according to the manipulative procedure described above.

To obtain 13β-n-propyl-3-ethoxy-D-homo-gona-1,3,5(10),8,14 - pentaen-17a-one, cyclize 13β-n-propyl-3-ethoxy-8,14-seco-D-homo-gona - 1,3,5(10),9-tetraene-14,17a-dione with phosphorus pentoxide according to the manipulative procedure described above.

To obtain 13β-butyl-3-ethoxy-D-homo-gona-1,3,5(10),8,14-pentaene-17a-one, cyclize 13β-n-butyl-3-ethoxy-8,14-seco-D-homo-gona - 1,3,5(10),9 - tetraene-14,17a-dione with phosphorus pentoxide according to the manipulative procedure described above.

To obtain 13β-ethyl-3 - hydroxy-D-homo-gona-1,3,5(10),8,14 - pentaene-17a-one, cyclize 13β-ethyl-3-hydroxy-8,14-seco-D-homo-gona - 1,3,5(10),9-tetraene-14,17a-dione with phosphorus pentoxide according to the manipulative procedure described above.

To obtain 13β-ethyl-3-methoxy-6-methyl-D-homo-gona-1,3,5(10),8,14-pentaene-17a-one, cyclize 13β-ethyl-3-methoxy-6-methyl-8,14 - seco-D-homo-gona - 1,3,5(10),9-tetraene-14,17a-dione with phosphorus pentoxide according to the manipulative procedure described above.

To obtain 13β-ethyl-3-methoxy-7-methyl-D-homo-gona-1,3,5(10),8,14-pentaen-17a-one, cyclize 13β-ethyl-3-methoxy-7-methyl-8,14 - seco-D-homo-gona - 1,3,5(10),9-tetraene-14,17a-dione with phosphorus pentoxide according to the manipulative procedure described above.

These compounds possess estrogenic and lipid lowering activity and are useful as intermediates for preparing the hormonal compounds of this invention.

EXAMPLE 447

13β-methyl-3-methoxy-gona-1,3,5(10),8,14-pentaen-17-one

Add 13β-methyl-3-methoxy-8,14-seco-gona-1,3,5)10),9-tetraene-14,14-one (14 g.) to a solution of anhydrous toluene-p-sulphonic acid (14 g.) in dry benzene (500 cc.). Allow the mixture to stand at room temperature for 3 hours and then add ether (100 cc.) and wash with water, aqueous sodium carbonate, brine and dry. Remove the solvent under reduced pressure and distil the red gummy residue at 230° (bath temperature) 0.2 mm. Hg. Crystallize the distillate to obtain the title product.

To obtain 13β-ethyl-3-methoxy-gona-1,3,5(10),8,14-pentaen-17-one cyclize 13β-ethyl - 3 - methoxy-8,14-seco-gona-1,3,5(10),9-tetraene-14,14-dione with toluene-p-sulphonic acid according to the manipulative procedure described above.

To obtain 13β-n-propyl-3-methoxy-gona-1,3,5(10),8,14-pentaene - 17 - one cyclize 13β-n-propyl-3-methoxy-8,14-seco-gona-1,3,5(10),9-tetraene-14,17-dione with toluene-p-sulphonic acid according to the manipulative procedure described above.

To obtain 13β-n-butyl-3-methoxy-gona-1,3,5(10),8,14-pentaene-17-one cyclize 13β-n-butyl-3-methoxy-8,14-seco-gona-1,3,5(10),9-tetraene - 14,17 - dione with toluene-p-sulphonic acid according to the manipulative procedure described above.

To obtain 13β - methyl-3-ethoxy-gona-1,3,5(10),8,14-pentaene - 17 - one cyclize 13β-methyl-3-ethoxy-8,14-seco-gona-1,3,5(10),9-tetraene-14,17-dione with toluene-p-sulphonic acid according to the manipulative procedure described above.

To prepare 13β - ethyl-3-ethoxy-gona-1,3,5(10),8,14-pentaene-17-one treat 13β-ethyl-3-ethoxy-8,14-seco-gona-1,3,5(10),9-tetraene-14,17-dione with toluene-p-sulphonic acid according to the manipulative procedure described above.

To prepare 13β - n-propyl-3-ethoxy-gona-1,3,5(10),8,14 - pentaene-17-one treat 13β-n-propyl-3-ethoxy-8,14-seco-gona-1,3,5(10),9-tetraene-14,17-dione with toluene-p-sulphonic acid according to the manipulative procedure described above.

To prepare 13β-n-butyl-3-ethoxy-gona-1,3,5(10),8,14-pentaene - 17 - one treat 13β-n-butyl-3-ethoxy-8,14-seco-gona-1,3,5(10),9-tetraene-14,17-dione with toluene-p-sulphonic acid according to the manipulative procedure described above.

To prepare 13β - ethyl-3-hydroxy-gona-1,3,5(10),8,14-pentaene - 17 - one treat 13β-ethyl-3-hydroxy-8,14-seco-gona-1,3,5(10),9-tetraene-14,17-dione with toluene-p-sulphonic acid according to the manipulative procedure described above.

To prepare 13β - ethyl-3-methoxy-6-methyl-gona-1,3,5(10),8,14 - pentaene-17-one treat 13β-ethyl-3-methoxy-6-methyl-8,14-seco-gona-1,3,5(10),9 - tetraene-14,17-dione with toluene-p-sulphonic acid according to the manipulative procedure described above.

To prepare 13β - ethyl-3-methoxy-7-methyl-gona-1,3,5(10),8,14-pentaene-17-one treat 13β - ethyl-3-methoxy-7 - methyl - 8,14 - seco-gona-1,3,5(10),9-tetraene-14,17-dione with toluene-p-sulphonic acid according to the manipulative procedure described above.

These compounds possess estrogenic and blood lipid lowering activity and are useful as intermediates for preparation of hormonal compounds of this invention.

EXAMPLE 448

13β-ethyl-gona-1,3,5(10),8,14-pentaene-17-one

Stir 13β - ethyl-8,14-seco-gona-1,3,5(10),9-tetraene-14,17-dione (5 g.) in benzene (50 cc.) with polyphosphoric acid (20 g.) for 30 minutes at room temperature. Add water and extract the mixture with ether. Wash and dry the organic extracts and evaporate the solvent to give the title compound as a gum.

To prepare 13β - n - propyl-gona-1,3,5(10),8,14-pentaene - 17 - one treat 13β-n-propyl-8,14-seco-gona-1,3,5(10),9-tetraene-14,17-dione with polyphosphoric acid according to the manipulative procedure described above.

These compounds possess estrogenic and blood lipid lowering activity and are useful as an intermediate for preparing the hormonal compounds of this invention.

EXAMPLE 449

13β-ethyl-3-methoxy-17α-ethynyl-17β-acetoxy-gona-1,3,5(10)-triene

Shake 13β-ethyl - 3 - methoxy-17α-ethynyl-gona-1,3,5 (10)-trien-17β-ol (1.1 g.) with toluene-p-sulphonic acid (0.3 g.) and acetic anhydride (10 cc.) until the solution is homogeneous and then allow to stand at room temperature for 12 hours. Decompose the reaction mixture by stirring with water containing a little pyridine and extract with ether. Wash the ethereal solution with water, 2N aqueous sodium hydroxide, water, dilute hydrochloric acid, brine and dry ($MgSO_4$). Evaporate the solvent and dissolve the crystalline residue in benzene and filter through a short column of alumina. Recrystallize the product from methanol-ethyl acetate to obtain the title compound 0.98 g., m.p. 178–182°; infrared absorption peaks at 3.02, 5.75μ.

This compound has estrogenic activity and is useful as an intermediate for preparing the hormonal compounds of the invention.

EXAMPLE 450

13β-ethyl-3-methoxy-17α-dibromoacetyl-17β-acetoxy-gona-1,3,5(10)-triene

Dissolve 13β - ethyl - 3 - methoxy-17α-ethynyl-17β-acetoxy-gona-1,3,5(10)-triene (0.6 g.) in tertiary butanol (25 cc.) and water (0.4 cc.) and add N-bromoacetamide (0.55 g.). Allow the mixture to stand for 15 hours then add water (10 cc.), cool to 0° and allow to stand for 3 hours. Filter the precipitated product, wash with aqueous methanol and dry to obtain the title product (0.72 g.), m.p. 85–92°.

This compound is useful as an intermediate for preparing the hormonal compounds of this invention.

EXAMPE 451

13β-ethyl-3-methoxy-17α-acetyl-17β-acetoxy-gona-1,3,5(10)-triene

Heat 13β - ethyl - 3-methoxy-17α-dibromacetyl-17β-acetoxy-gona-1,3,5(10)-triene (0.7 g.) in acetic acid (27 cc.) and water (2.7 cc.) with sodium acetate (0.7 g.) and zinc dust (0.99 g.) at 100° for 15 minutes with stirring. Filter the mixture, add water to the filtrate and filter the precipitated product. Dry the residue and recrystallize from ethyl acetate-methanol to obtain the title products (0.25 g.) m.p. 144–8°; infrared absorption peaks at 5.8, 5.9μ.

This compound is useful as an intermediate for preparing the hormonal compounds of this invention.

EXAMPLE 452

13β-ethyl-17β-acetylgon-4-en-3-one

Add 13β - ethyl - 3 - methoxy-17α-acetyl-17β-acetoxy-gona-1,3,5(10)-triene (0.24 g.) in dioxan (5 cc.) to a stirred solution of lithium (0.15 g.) in liquid ammonia (100 cc.). After 30 minutes add methanol (8 cc.) followed by lithium (0.5 g.) in small pieces. Add water, extract with ether and work up to a gum (0.218 g.). Reflux this product with 4N hydrochloric acid (5 cc.) and methanol (8 cc.) for 15 minutes. Add water, extract with ether, work up and dissolve the resulting gum in acetone (30 cc.) containing anhydrous magnesium sulphate (0.5 g.) and add 8N-chromic acid dropwise with swirling until the solution assumes a permanent yellowish-orange color. Add excess isopropanol and evaporate the solution almost to dryness. Add water, extract with ether, wash, dry and evaporate the organic solution, filter the product through alumina with benzene-ether and recrystallize the product from ethyl acetate to obtain the title product (0.072 g.), m.p. 138–142°; infrared absorption peaks at 5.9, 6μ.

This compound has progestational activity and is useful as an intermediate for preparing the hormonal compounds of this invention.

EXAMPLE 453

13β-ethyl-gon-4-en-17β-ol

Add 13β-ethyl-3,3-ethylenedithiogon - 4 - en-17β-ol in ether (5 cc.) and tetrahydrofuran (2 cc.) to a stirred solution of liquid ammonia (50 cc.) and add sodium (0.5 g.) in pieces and then add ethanol dropwise to discharge the blue color. Add ammonium chloride and water, extract with ether and wash, dry and evaporate the organic solution. Recrystallize the residue from light petroleum, b.p. 60–80°, to obtain 13β-ethyl-gon-4-en-17β-ol, m.p. 118–120°.

This compound has anabolic and androgenic activity and is useful as an intermediate for preparing the hormonal compounds of this invention.

EXAMPLE 454

13β-ethyl-gon-4-en-17-one

Dissolve 13β-ethyl-gon-4-en-17β-ol (0.29 g.) in acetone (40 cc.) and 8N-chromic acid dropwise with stirring until the solution becomes permanently orange and then add isopropanol (3 cc.) and evaporate the solution to small bulk (ca. 5 cc.). Add water and extract the mixture with ether. Wash dry and evaporate the ethereal solution to obtain 13β-ethyl-gon-4-en-17-one (0.24 g.), m.p. 101–102° C. Purify by recrystallization from methanol to obtain the pure product, m.p. 102.5–103.5° C.

$C_{19}H_{28}O$ calculated: 83.8%; H, 10.4%. Found: 83.55%; H, 10.7%.

This compound is useful as an intermediate for preparing the hormonal compounds of this invention.

EXAMPLE 455

13β-ethyl-17α-allyl-gon-4-en-17β-ol

Reflux magnesium (0.36 g.) and allyl bromide (0.15 cc.) in dry ether (10 cc.) for 15 minutes and then add 13β-ethyl-gon-4-en-17-one (0.9 g.) in ether (40 cc.) containing allyl bromide (2.9 cc.). Reflux the mixture for 3 hours and treat the cooled solution with aqueous ammonium chloride. Extract the product with ether and wash the ethereal solution with water, brine and dry ($MgSO_4$). Evaporate the solvent and recrystallize the residue from methanol to obtain 13β-ethyl-17α-allyl-gon-4-en-17β-ol (0.97 g.), m.p. 88.5–91° C. Recrystallize further from ether-hexane to obtain the pure product, m.p. 92–94° C.

$C_{22}H_{34}O$ calculated: C, 84.0%; H, 10.9%. Found: C, 84.4%; H, 10.9%.

This compound has progestational activity and is useful as an intermediate for preparing the hormonal compounds of this invention.

EXAMPLE 456

13β-n-propyl-3,3-ethylenedithio-gon-4-en-17β-ol

Treat 13β-n-propyl-17β-hydroxy-gon-4-en-3-one (6 g.) in acetic acid (15 cc.) with ethane dithiol (1.75 cc.) followed by boron trifluoride etherate (1.75 cc.). Allow the mixture to stand at room temperature for 15 minutes then pour into water and filter. Recrystallize the residue from methanol to obtain the title product (6.05 g.), m.p. 165–166.5° C. Recrystallize further to obtain the pure compound, m.p. 167–168.5° C.

$C_{22}H_{34}OS_2$ calculated: C, 69.8%; H, 9.05%; S, 16.9%. Found: C, 69.6%; H, 8.9%; S, 16.5%.

This compound is useful as an intermediate for preparing the hormonal compounds of this invention.

EXAMPLE 457

13β-n-propyl-gon-4-en-17β-ol

Add 13β - n-propyl-3,3-ethylenedithio-gon-4-en-17β-ol (5.8 g.) in tetrahydrofuran (40 cc.) and ether (20 cc.) with stirring to a solution of sodium (3 g.) in liquid ammonia (250 cc.). Add more sodium (3 g.) in pieces over 30 minutes followed by the dropwise addition of ethanol to discharge the blue color. Add water, extract with ether and wash, dry, and evaporate the organic extracts. Recrystallize the product from ether-hexane to obtain the title product (4.5 g.), m.p. 115–119° C.

This compound has anabolic and androgenic activity and is useful as an intermediate for preparing the hormonal compounds of this invention.

EXAMPLE 458

13β-n-propyl-gon-4-en-17-one

Add 8N chromic acid dropwise with stirring to a solution of 13β-n-propyl-gon-4-en-17β-ol in acetone (100 cc.) until the solution becomes permanently orange. Add isopropanol (10 cc.) and potassium carbonate (5 g.), filter and evaporate the filtrate to dryness. Filter the residue in benzene-ether (1:1) through neutral alumina (20 g.), evaporate and recrystallize the product from methanol to obtain 13β-n-propyl-gon-4-en-17-one. Recrystallize from ether-hexane to obtain the pure product, m.p. 89–90° C.

$C_{20}H_{30}O$ calculated: C, 82.9; H, 10.6%. Found: C, 83.9; H, 10.5%.

This compound is useful as an intermediate for preparing the hormonal compounds of this invention.

EXAMPLE 459

13β-n-propyl-17α-ethynyl-gon-4-en-17β-ol

Add 13β-n-propyl-gon-4-en-17-one (1.5 g.) in dimethylacetamide (50 cc.) to a stirred suspension of lithium acetylide (40 cc. of a 15% solution in dioxan-triethylamine) and pass a slow stream of acetylene through the stirred solution for 40 hours. Pour the mixture into iced water and extract with ether. Wash and dry the ethereal solution and evaporate to dryness. Recrystallize the product twice from methanol and once from hexane to obtain the title product, m.p. 118–119° C.

$C_{22}H_{32}O$ calculated: C, 84.55%; H, 10.3%. Found: C, 84.8%; H, 10.4%.

This compound has progestational activity and is useful for preparing the hormonal compounds of this invention.

EXAMPLE 460

13β-n-propyl-17α-allyl-gon-4-en-17β-ol

Reflux magnesium (0.36 g.) and allyl bromide (1.5 cc.) in ether (15 cc.) for 15 minutes and then add a solution of 13β - n-propyl-gon-4-en-17-one in ether (10 cc.) and allyl bromide (2.9 cc.). Reflux for 3 hours and treat the cooled solution with aqueous ammonium chloride. Extract the mixture with ether and wash, dry, and evaporate the ethereal solution. Recrystalize the residue from methanol and then from hexane to obtain 13β-n-propyl-17α-allyl-gon-4-en-17β-ol, m.p. 90–92° C.

$C_{23}H_{36}O$ calculated: C, 84.1%; H, 11.1%. Found: C, 84.15%; H, 11.1%.

This compound has progestational activity and is useful as an intermediate for preparing the hormonal compounds of this invention.

EXAMPLE 461

13β-17α-diethyl-gon-4-en-3,17β-diol

Add 13β,17α - diethyl-17β-hydroxy-gon-4-en-3-one (10 g.) in tetrahydrofuran (100 cc.) and ether (100 cc.) to a stirred suspension of lithium aluminum hydride (5 g.) in ether (1000 cc.). Reflux the mixture for 2 hours, cool and decompose excess reagent by cautiously adding water. Separate the organic phase, wash, dry and evaporate to obtain the title product (10 g.), m.p. 110–122° C.

This compound has anabolic and androgenic activity and is useful as an intermediate for preparing the hormonal compounds of this invention.

EXAMPLE 462

13β,17α-diethyl-3-acetoxy-gon-4-en-17β-ol

Allow 13β,17α - diethyl-gon-4-en-3,17β-diol (3 g.) in pyridine (30 cc.) and acetic anhydride (3 cc.) to stand for 12 hours at 0° C. Evaporate the solvents under reduced pressure at less than 50° C. and crystallize the residue from ether-hexane to obtain the title product (2.43 g.), m.p. 85–100°. C This compound has anabolic and androgenic activity and is useful as an intermediate for preparing the hormonal compounds of this invention.

EXAMPLE 463

13β,17α-diethyl-gon-4-en-17β-ol

Add 13β,17α-diethyl-3-acetoxy-gon-4-en-17β-ol (1.35 g.) in ether (50 cc.) to a stirred solution of lithium (0.5 g.) in redistilled ethylamine (100 cc.). Stir the mixture for 15 minutes and decompose excess reagent with sodium nitrite. Allow the ethylamine to evaporate and add sodium sulphate (10 g.) and ether (200 cc.). Evaporate the filtered ethereal solution and recrystallize the residue from ether-hexane to give the title product, m.p. 96–112° C. Chromatograph on neutral alumina, eluting with benzene containing 5% ether and recrystallize from ether to obtain the pure compound, m.p. 117.5–118.5° C.

$C_{21}H_{34}O$ calculated: C, 83.4%; H, 11.3%. Found: C, 83.5%; H, 11.3%.

This compound has anabolic and androgenic activity and is useful as an intermediate for preparing the hormonal compounds of this invention.

The subject matter which the applicants regard as their invention is particularly pointed out and distinctly claimed as follows:

1. A chemical compound having a cyclopentanophenanthrene carbon-carbon skeleton containing at least 19 and up to a maximum of 40 carbon atoms and in which at least the B and the C ring are at least partially hydrogenated, including a nucleus selected from the group consisting of saturated and unsaturated gonane and 8-isogonane nuclei having up to a maximum of five (5) double bonds and having as a part thereof in the 13-position a monovalent polycarbon alkyl radical having 2 to about 16 carbon atoms, said rings and the 13 and other positions of the nucleus being identified according to steroid nomenclature.

2. A compound of Claim 1, wherein said nucleus is unsaturated and has a double bond or bonds present in a position or positions selected from the following: (a) 4 position, (b) 5 position, (c) 5(10) position, (d) 2,5 (10) positions, (e) 3,5 positions, (f) 1,3,5(10) positions, (g) 1,3,5(10),9(11) positions, (h) 1,3,5(10),8 positions, or (i) 1,3,5(10),8,14 positions.

3. A compound of Claim 2, wherein the compound contains three (3) or more double bonds in the nucleus and the A ring of said nucleus is aromatic.

4. A compound of Claim 2, wherein the monovalent polycarbon alkyl radical in the 13-position is ethyl.

5. A compound of Claim 2, having a substituent in the 17-position linked to said 17-position through a carbon-carbon bond, thus being a part of said carbon-carbon skeleton, said 17 substituent containing a maximum of 4 carbon atoms.

6. A compound of Claim 4, wherein an alpha-ethynyl group is present in the 17-position.

7. A compound of Claim 6, wherein an acetoxy or hydroxy group is also present at said 17-position.

References Cited

UNITED STATES PATENTS

| | | | |
|---|---|---|---|
| 2,854,452 | 9/1958 | Laubach | 260—239.55 |
| 2,885,413 | 5/1959 | Hogg et al. | 260—397.45 |
| 2,923,708 | 2/1960 | Chemerda et al. | 260—239.55 |
| 3,048,606 | 8/1962 | Wettstein et al. | 260—397.45 |
| 3,075,970 | 1/1963 | Nomine et al. | 260—239.55 |

OTHER REFERENCES

Johnson et al.: J.A.C.S., *18*, pp. 6302–11 (1956).
Fieser et al.: Steroids, pp. 692–696 (1959).

HENRY A. FRENCH, Primary Examiner

U.S. Cl. X.R.

260—239.55 C, 397.3, 397.4, 397.45, 397.5, 570.5, 570.8, 590, 618, 650, 668, 999